United States Patent
Saitou et al.

(10) Patent No.: US 6,559,555 B1
(45) Date of Patent: May 6, 2003

(54) PASSENGER DETECTION SYSTEM AND DETECTION METHOD

(75) Inventors: Takashi Saitou, Osaka (JP); Masahiro Ofuji, Yokohama (JP); Yoshitaka Oka, Osaka (JP); Kazunori Jinno, Osaka (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/395,046

(22) Filed: Sep. 13, 1999

(51) Int. Cl.[7] ............................................. B60R 21/01
(52) U.S. Cl. ..................... 307/10.1; 307/121; 280/735
(58) Field of Search ................................ 307/9.1, 10.1, 307/121; 280/735; 340/573.1; 701/45

(56) References Cited

U.S. PATENT DOCUMENTS

| | | | |
|---|---|---|---|
| 4,573,082 A | 2/1986 | Jeskey ......................... 358/250 |
| 5,321,789 A | 6/1994 | Kida et al. .................. 385/133 |
| 5,844,415 A | 12/1998 | Smith et al. | |
| 5,877,492 A | 3/1999 | Fujieda et al. ........... 250/208.1 |
| 5,936,412 A | 8/1999 | Smith et al. | |
| 6,310,407 B1 * | 10/2001 | Saito et al. ................. 307/10.1 |
| 6,356,194 B1 | 3/2002 | Fukui et al. | |

FOREIGN PATENT DOCUMENTS

| | | | |
|---|---|---|---|
| DE | 19900842 | 7/1999 | |
| DE | 199 00 842 | 7/1999 | |
| GB | 2333160 A * | 7/1999 | ............ B60N/2/00 |
| JP | 3-233391 | 10/1991 | |
| JP | 4-303788 | 10/1992 | |
| JP | 5-291924 | 11/1993 | |
| JP | 5-291925 | 11/1993 | |
| JP | 7-270541 | 10/1995 | |
| JP | 9-509118 | 9/1997 | |
| JP | 9-301119 | 11/1997 | |
| JP | 11-198705 | 7/1999 | |
| JP | 11-281748 | 10/1999 | |
| JP | 11-334451 | 12/1999 | |
| JP | 11-351808 | 12/1999 | |
| JP | 2000-38077 | 2/2000 | |

OTHER PUBLICATIONS

European Search Report (in English) issued Feb. 14, 2000 in a related application.

Hardy L et al.: "Flat Eddy–Current Matrix Sensor for Detecting Metallic Objects" Sensors and Actuators A, CH, Elsevier, Sequoia S.A., Lausanne, vol. A29, No. 1, Sep. 1, 1991, pp. 13–19, XP000230912, ISSN: 0924–4247 *the whole document*.

(List continued on next page.)

Primary Examiner—Fritz Fleming
(74) Attorney, Agent, or Firm—Dickstein, Shapiro, Morin & Oshinsky, LLP.

(57) ABSTRACT

A passenger detection system is presented so that the master control circuit in the system instructs the passenger airbag control circuit controlling the operation of the airbag designated for the passenger seat to be in the deployable state or not-deployable state, depending on the seating conditions of a passenger sitting on the passenger seat, for example whether the passenger is an adult or a child. The passenger detection system is operated by a plurality of antenna electrodes disposed on the passenger seat; an electric field generation device for generating an electric field around an antenna electrode; a switching circuit for connecting the electric field generation device to the various antenna electrodes; an information detection circuit for detecting information related to a current flowing in a particular antenna electrode selected by the switching circuit; a master control circuit for receiving signal data output from the information detection circuit, and judging passenger seating conditions according to the signal data; and an airbag apparatus for controlling the operation of an airbag designated for the driver seat and an airbag designated for the passenger seat.

19 Claims, 78 Drawing Sheets

OTHER PUBLICATIONS

Japanese Office Action issued Jan. 30, 2002 (English translation of relevant portion).

Japanese Office Action issued Jan. 30, 2002 (English translation of relevant portion).

Japanese Office Action issued Feb. 5, 2002 (English translation of relevant portion).

Japanese Office Action issued Feb. 13, 2002 (English translation of relevant portion).

Japanese Office Action dated Jun. 5, 2002 (w/ English translation of relevant part).

Japanese Office Action dated May 10, 2002.

* cited by examiner

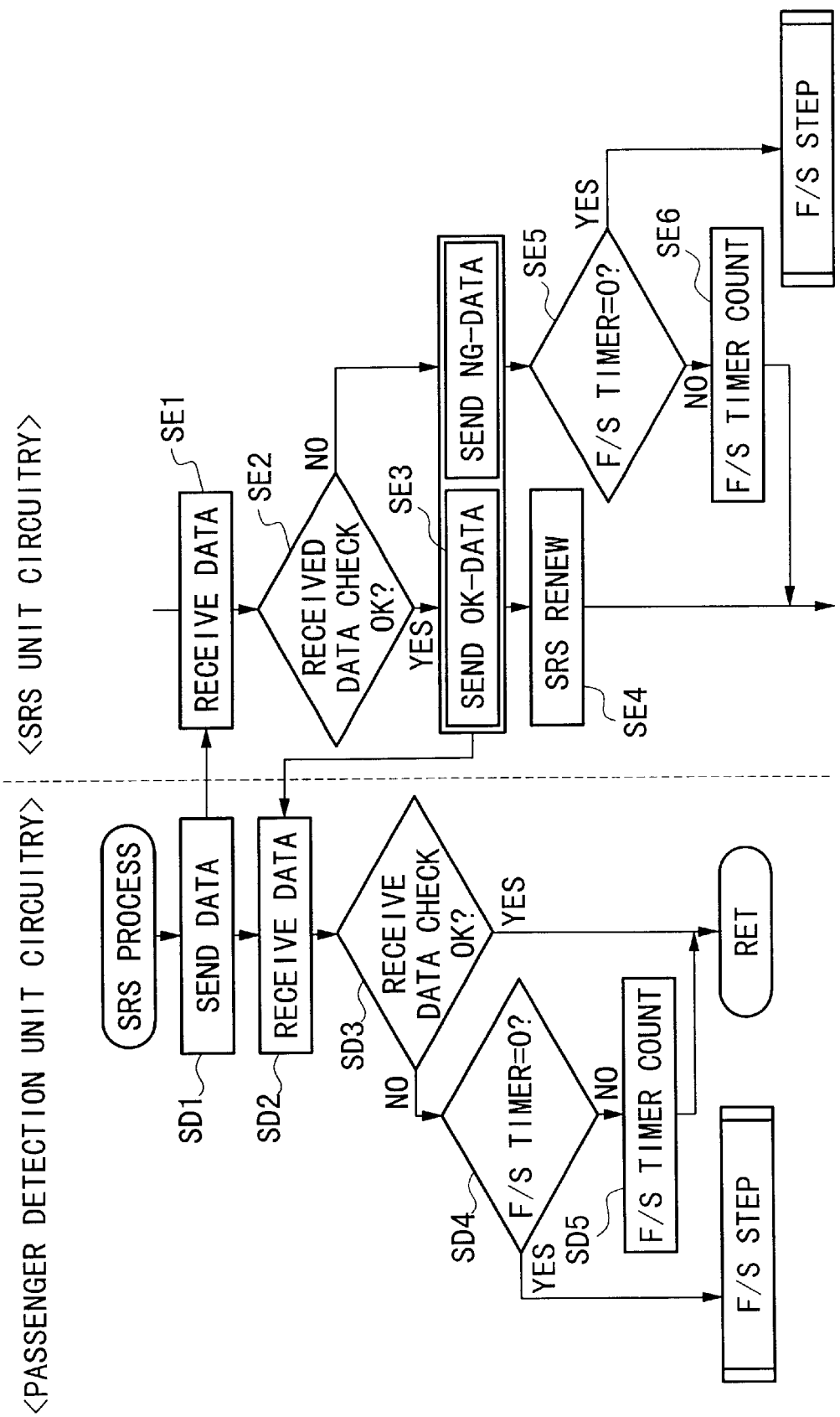

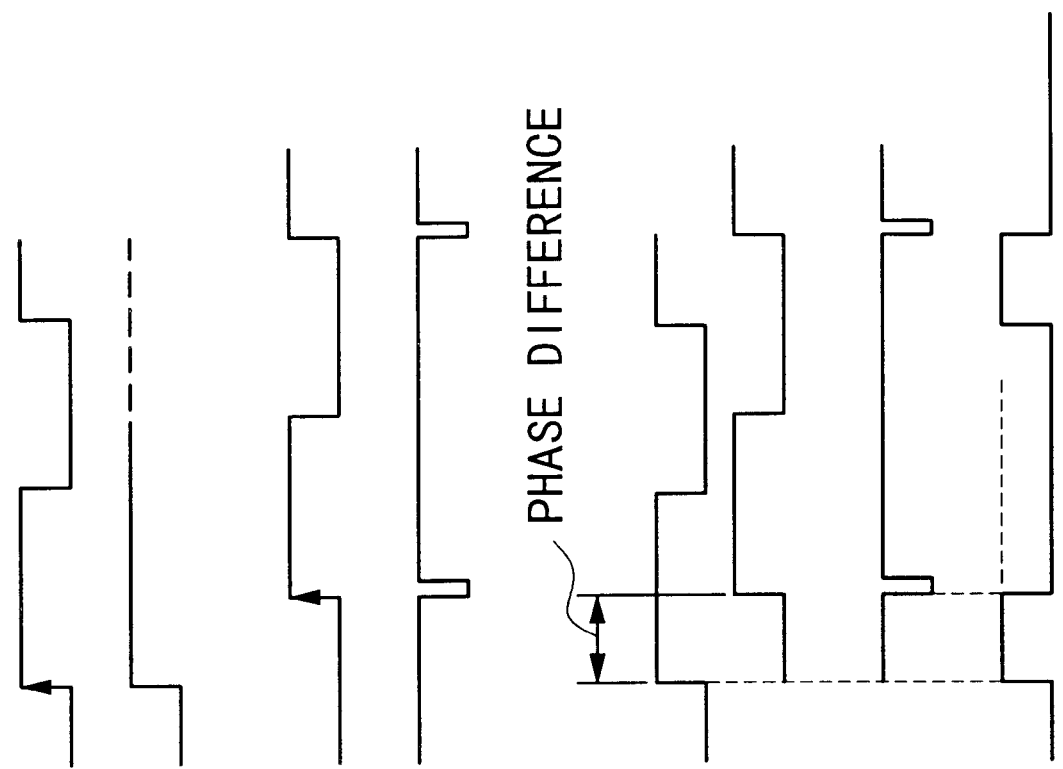

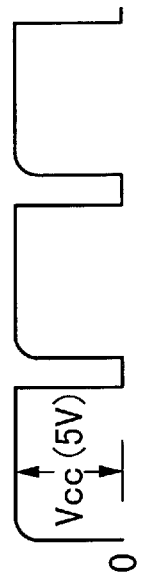
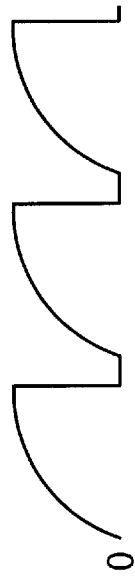
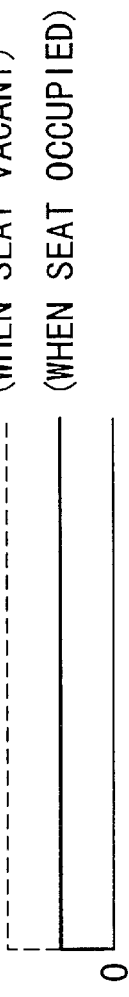
FIG.60A GATE SIGNAL
FIG.60B OUTPUT WAVEFORM WHEN SEAT VACANT
FIG.60C OUTPUT WAVEFORM WHEN SEAT OCCUPIED
FIG.60D OUTPUT DC SIGNAL FROM AC-DC CONVERSION SECTION

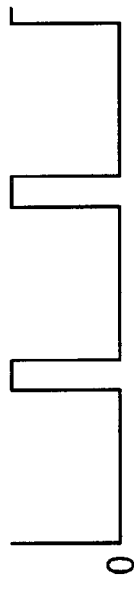
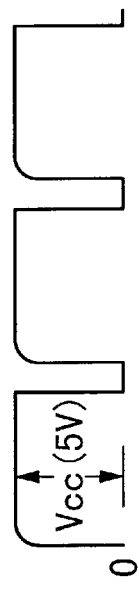
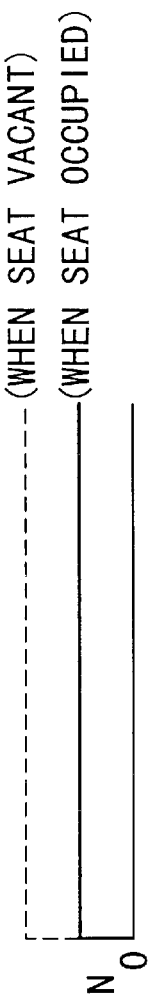
FIG.75A GATE SIGNAL
FIG.75B OUTPUT WAVEFORM WHEN SEAT VACANT
FIG.75C OUTPUT WAVEFORM WHEN SEAT OCCUPIED
FIG.75D OUTPUT DC SIGNAL FROM AC-DC CONVERSION SECTION

SEATING CONDITION EVALUATION

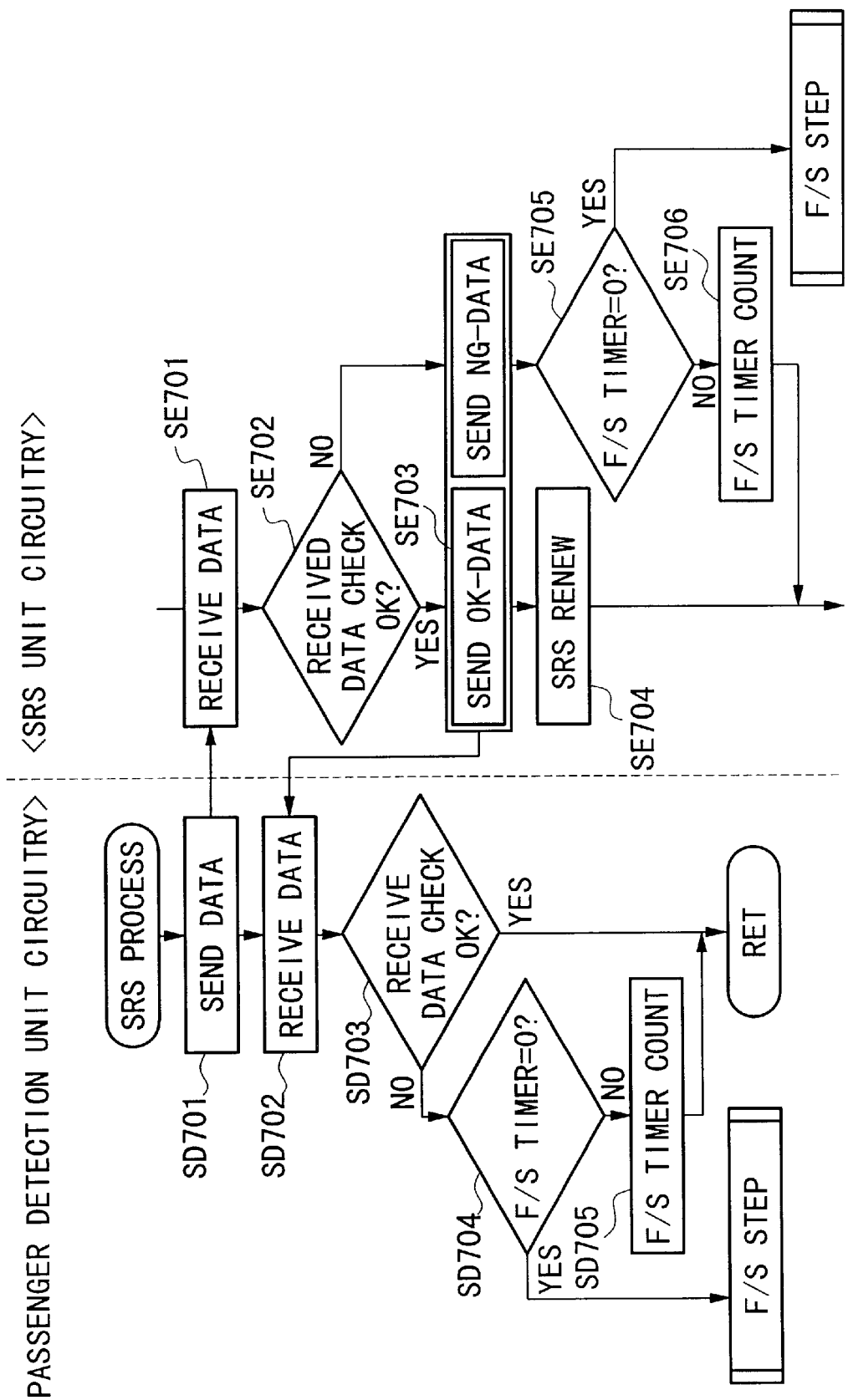

PASSENGER DETECTION SYSTEM AND DETECTION METHOD

BACKGROUND OF THE INVENTION

1. Field of the Invention

The present invention relates in general to passenger detection systems and methods, and relates in particular to an improved passenger detection system that places the airbag for the passenger, in the deployable or not-deployable state, depending on the seating conditions of the passenger sitting in the passenger seat in an automobile.

This application is based on Japanese Patent Applications Nos. Hei 10-061299, Hei 10-077870, Hei 10-077871, Hei 10-077872, Hei 10-077873, Hei 10-083797, Hei 10-083798, Hei 10-083799, Hei 10-097782, and Hei 10-153270, the contents of which are incorporated herein by reference.

2. Description of the Related Art

In general, an airbag apparatus in an automobile is aimed at protecting the driver of the vehicle from fatal injuries, in the event of a collision, and is now considered to be an essential item for automotive safety, and in recent years, an airbag is provided for the passenger as well as for the driver.

An example of such an airbag apparatus is shown in FIG. 96, and is comprised by: a driver-side squib circuit comprised by a series circuit including safety sensor SS1, squib SQ1, and a semiconductor switching device SW1 such as field effect transistor; a passenger-side squib circuit comprised by a series circuit including a safety sensor SS2, a squib SQ2, and a semiconductor switching device SW2 such as field effect transistor; an electronic accelerometer (impact sensor) GS; a control circuit CC for judging an impact force on the basis of output signals from the sensor GS, and to supply signals to the gate circuits of the switching devices SW1, SW2.

This air bag apparatus, when a collision occurs for whatever reason, safety sensor SS1, SS2 are closed responding to a relatively minor acceleration, and the squib circuits are placed in an operable state. And, when the control circuit CC judges that a collision has definitely taken place according to the signals from the accelerometer GS, signals are sent to the gates of switches SW1, SW2 and the switches SW1, SW2 are closed. As a result of a current flowing in the respective squib circuits, the driver-side and passenger-side airbags are deployed because of the heating in the squib SQ1, SQ2, and the occupants are protected from the collision impact.

However, this type of airbag apparatus is designed so that the airbags are deployed upon collision, regardless of the presence of a passenger so that, when an adult is sitting on the passenger seat, protective effect against collision can be expected, but when a child is sitting on the passenger seat, because the seated height is shorter and the head position is lower than an adult, the effect of airbag deployment on the child can be more damaging. Therefore, in some cases, it may be desirable that the airbag on the passenger-side be not deployed upon collision, when the passenger is a child.

Accordingly, in the past, an airbag apparatus such as the one shown in FIG. 97 has been proposed to address such a concern. This airbag apparatus includes a sensor SD to detect whether a passenger is seated, and the control circuit CC judges the seating condition according to the detected signal from the sensor SD, when a collision occurs, it is designed so that the control circuit CC makes the airbag apparatus deployable or not deployable. Proposed systems are based on: either to measure the weight of the passenger according to a weight sensor to decide if the passenger is an adult or a child; or to record an image of the passenger and decide between an adult or a child based on the processed image.

The weight method is capable of estimating substantially whether the passenger is an adult or a child, and based on the result, the airbag is placed either in the deployable state or not-deployable state, to safeguard the passenger in the event of a collision. However, body weight is subject to individual differences, and there is a serious concern in basing such a critical decision solely on loading factor, and the efficacy of such a system is in doubt.

The imaging method is able to reasonably estimate the seating condition of the passenger and decide whether the passenger is an adult or a child, but the method is based on comparing the current image data with various stored patterns so that the apparatus can be complex and expensive.

SUMMARY OF THE INVENTION

It is an object of the present invention to provide a passenger detection system and a method for precisely detecting the sitting conditions of a passenger occupying a seat, and based on the results of a detection process, an airbag apparatus is instructed to be in an appropriate operational state.

To achieve the objective, the present invention provides a passenger detection system comprising: a plurality of antenna electrodes disposed separately on a seat; an electric field generation device for generating a weak electric field around an antenna electrode; a switching circuit for selecting a particular antenna electrode from the plurality of antenna electrodes and connecting to the electric field generation device; an information detection circuit for generating a particular electric field around the particular antenna electrode, and obtaining information related to a current flowing in the particular antenna electrode resulting from applying the particular electric field; and a control circuit for receiving signal data from the information detection circuit and judging passenger seating conditions on the seat according to the signal data.

Aspect 2 of the present invention provides a passenger detection system having a plurality of antenna electrodes disposed separately on a seat; an electric field generation device for generating a weak electric field around an antenna electrode; a switching circuit for selecting a particular antenna electrode from the plurality of antenna electrodes and providing an electrical connection to the electric field generation device; an information detection circuit for generating a particular electric field around the particular antenna electrode, and obtaining information related to a current flowing in the particular antenna electrode resulting from applying the particular electric field; a control circuit for receiving signal data from the information detection circuit and judging passenger seating conditions on the seat according to the signal data; and an airbag apparatus for enabling to deploy, upon collision, an airbag designated for the seat; wherein the airbag apparatus is instructed by the control circuit to be either in the deployable state or not-deployable state according to judging data generated by the control circuit. Aspect 3 of the system is that the plurality of antenna electrodes are disposed on a sitting section and/or backrest section of the seat.

Aspect 4 of the present invention provides a passenger detection method based on disposing generating an electric field around a particular selected from a plurality of antenna electrodes; detecting information related to a current flowing in the particular antenna electrode resulting from applying the electric field; and judging passenger seating conditions according to signal data related to the information.

Aspect 5 of the present invention provides a passenger detection method comprising the steps of: disposing a plurality of antenna electrodes separately on a seat; selecting a particular antenna electrode from the plurality of antenna electrodes; generating an electric field on the particular antenna electrode; detecting information related to a current flowing in the particular antenna electrode resulting from applying the particular electric field; evaluating passenger seating conditions according to signal data related to the information and producing a judgment; sending the judgment to an airbag apparatus so as to place an airbag of the airbag apparatus either in the deployable state or not-deployable state.

As disclosed above, the present passenger detection system is based on a plurality of antenna electrodes disposed on a seat, and an electric field is generated by connecting the electric field generation device successively to each antenna electrode by means of a switching device. A current, resulting from the application of the electric field, flows in each antenna electrode depending on the passenger seating conditions. Therefore, by detecting information related to the current flowing in each antenna electrode, passenger seating conditions such as passenger loading and whether the passenger is an adult or a child can be detected readily.

Also, because high frequency low voltage signals are generated from one electric generation device and are distributed to the plurality of antenna electrode by the switching action of the switching device, circuit configuration is simple and the cost of the system is low.

Especially, the airbag in the airbag apparatus can be placed in a deployable or not-deployable state depending on whether the passenger is an adult or a child. For example, if a passenger is judged to be not an adult because of a low head height, the airbag is placed in the not-deployable state. Therefore, even if a collision occurs, the airbag is not deployed thus providing an appropriate action for a child passenger.

Aspect 6 of the present invention provides a passenger detection system comprising: a plurality of antenna electrodes disposed separately on a seat; an electric field generation device for generating a weak electric field around an antenna electrode; an amplitude control circuit for maintaining an amplitude of forward signals substantially constant; a switching circuit for selecting a particular antenna electrode from the plurality of antenna electrodes and providing an electrical connection to the electric field generation device; an information detection circuit for generating a particular electric field around the particular antenna electrode, and obtaining information related to a current flowing in the particular antenna electrode resulting from applying the particular electric field; and a control circuit for receiving signal data from the information detection circuit and judging passenger seating conditions on the seat according to the signal data.

Aspect 7 of the present invention provides a passenger detection system comprising: a plurality of antenna electrodes disposed separately on a seat; an electric field generation device for generating a weak electric field around an antenna electrode; an amplitude control circuit for maintaining an amplitude of forward signals substantially constant; a switching circuit for selecting a particular antenna electrode from the plurality of antenna electrodes and providing an electrical connection to the electric field generation device; an information detection circuit for generating a particular electric field around the particular antenna electrode, and obtaining information related to a current flowing in the particular antenna electrode resulting from applying the particular electric field; a control circuit for receiving signal data from the information detection circuit and judging passenger seating conditions on the seat according to the signal data; and an airbag apparatus for deploying, upon collision, an airbag designated for the seat; wherein the airbag apparatus is programmed by the control circuit to be either in the deployable state or not-deployable state according to judging data generated by the control circuit.

Aspect 8 of the present invention provides that the plurality of antenna electrodes are disposed on the sitting section and/or the backrest section. The invention presented in aspect 9 is a passenger detection system wherein the amplitude control circuit includes, at least, an amplitude varying circuit for varying a voltage amplitude of forward signals and an amplitude detection circuit for detecting the voltage amplitude and controlling the voltage varying circuit so as to maintain the voltage amplitude substantially constant, according to output signals from the amplitude detection circuit.

Aspect 10 of the present invention provides a passenger detection method by selecting a particular antenna electrode, and an electric field on the particular antenna electrode by impressing field signals, whose voltage amplitude is controlled substantially constant; detecting information related to a current flowing in the particular antenna electrode resulting from applying the particular electric field; and judging passenger seating conditions according to signal data related to the information.

Aspect 11 of the present invention provides a passenger detection method by selecting a particular antenna electrode, and an electric field on the particular antenna electrode by impressing field signals, whose voltage amplitude is controlled substantially constant; detecting information related to a current flowing in the particular antenna electrode resulting from applying the particular electric field; and judging passenger seating conditions according to signal data related to the information; and sending the judgment to an airbag apparatus so as to place an airbag of the airbag apparatus either in the deployable state or not-deployable state.

According to the invention presented in aspects 6 to 11, because the voltage amplitude of the forward signal from the selected antenna electrode is maintained substantially constant by the amplitude control circuit, little fluctuation occurs in the information related to the current detected by the information detection circuit so that stable data are obtained. Therefore, without compensating for the fluctuations in voltage amplitude, the stored data and the detected data can be compared readily, and the present detection method can offer high precision of detection of passenger seating conditions.

Also, seat has a plurality of separate antenna electrodes, and each antenna electrode is made to generate an electric field successively by the switching action of the switching circuit. Based on the electric field, a current flows successively in each antenna electrode according to the seating condition of the passenger. Therefore, by detecting information related to the current, passenger seating conditions can be determined accurately and readily.

Especially, the passenger airbag of the airbag apparatus is placed in either the deployable state or not-deployable state depending on whether the passenger is an adult or a child.

For example, if a passenger is judged to be not an adult because of a low head height, the airbag is placed in the not-deployable state. Therefore, even if a collision occurs, the airbag is not deployed to as to produce a protective action appropriate for a child passenger.

Aspect 12 of the present invention provides a passenger detection system comprised by: a plurality of antenna electrodes disposed separately on a seat; an electric field generation device for generating a weak electric field around an antenna electrode; a switching circuit for selecting a particular antenna electrode from the plurality of antenna electrodes and providing an electrical connection to the electric field generation device; an information detection circuit for generating a particular electric field around the particular antenna electrode, and obtaining information related to a current flowing in the particular antenna electrode resulting from applying the particular electric field; and a control circuit for receiving signal data from the information detection circuit and judging passenger seating conditions on the seat according to the signal data; wherein control circuit includes: memory means for storing initial data SDn as reference data, obtained in a reference state including a vacant seat state by impressing an electric field on each antenna electrode and detecting a resulting current flow in each antenna electrode; reception means for receiving detected data ADn, obtained when starting the passenger detection system by impressing an electric field on each antenna electrode and detecting a resulting current flow in each antenna electrode; and judging means for computing a difference between the detected data ADn and the initial data SDn to produce essentially true data DTn, where DTn=SDn−ADn, and judging passenger seating conditions according to the essentially true data.

Aspect 13 of the present invention provides a passenger detection system comprising: a plurality of antenna electrodes disposed separately on a seat; an electric field generation device for generating a weak electric field around an antenna electrode; a switching circuit for selecting a particular antenna electrode from the plurality of antenna electrodes and providing an electrical connection to the electric field generation device; an information detection circuit for generating a particular electric field around the particular antenna electrode, and obtaining information related to a current flowing in the particular antenna electrode resulting from applying the particular electric field; a control circuit for receiving signal data from the information detection circuit and judging passenger seating conditions on the seat according to the signal data; an airbag apparatus having a capability to select an operational state of an airbag designated for the seat; and communication means for sending judgment data, based on a judgment derived by the control circuit, to the airbag apparatus; wherein control circuit includes: memory means for storing initial data SDn as reference data, obtained in a reference state including a vacant seat state by impressing an electric field on each antenna electrode and detecting a resulting current flow in each antenna electrode; reception means for receiving detected data ADn, obtained when starting the passenger detection system, by impressing an electric field on each antenna electrode and detecting a resulting current flow in each antenna electrode; and judging means for computing a difference between the detected data ADn and the initial data SDn to produce essentially true data DTn, where DTn=SDn−ADn, and judging passenger seating conditions according to the essentially true data.

Aspect 14 of the present invention provides a passenger detection method for a passenger detection system to detect seating conditions of a passenger seated on a seat by generating an electric field successively in a plurality of antenna electrodes disposed on the seat, detecting information related to a current flow in each antenna electrode caused by respective impressed electric field and judging passenger seating conditions according to the information, wherein the method includes the steps of: storing initial data SDn as reference data obtained in a reference state including a vacant seat state, produced by impressing an electric field on each antenna electrode and detecting a resulting current flow in each antenna electrode; receiving detected data ADn, obtained after starting the passenger detection system, by impressing an electric field on each antenna electrode and detecting a resulting current flow in each antenna electrode; computing a difference between the detected data ADn and the initial data SDn to produce essentially true data DTn, where DTn=SDn−ADn; and evaluating passenger seating conditions according to the essentially true data.

Aspect 15 of the present invention provides a passenger detection method for a passenger detection system to detect seating condition of a passenger seated on a seat by generating an electric field around each of a plurality of antenna electrodes disposed on the seat, detecting information related to a current flow in each antenna electrode caused by respective impressed electric field, judging seating conditions based on signal data related to the information, and sending the judgment to an airbag apparatus so as to place an airbag of the airbag apparatus either in the deployable state or not-deployable state, wherein the method includes the steps of: initializing sensors so as to store initial data SDn as reference data obtained in a reference state including a vacant seat state, produced by impressing an electric field on each antenna electrode and detecting a resulting current flow in each antenna electrode; and after starting the passenger detection system, receiving detected data ADn, produced by successively impressing an electric field on each antenna electrode and detecting a resulting current flow in each antenna electrode; computing a difference between the detected data ADn and the initial data SDn to produce essentially true data DTn, where DTn=SDn−ADn; evaluating passenger seating conditions according to the essentially true data; sending resulting evaluation data to airbag apparatus using communication means; and prior to placing the airbag apparatus in a selected operational state, performing an SRS process by exchanging evaluation data between a passenger detection circuitry and an airbag apparatus circuitry to examine whether or not there is abnormality in communication circuitry.

According to the invention presented in aspects 12 to 15, passenger evaluation is carried out by using the initial data SDn based on the reference state which is a vacant state of the passenger seat, and the detected signal data ADn is corrected so that the evaluation of the passenger seating conditions is carried out according to essentially true signal data DTn according to a relation DTn=SDn−ADn. Therefore, such initialization process can eliminate the effects of subtle variations in the installation condition of the antennae and the characteristics of the parts used, so that the passenger detection can be carried out reliably and precisely.

Also, signal data related to the current flowing in a selected antenna electrode resulting from the application of electric field are obtained from a difference of the initial value stored in the control stored circuit and the detected data, and judgment on the passenger seating conditions is made on the basis of the difference data, and the results are sent to the airbag apparatus through the communication device, and furthermore, these actions are repeated, so that the control of the airbag apparatus can be performed reliably and precisely according to the detected data of passenger seating conditions.

Especially, by arranging to communicate the passenger seating conditions between the control circuit and the control circuit of the airbag apparatus, problems in the can be identified and the system performance is improved.

Aspect 16 of the present invention provides a passenger detection system having a plurality of antenna electrodes disposed separately on a seat; an electric field generation device for generating a weak electric field around an antenna electrode; a switching circuit for selecting a particular antenna electrode from the plurality of antenna electrodes and providing an electrical connection to the electric field generation device; an information detection circuit for generating a particular electric field around the particular antenna electrode, and obtaining information related to a current flow resulting from the particular electric field; a control circuit for receiving signal data from the information detection circuit and judging passenger seating conditions on the seat according to the signal data; an airbag apparatus for enabling to deploy, upon collision, an airbag designated for the seat; and communication means for sending a resulting judgment to the airbag apparatus, wherein resulting evaluation data are sent to airbag apparatus using communication means; and prior to placing the airbag apparatus either in the deployable state or not-deployable state, checking system operation by exchanging evaluation data between a passenger detection circuitry and an airbag apparatus circuitry to examine whether or not there is abnormality in a communication circuitry between the passenger detection circuitry and the airbag apparatus circuitry.

Aspect 17 of the present invention provides a passenger detection method by: generating an electric field successively around a plurality of antenna electrodes disposed on a seat; detecting information related to a current flowing in successive antenna electrodes; receiving signal data regarding the information; evaluating passenger seating conditions according to received signal data and producing a judgment; sending the judgment to an airbag apparatus; and prior to placing an airbag of the airbag apparatus in a selected operational state; checking system operation by exchanging SRS data between a passenger detection circuitry and an airbag apparatus circuitry to examine whether or not there is abnormality in a communication circuitry between the passenger detection circuitry and the airbag apparatus circuitry.

Aspect 18 of the present invention provides a passenger detection method for a passenger detection system to detect passenger seating conditions on a seat by generating an electric field successively around a plurality of antenna electrodes disposed on a seat; detecting information related to a current flowing in successive antenna electrodes; judging passenger seating conditions according to signal data on the information; and sending a resulting judgment to an airbag apparatus so as to place an airbag designated for the seat either in the deployable state or not-deployable state, wherein when the seat is vacant, generating an electric field successively on the plurality of antenna electrodes; detecting information related to a current flowing in successive antenna electrode resulting from applying the electric field; initializing sensors so as to store initial data SDn obtained, in a reference state including a vacant seat state, by generating an electric field successively on a plurality of antenna electrodes and detecting information related to a current flow caused by respective electric field; and after starting the passenger detection system, receiving detected data ADn, produced by successively impressing an electric field on each antenna electrode and detecting a resulting current flow in each antenna electrode; computing a difference between the detected data ADn and the initial data SDn to produce essentially true data DTn, where DTn=SDn−ADn; evaluating passenger seating conditions according to the true data; sending resulting evaluation data to airbag apparatus using communication means; and prior to placing the airbag apparatus in a selected operational state, performing an SRS process by exchanging evaluation data between a passenger detection circuitry and an airbag apparatus circuitry to examine whether or not there is abnormality in a communication circuitry between the passenger detection circuitry and the airbag apparatus circuitry.

According to the invention presented in aspects 16 to 19, signal data related to the current flowing in an antenna electrode resulting from the electric field selectively generated on the plurality of antenna electrodes are received in the control circuit, and based on the signal data, passenger seating conditions are judged, and the judgment is sent to the airbag apparatus through the communication device, and these linked actions are performed repeatedly, therefore, the airbag apparatus can be controlled appropriately according to the passenger seating conditions.

Especially, the judgment of passenger seating conditions is exchanged between the control circuit and the airbag apparatus so as to check the communication circuit in this process, therefore, the airbag apparatus can be controlled appropriately and control reliability is increased.

Also, the passenger evaluation process is performed according to the initial data SDn stored in external memory which is used to correct the detected data ADn, so that the true data can be obtained from a relation DTn=SDn−ADn, and therefore, it is possible to eliminate such effects of subtle variations in the installation condition of the antenna electrode and the characteristics of the parts used, so that the passenger detection can be carried out reliably and precisely.

Aspect 20 of the present invention provides a passenger detection system comprised by an antenna electrode disposed on a seat and/or a vicinity of the seat, generation means for generating an electric field around the antenna electrode, detection means for detecting information related to a current flowing in the antenna electrode, and evaluation means for evaluating passenger seating conditions according to the information, wherein the antenna electrode is comprised by an antenna electrode section made of an electrically conductive material, and the antenna electrode section surrounds a planar space where there is no antenna electrode.

Aspect 21 of the present invention provides a passenger detection system comprised by an antenna electrode disposed on a seat and/or a vicinity of the seat, generation means for generating an electric field around the antenna electrode, detection means for detecting information related to a current flowing in the antenna electrode, evaluation means for evaluating passenger seating conditions according to the information, controlling means for selecting an operational state of an airbag apparatus according to the information, wherein the antenna electrode is comprised by an antenna electrode section made of an electrically conductive material, and the antenna electrode section surrounds a planar space where there is no antenna electrode.

Aspect 22 of the present invention provides an antenna electrode placed on a scat and/or a vicinity of the seat constructed so as to be used in a passenger detection system to generate an electric field around the antenna electrode, detect information related to a current flowing in the antenna electrode, and evaluate passenger seating conditions according to the information, wherein the antenna electrode is comprised by an antenna electrode section made of an electrically conductive material, and the antenna electrode section surrounds a planar space where there is no antenna electrode.

Aspect 23 of the present invention provides a antenna electrode placed on a seat and/or a vicinity of the seat constructed so as to be used in a passenger detection system to generate an electric field around the antenna electrode, detect information related to a current flowing in the antenna electrode, and evaluate passenger seating conditions according to the information, wherein the antenna electrode is comprised at least by an insulating base member and an antenna electrode section made of an electrically conductive material, and a lead wire having an electrical connection to the antenna electrode section, and the antenna electrode section surrounds a planar space where there is no antenna electrode.

Aspect 24 of the present invention provides an antenna electrode wherein the antenna electrode section is formed into a loop shape including spiral, or snake, comb, radiating shapes by using an electrically conductive metal wire or strip. The invention in aspect 25 is an antenna electrode, wherein the antenna electrode section is formed into a loop shape including spiral, or snake, comb, radiating shapes by using a process including screen printing, coating, spraying, vapor depositing or electroplating of an electrically conductive material. The invention in aspect 26 is an antenna electrode, wherein the antenna electrode section is formed into a loop shape including spiral, or snake, comb, radiating shapes by using an etching process of an electrically conductive material including metal strip or an electrically conductive material prepared by vapor deposition or electroplating.

Aspect 27 of the present invention provides an antenna electrode, wherein the base member is provided with a cover member for covering the antenna electrode section so as to unitize base member with the antenna electrode section and the cover member. The invention in aspect 28 is an antenna electrode, wherein the antenna electrode section is provided directly on parts constituting the seat, including seat outer covering and cushion member. The invention in aspect 29 is an antenna electrode, wherein the antenna electrode section and the lead wire are electrically connected by joining means including connection terminals and pressure terminals.

According to the invention presented in aspects 20 to 29, a plurality of antenna electrodes provided in the seat have a space bounded by the peripheries of the antenna electrode section where there is no conductive material of the antenna electrodes. Therefore, the wire material is reduced and the cost is lowered. Especially, when the antenna electrode section is made of an electrically conductive woven material, reduction in the material usage means lower cost.

Also, the antenna electrodes are provided with as many vacant spaces as possible without causing problems in use, so that the cushioning of seat is not affected. Therefore, seating comfort level is maintained and is comparable to those seats without the antenna electrodes. Particularly, when the space is in the center of the antenna electrode section, there is hardly any effect on the performance of the antenna electrodes.

Also, the overall antenna electrode section is produced by bonding a plurality of antenna electrodes on an insulating base member, so that it is possible to secure the spacing and arrangement of the antenna electrodes simply by positioning the base between the outer covering and the cushion material, without having to make any adjustments in their positions. After installing the section, there is no problem of shifting of the antenna electrodes. Therefore, information obtained from the perturbation current is reliable and the precision of passenger seating evaluation is improved.

Aspect 30 of the present invention provides a passenger detection system comprising: a plurality of antenna electrodes disposed separately on a sitting section and/or a backrest section of a seat; an electric field generation device for generating a weak electric field around an antenna electrode; a current detection circuit for applying the weak electric field to a particular antenna electrode and detecting a resulting current flowing in the particular antenna electrode; and a control circuit for evaluating passenger sitting conditions according to signal data received from the current detection circuit; wherein all antenna electrodes, excepting the particular antenna electrode selected for generating an electric field, are impressed with a direct current potential or earth potential.

Aspect 31 of the present invention provides a passenger detection system comprising: a plurality of antenna electrodes disposed separately on a sitting section and/or a backrest section of a seat; an electric field generation device for generating a weak electric field around an antenna electrode; a switching circuit having a plurality of switching devices for selecting a particular electrode and connecting the electric field generation device to the particular antenna electrode; a current detection circuit for applying the weak electric field to the particular antenna electrode and detecting a resulting current flowing in the particular antenna electrode; and a control circuit for evaluating passenger sitting conditions according to signal data received from the current detection circuit; wherein all antenna electrodes, excepting the particular antenna electrode selected for generating an electric field, are impressed with a direct current potential or earth potential.

Aspect 32 of the present invention provides a passenger detection system comprising: a plurality of antenna electrodes disposed separately on a sitting section and/or a backrest section of a seat; an electric field generation device for generating a weak electric field around an antenna electrode; a current detection circuit for applying the weak electric field to a particular antenna electrode and detecting a resulting current flowing in the particular antenna electrode; and a control circuit for evaluating passenger sitting conditions according to signal data received from the current detection circuit; wherein all antenna electrodes, excepting the particular antenna electrode selected for generating an electric field, are impressed with a direct current potential or earth potential, and evaluation data from the control circuit are sent to an airbag apparatus so as to place an airbag designated for the seat in the deployable state or not-deployable state.

Aspect 33 of the present invention provides a passenger detection method by generating a weak electric field selectively around a particular antenna electrode selected from a plurality of antenna electrodes disposed separately on a sitting section and/or backrest section of a seat; applying a direct current potential or earth potential to all antenna electrodes excepting the particular antenna electrode; and evaluating passenger seating conditions according to signal data of a perturbation current resulting from applying the weak electric field.

Aspect 34 of the present invention provides a passenger detection method by generating a weak electric field selectively around a particular antenna electrode selected from a plurality of antenna electrodes disposed separately on a sitting section and/or backrest section of a seat; applying a direct current potential or earth potential to all antenna electrodes excepting the particular antenna electrode; and evaluating passenger seating conditions according to signal data of a perturbation current resulting from applying the weak electric field to produce an evaluation result, and sending instruction data based on the evaluation result from the control circuit to an airbag apparatus so as to place an airbag designated for the seat in the deployable state or not-deployable state.

According to the invention presented in aspects 30 to 34, a plurality of antenna electrodes are disposed in the sitting section and/or the backrest section separately, and weak electric fields are generated successively around each electrode and the resulting signal data related to the perturbation current flowing in the antenna electrodes are processed to carry out the passenger detection process. However, one antenna electrode at a time is activated with ac signals while all other antenna electrodes are impressed with a dc voltage so that parasitic interference can be avoided. This approach is advantageous because of the stability of the electric field generated, and consequently, the perturbation current measurement is also stable. Therefore, by detecting the values of such perturbation current, it is possible to detect readily whether the seat is vacant or the passenger is an adult or a child, thereby improving the detection precision. Especially, the circuitry allows selection of setting the airbag apparatus to be either in the deployable state or not-deployable state so that unwanted airbag deployment can be prevented.

Especially, when a dc voltage from the electric power circuit is to be applied to all the antenna electrodes that are not generating an electric field, the same voltage can be shared with the oscillation circuit and control circuit, thus enabling to avoid having a separate power source for the dc voltage and the electric field generation process is stabilized at low cost.

Also, because a plurality of antenna electrodes can be selectively switched to the oscillation circuit and a dc voltage source by the switching action of the switching device by signals from the control circuit, contact to terminals a and b of the switching devices can be performed quickly and accurately. Thus, the perturbation current flowing in a particular antenna electrode can be detected precisely by the current detection circuit, and signal data regarding the perturbation current are received accurately in the control circuit.

Aspect 35 of the present invention provides a passenger detection system comprising: a plurality of antenna electrodes disposed separately on a seat; an electric field generation device for generating a weak electric field around an antenna electrode; a switching circuit for selecting a particular electrode and connecting the electric field generation device to the particular antenna electrode; an information detection circuit for applying the weak electric field to the particular antenna electrode and detecting information related to a current flowing in the particular antenna electrode resulting from applying the weak electric field; and a control circuit for evaluating passenger sitting conditions according to signal data received from the information detection circuit; wherein the electric field generation device outputs high frequency low voltage signals having a rectangular waveform.

Aspect 36 of the present invention provides a passenger detection system comprising: a plurality of antenna electrodes disposed separately on a seat; an electric field generation device for generating a weak electric field around an antenna electrode by outputting high frequency low voltage signals having a rectangular waveform; a switching circuit for selecting a particular electrode and connecting the electric field generation device to the particular antenna electrode; an information detection circuit for applying the weak electric field to the particular antenna electrode and detecting information related to a current flowing in the particular antenna electrode resulting from applying the weak electric field; and a control circuit for evaluating passenger sitting conditions according to signal data received from the information detection circuit to produce an evaluation result, and sending instruction data based on the evaluation result from the control circuit to an airbag apparatus so as to place an airbag designated for the seat in the deployable state or not-deployable state.

Aspect 37 of the present invention provides a passenger detection system, wherein a plurality of antenna electrodes are disposed on a sitting section and/or a backrest section of a seat. The invention in aspect 38 is passenger detection system, wherein electric field generation device generates high frequency low voltage signals of a rectangular waveform by switching a direct current voltage maintained at a positive constant voltage at a selected frequency. The invention in aspect 39 is a passenger detection system, wherein electric field generation device generates high frequency low voltage signals of a rectangular waveform by dividing a clock signal in a control circuit at a selected interval.

Aspect 40 of the present invention provides a passenger detection method by generating a weak electric field selectively around a particular antenna electrode selected from a plurality of antenna electrodes disposed separately on a seat; applying high frequency low voltage signals of a rectangular waveform on the particular antenna electrode; and detecting information related to perturbation current flowing is the particular antenna electrode; and evaluating passenger seating conditions according to signal data related to the information.

Aspect 41 of the present invention provides a passenger detection method by generating a weak electric field selectively around a particular antenna electrode selected from a plurality of antenna electrodes disposed separately on a seat; applying high frequency low voltage signals of a rectangular waveform on the particular antenna electrode; and detecting information related to a perturbation current flowing is the particular antenna electrode; and evaluating passenger seating conditions according to signal data related to the information to produce an evaluation result, and sending instruction data based on the evaluation result from the control circuit to an airbag apparatus so as to place an airbag designated for the seat in the deployable state or not-deployable state.

According to the invention presented in aspects 35 to 41, the antenna electrodes disposed on the seat are impressed with high frequency low voltage (HFLV) signals of a square waveform by the electric generation device, therefore, the circuit is simplified by adopting the method of switching a direct voltage source. Therefore, not only the electric field generation circuit but other component circuits are also simplified, so that the system cost is lowered.

Especially, electric field generation device may include an HFLV source to produce substantially rectangular waveform by switching of a positive electrical power source based on clock signals in the control circuit, or by dividing the clock signal in the control circuit. This further simplifies the control unit circuit, and system cost is further lowered.

Further, forward signals sent to the antenna electrodes are substantially at a constant voltage of a square waveform, therefore, data related to information obtained by the information detection circuit can be processed by a simple circuit, and the passenger seating conditions can be determined even more reliably and precisely.

Aspect 42 of the present invention provides a passenger detection system comprising: an antenna electrode disposed on a sitting section and/or a backrest section of a seat; an electric field generation device for generating a weak electric field around the antenna electrode; an ac-dc conversion circuit for converting an alternating current line voltage in a forward line, related to a perturbation current flowing in the antenna electrode resulting from the weak electric field generated around the antenna electrode produced by connecting the antenna electrode to the electric field generation device, to a direct current voltage; and a control circuit for judging passenger seating conditions according to evaluation data output from the conversion circuit.

Aspect 43 of the present invention provides a passenger detection system comprising: a plurality of antenna electrodes disposed separately on a sitting section and/or a backrest section of a seat; an electric field generation device for generating a weak electric field around an antenna electrode; a switching circuit for selecting a particular electrode and connecting the electric field generation device to the particular antenna electrode; an ac-dc conversion circuit for applying the weak electric field to the particular antenna electrode, and converting a resulting alternating current line voltage in a forward line related to a perturbation current flowing in the particular electrode to a direct current voltage; and a control circuit for judging passenger seating conditions according to signal data output from the conversion circuit.

Aspect 44 of the present invention provides a passenger detection system comprising: a plurality of antenna electrodes disposed separately on a sitting section and/or a backrest section of a seat; an electric field generation device for generating a weak electric field around an antenna electrode; a switching circuit for selecting a particular electrode to serve as a sending electrode and selecting a pairing electrode serving a receiving electrode, and connecting the electric field generation device to the particular antenna electrode; an ac-dc conversion circuit for generating a weak electric field between a resulting pair of antenna electrodes, and converting a resulting alternating current line voltage in a forward line related to a perturbation current flowing in the particular electrode to a direct current voltage; and a control circuit for judging passenger seating conditions according to signal data output from the conversion circuit.

Aspect 45 of the present invention provides a passenger detection system comprising: a plurality of antenna electrodes disposed separately on a sitting section and/or a backrest section of a seat; an electric field generation device for generating a weak electric field around an antenna electrode; a switching circuit for selecting a particular electrode and connecting the electric field generation device to the particular antenna electrode; an ac-dc conversion circuit for applying the weak electric field to the particular antenna electrode, and converting a resulting alternating current line voltage in a forward line related to a perturbation current flowing in the particular electrode to a direct current voltage; and a control circuit for judging passenger seating conditions according to signal data output from the conversion circuit to produce an evaluation result, and sending instruction data based on the evaluation result from the control circuit to an airbag apparatus so as to place an airbag designated for the seat in the deployable state or not-deployable state.

Aspect 46 of the present invention provides a passenger detection system comprising: a plurality of antenna electrodes disposed separately on a sitting section and/or a backrest section of a seat; an electric field generation device for generating a weak electric field around an antenna electrode; a switching circuit for selecting a particular electrode and connecting the electric field generation device to the particular antenna electrode; an ac-dc conversion circuit for applying the weak electric field to the particular antenna electrode, and converting a resulting alternating current line voltage in a forward line related to a perturbation current flowing in the particular electrode to a direct current voltage; and a control circuit for judging passenger seating conditions according to signal data output from the conversion circuit.

Aspect 47 of the present invention provides a passenger detection system comprising: a plurality of antenna electrodes disposed separately on a sitting section and/or a backrest section of a seat; an electric field generation device for generating a weak electric field around an antenna electrode; a switching circuit for selecting a particular electrode and connecting the electric field generation device to the particular antenna electrode; an ac-dc conversion circuit for applying the weak electric field to the particular antenna electrode, and converting a resulting alternating current line voltage in a forward line related to a perturbation current flowing in the particular electrode to a direct current voltage; and a control circuit for judging passenger seating conditions according to signal data output from the conversion circuit to produce an evaluation result, and sending instruction data based on the evaluation result from the control circuit to an airbag apparatus so as to place an airbag designated for the seat in the deployable state or not-deployable state.

Aspect 48 of the present invention provides a passenger detection system, wherein an RC time constant circuit is formed by capacitance components existing in a vicinity of an antenna electrode and a resistor connected in series to a forward circuitry including an electric field generation device. The invention in aspect 49 is a passenger detection system, wherein an impedance conversion circuit is provided between a forward circuitry for sending output signals from an electric field generation device and an ac-dc conversion device. The invention in aspect 50 is a passenger detection system, wherein the impedance conversion circuit is comprised by an operational amplifier having an amplification factor of 1. The invention in aspect 51 is a passenger detection system, wherein the control circuit is comprised, at least, by memory means for storing threshold value related to passenger seating conditions, means for receiving output signals from an ac-dc conversion circuit, and a judging section for judging passenger seating conditions by comparing threshold values with received signal data.

Aspect 52 of the present invention provides a passenger detection system, wherein the electric field generation device, the ac-dc conversion circuit, and the control circuit are housed in a common housing to form a control unit, which is incorporated in the seat. The invention in aspect 53 is a passenger detection system, wherein the electric field generation device, ac-dc conversion circuit, and the control circuit are housed in a common housing to form a control unit, and those constituting elements requiring an electric power source are supplied with power from an electric power source Vcc outputting a constant direct current voltage.

According to the invention presented in aspects 42 to 53, a current related to the stray capacitance components existing around the seat flows in the antenna electrodes, and in such a case, the waveform of the forward signals from the electric generation device is dependent on a RC time constant of the circuitry, and the rise time of the signals is affected and the resulting rounding effect of the rise time depends on whether the passenger is an adult or a child. The resulting ac voltage can be converted in the ac-dc conversion circuit to obtain distinguishable dc signals. This signal data are received in the control circuit and based on the signal data related to the dc current, passenger seating conditions can be determined precisely.

Also, because of the presence of the impedance conversion circuit between the signal line and the ac-dc conversion circuit, the input-side has a high impedance and the output-side has a low impedance. Therefore, when the control circuit receives dc output signals from the ac-dc conversion circuit, current drain by the control circuit does not affect the performance of the signal line. Therefore, passenger seating conditions can be detected with high precision.

Also, the electric power circuit as an element in the control unit produces a singular power source Vcc by reducing the voltage form the battery power to a singular dc voltage so that all the elements in the control unit requiring the electrical power can be served by the same constant voltage Vcc, therefore, the electric power circuit and the structure of the control unit can be simplified, so that the overall unit is simplified and the system cost is lowered.

Because the control unit is housed within the same housing as other components such as the electric field generation device, switching circuit, impedance conversion circuit, ac-dc conversion circuit; control circuit; power circuit, so that assembly into the seat is facilitated. Especially, an installation space is readily available near the seat frame or its vicinity, therefore, even if the size of the control unit becomes slightly larger, it can be simply and readily accommodated near the frame.

Also, the passenger seating condition is judged from the output dc signals from the ac-dc conversion circuit and analyzed by the control circuit in terms of a plurality of antenna electrodes, which are selected by the switching circuit. Therefore, the control circuit bases its decision on a large amount of perturbation data obtained from different antenna electrodes, thereby improving the detection capability and reliability of the passenger detection system even more.

Aspect 54 of the present invention provides a passenger detection system comprising: an antenna electrode disposed on a sitting section and/or a backrest section of a seat; an electric field generation device for generating a weak electric field around the antenna electrode; an antennae interface circuit including a detection circuit for detecting information related to a perturbation current flowing in the antenna electrode resulting from applying a power from the electric field generation device; a correction interface circuit including a detection circuit for detecting information related to a perturbation current flowing in the antenna electrode resulting from applying a power from the electric field generation device; and a control circuit for correcting signals output from the antennae interface circuit according to signal data output from the antennae interface circuit and the correction interface circuit; wherein the antennae interface circuit and the correction interface circuit are configured similarly and the antennae interface circuit is connected to an antenna electrode and the correction interface circuit is not connected to an antenna electrode and is open-circuited.

Aspect 55 of the present invention provides a passenger detection system comprising: an antenna electrode disposed on a sitting section and/or a backrest section of a seat; an electric field generation device for generating a weak electric field around an antenna electrode; an antennae interface circuit including a detection circuit for detecting information related to a perturbation current flowing in an antenna electrode resulting from applying a power from the electric field generation device; a correction interface circuit including a detection circuit for detecting information related to a perturbation current flowing in an antenna electrode resulting from applying a power from the electric field generation device; a control circuit for correcting signals output from the antennae interface circuit according to signal data output from the antennae interface circuit and the correction interface circuit; and an airbag apparatus that can be placed in a specific operational state according to judgment data generated by the control circuit; wherein the antennae interface circuit and the correction interface circuit are configured similarly and the antennae interface circuit is connected to an antenna electrode and the correction interface circuit is not connected to an antenna electrode and is open-circuited.

Aspect 56 of the present invention provides a passenger detection system, wherein the antennae interface circuit is comprised of, at least: an electric field generation device for generating a weak electric field around an antenna electrode; an ac-dc conversion circuit for connecting an antenna electrode to the electric field generation device to generate an electric field, and converting ac voltage related to a perturbation current flowing in the antenna electrode, resulting from applying the electric field, to dc data. The invention in aspect 57 is passenger detection system, wherein an RC time constant circuit is formed by capacitance components existing in a vicinity of an antenna electrode and a resistor connected in series to a forward circuitry including an electric field generation device. The invention in aspect 58 is passenger detection system, wherein an impedance conversion circuit is provided between a forward circuitry for sending output signals from an electric field generation device and an ac-dc conversion device. The invention in aspect 59 is passenger detection system, wherein the impedance conversion circuit is comprised by an operational amplifier having an amplification factor of 1.

Aspect 60 of the present invention provides a passenger detection system, wherein the control circuit is comprised of, at least: memory means for storing signal data output from the correction interface circuit; means for receiving signals output from the antennae interface circuit; a correction section for compensating for drift according to correction data received; an evaluation section for evaluating passenger seating conditions according to correction results output from the correction section. The invention in aspect 61 is a passenger detection system according to one of aspect 54 or 55, wherein the antennae interface circuit and the correction interface circuit are comprised by, at least: an electric field generation device; a current detection device for detecting a perturbation current produced by application of power by the electric field generation device; wherein the antennae interface circuit is connected to an electrode and the correction circuit is not connected to an antenna electrode and is open-circuited.

According to the invention presented in aspects 54 to 61, the antennae interface circuit and the correction interface circuit have essentially the same configuration of circuit components, and the electric generation device in the antennae interface circuit is connected to an electrode while the electric generation device in the correction circuit is not connected to an antenna electrode and is open-circuited. Therefore, output signals Sin, Hin from the respective interface circuits are affected by the same level of drift, so that by calculating the difference portion $D_1$ between the output signals Sin, Hin, the drift components in each interface circuit can be eliminated.

In addition, by calculating the output signals Sin, Hin and the difference portion $D_1$, essentially true signal data $D_2$ can be obtained according to a relation $D_2=(Hin-(Sin+D_1))$. Therefore, even is the output signals from the antennae interface circuit are affected over time by thermal effects, passenger seating conditions can always be determined according to correct information data. For example, the system enables to avoid misdiagnose passenger seating conditions such that even though an adult is seated, erroneous judgment indicates that a child is seated.

Further, the control circuit makes judgment based on essentially true signal data $D_2$ so that the airbag apparatus can be controlled according to correct passenger seating conditions.

Aspect 62 of the present invention provides a passenger detection system comprised by antenna electrodes disposed on a seat inside an automobile connected, using a shielding cable whose signal line is shielded by a shielding line, to a signal processing circuit for detecting passenger seating conditions by processing signal data related to a perturbation current flowing in an antenna electrode resulting from applying an electric field generated about the antenna electrode, wherein a buffer circuit, for maintaining signal levels of signal line and shield line at a same level, is connected between the signal line and the shield line.

Aspect 63 of the present invention provides a passenger detection system, wherein a plurality of antenna electrodes are disposed on the seat, and antenna electrodes and the signal processing circuit are wired using a plurality of shielding cables.

Aspect 64 of the present invention provides a passenger detection system, wherein a common buffer circuit is connected to each of the plurality of antenna electrodes and signal processing circuit through a respective switching element.

In this case, the signal line in the shield cable and the buffer circuit connected to the shield line are connected to an operational amplifier to maintain the same potential in the signal line and the shield line. This buffer circuit the signal levels in the corn circuit are maintained at the same potential level so that the RC time constant between the signal and shield lines does not affect the signal communication between the control circuits and the signal error in evaluating the passenger seating conditions can be eliminated.

The buffer circuit can resolve the problems of scatter in the signal levels resulting from the differences in the lengths of the shield cables, therefore, design freedom is increased by not having to limit the cable length.

Also, by using a common buffer circuit for a plurality of shield cables, cost is reduced, and in particular, circuit configuration can be simplified significantly for a passenger detection system based on many antenna electrodes.

BRIEF DESCRIPTION OF THE DRAWINGS

FIG. 14 is a flowchart for SRS process shown in FIG. 10.

FIGS. 47A, 47B, 47C are diagrams to explain the operation of the phase shift detection circuit, shown in FIG. 45, in terms of, respectively: output waveforms of the forward signal and first flipflop circuit; waveforms of the output signal and the second flipflop circuit; and detection of phase differential from the first and second flipflop circuits.

FIGS. 60A–60D are diagrams to explain the operation of the control unit, in terms of respectively: gate signal output from the control circuit; waveform of forward signal when the seat is vacant (output waveform of electric field generator); waveform of forward signal when the seat is occupied (output waveform of electric field generator); and dc. output current in ac-dc conversion circuit.

FIGS. 75A–75D are diagrams to explain the operation of the control unit, in terms of respectively: gate signal output from the control circuit; waveform of forward signal when the seat is vacant (output waveform of electric field generator); waveform of forward signal when the seat is occupied (output waveform of electric field generator); and dc. output current in ac-dc conversion circuit.

FIG. 83 is a flowchart for SRS process shown in FIG. 79.

DESCRIPTION OF THE PREFERRED EMBODIMENTS

Embodiment 1

Figure 1A:
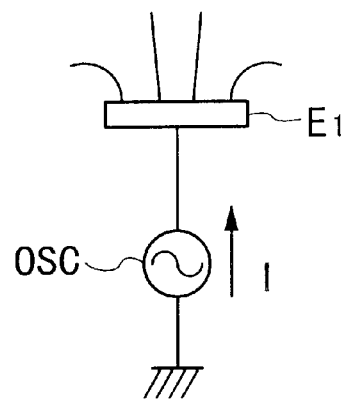
FIGS. 1A, 1B are diagrams, respectively, to show basic actions of an occupant detection system with an electric field distribution of an antennae, and an electric field distribution of the antennae with a nearby object.
Figure 1B:
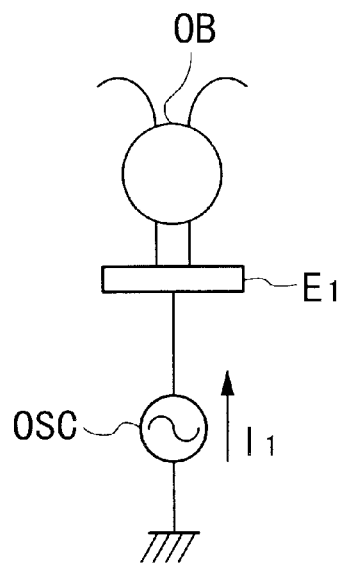

The basic principle of the passenger detection system will be explained with reference to FIG. 1. The present detection system is based on perturbation in weak electric field generated by the presence of an object in the vicinity of antenna electrode. First, as shown in FIG. 1A, when a high frequency low voltage (HFLV) signal is impressed on an antenna E1 by an oscillation circuit OSC, a weak electric field is generated in the vicinity of the electrode, resulting in a flow of current I in the antenna electrode E1. When an object OB is introduced in the vicinity of the antenna electrode E1, as shown in FIG. 1B, the electric field is disturbed, resulting in a perturbation current $I_1$, which is different in character than current I.

Therefore, by utilizing the fact that the different currents flow in antenna electrode E1, depending on there is or there is no object OB on a vehicle seat, it is possible to detect the seating condition of the passenger. Specially, by increasing the number of antenna electrodes, much more precise information can be gained on the object, including a passenger, that is loading the seat. When the object OB is on the seat, the perturbation current in the antenna electrode E1 increases while when the object OB is not on the seat, the perturbation current in the antenna electrode E1 is decreased.

Figure 2A:
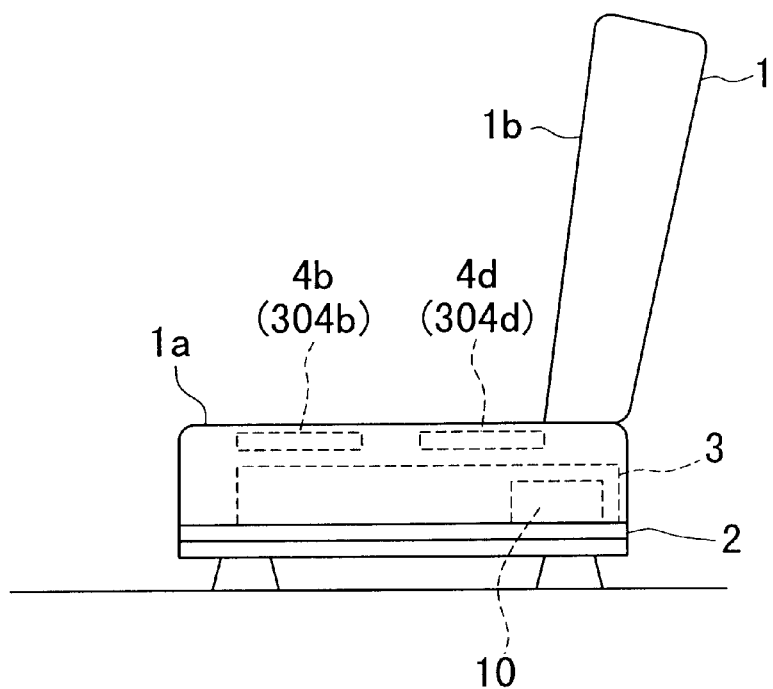
FIGS. 2A, 2B are diagrams of the interior section of the passenger detection system showing, respectively, a side view of the antenna electrodes installed on the seat, and a front view of the seat.
Figure 2B:
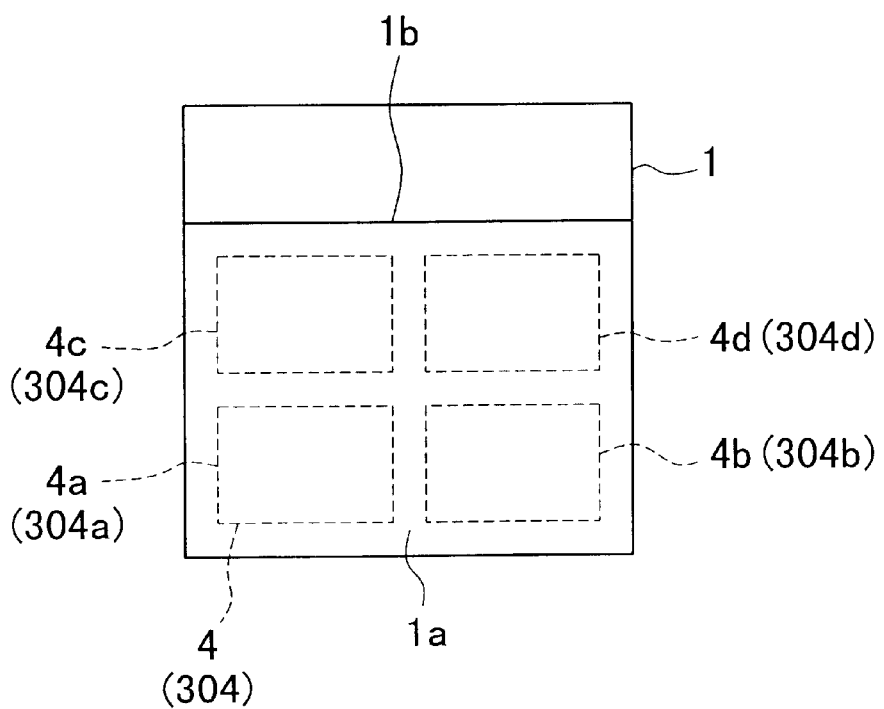
Figure 3A:
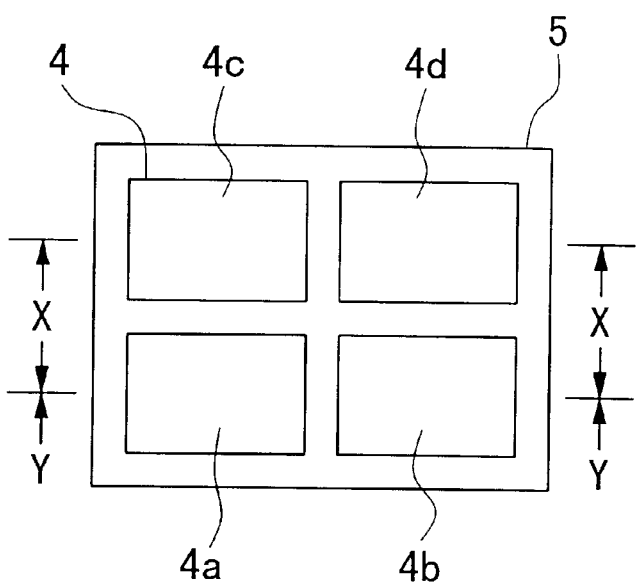
FIGS. 3A, 3B, 3C are diagrams of the antenna electrodes shown in FIG. 2, to show, respectively, a plan view, a cross sectional view through X—X, a cross sectional view through Y—Y.
Figure 3B:
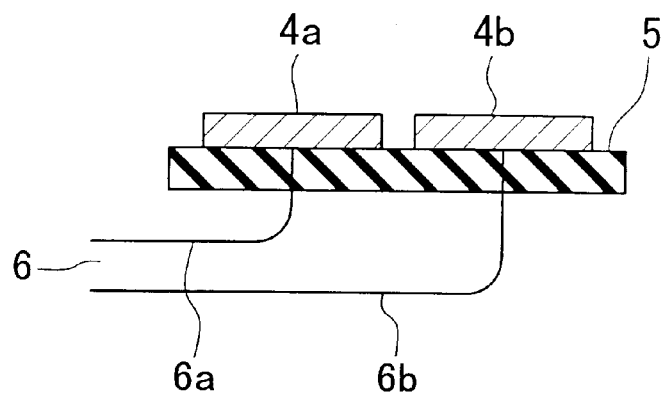
Figure 3C:
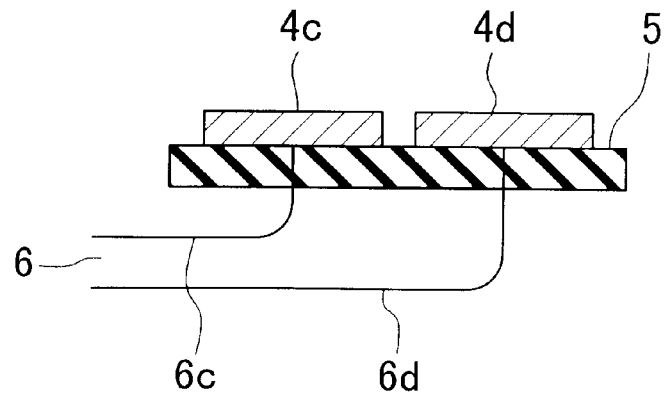
Figure 96:
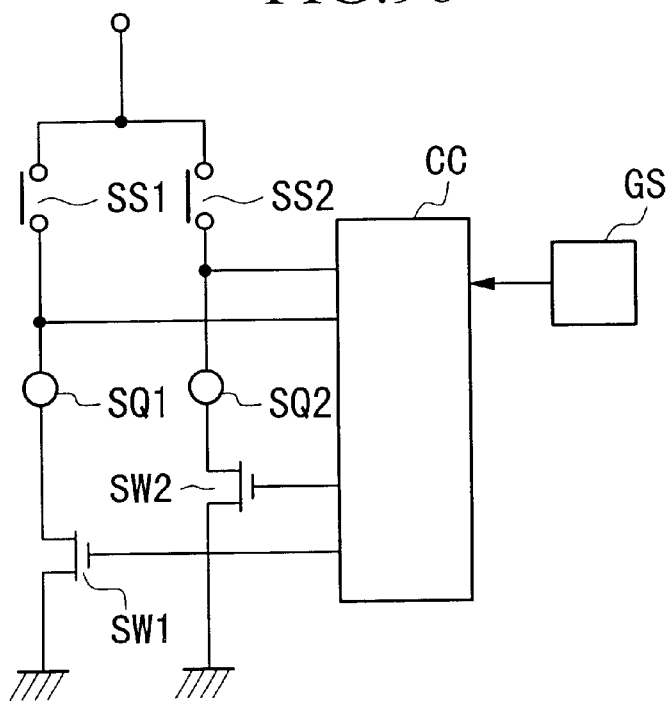
FIG. 96 is a block circuit diagram of a conventional airbag apparatus.
Figure 97:
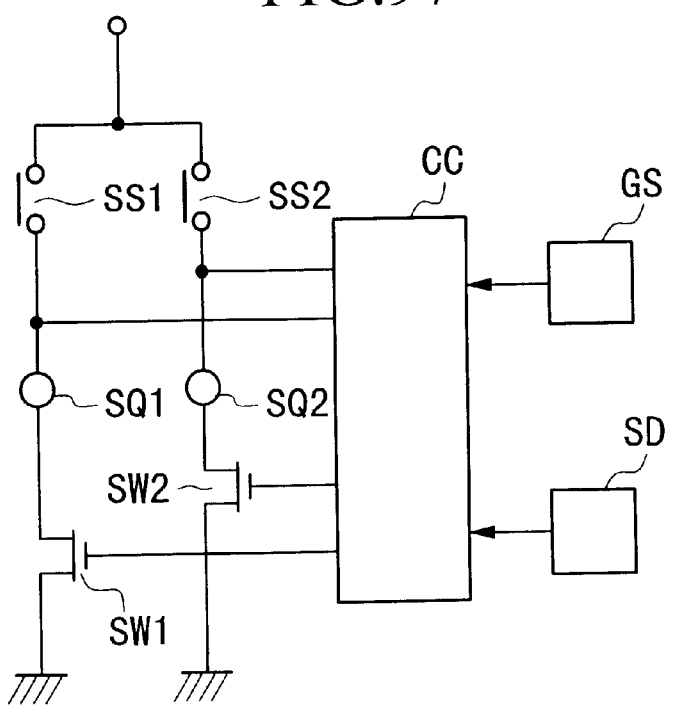
FIG. 97 is a block circuit diagram of an improved conventional airbag apparatus.

Next, the passenger detection system based on this principle will be explained with reference to FIGS. 2~7. The parts of the present system which are the same as those in the conventional systems shown in FIGS. 96, 97 are referenced using the same reference numerals and their explanations are omitted. FIGS. 2~4 show the structures of the passenger/driver seat and the antenna electrodes, and seat 1 is comprised primarily of a sitting section 1a and a backrest section 1b. Sitting section 1a is typically comprised by a seat frame 3 fixed to a base 2 that is slidable forward and backward, a cushion part disposed above the seat frame 3, and an outer covering for the cushion part, and the backrest section 1b is typically comprised by a cushion part disposed on the front side of the seat frame 3 and an outer covering. A part of the detection system is comprised by a plurality of antenna electrodes 4 (4a~4d) of substantially the same shape and size arranged symmetrically (for example rectangle) on the sitting section 1a. It is allowable to install the antenna electrodes 4 on the outside of the covering or on the covering part itself. Also, a control unit 10 may be provided on the seat frame 3 or in the vicinity.

The antenna electrode 4 is made of a conductive fabric but it may be made by weaving a metallic thread in the seat fabric of the sitting section 1a or applying a conductive paint or using metal strips. It is preferable that the antenna electrodes 4 be constructed by arranging separate rectangle-shaped electrodes of substantially the same size, such as those antenna electrodes 4a~4d shown in FIG. 3, as a unit on one surface of a base member 5 made of an insulating material such as non-woven cloth, so that they may be placed inside of the outer covering part of the sitting section 1a. Lead wire 6 (6a~6d) including shield wires are independently provided for each of the antenna electrodes 4a~4d, and are connected to the connectors (or terminals) 19a~19d of the control unit 10, which will be described later.

Figure 4A:
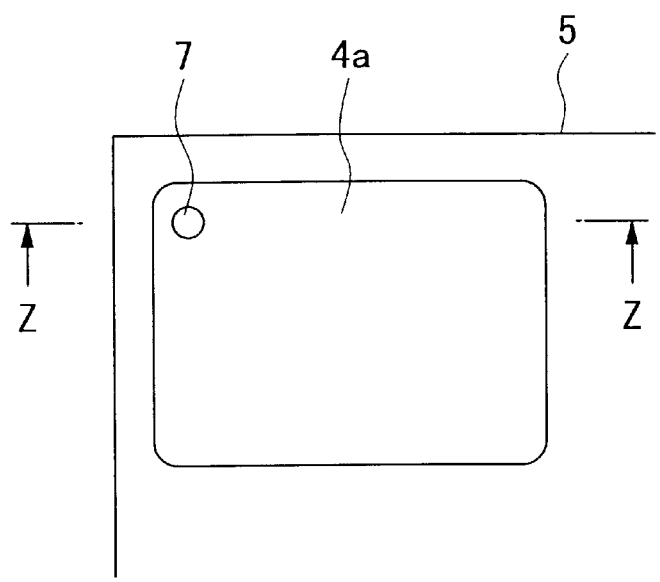
FIGS. 4A, 4B, 4C are diagrams showing, respectively, a plan view, a cross sectional view through Z—Z and a plan view of another example of the coupling conditions of the connection terminals to the antenna electrodes shown in FIG. 2.
Figure 4B:
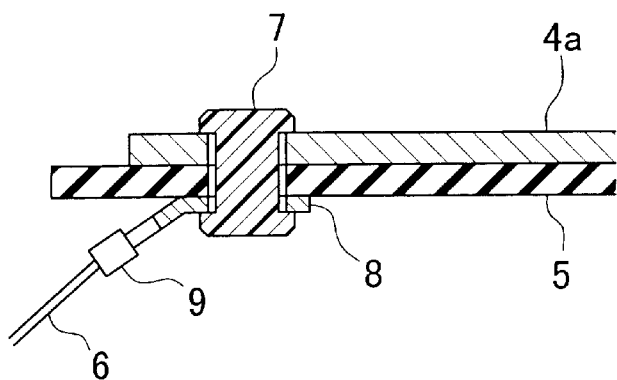
Figure 4C:
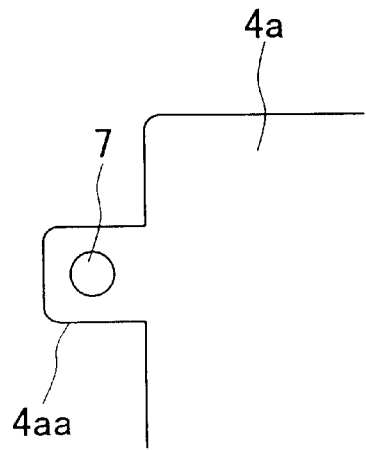

An example of the connections between the antenna electrodes 4 (4a~4d) and the lead wires 6 (6a~6d) is shown in FIG. 4. Connecting structures are all the same for the antenna electrodes 4a~4d and the lead wires 6a~6d, therefore, the following explanation will be based on connecting an antenna electrode 4a to a lead wire 6a. As shown in FIGS. 4A and 4B, a connection terminal 7 is riveted through the antenna electrode 4a and the base member 5. A terminal lug 8 is attached to the connection terminal 7 prior to riveting, so that an electrical connection is made between the terminal lug 8 to the antenna electrode 4a through the connection terminal 7. The terminal lug 8 is connected so as to make a mechanical and electrical contact with the lead wire 6a using a fastening means such as pressure lug 9. The connection between the antenna electrode 4a and the lead wire 6a may be made by providing an extension member 4aa at a portion of the antenna electrode 4a and joining to the connection terminal 7.

Figure 7:
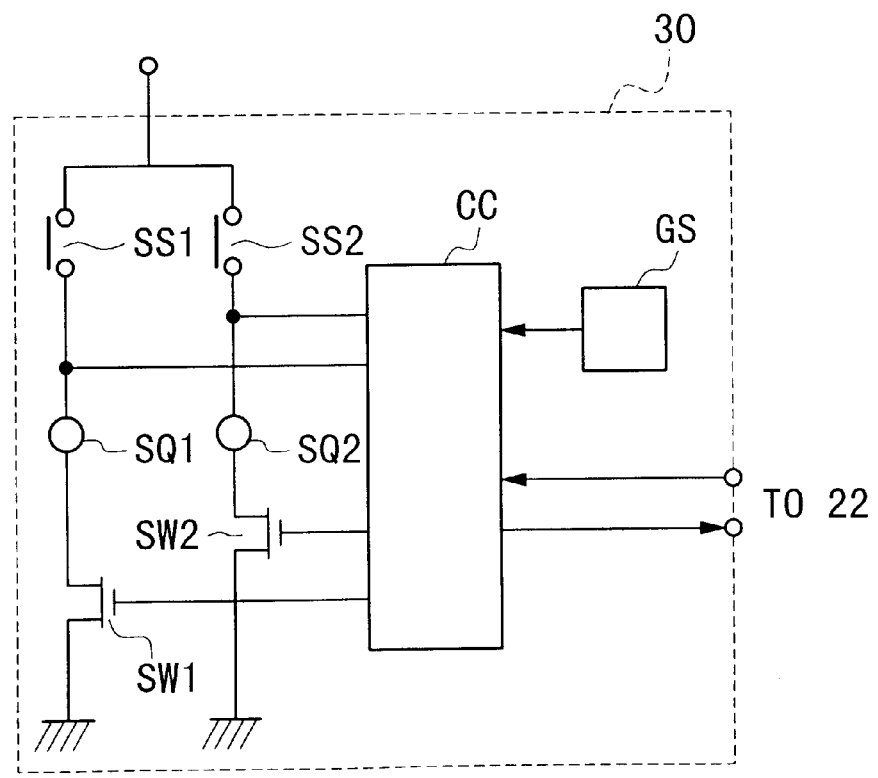
FIG. 7 is a block circuit diagram of the airbag apparatus shown in FIG. 5.
Figure 5:
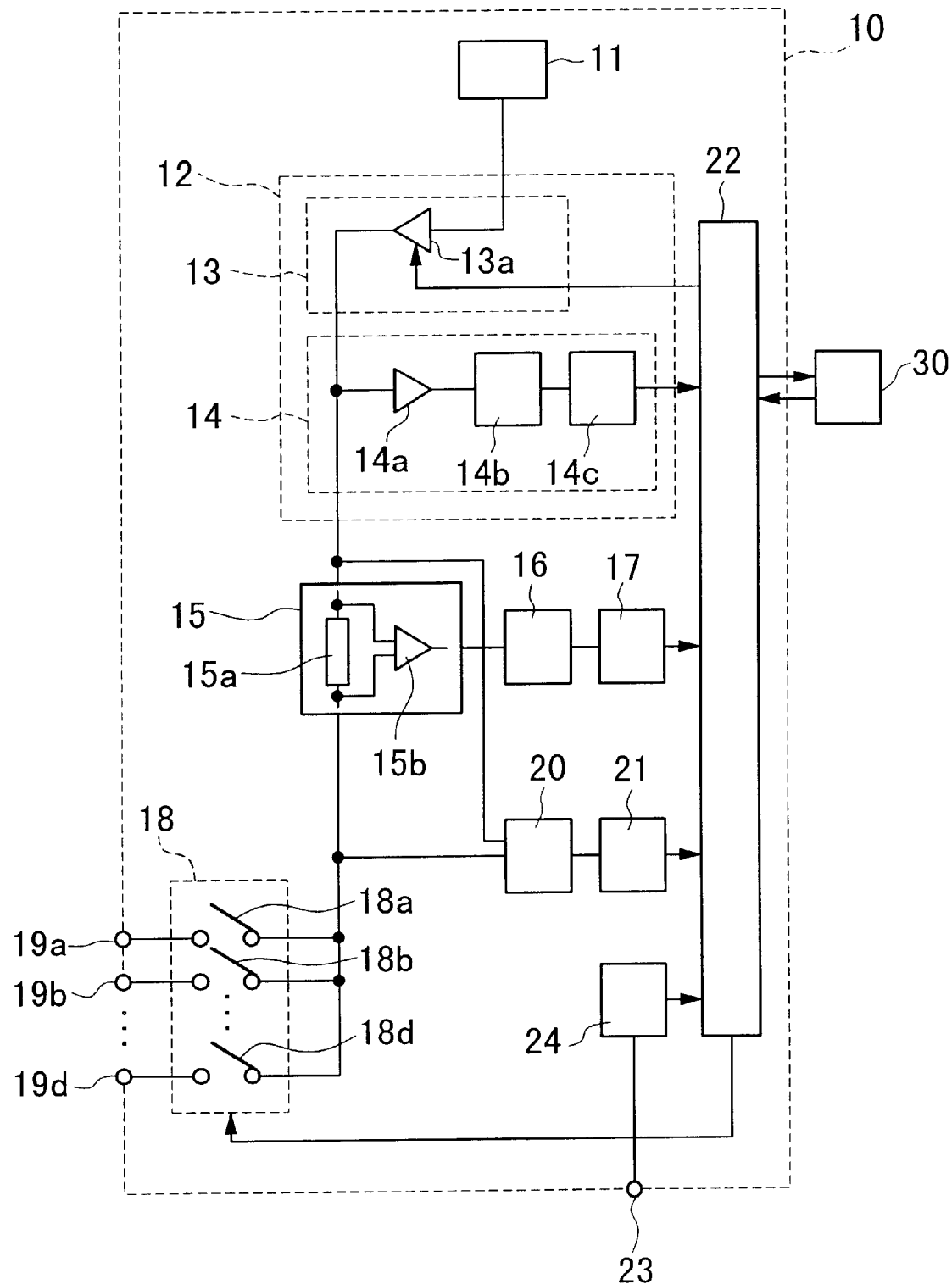
FIG. 5 is a block diagram of the occupant detection system.

As shown in FIG. 5, a control unit 10, disposed on the seat frame 3 or its vicinity, is comprised by, for example: an electric field generation device (oscillator and the like) 11 for generating a weak electric field in the vicinity of the antenna electrodes 4a~4d; an amplitude control circuit 12 for controlling the amplitude of the forward signal output from the oscillation circuit 11 to antenna electrode 4 approximately constant; an information detection circuit (current detection circuit for example) 15 for detecting information related to the forward current of the forward signal; an ac-dc conversion circuit 16 for converting the output signal in the current detection circuit 15 to direct current (dc hereinbelow); an amplifier 17 for amplifying the output signal from the ac-dc conversion circuit; a switching circuit 18 having a plurality of switching devices 18a~18d for the antenna electrodes 4a~4d, connected to the current detection circuit 15; connectors 19a~19d disposed in the housing of the control unit, connected to the switching devices 18a~18d of the switching circuit 18; a phase shift detection circuit 20 connected to the amplitude control circuitry (signal generating side) and the switching circuitry (antenna electrode side) of the current detection circuit 15, for detecting a phase shift between the forward signal from the oscillation circuit and the application signal to the antenna electrodes; an amplifier 21 for amplifying the output signal of the phase shift detection circuit 20; a control circuit 22 including MPU and the like; connector 23 connected to the battery source (not shown) disposed in the housing; and an electric power circuit 24 connected between the connector 23 and the control circuit 22 and others. An airbag apparatus 30, of a configuration such as the one shown in FIG. 7, is connected to control circuit 22 of the control unit 10. The oscillation circuit 11 is designed to generate HFLV signals with a voltage range 5~10 volts at a frequency of 120 KHz, for example. Selective switching of the switching devices 18a~18d is carried out according to output signals from the control circuit 22.

In the control unit 10, the amplitude control circuit 12 includes an amplitude varying circuit 13 for varying the voltage amplitude of the forward signals, and amplitude detection circuit 14 for detecting the voltage amplitude of the forward signals. The amplitude varying circuit 13 is comprised by an amplitude varying section 13a including a programmable gain amplifier (PGA) and others, and the amplitude detection circuit 14 is comprised by: a voltage amplitude detection section 14a having an op-amp; an ac-dc conversion circuit 14b for converting the output signal from the amplitude detection circuit 14a to dc; and an amplifier for amplifying the output signal from the ac-dc conversion circuit 14b. Output signal from the amplifier 14c is supplied to the control circuit 22, and the amplitude varying signal for the amplitude varying section 13a is output from the control circuit 22.

The current detection circuit 15 in the control unit 10 includes an impedance element, for example resistor 15a, connected in series to the signal circuit (forward signal side) and an amplifier 15b, such as differential amplifier, for amplifying the terminal voltage of the resistor 15a. The output side of the current detection circuit 15 is connected to the control circuit 22 through the ac-dc conversion circuit 16 and the amplifier 17. The output side of the resistor 15a in the current detection circuit 15 is connected to the connectors 19a~19d through the switching circuit 18.

Figure 6A:
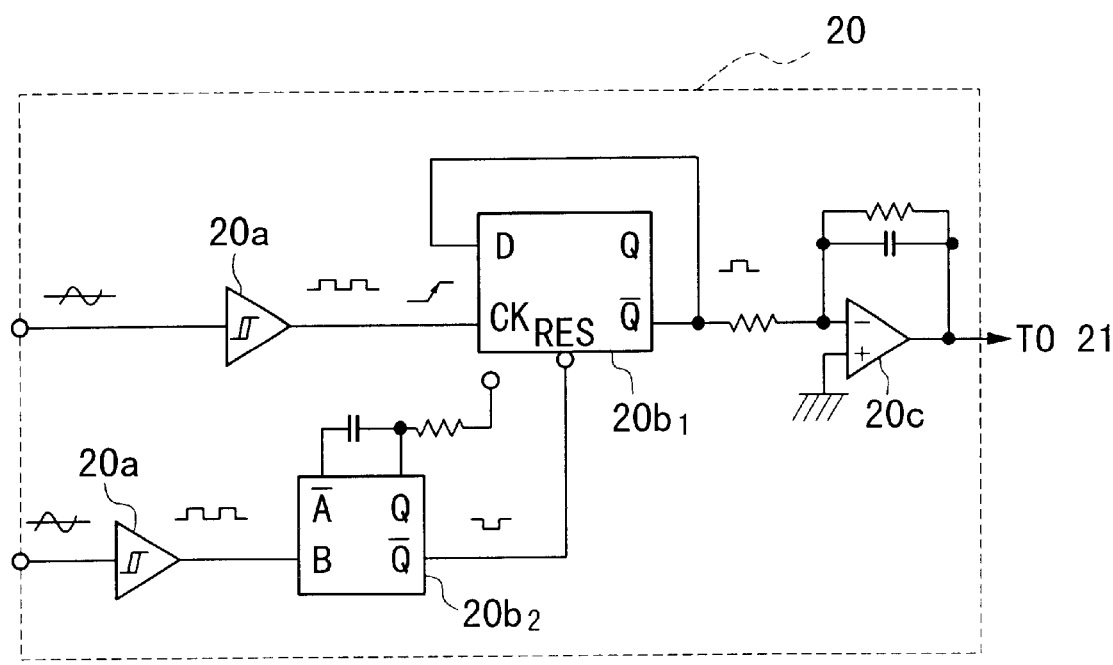
FIGS. 6A, 6B are, respectively, a block circuit diagram of the phase difference detection circuit shown in FIG. 5, and a block circuit diagram of a waveform shaping circuit.
Figure 6B:
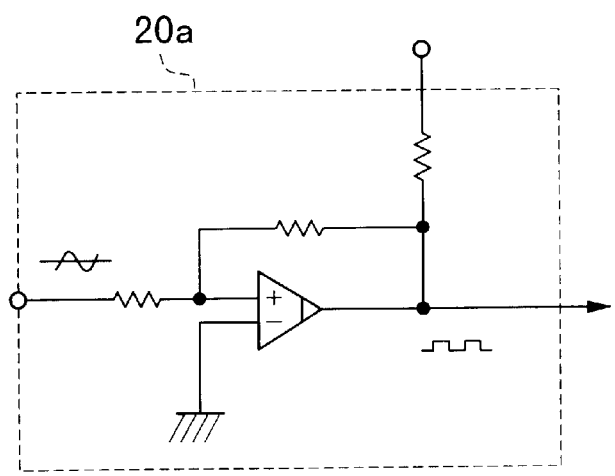

Further, an example of the phase shift detection circuit 20 is shown in FIG. 6A, which is comprised by: wave shaping circuits 20a for shaping the output wave of the forward signal from the oscillation circuit 11 and the application signal to the antenna electrodes 4 (4a~4d) separately to shape the waveform from sine waves to rectangular waves; a first flipflop (shortened to ff) circuit 20b1; a second ff circuit 20b2; and an integration circuit 20c. An example of the wave shaping circuits 20a is shown in FIG. 6B. It should be noted that when the HFLV signals output from the oscillation circuit 11 are generated by such means as switching of a single dc source, say, +5 volts (that is, the output voltage is rectangular), then the wave shaping currents 20a may be omitted.

The passenger detection system having the above structure operates in the following manner. First, the oscillation circuit 11 generates HFLV signals whose voltage amplitude is detected by the detection section 14a of the amplitude detection circuit 14, and the detection signal is converted to a dc signal in the ac-dc conversion circuit 14b, and the amplified signal from the amplifier 14c is input in the control circuit 22. The control circuit 22 judges whether the detected voltage amplitude meets the required amplitude value, and sends the amplified signal to the amplitude varying section 13a to correct the amplitude to the required value. This process controls the voltage amplitude of the forward signal at a given voltage amplitude, and henceforth, voltage amplitude of the forward signal is corrected to a given amplitude by the linked action of the amplitude varying circuit 13 and the amplitude detection circuit 14.

The forward signal having a constant voltage amplitude is applied to antenna electrodes 4 (4l~4d) through the current detection circuit 15, switching circuit 18 (18a~18d), connectors 19a~19d, resulting in the generation of a weak electric field in the vicinity of the antenna electrodes 4 (4a~4d). In this process, switching circuits 18 are operated by signals from the control circuit 22 so that, first, only the switching device 18a is closed, next only the switching device 18b is closed, next only the switching circuit 18c is closed, and such a stepwise switching is successively carried out so that when a particular switch is being closed, other switches are all opened. Therefore, when a particular switching device of the switches (18a~18d) is closed, constant-amplitude forward signal passes through a particular switching device (18a~18d), a particular connector (19a~19d) and reaches a particular antenna electrode (4a~4d), generating an electric field in the vicinity of a particular antenna electrode (4a~4d), so that different values of perturbation current, governed by the seating condition of the passenger, flows in the antenna circuits. The perturbation current is detected by the current detection circuit 15, converted to a dc signal in the ac-dc conversion circuit 16, amplified in the amplifying circuit 17 and is successively input in the control circuit 22. The sequence of switching may be in a reverse direction, 18d, 18c. . . to 18a.

Figure 8A:
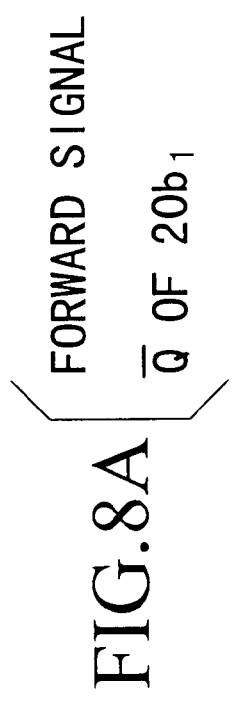
FIGS. 8A, 8B, 8C are diagrams to explain the operation of the phase shift detection circuit, shown in FIG. 6, in terms of, respectively: output waveforms of the forward signal and first flipflop circuit; waveforms of the output signal and the second flipflop circuit; and detection of phase differential from the first and second flipflop circuits.
Figure 8B:
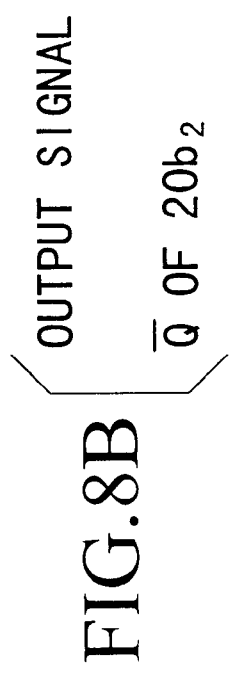
Figure 8C:
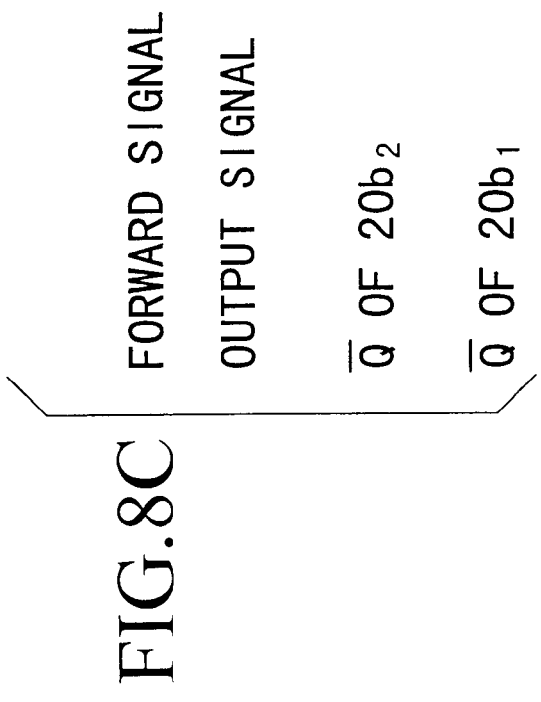

The signal (voltage) at both input/output ends of the current detection circuit 15, that is, the forward signal from the oscillation circuit 11 in the oscillation control circuitry and the application signal to the antenna electrodes 4(4a~4d) in the switching circuitry (antenna electrode side) are input in the phase shift detection circuit 20. The sine wave signals are converted to rectangle waves, as shown in FIG. 8A, by the wave shaping circuit 20a, and are output to the first and second ff circuits 20b1, 20b2. The leading edge (arrow) of the rectangle wave output from the forwarding side is detected at the terminal CK of the first ff circuit 20b1, and the terminal bar Q outputs a "high". In the meantime, in the receiving side also, the leading edge (arrow) of the rectangle wave is detected at the terminal B of the second ff circuit 20b2, and the terminal bar Q outputs a one-shot low signal momentarily. When this output signal is input in the terminal RES of the first ff circuit 20b1, the output signal of the terminal bar Q of the first ff circuit 20b1 is inverted to a low, as shown in FIG. 8C. This output signal represents the amount of phase difference (phase shift), and is converted to a voltage value by being integrated in the integration circuit 20c, and is input in the control circuit 22 through the amplifier 21. The phase shift detection is carried out successively to correspond with the detection of forward current to each antenna electrode by the current detection circuit 15.

Figure 9A:
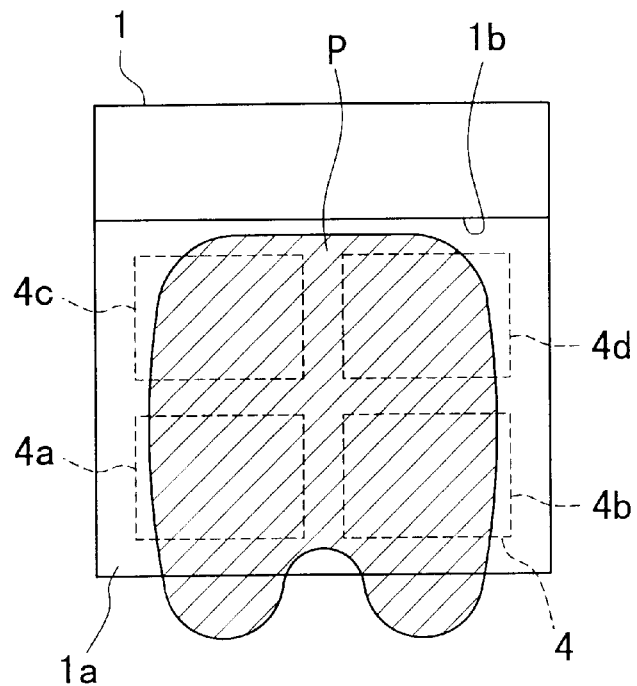
FIGS. 9A, 9B are diagrams to show, respectively, an adult seating condition and a child seating condition.
Figure 9B:
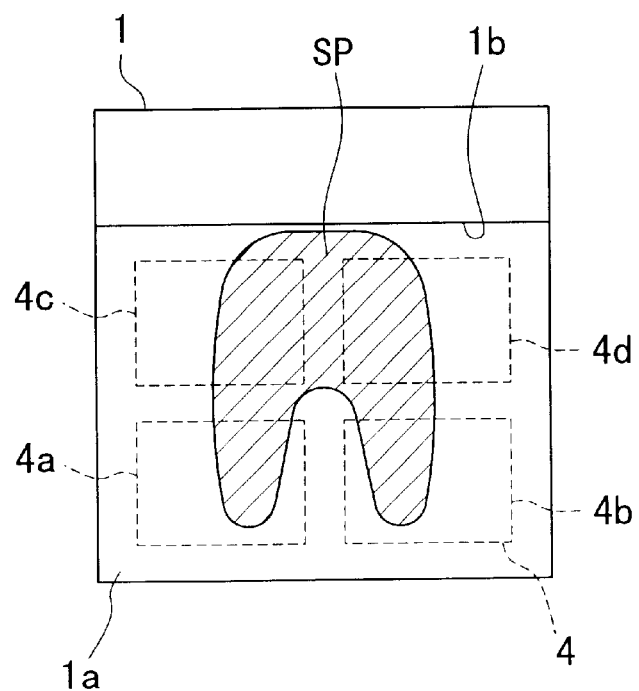

In the control circuit 22, reference data are already stored such as threshold values (threshold data) regarding the seating conditions (passenger loading and passenger identify, whether adult/child), threshold values regarding the phase difference between the forward signal to the current detection circuit 15 and the application signal to the antenna electrodes (threshold data). Specifically, passenger loading data are selected as follows. For example, as shown in FIGS. 9A, 9B, when an adult passenger P or a child passenger SP is seated on the seat 1, the areas opposing the individual antenna electrodes are different, and as a result, the levels of the current flowing in the antenna electrodes are different, such that when an adult passenger P is seated, the current level is higher than that when a child passenger SP is seated. Therefore, a threshold value, which is somewhat lower than the current level for a child passenger SP, is selected as the threshold value for passenger loading. Thus, when detected data is higher than the threshold value, it is assumed that a passenger is seated, and when it is lower than the threshold value, it is assumed that no one is seated. It is preferable that the threshold value be selected according to a sum of all the current flowing in each antenna electrode, but it is possible to select a threshold value for each antenna electrode.

Identity of a passenger is determined as follows. When an adult passenger P or a child passenger SP is seated, the levels of the current flowing in individual antenna electrodes are different as explained above. Therefore, the threshold value for the identity of the passenger (whether the passenger is an adult or a child) is selected as a current level midway between the adult and child threshold values. Thus, when detected data is higher than the threshold value, it is assumed that a passenger is seated, and when it is lower than the threshold value, it is assumed that no one is seated. It is preferable that the threshold value be selected according to a sum of all the current flowing in each antenna electrode, but it is possible to select a threshold value for each antenna electrode.

With respect to selecting a threshold value for the phase difference, a suitable value may be chosen between an average value of the phase difference detected by the phase shift detection circuit 20 when a person is present, and an average value of the phase difference, caused by factors other than a human body. The characteristics of the seat (wetness, for example) can affect the measurements, therefore, upper and lower limits of threshold values are chosen, so that when the phase difference data are inside the range, it is assumed that a person is seated. Therefore, pre-stored data (regarding the passenger seating conditions and the phase difference) and the detected data (regarding the current levels and the phase difference) are compared in the control circuit 22 to determine whether a seated passenger is an adult or a child, and what the characteristics of the seat are.

Thus, signal data received by the control circuit 22 are compared against the threshold data stored in the control circuit 22, so that when the current levels in all the antenna electrodes 4a~4d are high, it is assumed that seat 1 has a passenger and that the passenger is an adult P, as illustrated in FIG. 9A. In such a case, the control circuit 22 places the airbag circuit shown in FIG. 7 in the deployable state. When the current levels in all the antenna electrodes 4a~4d are low and are lower than the passenger loading threshold value, it is assumed that seat 1 has a passenger and that the person is a child SP, as illustrated in FIG. 9B. In such a case, the airbag apparatus 30 in FIG. 7 is placed in the not-deployable state by the control signal from control circuit 22. That is, when the airbag is not to be deployed, the control circuit 22 instructs the control circuit CC in the airbag apparatus 30 so that a gate signal is not supplied to the switching element SW2 of the passenger side when a collision takes place. The driver-side switching element SW1 is supplied with a gate signal. When the driver and an adult are seated, the switching elements SW1, SW2 are both placed in the deployable state.

Figure 10:
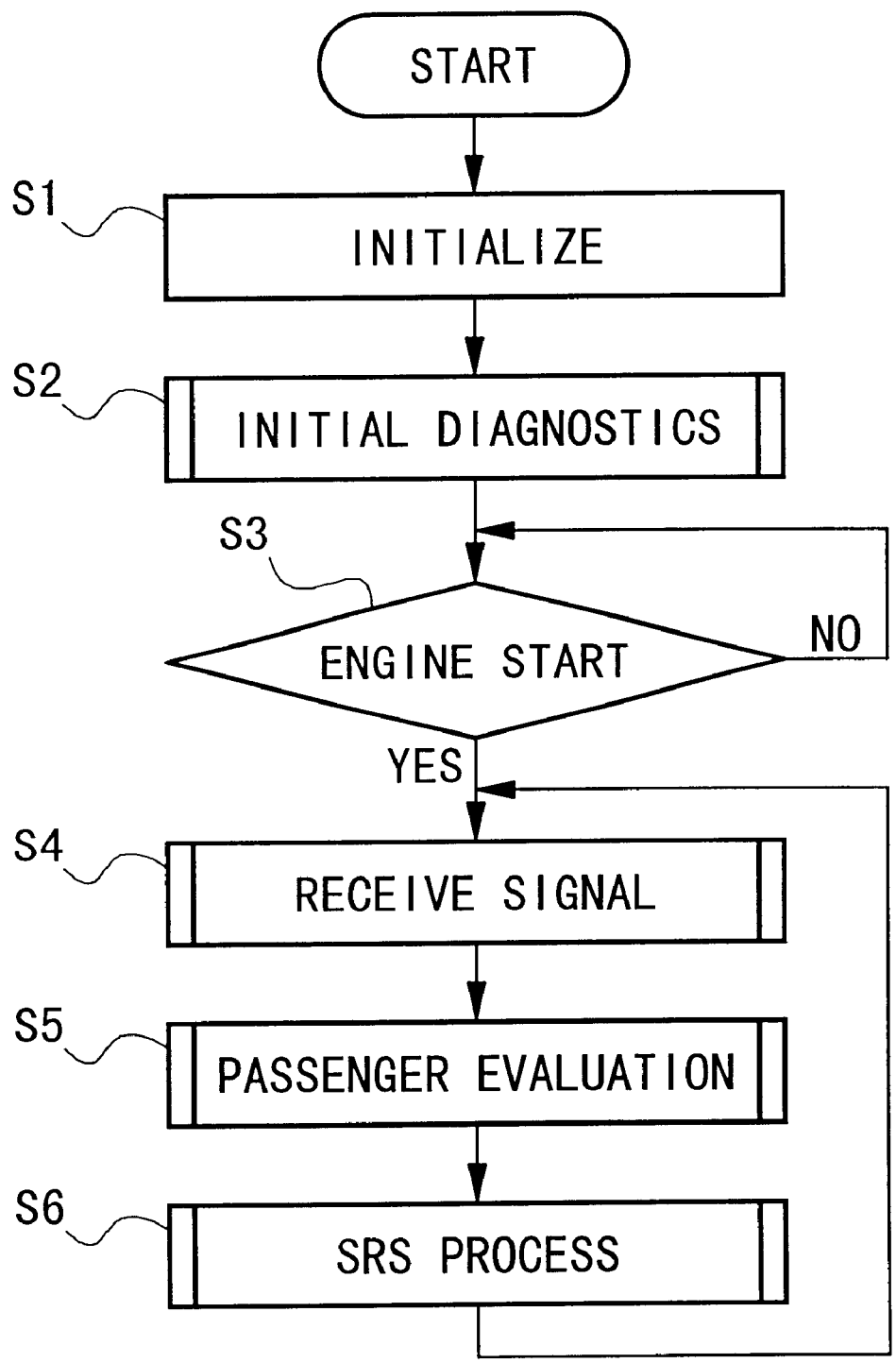
FIG. 10 is a flowchart for a passenger detection process.

The overall process of operation of the passenger detection system will be explained with reference to the overall flowchart shown in FIG. 10. FIGS. 11~14 relate to steps in sub-processes. First, as shown in FIG. 10, the ignition circuit is turned on so that the process is in START. In step S1, the program is initialized, and proceeds to step S2. In step S2, initial diagnostics are performed for any communication problems between the control circuit 22 and the airbag apparatus 30. In step S3, it examines whether the engine is operating, and if it is judged that the engine is operating, it proceeds to step S4. If it is judged that the engine is not operating, the program is shutoff. In step S4, signal data related to perturbation current flowing in a particular antenna electrode and signal data on phase shift related to passenger seating conditions, resulting from the application of a weak electric field on a particular antenna electrode of the antenna electrodes 4a~4d, are received in the control circuit 22. In step S5, based on the received data, passenger loading data, passenger identity data are examined and conclusions reached. In step S6, SRS process (for placing the airbag in either the deployable state or not-deployable state) is carried out between the control circuit 22 and the airbag apparatus (SRS) 30. When step S6 is completed, it returns to step S4 and repeats the steps S4 to S6. Step S3 may be omitted.

Figure 11:
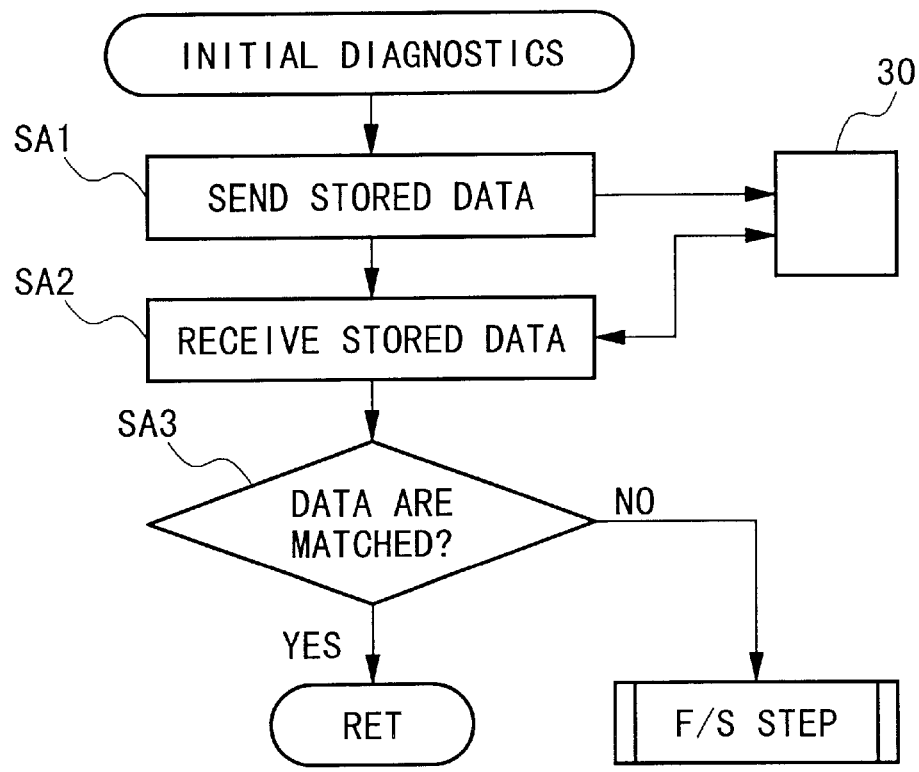
FIG. 11 is a flowchart for the initial process of passenger detection.

Initial diagnostics are carried out as outlined in FIG. 11. First, in step SA1, stored data are sent from the control circuit 22 to the control circuit CC in the airbag circuit 30. In step SA2, passenger data are received from the airbag apparatus 30. In step SA3, it is examined whether the received data from the airbag apparatus 30 match the stored data. If it is judged that the data are matched. the process is continued. If the data do not match, it is judged that problems exist in the corn circuit and fail-safe process is carried out and alert lamp is turned on, for example. The initial diagnostics may be carried out by sending the stored data from the airbag apparatus 30 to the control circuit 22 so that matching process can be carried out in the control circuit CC in the airbag apparatus 30.

Figure 12:
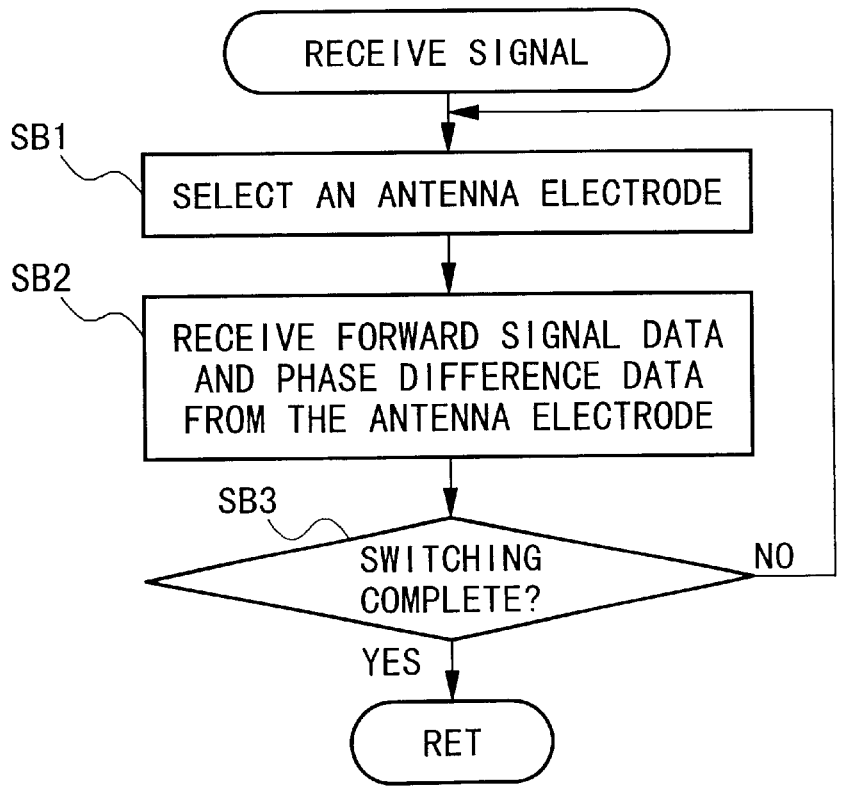
FIG. 12 is a flowchart for the signal receiving process shown in FIG. 10.

Signal reception process is carried out as outlined in FIG. 12. First in step SB1, the control circuit 22 successively selects one switching device at one time from the switching devices 18a~18d so that only the switching circuit 18a is closed, for example, to select an antenna electrode 4a. In step SB2, the data from the respective antenna electrode and phase difference are received in the control circuit 22. In step SB3, it is examined whether successive selection of antenna electrodes 4a~4d by the successive actions of the switching devices 18a~18d has been completed. If it is judged that the switching process has been completed, it proceeds to passenger evaluation process. If it is judged that the switching process is incomplete, it returns to step SB1.

Figure 13:
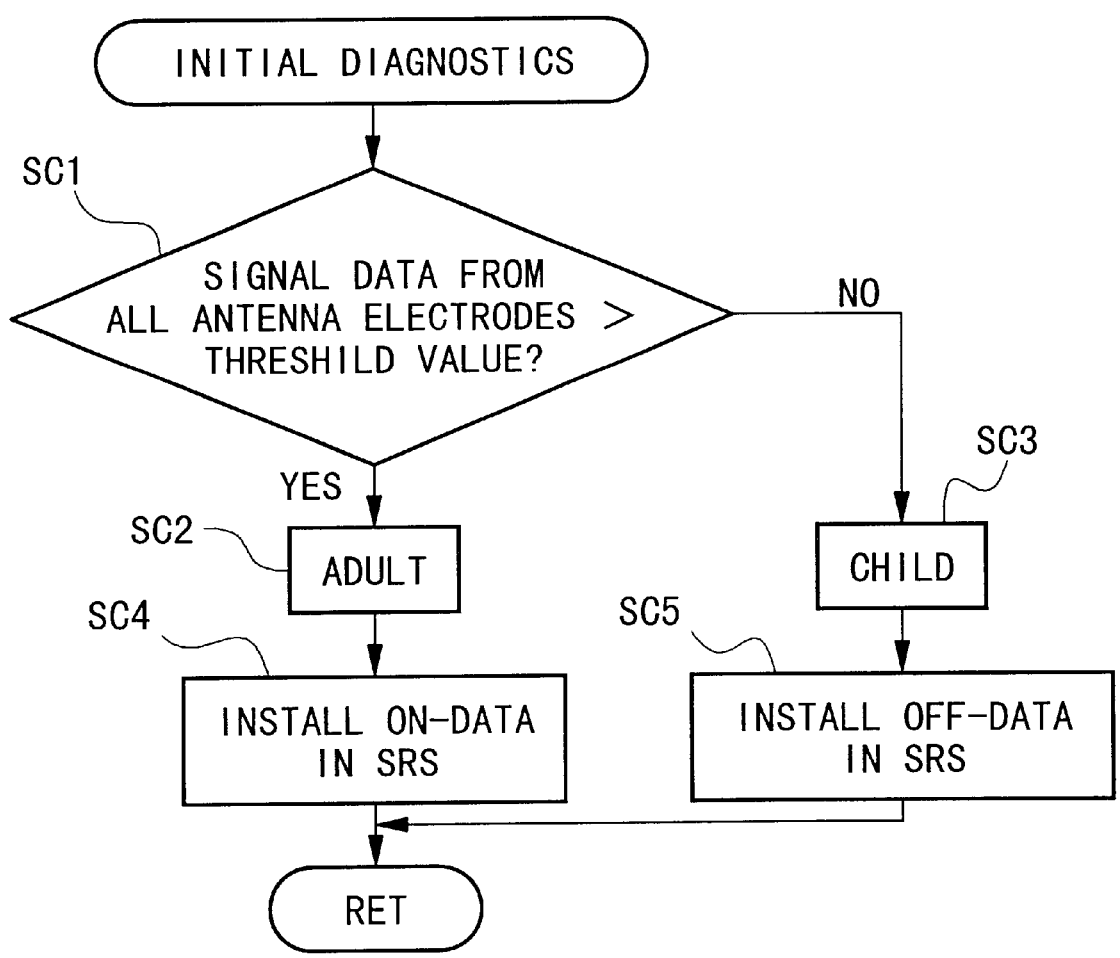
FIG. 13 is a flowchart for the passenger evaluation process shown in FIG. 10.

The passenger evaluation process is carried out as outlined in FIG. 13. First, in step SC1, signal data related to the current levels flowing in all the antenna electrodes 4a~4d and threshold values related to the passenger seating conditions are compared to decide whether the measured signal data are higher than the threshold values. If the measured signal data are higher than the threshold values, it proceeds to step SC2, and if it is judged that the signal data are not higher, it proceeds to step SC3. In step SC2, if it is judged that the passenger sitting on the seat is an adult, it proceeds to step SC4, so that ON-data for placing the airbag apparatus 30 in the deployable state are entered in the SRS process, and the program connects to SRS process. Also, in step SC3, if the passenger sitting on the seat is a child, it proceeds to step SC5, and OFF-data for not deploying the airbag apparatus 30 are entered in the SRS process, and the program is continued.

The SRS process is carried out as outlined in FIG. 14. First, in step SD1, ON-data for placing the airbag apparatus in the deployable state or OFF-data for placing the airbag apparatus in the not-deployable state and system check-data are sent from the passenger detection unit circuitry (control circuit 22) to the airbag apparatus circuitry (control circuit CC). In step SD2, (system) OK-data or (system) NG-data in response to the ON-data and OFF-data and system check-data from the airbag apparatus are received by the control circuit 22, and it proceeds to step SD3. In step SD3, it is judged whether the ON-/OFF-data and system check-data, which had been sent from the passenger detection side to the airbag apparatus circuitry, are again returned from the airbag apparatus circuitry to the passenger detection side in the normal condition. If it is judged to be normal (no problems in signal circuit), the process is continued. If there is a problem in the corn circuit, it proceeds to step SD4, and it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SD5, and fail-safe timer count is performed, and the process is continued.

On the other hand, in step SE1, the airbag apparatus circuitry (control circuit CC) receives ON-data for placing the airbag apparatus in the deployable state or OFF-data for placing the airbag apparatus in the not-deployable state and system check-data from the passenger detection unit circuitry (control circuit 22). In step SE2, the received data are checked to examine whether or not they are normal. In either case, it proceeds to step SE3 for sending OK-data or NG-data and system check-data to the passenger detection unit circuitry. If it is judged, in step SE2, that the signal circuit is normal, OK-data are sent in step SE3, and it proceeds to step SE4. In step SE4, the data on the airbag side is renewed in response to the OK-data, thereby enabling to place the airbag in the deployable state or not-deployable state. If, in step SE2, it is judged that there is a problem in the corn circuit, NG-data are sent to the control circuit 22 in step SE3, and it proceeds to step SE5. In step SE5, it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SE6, and fail-safe timer count is performed, and the process is continued.

According to this embodiment, a plurality of antenna electrodes 4 (4a~4d) are disposed separately on the sitting section of seat 1, therefore, each antenna electrode is successively connected to the oscillation circuit 11 by successively switching the switching devices 18a~18d in the switching section 18, and by impressing HFLV to generate a weak electric field, a particular value of current, determined by the opposing area of contact with the passenger and other factors, flows in each antenna electrode 4. Therefore, by detecting the values of such perturbation current, it is possible to detect readily whether the passenger is an adult or a child.

Especially, many antenna electrodes 4a~4d can be excited by successively applying HFLV signals generated by the oscillation circuit 11 by means of switching devices 18a~18d in the switching circuit 18, the circuit structure is simplified and the cost of the system is lowered.

Also, because many antenna electrodes 4a~4d are disposed symmetrically in the sitting section 1a, it is possible to detect if the passenger position is shifted laterally, on the basis of the values of the current flowing in each antenna electrode.

Furthermore, the phase difference between the forward signals (from the oscillation circuitry to the amplitude control circuitry) and the output signals (from the antenna electrode circuitry to antenna electrode 4) is dependent on the nature of the object sitting on the seat 1. Particularly, the levels of phase difference are recognizably different when the object is a human body. Therefore, the use of the phase shift detection circuit 20 to detect the phase difference together with the result of passenger identity judgment based on signal data related to passenger identity by detected perturbation current levels, enables to reliably detect passenger loading on the seat 1.

In particular, the airbag in the airbag apparatus 30 is able to be made either deployable or not deployable, depending on the judgment of the system on whether the passenger is an adult or a child. For example, if it is judged that the passenger is a child based on a low-level of detected current, the airbag in the airbag apparatus 30 is placed in a non-deployable state. Therefore, even if the car collides, the airbag is not opened and the child is prevented from suffering secondary injuries.

Also, the system cost can be lowered significantly by providing the system power source from the single power source produced by the electric power circuit 24, and by producing approximate HFLV rectangle waveforms with the use of only the positive power source in the oscillation circuit 11 in the control circuit 10.

Further, the amplitude control circuit 12 is used to maintain the amplitude of the voltage impressed on the antenna electrodes 4 (4a~4d) approximately constant, so that the data related to perturbation current provided by the electric current detection circuit 15 can be compared readily with the threshold data relating the passenger seating conditions and others, and a judgment arrived at with a high degree of accuracy and reliability.

FIG. 15 shows another embodiment of the passenger detection system. This system is basically the same as the system presented above, but the difference is that the antenna electrodes 4 (4a~4b) are provided on the backrest section 1b, and they are not provided on the sitting section 1a.

Figure 15A:
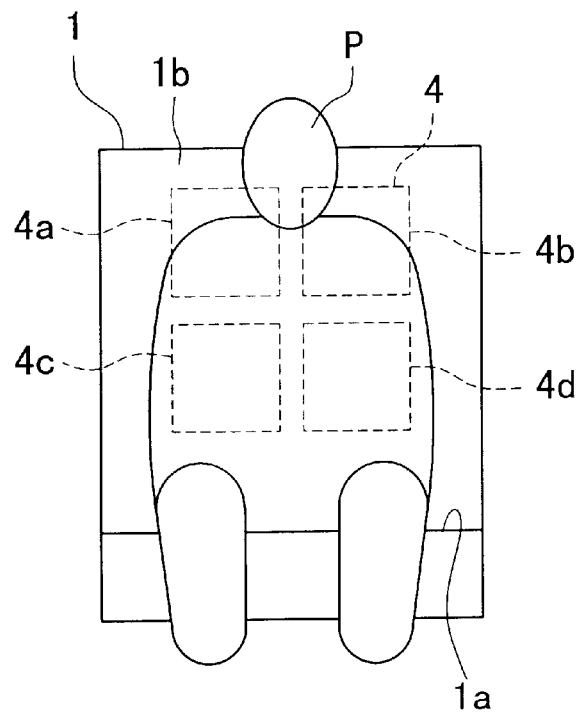
FIGS. 15A, 15B are diagrams for another arrangement of the antenna electrodes, respectively showing, a front view of an adult passenger, and a front view of a child passenger.
Figure 15B:
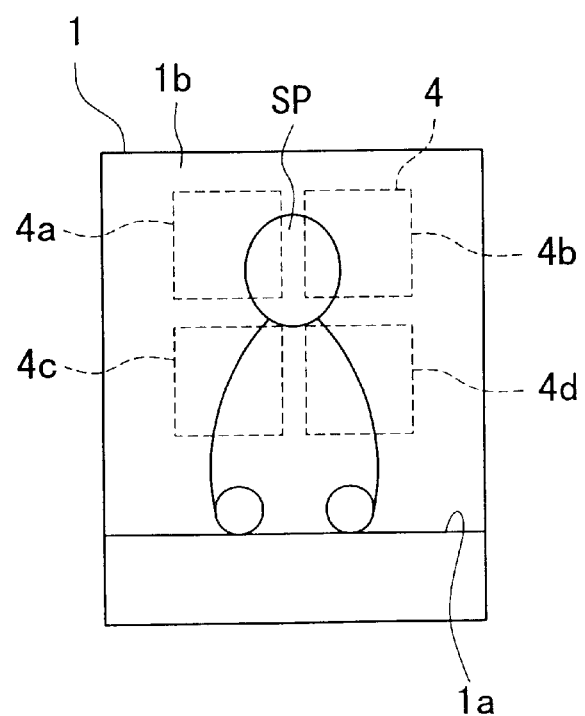

As shown in FIG. 15A, when the opposing areas to all the antenna electrodes 4a~4d are wide, and the detected current levels are high, it is judged that the passenger sitting on the seat 1 is an adult. Also, as shown in FIG. 15B, when the opposing areas to all the antenna electrodes 4a~4d are small, and the detected current levels are low, it is judged that the passenger sitting on the seat 1 is a child.

It should be noted that the present invention is not limited to the above embodiments and other arrangements are possible. For example, the number of antenna electrodes may be adjusted suitably, and their shape can be rectangular, strip shape which are possible examples. Electric field generation device may include an HFLV source to produce substantially rectangle waveform by switching of positive electrical power source based on clock signals in the control circuit, or by dividing the clock signal in the control circuit. The output frequency other than 120 KHz may be chosen depending on the conditions inside the car, and the voltage may be selected outside the range of 5~12 volts. Also, the amplitude control circuit and the phase shift detection circuit may be omitted depending on the precision of the system power source and expected performance level of the system. Also, information detection circuit includes not only the embodied example of direct detection of the antennae current, but includes such indirect detection based on information on voltages related to the perturbation current and waveform data. Further, passenger evaluation methods include comparison of stored data related to the seating pattern and sitting posture of the passenger with the detected data, thereby judging the passenger identity criteria such as passenger loading, and whether the passenger is an adult or a child.

Embodiment 2

Next, Embodiment 2 will be presented using the same reference numerals as those in Embodiment 1 for those parts that are the same, and their explanations are omitted. The passenger detection system in this embodiment is based on detecting the perturbation current related to passenger seating conditions by comparison of reference data with detected data and using improved switching methods.

As shown in FIG. 5, a control unit 10 is disposed on the seat frame 3 or its vicinity, and this control unit 10 is comprised by, for example: an electric field generation device (oscillator and the like) 11 for generating a weak electric field; an amplitude control circuit 12 for controlling the amplitude of the forward signal from the oscillation circuit 11 to antenna electrode 4 approximately constant; an information detection circuit (current detection circuit for example) 15 for detecting information on the forwarding current of the forward signal; an ac-dc conversion circuit 16 for converting the output signal in the current detection circuit 15 to dc; an amplifier 17 for amplifying the output signal from the ac-dc conversion circuit; a switching circuit 18 for the antenna electrodes 4a~4d, connected to the current detection circuit 15 and having a plurality of switching devices 18a~18d; connectors 19a~19d disposed in the housing of the control unit, connected to the switching devices 18a~18d of the switching circuit 18; a phase shift detection circuit 20 connected to the amplitude control circuit circuitry (oscillation circuitry) and the switching circuit circuitry (antenna electrode side) of the current detection circuit 15, for detecting the phase difference between the forward signal from the oscillation circuit and the application signal to the antenna electrodes; an amplifier 21 for amplifying the output signal of the phase shift detection circuit 20; a control circuit 22 including MPU, external memory (EEPROM for example) and the like; a connector 23 connected to the battery source (not shown) disposed in the housing; and an electric power circuit 24 connected between the connector 23 and the control circuit 22 and others. Power source Vcc generated in the electric power circuit 24 is a constituting element for the control unit 10, and is supplied to all the elements requiring power source Vcc. An airbag apparatus 30, of a configuration such as the one shown in FIG. 7, is connected to control circuit 22 of the control unit 10. The oscillation circuit 11 is designed to generate HFLV signals at a frequency of 120 KHz, for example. Selective switching of the switching devices 18a~18d is carried out according to the output signal from the control circuit 22.

In the control circuit 22, in the reference state (for example, no passenger sitting in seat 1), signal data related to the initial current flowing in individual antenna electrodes 4a~4d are stored as initial data (initial data or vacant seat data) SDn, where n is an identification number of an antennae 4a~4d in this embodiment in the external memory (memory section). Essentially true data DTn (=DSn−ADn) is obtained by subtracting the measured signal data ADn received from the current detection circuit 15 from the initial data SDn. Basically, initial data SDn are entered only at the time of new car shipment. In the memory section of the control circuit 22 are stored reference data derived from true data DTn, such as threshold values (threshold data) regarding the seating conditions (detect passenger loading, and identify adult/child), threshold values regarding the phase difference between the forward signal to the current detection circuit 15 and the application signal to the antenna electrodes (threshold data).

Specifically, passenger loading data are selected as follows. For example, as shown in FIGS. 9A, 9B, when an adult passenger P or a child passenger SP is seated on the seat 1, the areas opposing the individual antenna electrodes are different, and as a result, the levels of the current flowing in the antenna electrodes are different, such that when an adult passenger P is seated, the current level is higher than that when a child passenger SP is seated. Therefore, a threshold value, which is somewhat lower than the current level for a child passenger SP, is selected as the threshold value for passenger loading. Thus, when the detected data (DTn) is higher than the threshold value, it is assumed that a passenger is seated, and when it is lower than the threshold value, it is assumed that no one is seated. It is preferable that the threshold value be selected according to a sum of all the current flowing in each antenna electrode, but it is possible to select a threshold value for each antenna electrode.

The identity of a passenger is determined as follows. When an adult passenger P or a child passenger SP is seated, as shown in FIGS. 9A, 9B, the levels of the current flowing in individual antenna electrodes are different as an adult passenger P produces a higher current than a child passenger SP. Therefore, the threshold value for the identity of the passenger is selected as a current level midway between the adult and child threshold values. Thus, when detected data (DTn) is higher than the threshold value, it is assumed that the passenger seated is an P, and when it is lower than the threshold value, it is assumed that the passenger seated is a child SP. It is preferable that the threshold value be selected according to a sum of all the current flowing in each antenna electrode, but it is possible to select a threshold value for each antenna electrode.

With respect to selecting a threshold value for the phase difference, a suitable value may be chosen between an average value of the phase difference detected by the phase shift detection circuit 20 when a person is present, and an average value of the phase difference, caused by factors other than a human body. The characteristics of the seat (wetness, for example) can affect the measurements, therefore, upper and lower limits of threshold values are chosen, so that when the phase difference data are inside the range, it is assumed that a person is seated. Therefore, pre-stored data (regarding the passenger seating conditions and the phase difference) and the detected data (regarding the current levels and the phase difference) are compared in the control circuit 22 to determine whether a seated passenger is an adult or a child, and what the characteristics of the seat are.

Regarding the phase difference, a suitable value may be chosen between an average value of the phase difference detected by the phase shift detection circuit 20 when a person is present, and an average value of the phase difference, caused by factors other than a human body. The characteristics of the seat (wetness, for example) can affect the measurements, therefore, upper and lower limits of threshold values are chosen, so that when the phase difference data are inside the range, it is assumed that a person is seated. Therefore, pre-stored data (regarding the passenger seating conditions and the phase difference) and the detected data (regarding the current levels and the phase difference) are compared in the control circuit 22 to determine whether a seated passenger is an adult or a child, and what the characteristics of the seat are.

Thus, measured signal data ADn, regarding passenger seating conditions, received by the control circuit 22 are processed with initial seat data SDn stored in the control circuit 22, and compared against the threshold data such as passenger loading, so that when the current levels in all the antenna electrodes 4a~4d are high, it is assumed that seat 1 has a passenger and that the passenger is an adult P, as illustrated in FIG. 9A. In such a case, the control circuit 22 places the airbag circuit shown in FIG. 7 in the deployable state. When the current levels in all the antenna electrodes 4a~4d are low and are lower than the passenger loading threshold value, it is assumed that seat 1 has a passenger and that the person seated in a child SP, as illustrated in FIG. 9B. In such a case, the control circuit 22 places the airbag circuit shown in FIG. 7 in the not-deployable state. Specifically, when the airbag is not to be activated, the control circuit 22 instructs the control circuit CC in the airbag apparatus 30 so that a gate signal is not supplied to the switching element SW2 of the passenger side when a collision takes place. The driver-side switching element SW1 is supplied with a gate signal. When an adult and a child are seated, the switching elements SW1, SW2 are both selected to be in the deployable state.

Figure 16:
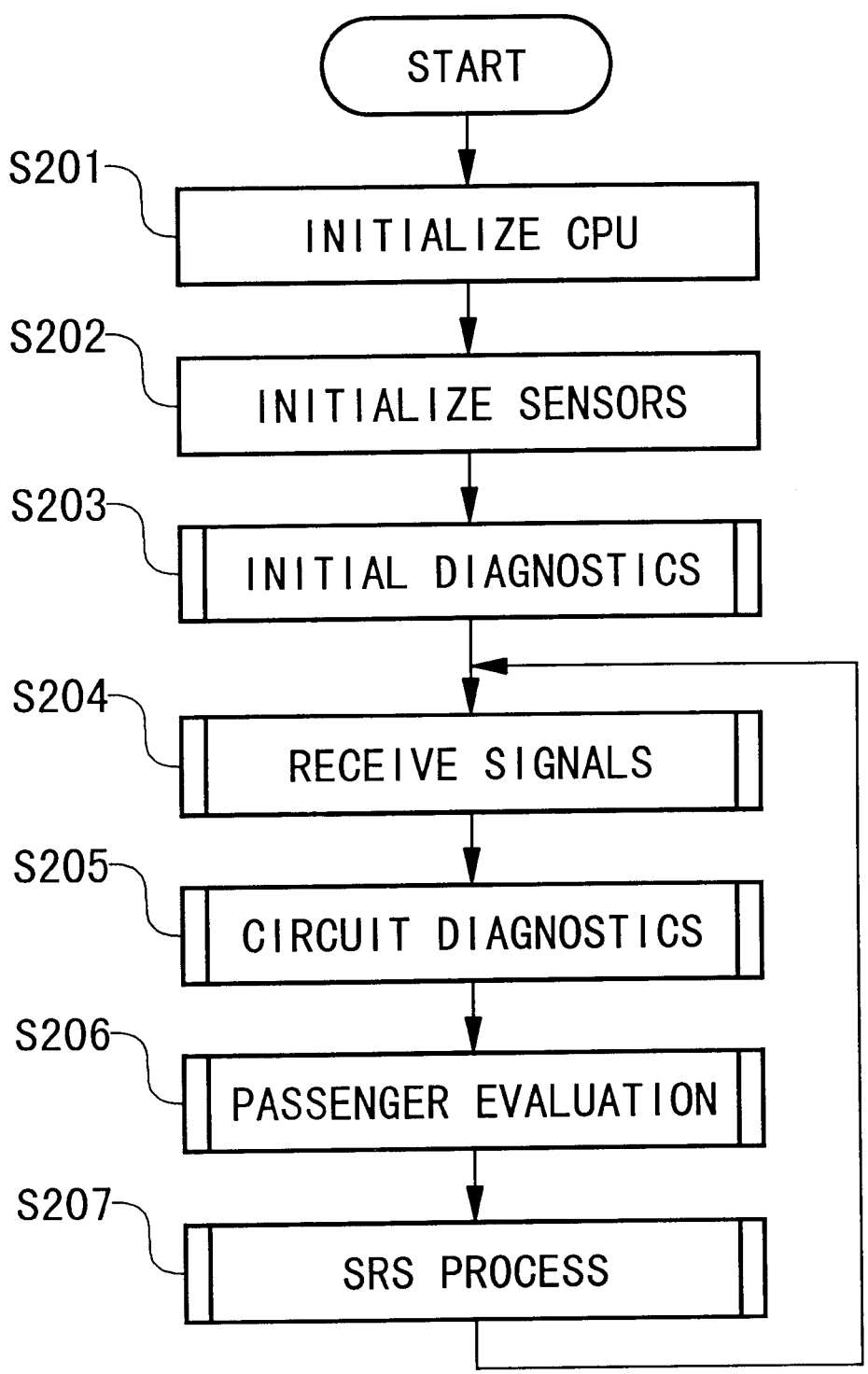
FIG. 16 is a flowchart for the process of detecting a passenger using the passenger detection system.

The process of passenger detection system will be explained with reference to the flowcharts shown in FIGS. 16~20. First, as shown in FIG. 16, the ignition circuit is turned on so that the process is in START. In step S201, CPU in the control circuit 22 is initialized (for example, clearing memories, selecting time data and others) and proceeds to step S202. In step S202, to carry out subtraction processing, signal data related to the initial currents flowing in the antenna electrodes (sensors) 4a~4d in the reference state such as vacant seat 1 are received, and the data are written to external memories such as EEEPROM as the initial values SDn, and it proceeds to step S203. In step S203, initial diagnostics are carried out to detect any problems in the communication line (com line) between the control circuit 22 and the airbag apparatus 30. In step S204, based on, measured signal data ADn (perturbation current flowing in the particular electrode resulting from the application of the weak electric field generated by a particular antenna electrode of the antenna electrodes 4a~4d) and phase shift data related to passenger seating conditions are received in the control circuit 22. In step S205, it is checked whether there are any problems in the signal circuitry such as contacts of the antenna electrodes, grounding of the antenna electrodes. The diagnostic results are sent as "0" if no problems exist and as "1" if problems exist, and the results are sent to the SRS process, which will be described later. In step S206, received detected data ADn is processed with the initial data SDn, to obtain essentially true data DTn, and it is judged whether the passenger sitting in seat 1 is an adult or a child. In step S207, SRS process is carried out between the control circuit 22 and the airbag apparatus (SRS) 30. When step S207 is completed, it returns to step S4 and repeats the steps S204 to S206 at certain intervals. Initial diagnostics in step S203 and circuit diagnostics in step S205 may be integrated into each other or omitted.

Figure 17:
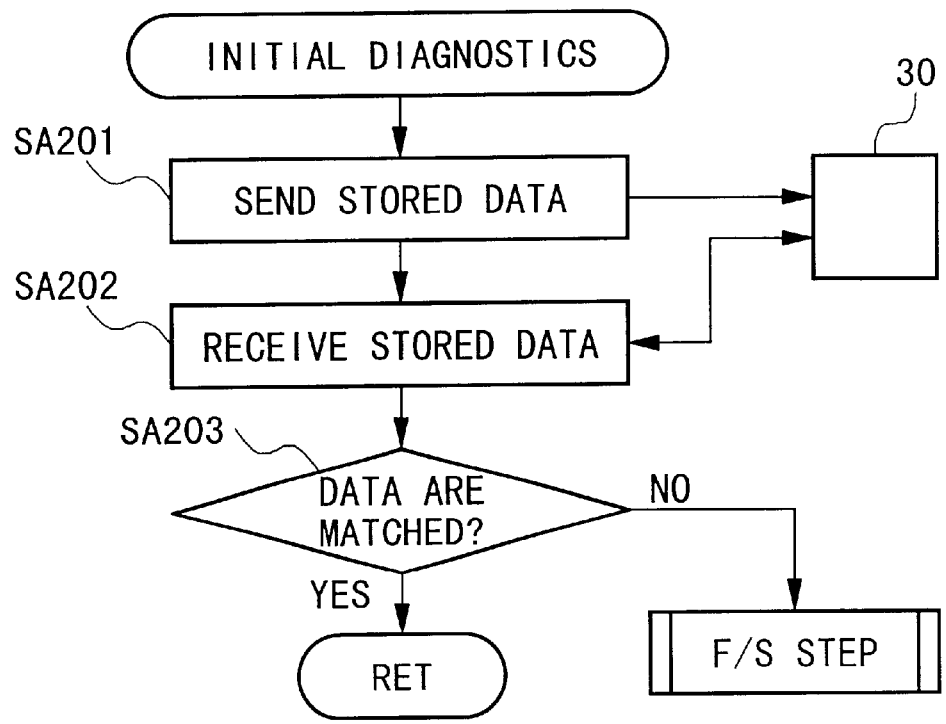
FIG. 17 is a flowchart for the initial process of passenger detection.

Initial diagnostics in FIG. 16 are carried out as outlined in FIG. 17. First, in step SA201, stored data are sent from the control circuit 22 to the control circuit CC in the airbag circuit 30. In step SA202, passenger data are received from the airbag apparatus 30. In step SA203, it is examined whether the received data from the airbag apparatus 30 match the stored data. If the data are matched, the process is continued. If the data do not match, it is judged that problems exist in the com circuit and fail-safe process is carried out and warning lamp is turned on, for example. The initial diagnostics may be carried out by sending the stored data from the airbag apparatus 30 to the control circuit 22 so that matching process can be carried out in the control circuit CC in the airbag apparatus 30.

Figure 18:
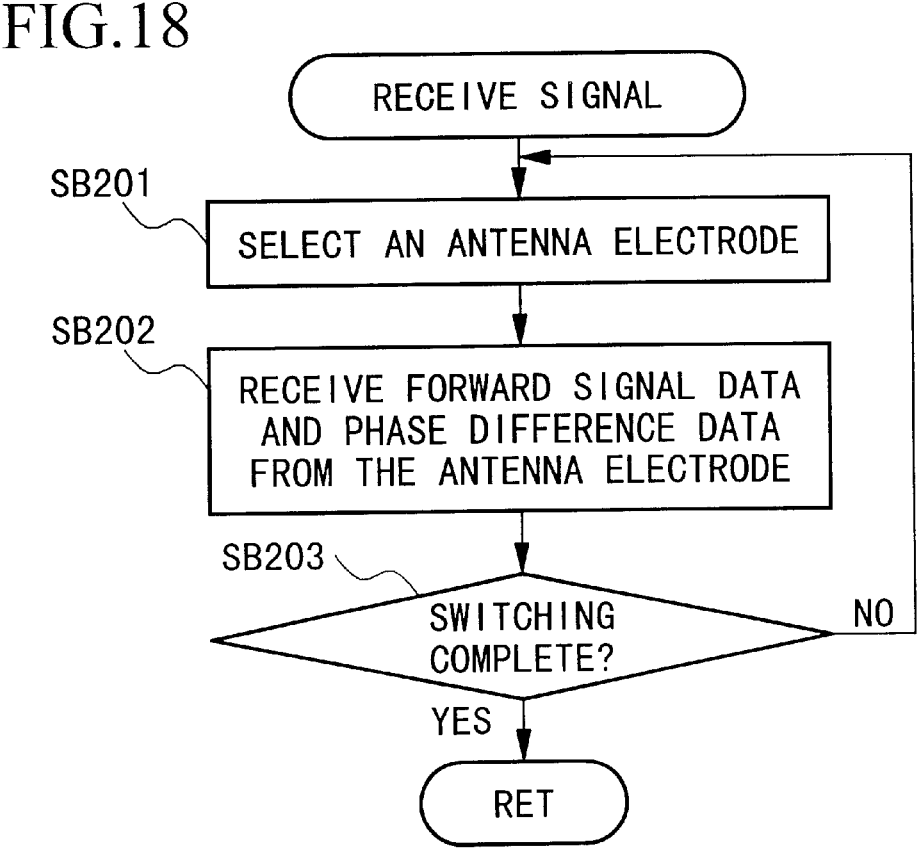
FIG. 18 is a flowchart for the signal receiving process.

Signal reception process in FIG. 16 is carried out as outlined in FIG. 18. First in step SB201, the control circuit 22 successively selects one switching device at a time from the switching devices 18a~18d so that only the switching circuit 18a is closed, for example, to select an antenna electrode 4a. In step SB202, the data from the respective antenna electrode and phase difference are received in the control circuit 22. In step SB203, it is examined whether successive selection of antenna electrodes 4a~4d by the successive actions of the switching devices 18a~18d has been completed. If it is judged that the switching process has been completed, it proceeds to passenger evaluation process. If it is judged that the switching process is incomplete, it returns to step SB201.

Figure 19:
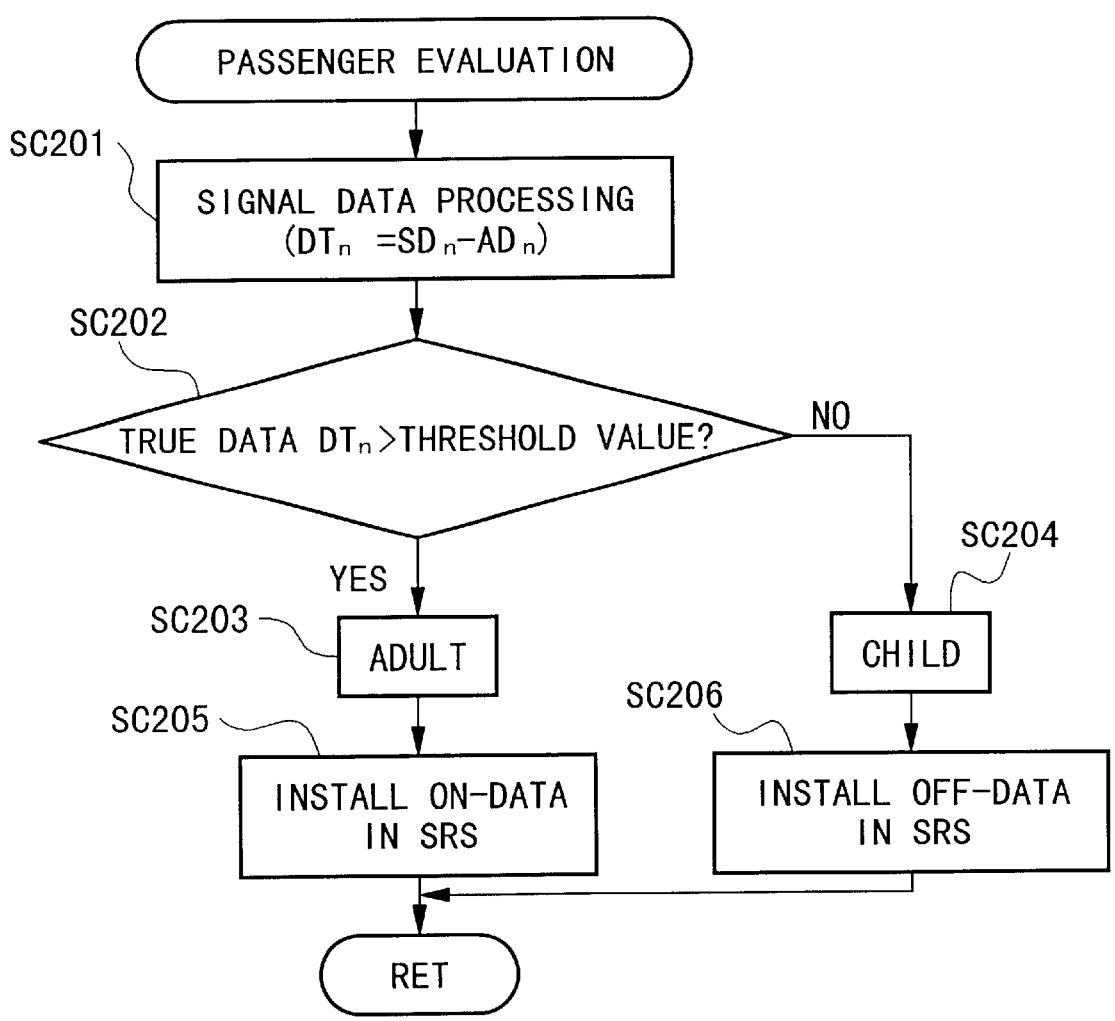
FIG. 19 is a flowchart for the passenger evaluation process.
Figure 20:
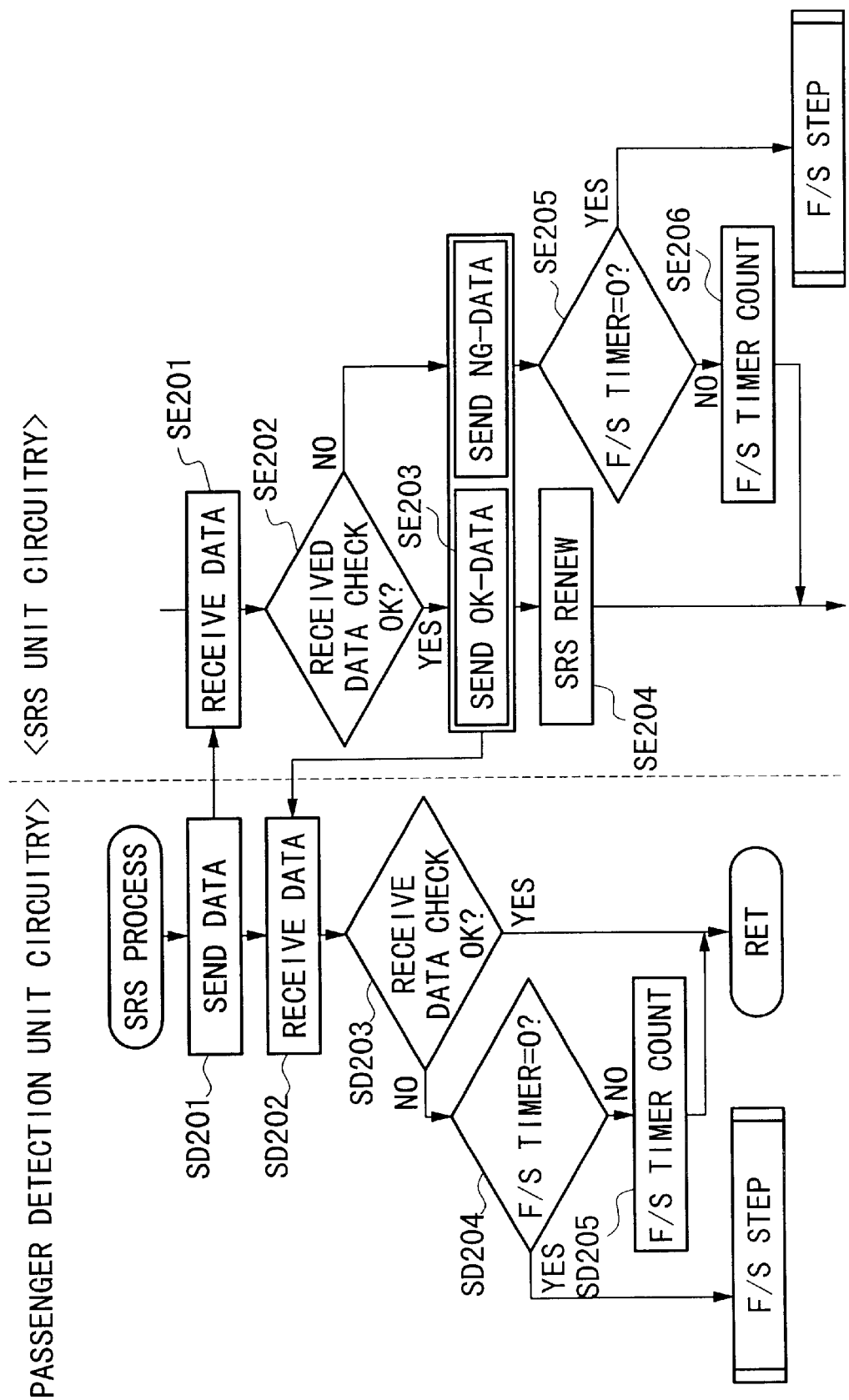
FIG. 20 is a flowchart for SRS process.

The passenger evaluation process is carried out as outlined in FIG. 19. First, in step SC201, based on the initial value SDn read from the external memory, the measured signal data related to current flowing in all the antenna electrodes 4a~4d are processed so as to calculate the essentially true data DTn (=SDn−ADn). In step SC202, the true data DTn received by the control circuit 22 and the threshold values related to passenger evaluation are compared to decide whether the true data DTn are higher than the threshold values. If the true data DTn are higher than the threshold values, it proceeds to step SC203, and if it is judged that the true data are not higher, it proceeds to step SC204. In step SC203, if it is judged that the passenger sitting on the seat is judged to be an adult, it proceeds to step SC205, so that ON-data for placing the airbag apparatus 30 in the deployable state are entered in the SRS process, and the program connects to SRS process. Also, in step SC3, if the passenger sitting on the seat is judged to be a child, it proceeds to step SC5, and OFF-data for not deploying the airbag apparatus 30 are entered, and the program is continued.

The SRS process is carried out as outlined in FIG. 19. First, in step SD201, ON-data for placing the airbag apparatus in the deployable state or OFF-data for placing the airbag apparatus in the not-deployable state and system check-data (problem information) are sent from the passenger detection unit circuitry (control circuit 22) to the airbag apparatus circuitry (control circuit CC). In step SD202, OK-data or NG-data in response to the ON-data and OFF-data from the airbag apparatus circuitry and system check-data are received by the control circuit 22, and it proceeds to step SD203. In step SD203, it is judged whether the ON-/OFF-data and system check-data, which had been sent from the passenger detection unit circuitry to the airbag apparatus circuitry, are returned again from the airbag apparatus circuitry to the passenger detection circuitry in the normal condition. If it is judged to be normal (no problem in corn circuit), the process is continued. If there is a problem in the corn circuit, it proceeds to step SD204, and it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SD205, and fail-safe timer count is performed, and the process is continued.

On the other hand, in step SE201, the airbag apparatus circuitry (control circuit CC) receives ON-data for placing the airbag apparatus in the deployable state or OFF-data for placing the airbag apparatus in the not-deployable state and system check-data from the passenger detection unit circuitry (control circuit 22). In step SE202, the received data are checked to examine whether or not they are normal. In either case, it proceeds to step SE203. In step SE203, OK-data or NG-data and system check-data are sent to the passenger detection unit circuitry. If, in step SE202, it is judged that the corn circuit is normal, OK-data are sent in step SE3, and it proceeds to step SE204. In step SE204, the data on the airbag side is renewed in response to OK-data, thereby placing the airbag in the deployable state or not-deployable state. If, in step SE202, it is judged that there is a problem in the corn circuit, NG-data are sent in step SE203, and it proceeds to step SE205. In step SE205, it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SE206, and fail-safe timer count is performed, and the process is continued.

According to this embodiment, the passenger evaluation process is performed according to the true data DTn (=SDn−ADn) obtained by subtracting the measured signal data ADn from the initial data SDn, relating to the reference state such as vacant seat that are stored in external memory. Therefore, by initializing each sensor in terms of the reference values of the sensors, it is possible to compensate for the scatter in the results caused by slight characteristic differences in the installation conditions of the antenna electrodes and fluctuations in installed components. This process increases the reliability and precision for the passenger evaluation process.

Also, signal data related to the perturbation current caused by selectively activating the antenna electrodes 4a~4d disposed on the seat 1, are subtraction processed using the initial data SDn stored in the control circuit 22, and seating conditions including passenger loading are judged on the basis of the corrected data, which is sent to the airbag apparatus 30, and these series of steps are repeated at certain intervals, and therefore, deployment of the airbag apparatus 30 can be controlled appropriately according to data on passenger loading and other data.

The beneficial effects of Embodiment 2 are the same as those in Embodiment 1. It is obvious that Embodiment 2 can be applied to other embodiment shown in FIG. 15.

Embodiment 3

Next, the passenger detection system in Embodiment 3 will be presented with reference to the drawings. The passenger detection system in this embodiment is based on detecting the perturbation current related to passenger seating conditions more effectively by using an impedance matching circuits and various designs of antenna electrodes. Those parts which are the same as the parts shown in FIGS. 96~97 will be given the same reference numerals and their detailed explanations will be omitted.

Figure 21A:
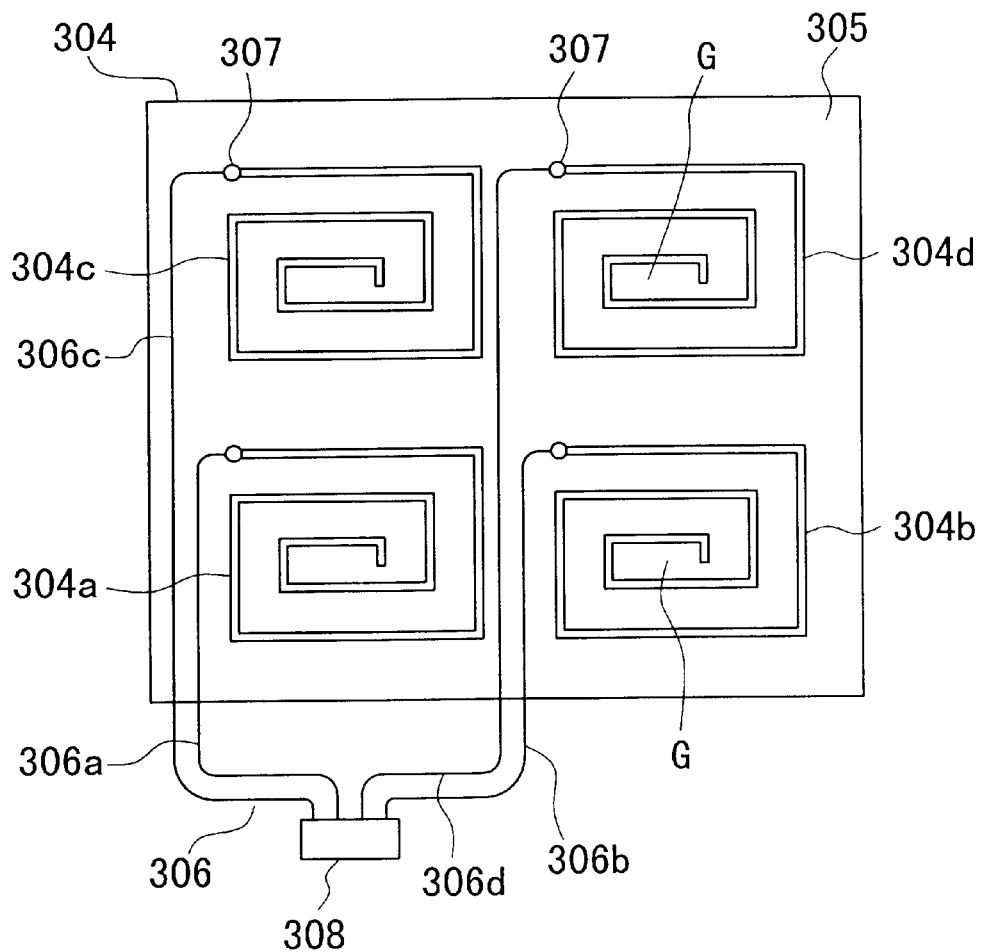
FIGS. 21A–21C are diagrams of the specific antenna electrodes structures showing, respectively, a plan view, a cross sectional view of the connection between antenna electrodes and lead wire connection, and another example of the connection.
Figure 21B:
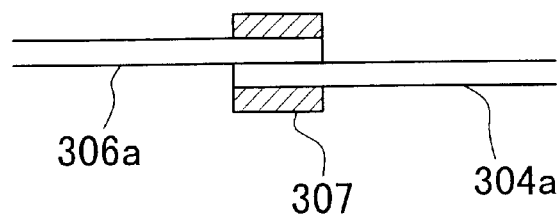
Figure 21C:
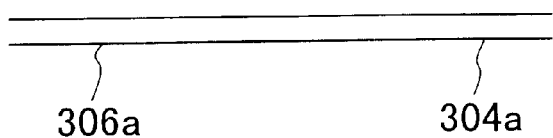

FIGS. 2, 21 show the arrangement of the passenger seat 1 and the antenna electrodes, and seat 1 is comprised primarily of a sitting section 1a and a backrest section 1b. The sitting section 1a is comprised by a seat frame 3 fixed to the base 2 which can be moved forward and backward, and an outer covering for the cushion. Particularly, a plurality of antenna electrodes 304 of substantially the same shape (for example, rectangular spiral), separated at some distance, are disposed symmetrically on the sitting section 1a. The antenna electrodes 304 may be disposed on the outside the covering or on the outer covering or cushion material itself. A control unit 10 is disposed on or near the seat frame 3.

The antenna electrode 304, as shown in FIG. 21, is basically comprised of a base member 305 made of an insulator such as non-woven fabric, and antenna electrodes 304a~304d placed separately and symmetrically on one surface of the base member 305, and in spirals using an electrically conductive material having a line or strip shape, and are disposed on the inside of the outer covering member. The antenna electrodes 304a~304d have an internal space section G bounded by peripheries and where there is no electrode, and it is preferred that the electrodes be formed on an electrically conductive cloth. The antenna electrode 304a~304d may be made of fine metallic wire, or a conductive fiber woven into the base member 305, or screen printing, coating or spraying of electrically conductive material containing copper powder, graphite powder or silver powder on the base member 305. Or, the outer covering for the sitting section 1a or cushion may be used as base member and a conductive material may be screed printed, coated or sprayed using a metallic wire, or an electrically conductive fiber may be woven in the fabric. They may also be fabricated into spiral shapes by etching a thin flexible metallic strip or etching an electrically conductive flexible thin material made by vapor depositing or electroplating an electrically conductive material on an insulator.

Especially, when the antenna electrodes 304a~304d are made of electrically conductive material, or a electrically conductive material in a line or strip shape, the antenna electrodes may be adhesively bonded or bonded using a thermoplastic or thermosetting material, sewing, hooking, button, hooks, or adhesive tape. Adhesive bonding is preferred. The antenna electrodes 304a~304d shown in the drawing are formed into rectangle spirals of substantially the same size. The antenna electrode section 304 contain many antenna electrodes 304a~304d but they are essentially synonymous functionally and are used interchangeably in the following presentation.

The antenna electrode 304 is constructed as shown in FIGS. 21A, 21B. A lead wire 306 (306a~306d) including shielding wire makes an electrical/mechanical connection on one end of the antenna electrodes 304a~304d using pressure clamps (bonding means) 307, and the lead wire 306 (306a~306d) is attached to a connector 308 at the output end, and is connected to the connectors (19a~19d) of the control unit 10. Particularly, when the antenna electrodes 306a~306d are to be made of metallic wire, lead wire (306a) and the antenna electrode wire (304a) may be made of the same wire.

In this embodiment, a plurality of antenna electrodes 304a~304d provided in the seat 1 have a space G bounded by the peripheries of the antenna electrode section where there is no conductive material of the antenna electrodes. Therefore, the wire material is reduced and the cost is lowered. Especially, when the antenna electrode section is made of an electrically conductive woven material, reduction in the material usage means lower cost.

Also, The antenna electrodes 306a~306d are provided with as many spaces G as possible without causing problems in use, so that the cushioning of seat 1 is not affected. Therefore, seating comfort level is maintained.

Particularly, when the space G is in the center of the antenna electrode section, there is hardly any effect on the performance of the antenna electrodes, but when the spaces G of very large size are located near the peripheral regions, the performance may be affected to some extent by lowering the perturbation current in the antenna electrodes. The shapes shown in these drawings are those that have the least effect on the performance of the antenna electrodes.

Also, the overall antenna electrode section is made by bonding a plurality of antenna electrodes 304a~304d on an insulating base member 305, it is possible to secure the spacing and arrangement of the antenna electrodes simply by positioning the base between the outer covering and the cushion material, without having to made any adjustment operations. After installing the section 306, there is no problem of shifting of the antenna electrodes 304a~304d. Therefore, information obtained from the perturbation current is reliable and the precision of passenger seating evaluation is improved.

When the antenna electrodes 304a~304d are placed individually between the outer covering and the cushion material, without using the base member 305, the spacing between the electrodes must be laboriously adjusted individually, and further more, there is a problem of shifting of the antenna electrodes caused by the use, and the reliability of information can suffer.

Also, lead wires 306a~306d are extended from the antenna electrodes 304a~304d, therefore, connections to the control unit 10 are facilitated. Specially, if connectors 308 are provided on the ends of the lead wires, connections to the control unit 10 is facilitated even more.

Also, the pressure terminals 7 are used to clamp the antenna electrodes 304a~304d with the lead wires 306a~306d so that the electrical connections can be provided reliably.

Figure 22:
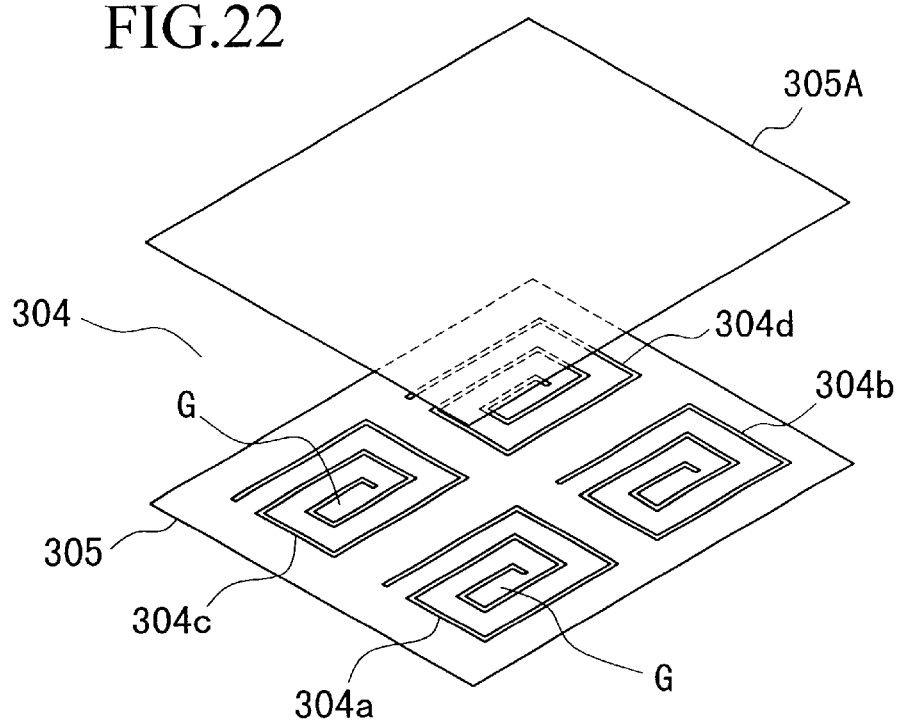
FIG. 22 is a perspective view of antenna electrodes details.

FIG. 22 shows another example of the antenna electrode. It is similar to the antenna electrode shown in FIG. 21, but the difference is that an insulating cover member 305A is used to guard an integral unit including the base member 305 and the antenna electrodes 304a~304d. It is preferred that the members be bonded using a an adhesive, thermoplastic or thermosetting resin. When using the thermoplastic or thermosetting resin, it is preferable to bond to the base member 305 and/or cover member 305A.

In this embodiment, the antenna electrodes 304a~304d are protected by the base member 305 and the cover member 305A, damage to the unit during assembly is minimized to improve productivity. Furthermore, because of the provision of spaces G, although the support strength for the base member 305A is reduced, unitizing of the base member 305 with the cover member 305A by clamping improves the strength to a level that will be acceptable for practical purposes.

Figure 23:
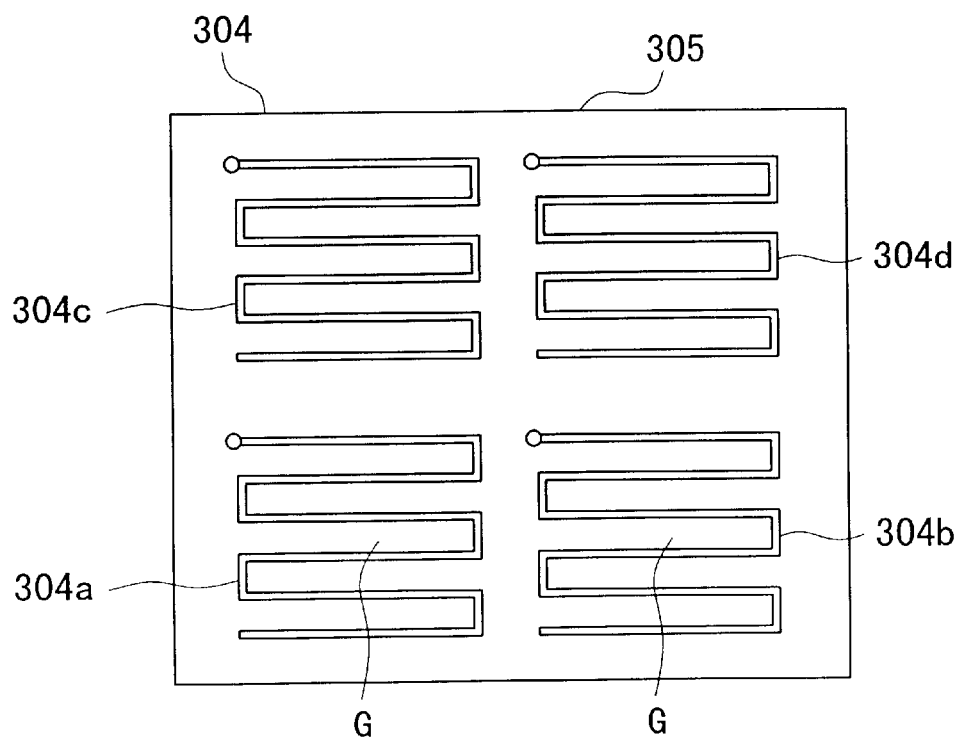
FIG. 23 is a plan view of another antenna electrodes.

FIG. 23 shows another example of the antenna electrode, which is basically the same as that shown in FIG. 21, but the difference is that a plurality of snaking antenna electrodes (304a~304d) are disposed on one surface of the base member 305. The snaking antenna electrodes 304a~304d are interspaced with spaces G.

Figure 24A:
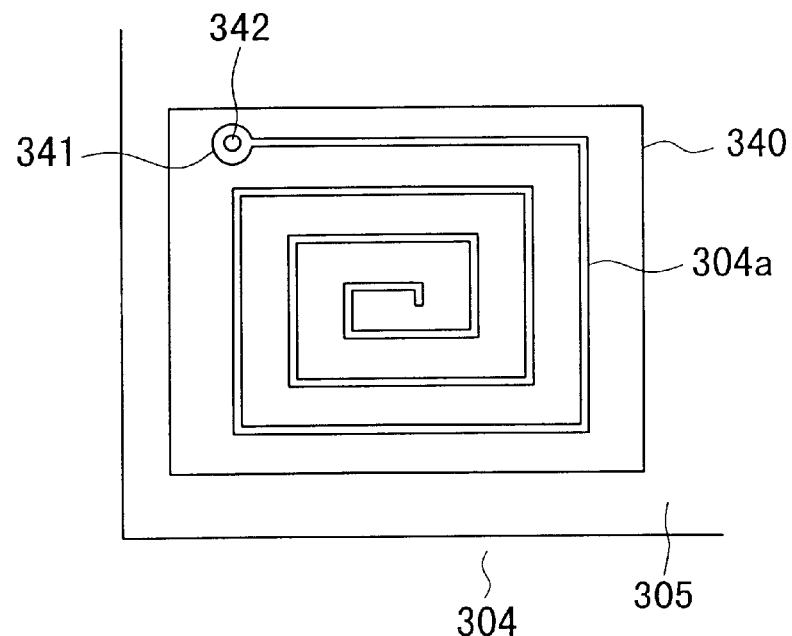
FIGS. 24A, 24B are, respectively, a plan view and a partial cross sectional view of another antenna electrode.
Figure 24B:
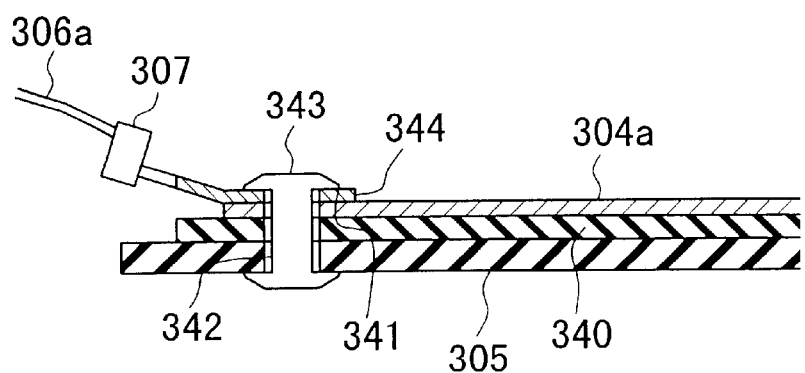

FIG. 24 shows another example of the antenna electrode, which is basically the same as that shown in FIG. 21, but the difference is that a rectangle shaped spiral antenna electrode 304a is formed on one corner of a flexible substrate member 340, and fixed to the base member 305. At the end of the antenna electrode 304a, a substantially circular conductive land 341 having a center hole 342 is provided, and the substrate member 340 is bonded to the base member 305. A lead wire 306a is attached to the conductive land 341 using a terminal lug 344 clamped by a pressure terminal 307 by fastening means 343 such as riveting to clamp the terminal lug 344, conductive land 341, flexible substrate 340 and the base member 305 in the center hole 342. The same arrangements are made for other antenna electrodes 304b~304d.

This type of antenna electrode 304a is made by depositing metals such as copper, aluminum or nickel to made a thin film on the entire surface of a flexible substrate 340 using electroplating, vapor deposition or injection molding, and by etching the film to form the electrodes. It is also possible to carry out deposition and fabrication process concurrently by using making on the surface during the deposition process to form the electrode section. It is also possible to form the electrode section by screen printing using a conductive paste.

According to this embodiment, mass production of antenna electrodes of uniform quality can be produced, thereby increasing the reliability passenger detection system and lowering the cost of production.

Figure 25:
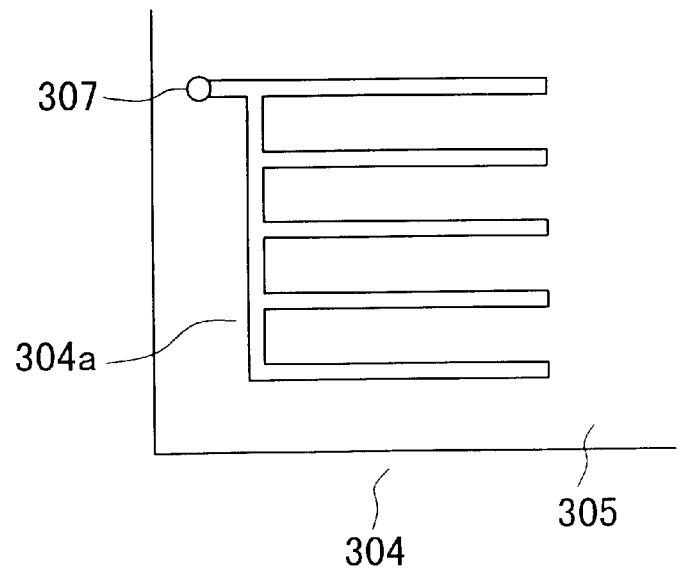
FIG. 25 is a plan view of a section of the antenna electrodes.

FIG. 25 shows another example of the antenna electrode, which is basically the same as that shown in FIG. 21, but the difference is that a plurality of antenna electrodes 309a (304b~304d) are provided on one surface of the base member 305 to form a comb structure using conductive wire or strip, which is fixed to the base member 305. The comb-shaped antenna electrode 304a is provided with interspaced spaces G. The comb sections may be provided on both sides.

In this embodiment, the shape of the antenna electrode 304a (304b~304d) is simple so that fabrication is relatively easy and passenger comfort can also be assured.

Figure 26:
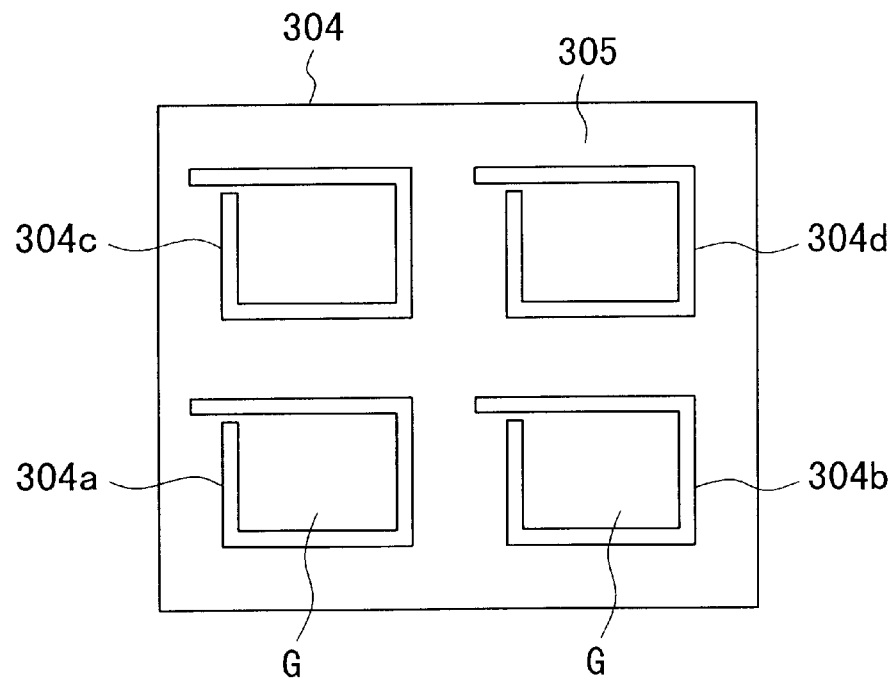
FIG. 26 is a plan view of yet another antenna electrodes.

FIG. 26 shows another example of the antenna electrode, which is basically the same as that shown in FIG. 21 but the difference is that the electrode is loop shaped, and the inside space G is surrounded by the antenna electrode wire. Such an antenna electrode is place at four corners of the base member 305.

This example further reduces the number of parts required to make the antenna electrode section, and the manufacturing cost can be significantly lowered.

Figure 27:
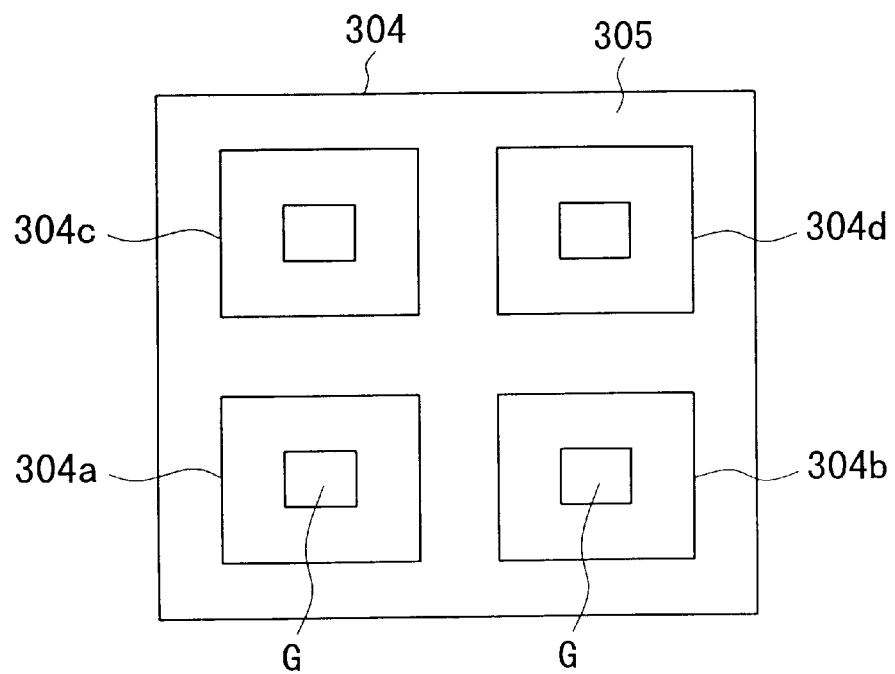
FIG. 27 is a plan view of still another antenna electrodes.

FIG. 27 shows another example of the antenna electrode, which is basically the same as that shown in FIG. 21 but the difference is that the shape of the antenna electrode 304a is substantially a rectangle frame and the inside space G is surrounded by tape conductor.

The antenna electrode section is fabricated by forming the space G is various ways such as cutting a space G in the center section of a conductive cloth, punching or etching a space G in the center section of a metal strip, or forming the space G on base member 305 by screen printing, coating, spraying, molten metal injection. When the antenna electrode section and the base member 305 are made separately, they can be united by adhesive bonding, bonding with thermoplastic or thermosetting resin, sewing, or by attaching with mechanical fasteners.

Figure 28A:
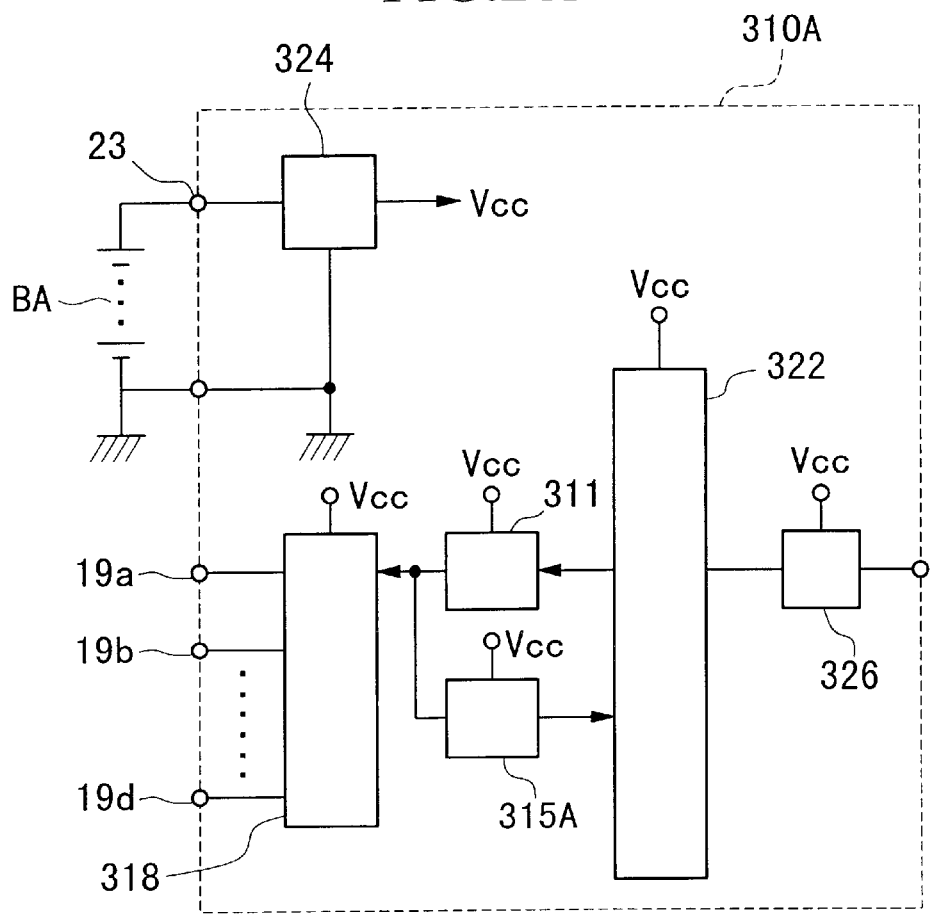
FIGS. 28A, 28B are, respectively, a block circuit diagram and a circuit diagram of an electrical field generation circuit and an information detection circuit.
Figure 28B:
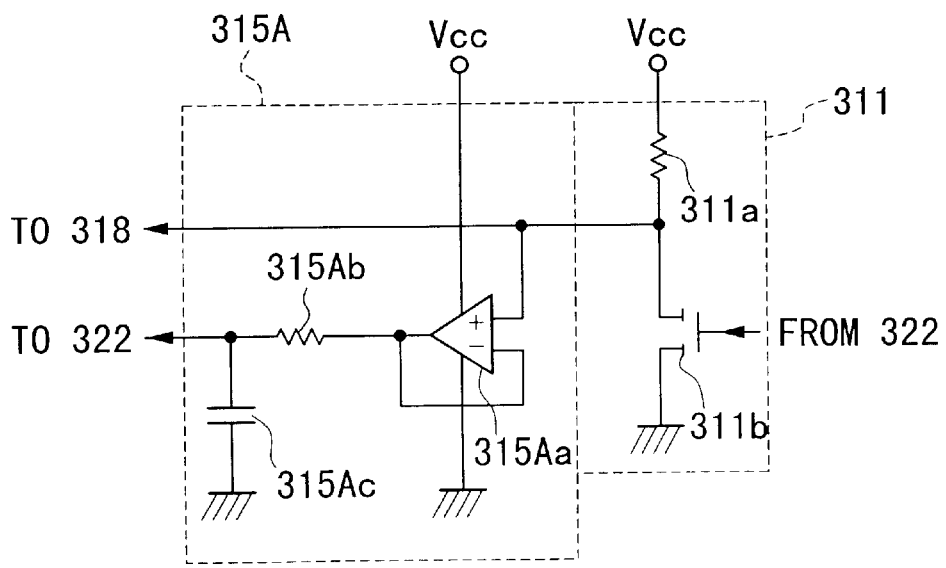
Figure 29A:
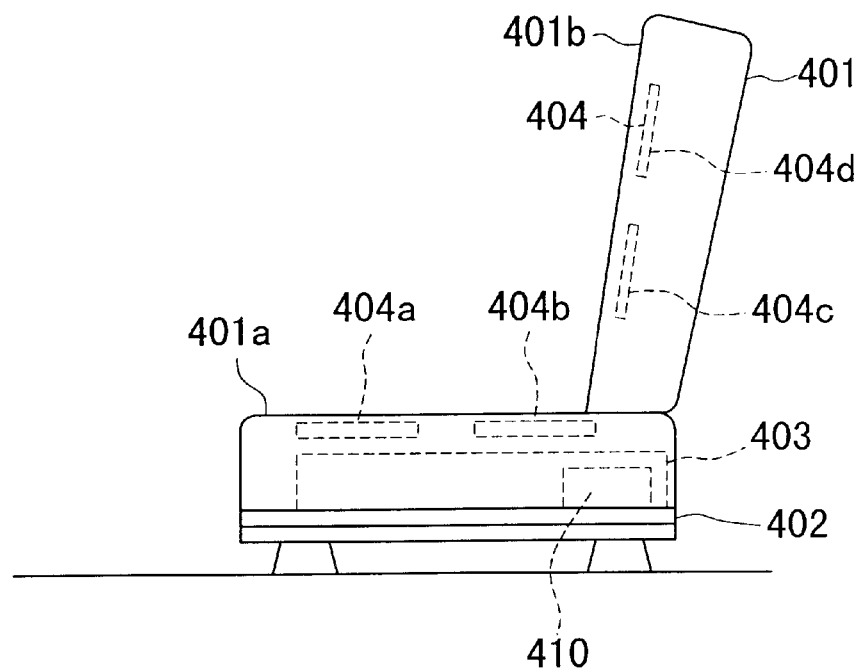
FIGS. 29A, 29B are, respectively, a side view and a front view of the antenna electrodes arrangement.
Figure 29B:
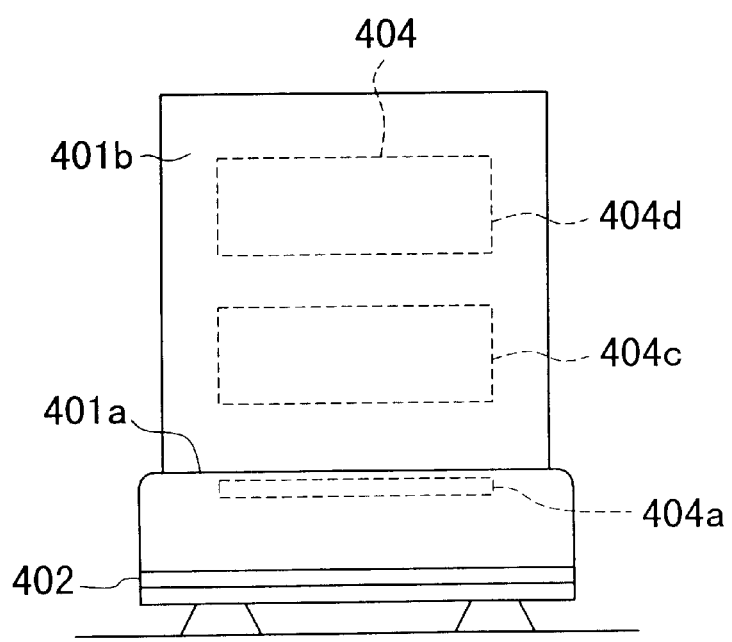

FIG. 28 shows a block diagram of another example of the circuit configuration, which is basically the same as that shown in FIG. 5, but the difference is that the amplitude control circuit 12 is omitted, and the direct measuring type electric current detection circuit (information detection circuit) 15 is replaced with an indirect measuring type information detection circuit 315A for obtaining information regarding electric current flow in the antenna electrodes indirectly. The singular power source Vcc generated in the electric power circuit 324 is a constituting element for the control unit 310, and is supplied to all the elements requiring power source Vcc (electric field generation device 311, information detection circuit 315A, switching circuit 318, control circuit 322, communication interface 326 and others).

The information detection circuit 315A is comprised by: an impedance conversion section 315Aa (operational amplifier of amplification factor 1) connected to the output line from the electric field generation device 311 and an ac-dc conversion section (smoothing device) having a resistor 315Ab connected to the output side of the impedance conversion device 315A and a condenser 315Ac. By inserting the impedance conversion section 315Aa, the impedance in the input side is increased while, in the output side, the impedance is lowered. Therefore, the current level required by the control circuit 322 for accessing data can be obtained without affecting the performance of the forward signals in the output signal line. The impedance conversion section 315Aa may be omitted depending on the detection content and detection precision required by the system.

Also, the electric field generation device 311 is comprised by a resistor 311a and a switching device 311b operated by field-effect type transistors which is turned on/off by a trigger signal from the control circuit 322, and HFLV signals are output from the rain. If Vcc is a 5 volt dc, rectangular waveform having an amplitude of 5 volts is generated.

The operation of the passenger detection system is as follows. First, the electric field generation device 311 is controlled by a trigger signal sent from the control circuit 311 to the switching device 311b, which undergoes on/off actions, and when the switching device is off, HFLV signals having a rectangle shape is output. The output signal is impressed on the antenna electrode section (304a~304d) through the switching circuit 318 and a weak electric field is generated in its vicinity. When a passenger is sitting on the seat 1, a perturbation current, dependent on the strength of the electric field, flows in the antenna electrode section (304a~304d) through the resistor 311a of the electric field generation device 311 and the switching circuit 318. In this case, the leading portion of the rectangular waveform is rounded depending on the RC time constant affected by the passenger portion of the capacitance effect and the resistance 311a. The rounded rectangular output waveform is received in the ac-dc conversion section through the impedance conversion section 315Aa, and is converted to a dc signal and received in the control circuit 322. When the seat 1 is vacant, there is little current flowing from the electric field generation device 311 to the antenna electrode section so that dc output from the information detection circuit 315A becomes higher compared to when the passenger is sitting on seat 1. However, threshold values intermediate between the two levels are stored in the control circuit 322, therefore, by comparing the signal data received in the control circuit 322 with the threshold values, passenger seating condition can be decided. The result obtained by the control circuit 322 is sent to the airbag apparatus 30 through the communication interface 326, and the airbag is made either deployable or not-deployable.

In this embodiment, HFLV signals are output from the electric field generation device 311, and the output line is connected to the ac-dc conversion section through the impedance conversion section 315Aa, therefore, the voltage information (voltage waveform) of the perturbation current flowing in the antenna electrodes 304a~304d can be converted to a dc signal, and the passenger seating conditions can be judged accordingly.

Also, because the input side has a high impedance while the output side has a low impedance by having an impedance conversion section 315Aa between the output line and the ac-dc conversion sections (315Ab, 315Ac), when the control circuit 22 consumes the dc output current from the ac-dc conversion section (smoothing circuit), forward signals in the output line are hardly affected when the current is consumed in the control circuit 22 for evaluating the data. This effect contributes to higher precision in passenger detection.

Also, the electric power circuit 324 as an element in the control unit 310 produces a singular power source Vcc by adjusting the voltage form the battery power BA to singular dc voltage so that all the elements in the control unit 31A requiring the electrical power wilt be served by the same constant voltage Vcc, therefore, the electric circuit can be constructed using a three-terminal regulator to simplify the circuit, and together with simplifying the structure of the antenna electrode section, the system is simplified and the system cost is lowered.

Specially, if one of the antenna electrode section is placed on the dashboard or door or sideport of the seat, when a child sitting in the passenger seat, for example, it is possible to detect a space between the passenger and the dashboard or door so that even if the space between the passenger and the dashboard or door becomes narrower than normal because of the position of the passenger or other factors, the airbag apparatus can be operated properly. Therefore, by using this system with the system shown in FIG. 28, the passenger detection system can be made more finely responsive. This system can be used in conjunction with the example shown in FIG. 5 or by itself.

It should be noted that the present invention is not limited by the examples given above, and for example, the number of antenna electrodes (antenna electrode section) can be adjusted suitably, and the electrode shape can be changed to loop shapes including angular spiral, circular loop, honeycomb shape, and the antenna electrode section can be made by making a laminated material of angular, circular, rectangular shape made of metal plate or electroplating, vapor deposition, or screen printing, and forming a plurality of spaces of angular or round shapes. The electric field generation device can be produced by suitably dividing the clock signals in the control circuit, and output frequency can be selected other than 120 KHz to suit the condition inside the car, and the voltage can be selected to be outside of the 5~12 volt range. Also, the amplitude control circuit, phase shift detection circuit may be omitted if the system requirements do not warrant such devices. Also, the judging result of the control circuit can be applied to control of the seat belt use and warning light, for example. Further, passenger evaluation can be based on pre-stored reference data on seating pattern of the passenger on the seat and sitting posture, and comparing the detected data with the reference data to obtain information on passenger loading and passenger identity.

Embodiment 4

Embodiment 4 of the passenger detection system will be presented with reference to FIGS. 29~32. The passenger detection system in this embodiment is based on detecting the perturbation current related to passenger seating conditions by means of an ac-dc conversion process, and signal interference effects are prevented by applying a dc potential to all non-active antenna electrodes. Those parts of the system that are the same as those shown in FIGS. 96, 97 are given the same reference numerals, and their explanations are omitted. FIGS. 29~32 show various passenger seats, where the seat 401 is primarily comprised by a sitting section 401a and the backrest section 1b. The sitting section 401a is comprised by: a seat frame section 403 fixed to a base 402 that is slidable forward and backward; cushion member disposed above the seat frame 403; and outer covering, and the backrest section 401b is comprised by a cushion member placed on the front of the seat frame; and outer covering for the cushion. Particularly, the sitting section 1a has a plurality of separate antenna electrodes 404 (404a~404b), and the backrest section 1b has a plurality of separate antenna electrodes 404 (404c~404d). The antenna electrode 404 may be placed on the outside or on the cushion member itself. A control unit 410 is disposed on or near the seat frame.

Figure 30A:
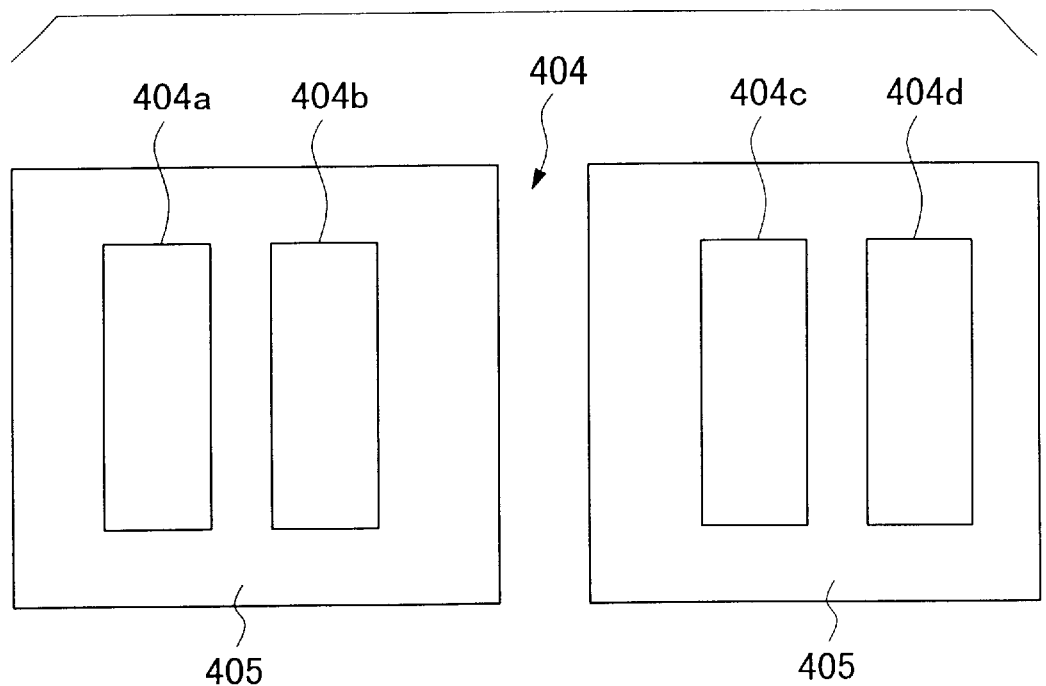
FIGS. 30A, 30B are, respectively, a plan view and a cross sectional view of the specific structure of the antenna electrodes shown in FIG. 29.
Figure 30B:
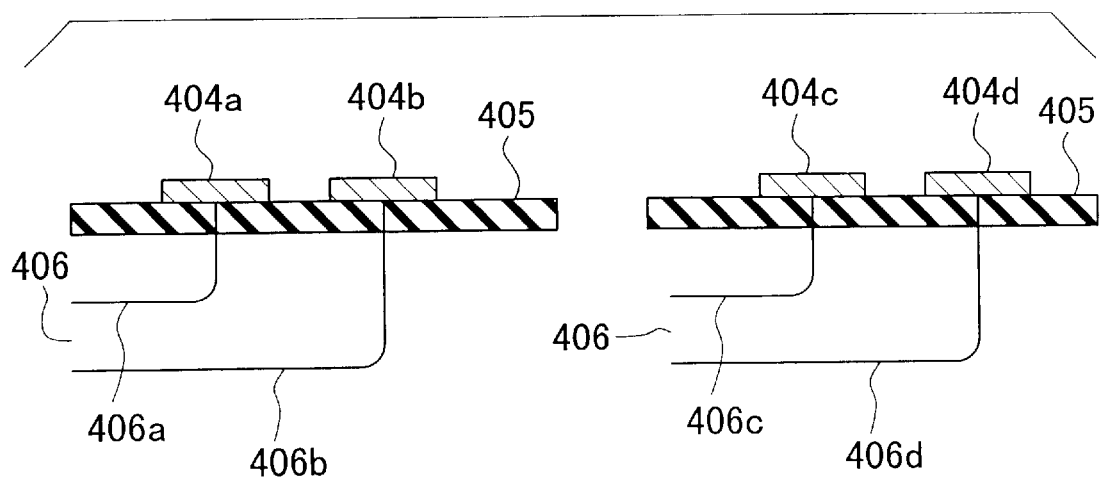

The antenna electrode 404 is made of a conductive cloth, but metallic threads may be woven into the seat fabric on the sitting section 401a and the backrest section 401b, or applying a conductive paint on the cloth, or using metal strips. It is preferable that the antenna electrode 404 be comprised by unitizing a plurality of antenna electrodes 404a~404b, 404c~404d of a uniform size (width 70 mm and length 400 mm, for example) separated at a given distance (50 mm, for example) on one surface of the base members 405 made of an insulating material, as shown in FIG. 30, and on the inside of the sitting section 401a and the backrest section 401b. Lead wires 406 (406a~406d) including shield wires are independently extended from the antenna electrodes 404a~404d, and are connected to the connectors (or terminals) 419a~419d of the control unit 410.

Figure 31:
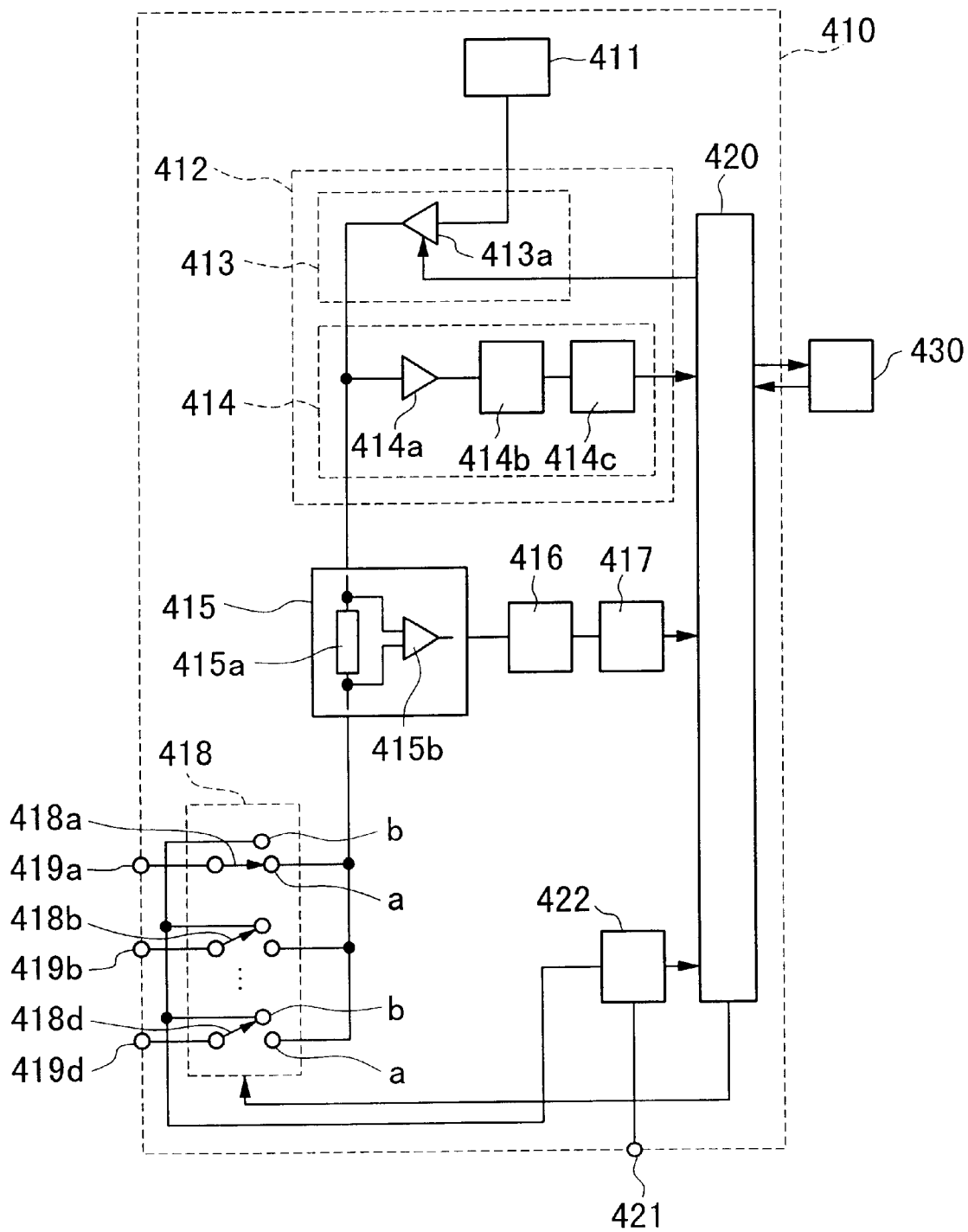
FIG. 31 is a block circuit diagram of the passenger detection system.
Figure 32:
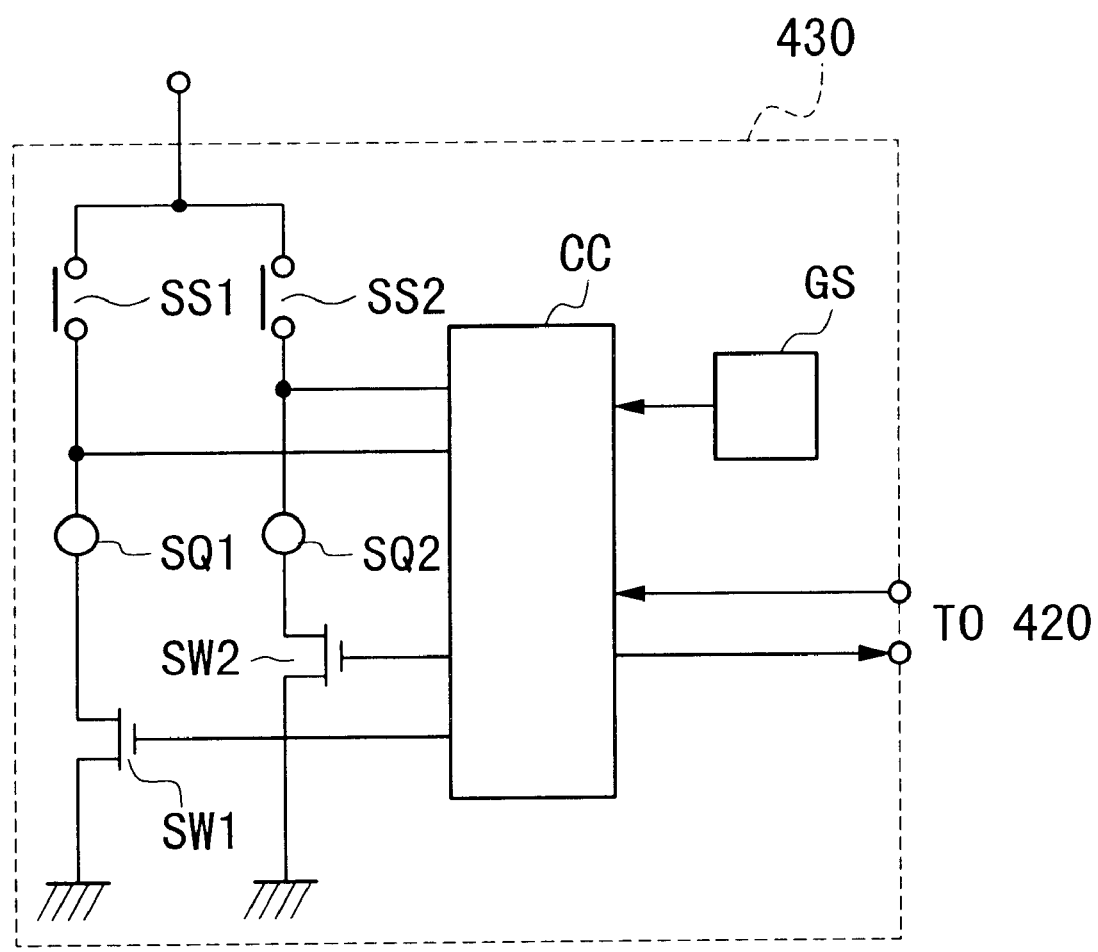
FIG. 32 is a block circuit diagram of the airbag apparatus shown in FIG. 31.

The control unit 410, disposed on the seat frame 403 or its vicinity, is comprised by, as shown in FIG. 31: an electric field generation device (oscillator and the like) 411 for generating a weak electric field around the antenna electrode 404 by HFLV signals of 5~12 volts and a frequency at approximately 100 KHz; an amplitude control circuit 412 for controlling the amplitude of the forward signal from the oscillation circuit 411 approximately constant; a current detection circuit 415 for detecting the forward current signal; an ac-dc conversion circuit 416 for converting the output signal in the current detection circuit 415 to dc; an amplifier 417 for amplifying the output signal from the ac-dc conversion circuit 416; a switching circuit 418 having a plurality of switching devices 418a~418d for the antenna electrodes 418a~418d, connected to the current detection circuit 415; connectors 419a~419d disposed in the housing of the control unit, connected to the switching devices 418a~418d of the switching circuit 418; a control circuit 420 including MPU and the like; connector 421 connected to the battery source (not shown) disposed in the housing; and an electric power circuit 422 connected between the connector 421 and the control circuit 420. In the switching circuit 418, one terminal a in the switching devise 418a~418d is connected to the current detection circuit 415, and the other terminal b is connected to the electric power circuit 422, and the other terminal b are impressed with a dc voltage of about 5 volts from the electric power circuit 422. The control circuit 420 is connected to such an airbag apparatus 430 as shown in FIG. 32. Selective switching of the terminals a, b of the switching devices 418a~418d is performed according to the signal from the control circuit 420.

In the control unit 410, the amplitude control circuit 412 includes an amplitude varying circuit 413 for varying the voltage amplitude of the forward signals, and amplitude detection circuit 414 for detecting the voltage amplitude of the forward signals. The amplitude varying circuit 413 is comprised by an amplitude varying section 413a including a programmable gain amplifier (PGA) and others, and the amplitude detection circuit 414 is comprised by: a voltage amplitude detection section 414a having an op-amp; an ac-dc conversion circuit 414b for converting the output signal from the amplitude detection circuit 414a to dc; and an amplifier 414c for amplifying the output signal from the ac-dc conversion circuit 414b. Output signal from the amplifier 414c is supplied to the control circuit 420, and the amplitude varying signal for the amplitude varying section 413a is generated by the control circuit 420.

In the control unit 410, the current detection circuit 415 includes an impedance element, for example resistor 415a, connected in series to the signal circuit (forward signal side) and an amplifier 415b, such as differential amplifier, for amplifying the terminal voltage of the resistor 415a. The output side of the current detection circuit 415 is connected to the control circuit 420 through the ac-dc conversion circuit 416 and the amplifier 417. The output side of the resistor 415a in the current detection circuit 415 is connected to the connectors 419a~419d through the switching circuit 418 (terminal a, switching devices 418a~418b).

The passenger detection system having the above structure operates in the following manner. First, the oscillation circuit 411 generates HFLV signals whose voltage amplitude is detected by the detection section 414a of the amplitude detection circuit 414, and the detection signal is converted to a dc signal in the ac-dc conversion circuit 414b, and the amplified signal from the amplifier 414c is input in the control circuit 420. The control circuit 420 evaluates whether the detected voltage amplitude meets the required amplitude value, and sends the amplified signal to the amplitude varying section 413a to correct the amplitude to the required value. This process controls the voltage amplitude of the forward signal to a given voltage amplitude, and henceforth, voltage amplitude of the forward signal is corrected to a given amplitude value by the linking action of the amplitude varying circuit 413 and the amplitude detection circuit 414.

The forward signal having a constant voltage amplitude is impressed on antenna electrode 404 through the current detection circuit 415, switching circuit 418, connectors 419a~419d, resulting in the generation of weak electric fields in the vicinity of the antenna electrode 404. In this process, switching circuits 418 are operated by signals from the control circuit 420 so that, first, only the switching device 418a is connected to terminal a, next only the switching device 418b is connected to terminal b, and such a stepwise switching is successively carried out so that when a particular switch contacts the corresponding terminal a, other switches are all contacted with terminal b so that dc voltage is provided. Therefore, when the particular switching device contact the respective terminal a, constant-amplitude forward signal passes through the current detection circuit 415, the particular switching device, the particular connector and reaches the particular antenna electrode (404a–404d), generating an electric field in the vicinity of the particular antenna electrode, so that different value of the perturbation current, governed by the passenger seating conditions (passenger loading, passenger posture on seat 401, passenger identity), flows in the antennae circuit. The current is detected by the current detection circuit 415, converted to dc in the ac-dc conversion circuit 416, amplified in the amplifying circuit 417 and are successively input in the control circuit 420.

In the control circuit 420, threshold values (threshold data) regarding passenger seating conditions (loading, seating posture and identity) are already stored. For example, the current level flowing in the electrodes is higher when a passenger is sitting on the seat, therefore, the reference can be based on whether the perturbation current data exceeds a given constant value. However perturbation currents flowing in various antenna electrodes will have certain characteristic patterns, so that such patterns may be utilized for evaluation. Also, regarding passenger posture and passenger identity, characteristic value of current flows in electrodes depending on the passenger posture and passenger identity, so that the reference can be based on such characteristic values, as well as the current patterns.

Therefore, the detected data received in the control circuit 420 regarding the current values flowing in the antenna electrodes 404a–404d are subjected to various computation processes. For example, detected data are compared against the threshold values in stored data regarding passenger loading and passenger identity to determine whether the passenger is an adult or a child. Based on such result, the airbag apparatus 430 is made, by the command signal from the control circuit 420, to be deployable or not-deployable. Specifically, the airbag apparatus 430 is programmed such that the signal from the control circuit 420 is input in the control circuit CC does not supply a gate signal to the switching element SW2 when the passenger is a child, but supplies a gate signal to the switching element SW2 when the passenger is an adult. Therefore, when an accident occurs, the airbag is not deployed when the passenger is a child while the airbag is deployed when the passenger is an adult. The driver side airbag is deployed regardless of the conditions in the passenger side.

Figure 33:
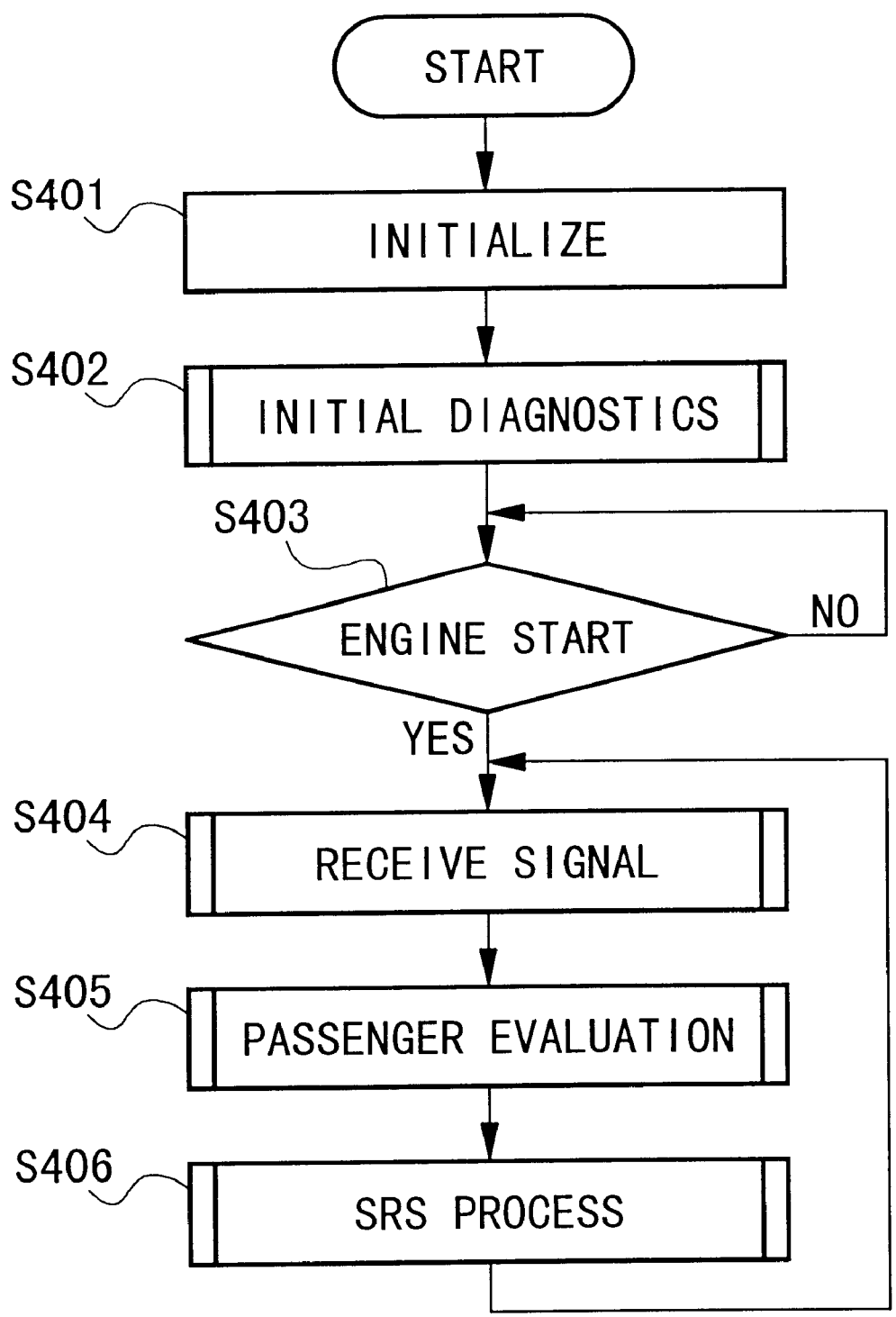
FIG. 33 is a flowchart for the process of detecting a passenger using the passenger detection system.

Next, the process of operation of the passenger detection system will be explained with reference to the overall flowchart shown in FIG. 33. FIGS. 34–37 shows steps in sub-processes. First, as shown in FIG. 33, the ignition circuit is turned on so that the process is in START. In step S401, the program is initialized, and proceeds to step S402. In step S402, initial diagnostics are performed for communication between the control circuit 420 and the airbag apparatus 430. In step S403, it examines whether the engine is operating, and if it is judged that the engine is operating, it proceeds to step S404. If it is judged that the engine is not operating, the program is shutoff. In step S404, signal data related to the perturbation current flowing in a particular antenna electrode, resulting from impressing a weak electric field on the particular antenna electrodes 404a–440d, are received in the control circuit 420. In step S405, based on the received data, passenger loading data, passenger identity data are examined and conclusions reached. In step S406, SRS process is carried out between the control circuit 420 and the airbag apparatus (SRS) 430. When step S406 is completed, it returns to step S404 and repeats the steps S404 to S406. Step S403 may be omitted.

Figure 34:
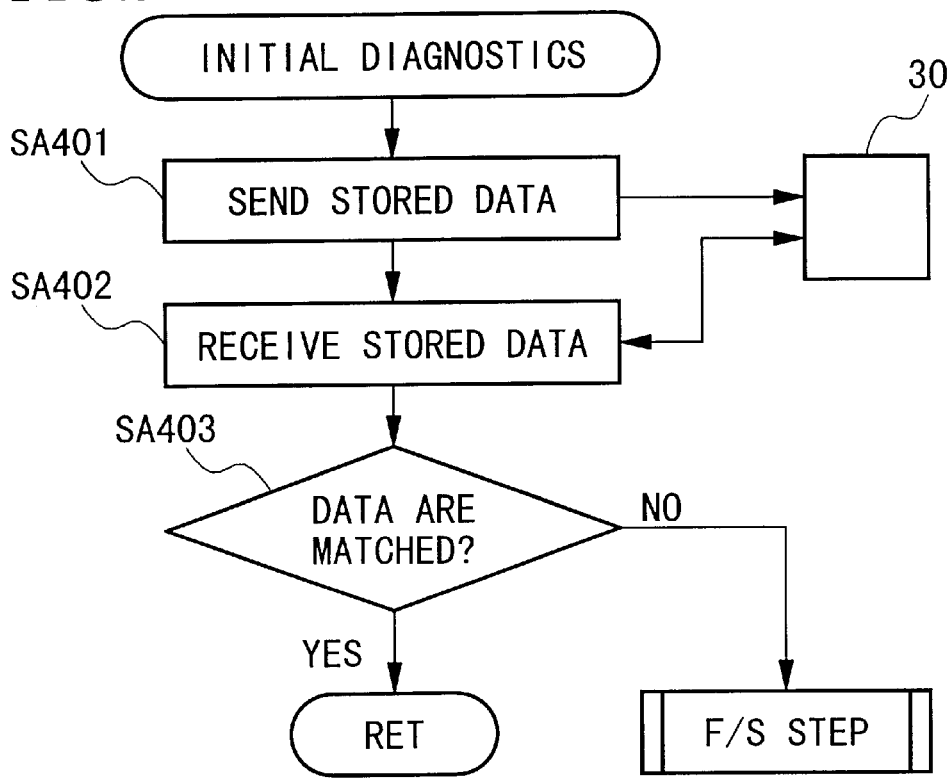
FIG. 34 is a flowchart for the initial process of passenger detection.

Initial diagnostics are carried out as outlined in FIG. 34. First, in step SA401, stored data are sent from the control circuit 420 to the control circuit CC in the airbag circuit 30. In step SA402, passenger data are received from the airbag apparatus 430. In step SA403, it is examined whether the received data from the airbag apparatus 430 match the stored data. If it is judged that the data are matched, the process is continued. If the data do not match, it is judged that problems exist in the corn circuit and fail-safe process is carried out and alert lamp is turned on, for example. The initial diagnostics may be carried out by sending the stored data from the airbag apparatus 30 to the control circuit 420 so that matching process can be carried out in the control circuit CC in the airbag apparatus 430.

Figure 35:
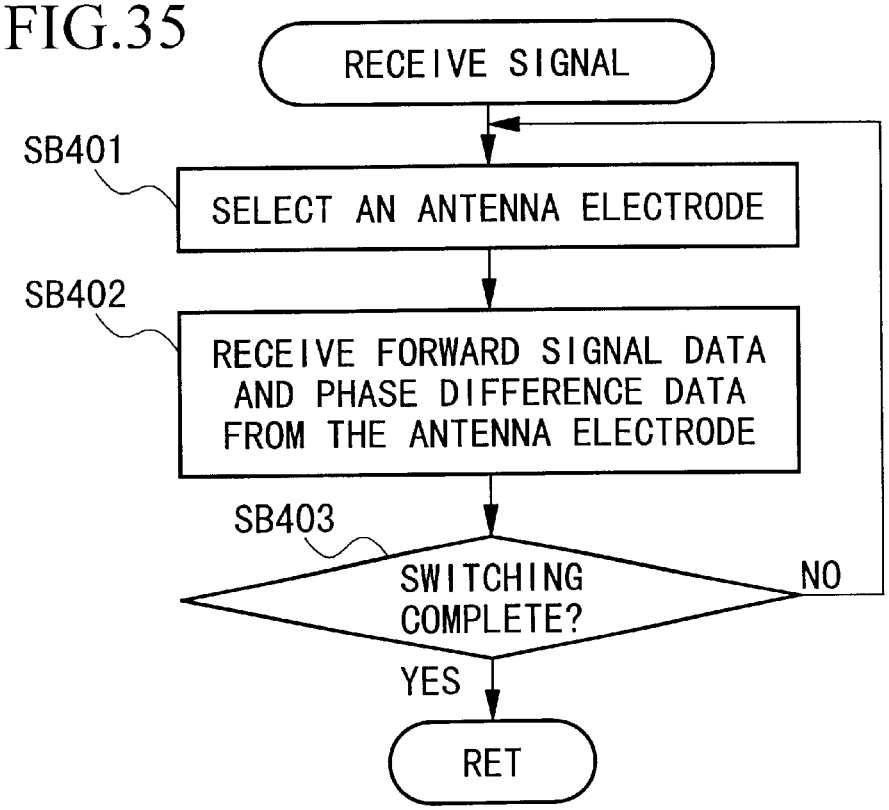
FIG. 35 is a flowchart for the signal receiving process.

Signal reception process is carried out as outlined in FIG. 35. First in step SB401, the control circuit 420 successively selects a particular switching device at a time from the switching devices 418a–418d so that only the switching circuit 418a contacts its terminal a, next, only the switching device 418b contacts its terminal a, and so on to activate respective antenna electrode (404a–404d). During this process, all switching devices other than the particular selected device are connected to the respective terminal b, and are impressed with a dc voltage signal. In step SB402, current data flowing in successive antenna electrodes 418a–418d are received in the control circuit 420, and it proceeds to step SB403. In step SB403, it is examined whether successive selection of antenna electrodes 404a–404d caused by successive actions of switching devices 418a–418d contacting respective terminals a and b has been completed. If it is judged that the switching process has been completed, it proceeds to passenger evaluation process. If it is judged that the switching process is incomplete, it returns to step SB401.

Figure 36:
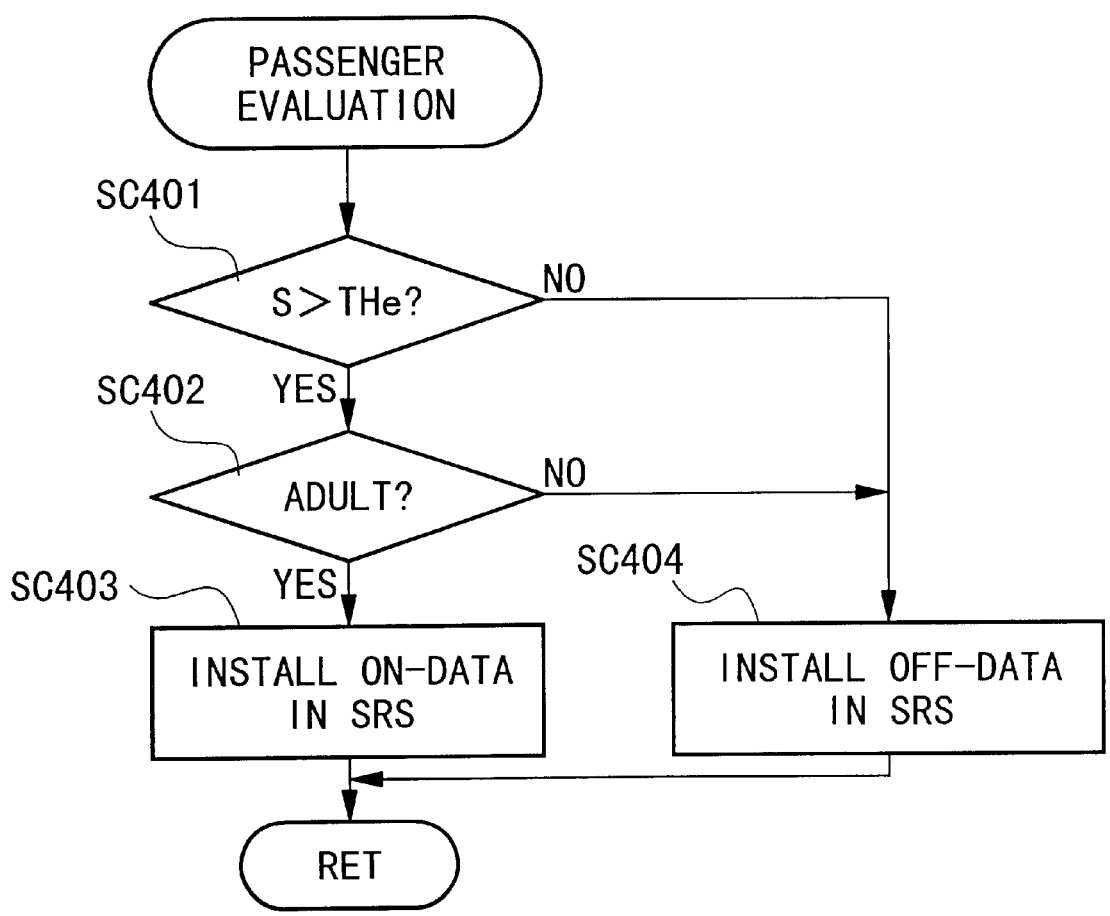
FIG. 36 is a flowchart for the passenger evaluation process.

The passenger evaluation process is carried out as outlined in FIG. 36. First, in step SC401, it is judged whether or not a sum of successive data on the current levels flowing in all the antenna electrodes 404a–404d is larger than the threshold value THe. If the measured signal data are higher than the threshold value THe, it proceeds to step SC402 on the basis that a passenger is sitting on the seat 1, and if it is judged that the signal data are not higher, it proceeds to step SC404. In step SC402, it is judged whether the passenger sitting on the seat is an adult or a child, and if the judgment is an adult, it proceeds to step SC403, and if the judgment is a child, it proceeds to step S404. In step S404, because the passenger is an adult, ON-data for placing the airbag apparatus 430 in the deployable state are entered in the SRS process, and the program connects to SRS process. Also, in step SC404, because the passenger sitting on the seat is a child (or vacant), OFF-data for not deploying the airbag apparatus 430 are entered in the SRS process, and the program is continued. If the seat is vacant, it may be programmed to proceed to step S403.

Figure 37:
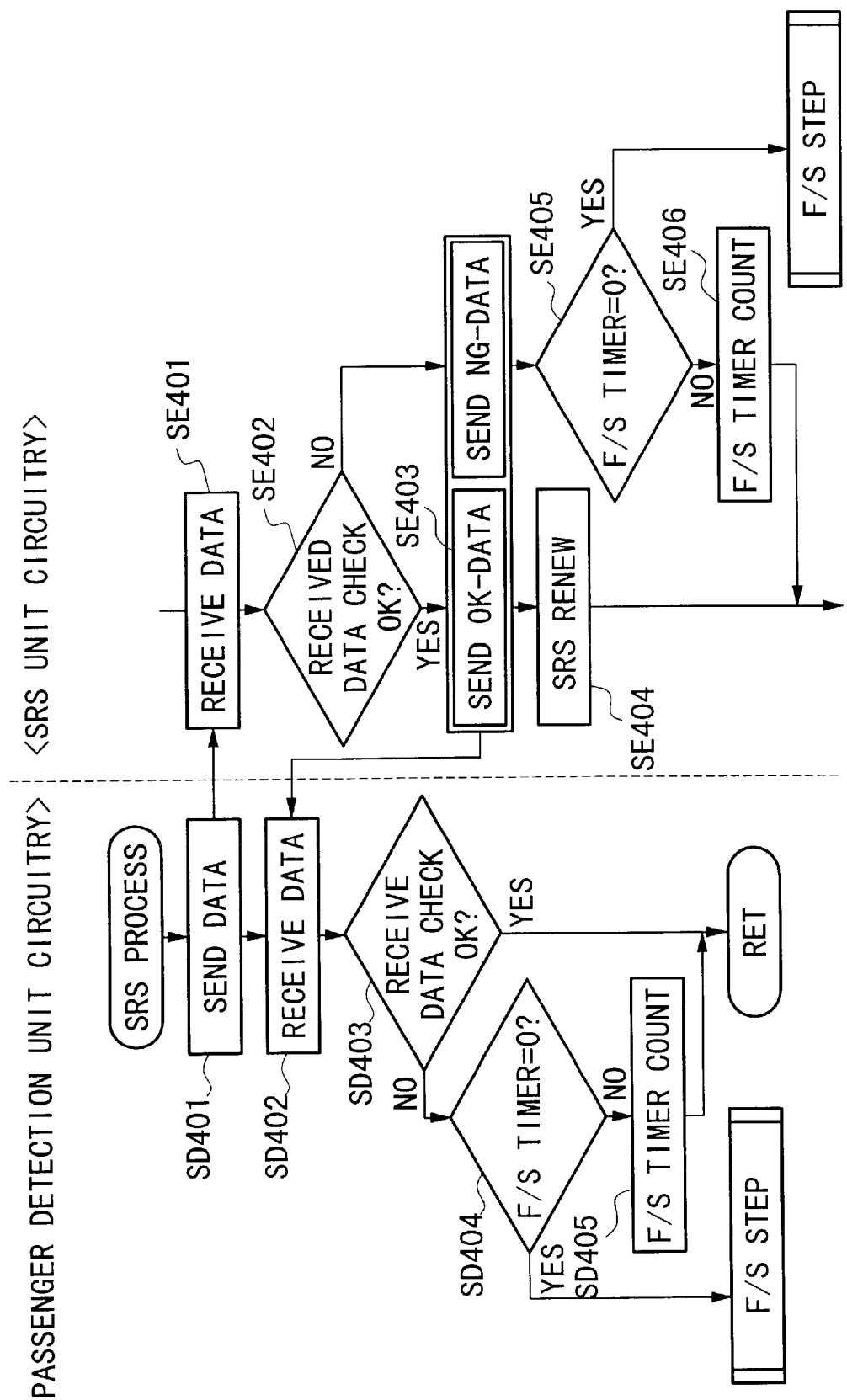
FIG. 37 is a flowchart for SRS process.

The SRS process in FIG. 33 is carried out as outlined in FIG. 37. First, in step SD401, ON-data for placing the airbag apparatus in the deployable state or OFF-data for placing the airbag apparatus in the not-deployable state and system check-data are sent from the passenger detection unit circuitry (control circuit 420) to the airbag apparatus circuitry (control circuit CC). In step SD402, OK-data or NG-data in response to the ON-data and OFF-data and system check-data from the airbag apparatus 430 are received in the control circuit 420, and it proceeds to step SD403. In step SD403, it is judged whether the ON-/OFF-data and system check-data, sent from the passenger detection side to the airbag apparatus circuitry, are again returned from the airbag apparatus circuitry to the passenger detection side in the normal condition. If it is judged to be normal (no problem in signal circuit), the process is continued. If there is a problem in the corn circuit, it proceeds to step SD4, and it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SD405, and fail-safe timer count is performed, and the process is continued.

On the other hand, in step SE401, the airbag apparatus circuitry (control circuit CC) receives ON-data for placing the airbag apparatus in the deployable state or OFF-data for placing the airbag apparatus in the not-deployable state and system check-data from the passenger detection unit circuitry (control circuit 420). In step SE402, the received data are checked to examine whether or not they are normal. In either case, it proceeds to step SE403. In step SE403, OK-data or NG-data and system check-data are sent to the passenger detection unit circuitry. If it is judged, in step SE402, that the signal circuit is normal, OK-data are sent in step SE403, and it proceeds to step SE404. In step SE404, the data on the airbag side is renewed in response to the OK-data, thereby placing the airbag in the deployable state or not-deployable state. If it is judged, in step SE402, that there is a problem in the corn circuit, NG-data are sent to the control circuit 420 in step SE403, and it proceeds to step SE405. In step SE405, it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SE406, and fail-safe timer count is performed, and the process is continued.

According to this embodiment, a plurality of antenna electrodes 4 (4a~4d) are disposed in the sitting section 401a and/or the backrest section 401b separately, and weak electric fields are generated successively around each electrode and the resulting signal data related to the perturbation current flowing in the antenna electrodes are processed to carry out the passenger detection process. However, one antenna electrode at a time is activated and all other antenna electrodes are impressed with a dc voltage so that external signal interference can be avoided because of lesser interference effects. This approach is advantageous because of the stability of the electric field generated, and consequently, the perturbation current measurement is also stable. Therefore, by detecting the values of such perturbation current, it is possible to detect readily whether the seat is vacant or the passenger is an adult or a child, thereby improving the detection precision. Especially, the circuitry allows selection of setting the airbag apparatus 430 to be either in the deployable state or not-deployable state so that unwanted airbag deployment can be prevented.

Especially, the control circuit can be designed so that a dc voltage (applied to all the antenna electrodes not generating an electric field) is generated by the electric power circuit 422, and sharing the same voltage (5 volts for example) with the oscillation circuit 411 and control circuit 420 enables to avoid having a separate power source for the dc voltage to stabilize the electric field generation process at low cost. It is also possible to connect to a ground potential instead of dc voltage (dc potential) to stabilize the electric field generation.

Also, because a plurality of antenna electrodes 404a~404d can be selectively switched to the oscillation circuit 411 and a dc voltage source (422) by the switching action of the switching device 814 by signals from the control circuit 420, contact to terminals a and b of the switching devices 814a~814d can be performed quickly and accurately. Thus, the perturbation current flowing in a particular antenna electrode can be detected precisely by the current detection circuit 415, and signal data regarding the perturbation current are received accurately in the control circuit 420.

Figure 38:
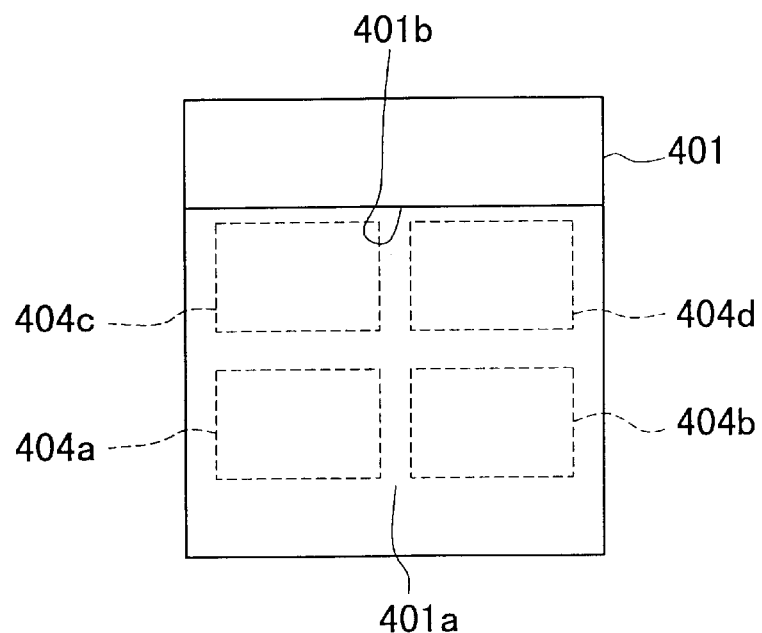
FIG. 38 is a plan view of a seat.

FIG. 38 shows a plan view of another example of the seat 401, having a sitting section 401a with a plurality of antenna electrodes 404a~404d disposed symmetrically on front/rear and left/right sections, but the backrest section 401b is not provided with any antenna electrode. The control unit to provide selective switching of the antenna electrodes, electric fields and dc voltage (or grounding) is basically the same as that shown in FIG. 31.

In this example, because a pattern of perturbation current in the antenna electrodes (404a~404d) produced by the sitting passenger corresponds to a sitting posture of the passenger, it can accurately judge whether or not the sitting posture is normal without much interference from external noise.

Figure 39:
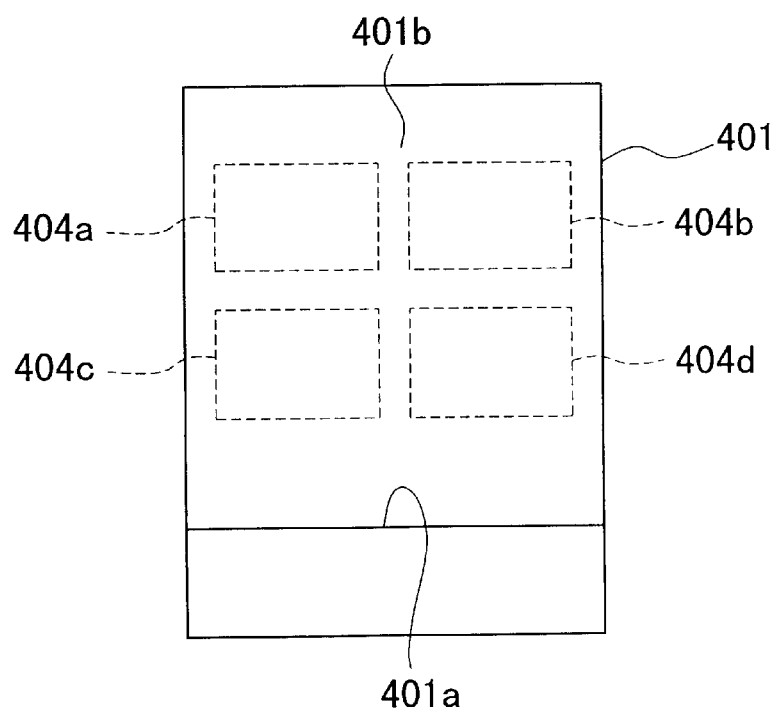
FIG. 39 is a front view of another seat.

FIG. 39 shows a front view of another example of the seat 401, having a backrest section 401b with a plurality of antenna electrodes 404a~404d disposed symmetrically on top/bottom and left/right sections, but the sitting section 401a is not provided with any antenna electrode. The control unit to provide selective switching of the antenna electrodes, electric fields and dc voltage (or grounding) is basically the same as that shown in FIG. 31.

In this example, because a pattern of perturbation current in the antenna electrodes (404a~404d) produced by the sitting passenger corresponds to opposing areas (opposing pattern) of the passenger leaning against the antenna electrodes 404a~404d, it can accurately judge whether or not the sitting posture is normal without much interference from external noise.

It should be noted that the present invention is not limited by the examples given above, and for example, the number of antenna electrodes for the seat can be adjusted suitably. Electric fields can be produced by switching according to pulse signals from the control circuit, so that the use of a positive power source only can produce HFLV signals, at output frequencies of the order of 100 KHz to suit the condition inside the car, and the voltage can be selected to be outside of the 5~12 volt range. Also, the amplitude control circuit may be omitted if the system requirements do not warrant such devices. Also, the judging result of the control circuit can be applied to control of the seat belt use and warning light, for example.

Embodiment 5

Figure 40A:
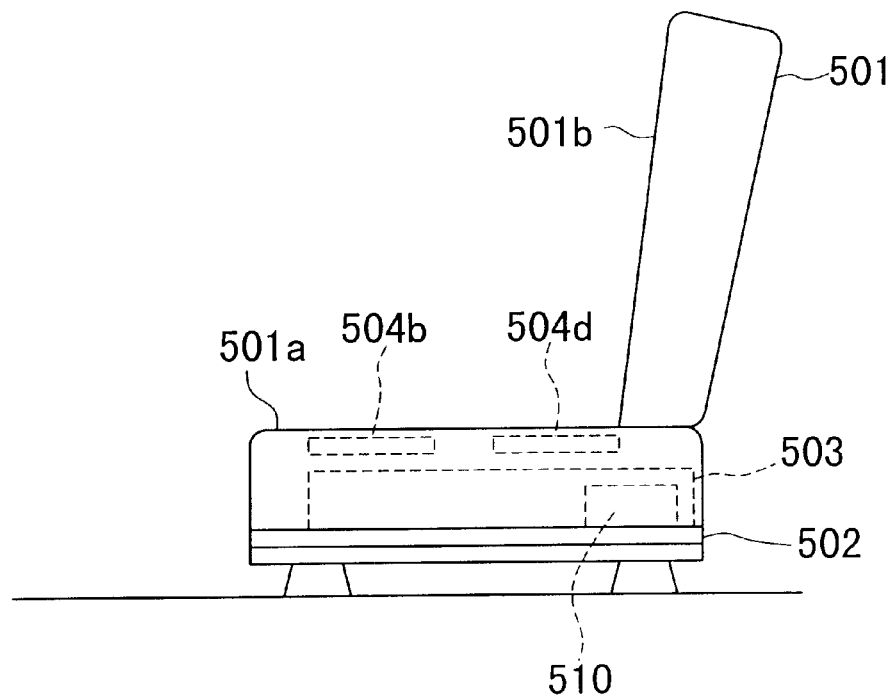
FIGS. 40A, 40B are diagrams of the interior section of the passenger detection system showing, respectively, a side view of the antenna electrodes installed on the seat, and a front view of the seat.
Figure 40B:
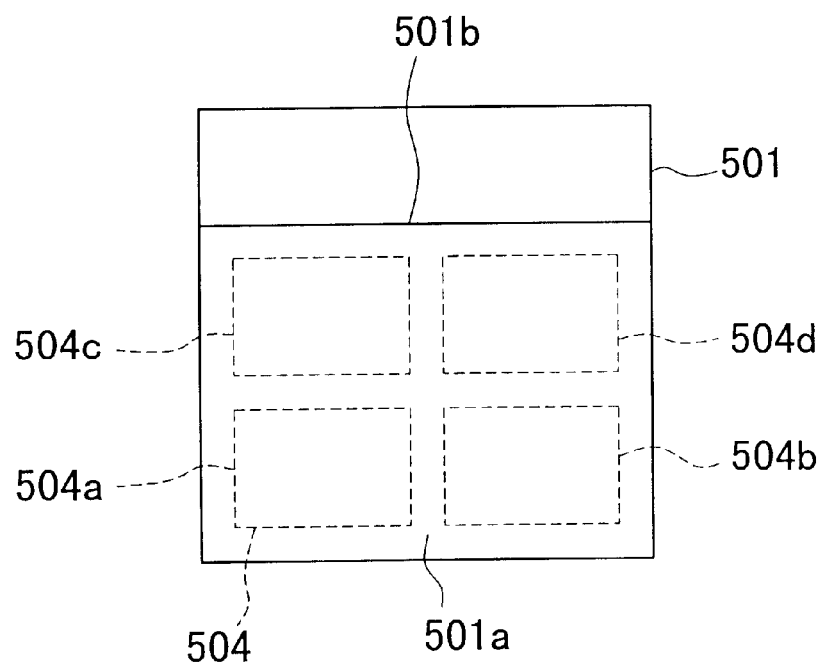
Figure 41A:
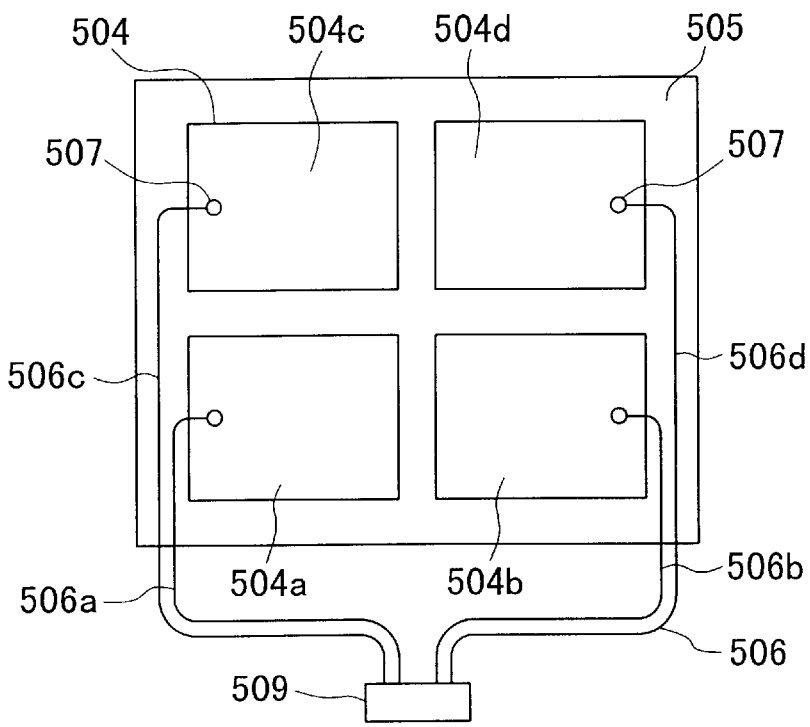
FIGS. 41A–41C are diagrams of specific structures of the antenna electrodes showing, respectively, a plan view, a cross sectional view of key parts, and a plan view of another embodiment.
Figure 41B:
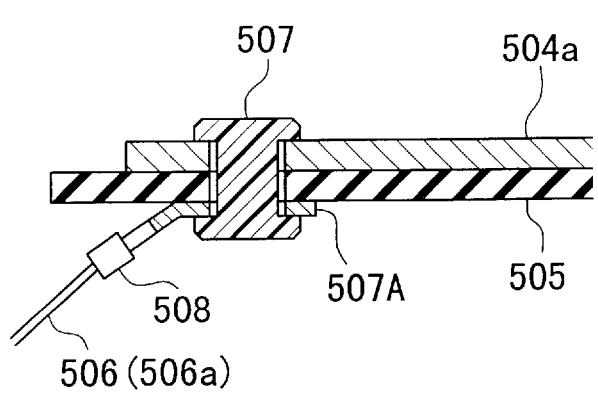
Figure 41C:
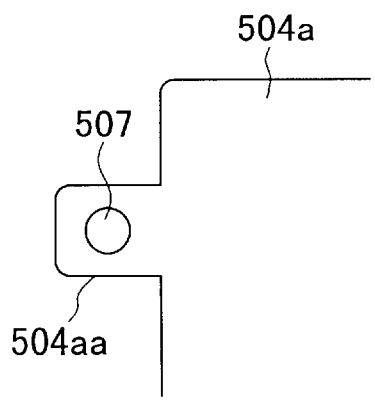
Figure 42:
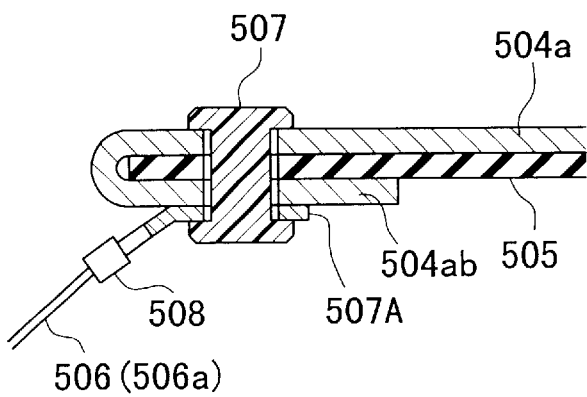
FIG. 42 is a cross sectional view of the essential parts to show the coupling condition between the connection terminal and the antenna electrode shown in FIG. 41B.

Next, the passenger detection system in Embodiment 5 will be presented with reference to FIGS. 40~46. The passenger detection system in this embodiment is based on detecting the perturbation current related to passenger seating conditions by using improved phase shift detection enabled by a waveforming technique. Those parts which are the same as the parts shown in FIGS. 96~97 will be given the same reference numerals and their detailed explanations will be omitted. FIGS. 40~42 show the arrangement of the passenger seat (driver seat) 501 and the antenna electrodes, and seat 501 is comprised primarily of a sitting section 501a and a backrest section 501b. The sitting section 501a is comprised by a seat frame 503 fixed to the base 502 which can be moved forward and backward, and an outer covering for the cushion. Particularly, a plurality of antenna electrodes 504 (504a~504d) of substantially the same shape (for sample, rectangle), separated at some distance, are disposed symmetrically on the sitting section 501a. The antenna electrode section 504 may be disposed on the outside the covering or on the outer covering or cushion material itself. A control unit 510 is assembled into the seat 501, and is disposed on the seat frame 501 or its vicinity.

The antenna electrode section 504 shown in FIG. 41 is basically comprised of a base member 505 made of an insulator such as non-woven fabric, and antenna electrodes 504a~504d placed separately and symmetrically on one surface of the base member 505, and are placed on the inside of the covering for the sitting section 501a. The antenna electrodes 504a~504d are made of an electrically conductive fabric, but they made be made by: weaving fine metallic wire, or a conductive fiber into the base member 505 or into the seat cloth for the sitting section 501a, which may be regarded as the base member; or applying a coating using a conductive paint; or using a thin flexible metallic strip. The antenna electrodes 504a~504d to the base member 505 may be adhesively bonded or bonded using a thermoplastic or thermosetting material, sewing, hooking, button, hooks, or adhesive tape, but adhesive bonding is preferred. The antenna electrodes 504a~504d shown in the drawing are formed into rectangles of substantially the same size. The antenna electrode section 504 contain many antenna electrodes 504a~504d but they are essentially synonymous functionally and are used interchangeably in the following presentation.

The antenna electrode section 504 is constructed as shown in FIGS. 41A, 41B. A lead wire 506 (506a~506d) including shielding wire makes an electrical connection on one end of the antenna electrodes 504a~504d using a connection terminal 507, and a terminal lug 507A, and the lead wire 506 (506a~506d) is attached to a connector 509 at the output end, and is connected to the connectors (or terminals) 519a~519d of the control unit 10. Particularly, the connection terminal 507 clamps antenna electrode with a metallic terminal to provide electrical conduction, and brass rivets, hooks can be used.

In the above antenna electrode section 504, the connection structure between the antenna electrodes 504a~504d and the lead wire 506 (506a~506d) are all essential the same, therefore, explanation will be based on connecting an antenna electrode 504a to a lead wire 506a. The connection terminal 507 is riveted through the antenna electrode 504a and the base member 505. A connection terminal 607 is placed in the a hole provided through the antenna electrode 604a and the base member 605, and a riveting terminal lug 607A is inserted in the connection terminal 607 prior to riveting, and when the assembly is riveted, it makes an electrical connection between the terminal lug 607A and the antenna electrode 604a through the connection terminal 607. The terminal lug 507A is connected so as to make an electrical/mechanical contact with the lead wire 506a using a fastening means such as pressure lug 508.

Figure 43:
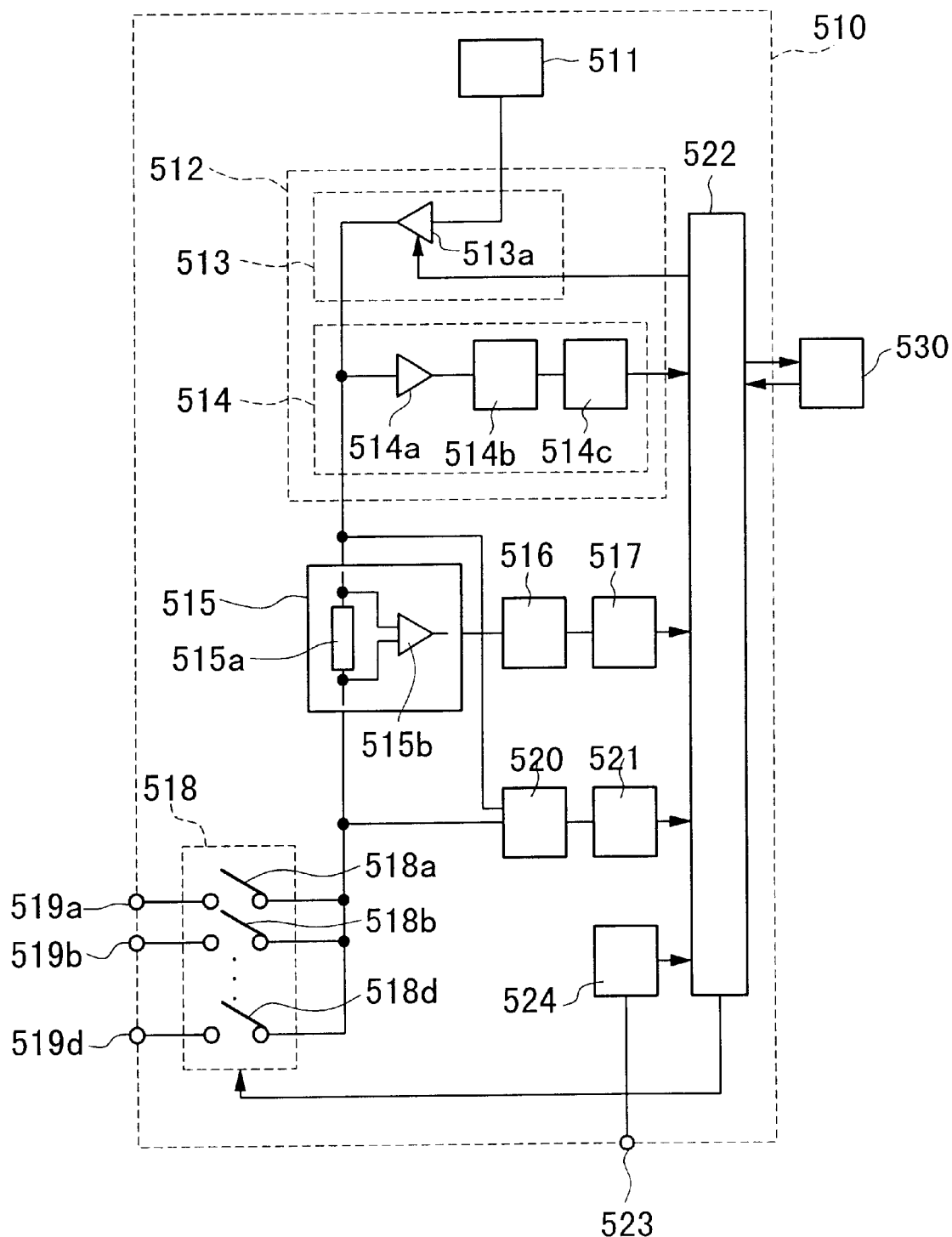
FIG. 43 is a block circuit diagram of the passenger detection system.
Figure 44:
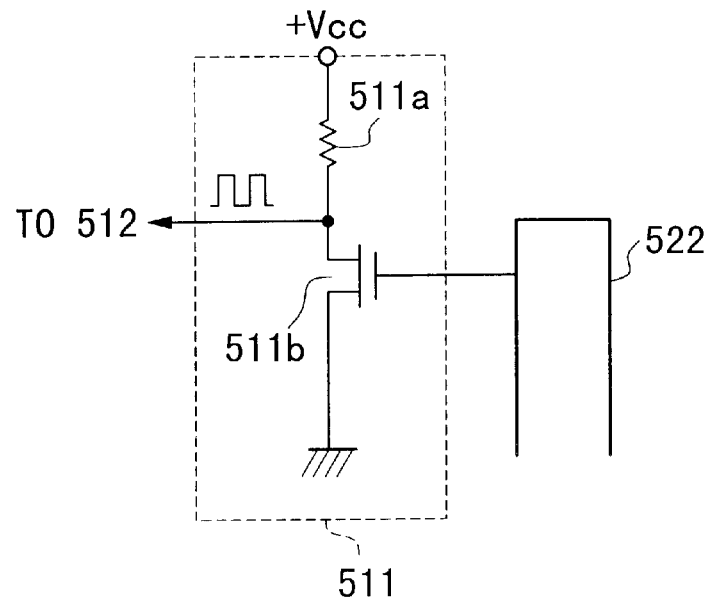
FIG. 44 is a block circuit diagram of a specific example of the oscillation circuit shown in FIG. 43.

The connection between the antenna electrode 504a and the lead wire 506a may be made as shown in FIG. 41C and FIG. 43. In the former case, an extension member 504aa is formed at a portion of the antenna electrode 504a, and the extension member 504aa is connected to the connection terminal 507. The latter case, one edge of the antenna electrode 504a is folded to the back side of the base member 505, and the foldback section 504ab, back side antenna electrode 504a, base member 505 are joined through a common hole by riveting a connection terminal 507. Also, terminal lug 507A is inserted in the connection terminal 507 prior to riveting.

The control unit 510 is assembled into the seat 501, and the control unit 501 is comprised by, as shown in FIG. 43, an electric field generation device (oscillator for example) 511 for generating a weak electric field in the vicinity of the antenna electrodes 504a~504d; an amplitude control circuit 512 for controlling the amplitude of the forward signal from the oscillation circuit 511 to antenna electrode 504 approximately constant; an information detection circuit (current detection circuit for example) 515 for detecting current information on the forward signal; an ac-dc conversion circuit 516 for converting the output signal in the current detection circuit 515 to a dc signal; an amplifier 517 for amplifying the output signal from the ac-dc conversion circuit; a switching circuit 518 connected to the current detection circuit 515 and having a plurality of switching devices 518a~518d for the antenna electrodes 504a~504d; connectors 519a~519d disposed in the housing of the control unit and connecting to the switching devices 518a~518d of the switching circuit 518 during the switching action; a phase shift detection circuit 520 connected to the amplitude control circuitry (oscillation circuit side) and the switching circuitry (antenna electrode side) of the current detection circuit 515, for detecting the phase difference between the forward signal from the oscillation circuit and the application signal to the antenna electrodes; an amplifier 521 for amplifying the output signal of the phase shift detection circuit 520; a control circuit 522 including CPU and the like; a connector 523 connected to the battery source (not shown) disposed in the housing; and an electric power circuit 524 connected between the connector 523 and the control circuit 522 and others. These components are contained in the same housing for the control unit 510, which is fixed to the seat frame 503 so as not to be exposed. An the airbag apparatus 530, shown in FIG. 46 for example, is connected to the control circuit 522 in the control unit 510. Selective switching of the switching devices 518a~518d is carried out according to the output signals from the control circuit 522.

In this control unit 510, the oscillation circuit 511 is comprised by a series connected resistor 511a and switching device 511b in a dc line of a constant dc voltage (+Vcc) operated by switching device (field-effect type transistors) 511b which is turned on/off by a trigger signal from the control circuit 522, and HFLV signals of a rectangular waveform are output from the drain to the amplitude control circuit 512. The HFLV signals are affected by the trigger signal generated by the control circuit 522, and is designed to output at substantially 120 KHz. The high frequency signal to the amplitude control circuit 512 is output when the field effect transistor 511 is off.

The amplitude control circuit 52 in the control unit 510 includes an amplitude varying circuit 513 for varying the voltage amplitude of the forward signals, and amplitude detection circuit 514 for detecting the voltage amplitude of the forward signals. The amplitude varying circuit 513 is comprised by an amplitude varying section 513a including a programmable gain amplifier (PGA) and others, and the amplitude detection circuit 514 is comprised by: a voltage amplitude detection section 514a having an op-amp; an ac-dc conversion circuit 514b for converting the output signal from the amplitude detection circuit 514a to dc; and an amplifier for amplifying the output signal from the ac-dc conversion circuit 514b. Output signal from the amplifier 514c is supplied to the control circuit 522, and the amplitude varying signal for the amplitude varying section 513a is output from the control circuit 522.

The current detection circuit 515 in the control unit 510 includes an impedance element, for example resistor 515a, connected in series to the signal circuit (forward signal side) and an amplifier 515b, such as differential amplifier, for amplifying the terminal voltage of the resistor 515a. The output side of the current detection circuit 515 is connected to the control circuit 522 through the ac-dc conversion circuit 516 and the amplifier 517. The output side of the resistor 515a in the current detection circuit 15 is connected to the connectors 519a~519d through the switching circuit 518.

Figure 45:
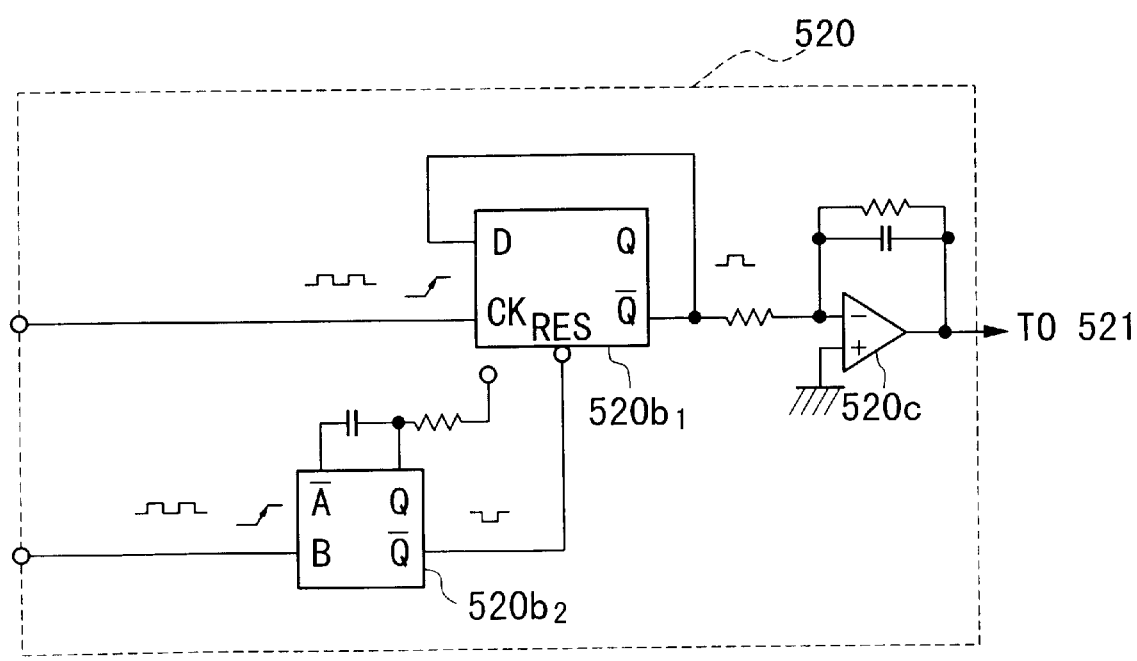
FIG. 45 is a block circuit diagram of a specific example of the phase shift detection circuit shown in FIG. 43.
Figure 46:
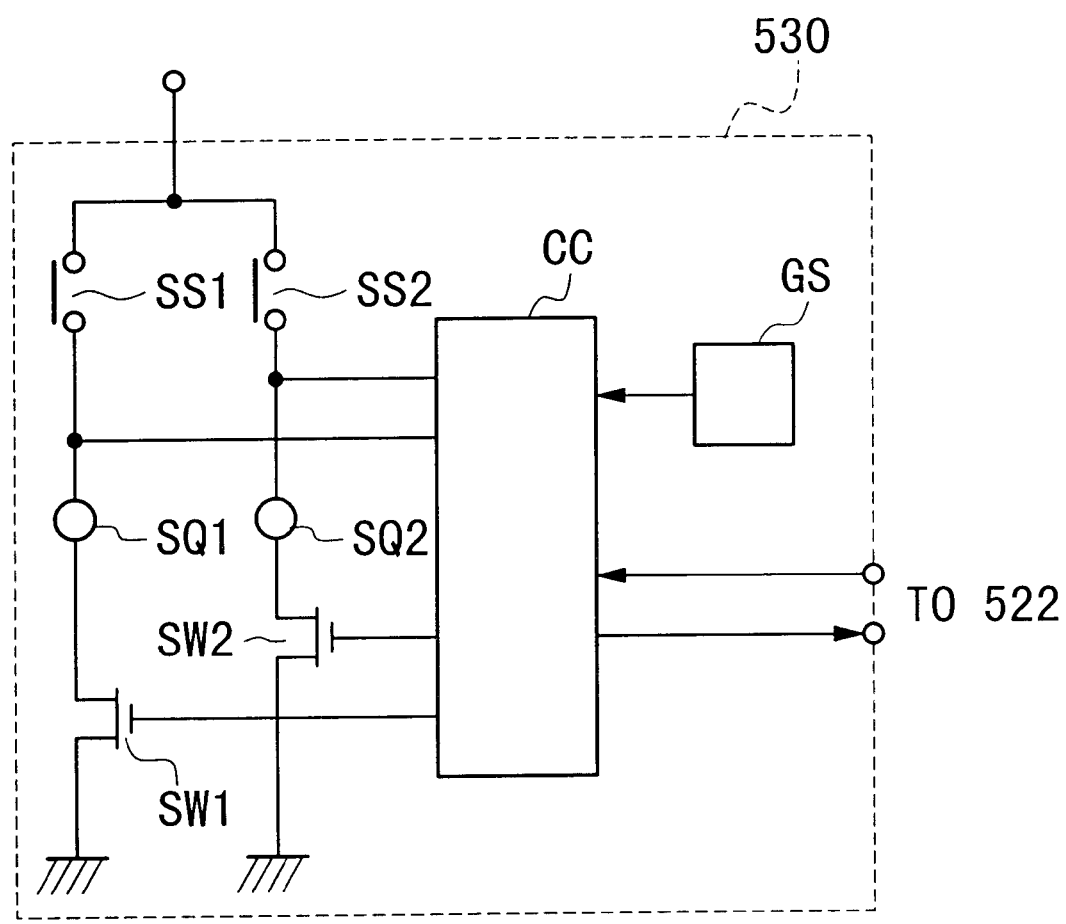
FIG. 46 is a block circuit diagram of the airbag apparatus shown in FIG. 43.

Further, the phase shift detection circuit 520, for example as shown in FIG. 45, is comprised by: a first flipflop (shortened to ff) circuit 5204a1; a second ff circuit 520a2; and an integration circuit 520b for separately inputting the forward signal from the oscillation circuit 511 and the application signal to the antenna electrodes 504 (504a~504d).

The passenger detection system having the above structure operates in the following manner. First, the oscillation circuit 511 generates HFLV signals whose voltage amplitude is detected by the detection section 514a of the amplitude detection circuit 514, and the detection signal is converted to a dc signal in the ac-dc conversion circuit 514b, and the amplified signal from the amplifier 514c is input in the control circuit 522. The control circuit 522 judges whether the detected voltage amplitude meets the required amplitude value, and sends the amplified signal to the amplitude varying section 513a to correct the amplitude to the required value. This process controls the voltage amplitude of the forward signal to a given voltage amplitude, and henceforth, voltage amplitude of the forward signal is corrected to a given amplitude value by the coordinating action of the amplitude varying circuit 513 and the amplitude detection circuit 514.

The forward signal having a constant voltage amplitude is impressed on antenna electrodes 504 (504a~504d) through the current detection circuit 515, switching circuit 518 (518a~518d), connectors 519a~519d, resulting in the generation of weak electric fields in the vicinity of the antenna electrodes 504 (504a~504d). In this process, switching circuits 518 are operated by signals from the control circuit 522 so that, first, only the switching device 518a is closed, next only the switching device 518b is closed, next only the switching circuit 518c is closed, and such a stepwise successive switching is carried out so that when a particular switch is being closed, other switches are all opened. Therefore, when a particular switching device 518 (518a~518d) is closed, constant-amplitude forward signal passes through a particular switching device (518a~518d), a particular connector 519 (519a~519d) and reaches a particular antenna electrode 504 (504a~504d), generating an electric field in the vicinity of a particular antenna electrode 504 (504a~504d), so that different values of the perturbation current, governed by the seating condition of the passenger, flow in the antennae circuits. The perturbation current is detected by the current detection circuit 515, converted to dc in the ac-dc conversion circuit 516, amplified in the amplifying circuit 517 and is successively input in the control circuit 522. The sequence of switching may be in a reverse direction, such that 518d, 518c . . . to 518a.

The signal (voltage) at both ends of the current detection circuit 15, that is, forward signal from the oscillation circuit 511 in the oscillation control circuitry and the rectangular application signal to the antenna electrodes 504 (504a~504d) in the switching circuitry (antenna electrode side) are input in the first and second ff circuits 20a1, 20a2 of the phase shift detection circuit 520, and, as shown in FIG. B, the leading edge (arrow) of the rectangle wave output from the forwarding side is detected at the terminal CK of the first ff circuit 20a1, and the terminal bar Q outputs a "high". In the meantime, in the receiving side also, as shown in FIG. B, the leading edge (arrow) of the rectangle wave is detected at the terminal B of the second ff circuit 20a2, and the terminal bar Q puts out a one-shot low signal momentarily. When this output signal is input in the terminal RES of the first ff circuit 29a1, the output signal of the terminal bar Q of the first ff circuit 20a1 is inverted to a low, as shown in FIG. C. This output represents the amount of phase shift (phase differential), and is converted to a voltage value by being integrated in the integration circuit 520b, and is input in the control circuit 522 through the amplifier 521. The phase shift detection is carried out successively to correspond with the detection of forward current to each antenna electrode by the current detection circuit 515.

Figure 48A:
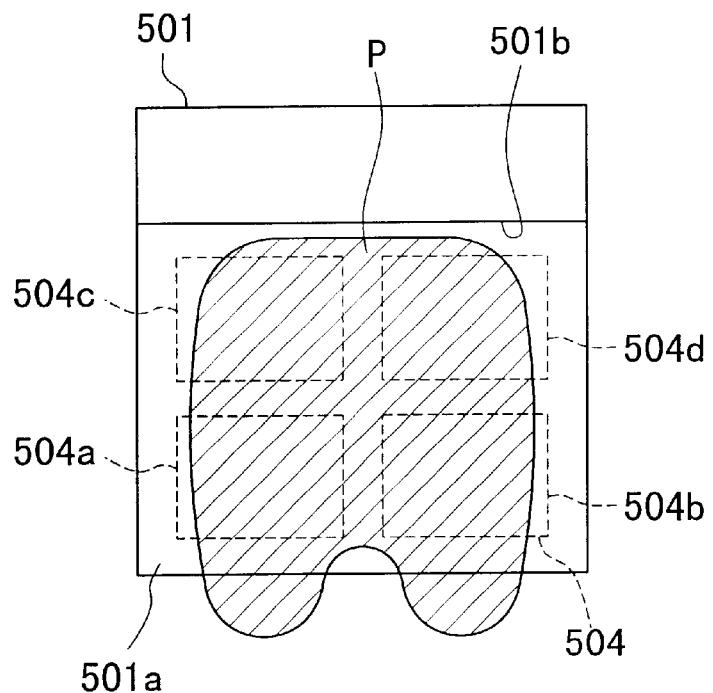
FIGS. 48A, 48B are diagrams to show, respectively, an adult seating condition and a child seating condition.
Figure 48B:
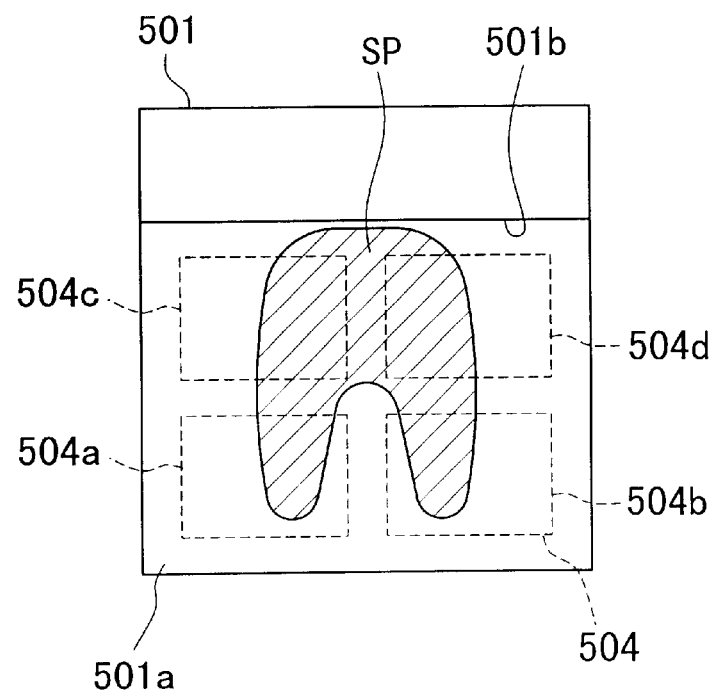

In the control circuit 522, reference data are already stored such as threshold values (threshold data) regarding the passenger seating conditions (passenger loading, and identify adult/child), threshold values regarding the phase difference between the forward signal to the current detection circuit 515 and the application signal to the antenna electrodes (threshold data). Specifically, passenger loading data are selected as follows. For example, as shown in FIGS. 48A, 48B, when an adult passenger P or a child passenger SP is seated on the seat 501, the areas opposing the individual antenna electrodes are different, and as a result, the levels of the current flowing in the antenna electrodes are different, such that when an adult passenger P is seated, the current level is higher than that when a child passenger SP is seated. Therefore, a threshold value, which is somewhat lower than the current level for a child passenger SP, is selected as the threshold value for passenger loading. Thus, when detected data is higher than the threshold value, it is assumed that a passenger is seated, and when it is lower than the threshold value, it is assumed that no one is seated. It is preferable that the threshold value be selected according to a sum of all the current flowing in each antenna electrode, but it is possible to select a threshold value for each antenna electrode.

The identity of a passenger is determined as follows. As shown in FIGS. 48A, 48B, when an adult passenger P or a child passenger SP is seated, the levels of the current flowing in individual antenna electrodes are different depending on the contact area as explained above. Therefore, the threshold value for the identity of the passenger (whether the passenger is an adult or a child) is selected as a current level midway between the adult and child threshold values. Thus, when detected data is higher than the threshold value, it is assumed that a passenger is seated, and when it is lower than the threshold value, it is assumed that a child SP is seated. It is preferable that the threshold value be selected according to a sum of all the current flowing in each antenna electrode, but it is possible to select a threshold value for each antenna electrode.

With respect to selecting a threshold value for the phase difference, a suitable value may be chosen between an average value of the phase difference detected by the phase shift detection circuit 520 when a person is present on the seat 501, and an average value of the phase difference, caused by factors other than a human body. The characteristics of the seat (wetness, for example) can affect the measurements, therefore, upper and lower limits of threshold values are chosen, so that when the phase difference data are inside the range, it is assumed that a person is seated. Therefore, pre-stored data (regarding the passenger seating conditions and the phase difference) and the detected data (regarding the current levels and the phase difference) are compared in the control circuit 22 to determine whether a seated passenger is an adult or a child, and what the characteristics of the seat are.

Thus, signal data received by the control circuit 522 are compared against the threshold data stored in the control circuit 522, so that when the current levels in all the antenna electrodes 504a~504d are high, it is assumed that seat 501 has a passenger and that the passenger is an adult P, as illustrated in FIG. 48A. In such a case, the control circuit 522 places the airbag apparatus 530 shown in FIG. 46 in the deployable state. Conversely, when the current levels in all the antenna electrodes 504a~504d are low and are lower than the passenger loading threshold value, it is assumed that seat 501 has a passenger and that the person seated in a child SP, as illustrated in FIG. 48B. In such a case, the control circuit 522 places the airbag apparatus 530 shown in FIG. 46 in the not-deployable state. Specifically, when the airbag is not to be activated, the control circuit 22 instructs the control circuit CC in the airbag apparatus 30 so that a gate signal is not supplied to the switching element SW2 of the passenger side when a collision takes place. The driver-side switching element SW1 is supplied with a gate signal. When an adult and a child are seated, the switching elements SW1, SW2 are both placed in the deployable state.

Figure 49:
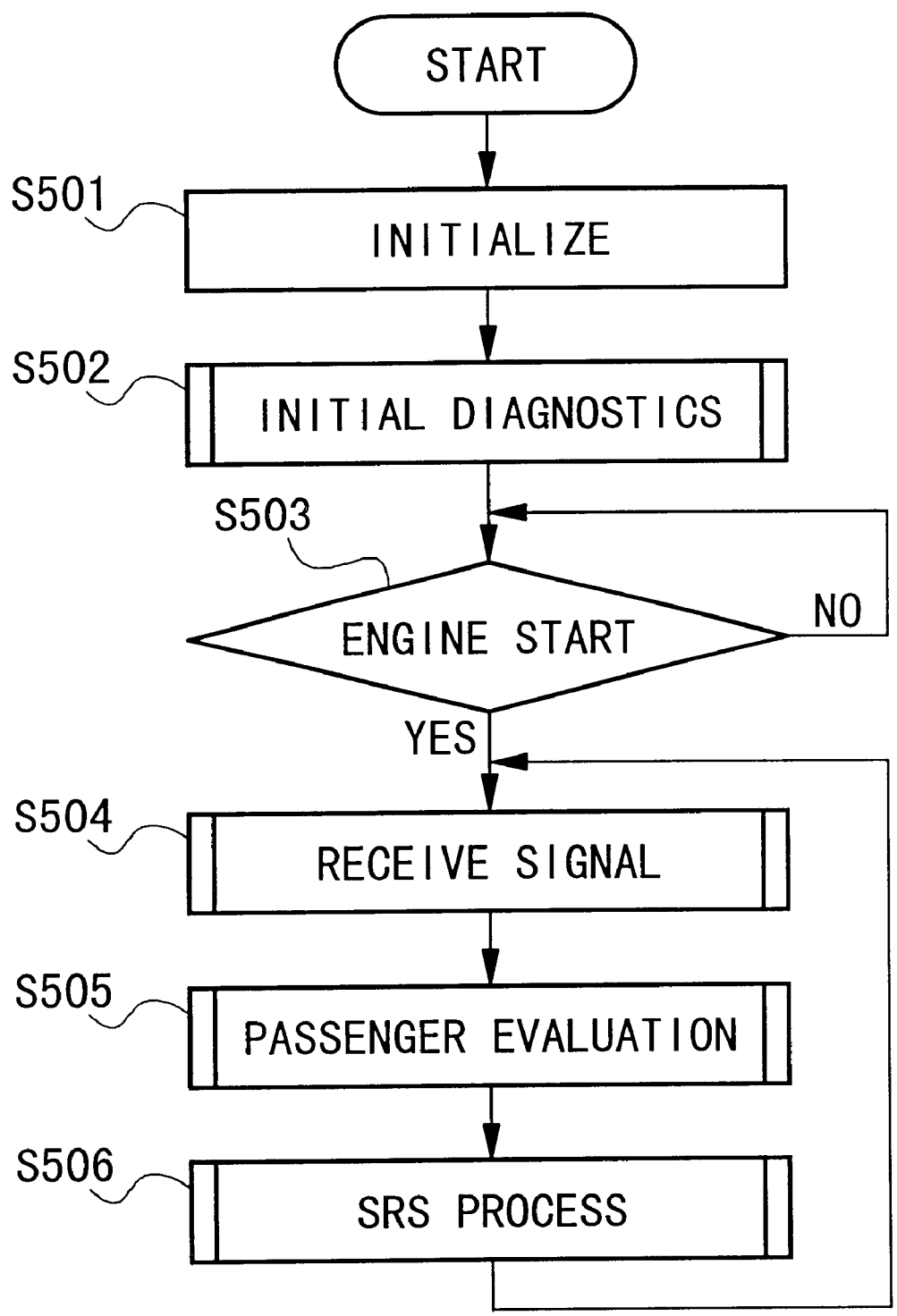
FIG. 49 is a flowchart for the process of detecting a passenger using the passenger detection system.

Next, the process of operation of the passenger detection system will be explained with reference to the overall flowchart shown in FIG. 49. FIGS. 50~53 show steps in sub-processes. First, as shown in FIG. 49, the ignition circuit is turned on so that the process is in START. In step S501, the program is initialized, and proceeds to step S502. In step S502, initial diagnostics are performed for communication between the control circuit 522 and the airbag apparatus 530. In step S503, it examines whether the engine is operating, and if it is judged that the engine is operating, it proceeds to step S504. If it is judged that the engine is not operating, the program is shutoff. In step S504, signal data related to the perturbation current flowing in a particular antenna electrode and phase shift data related to passenger seating conditions, resulting from the application of a weak electric field on the particular antenna electrode of the antenna electrodes 504a~504d, are received in the control circuit 522. In step S505, based on the received data, passenger loading data, passenger identity data are examined and conclusions reached. In step S506, SRS process is carried out between the control circuit 522 and the airbag apparatus (SRS) 530. When step S506 is completed, it returns to step S504 and repeats the steps S504 to S506. Step S503 may be omitted.

Figure 50:
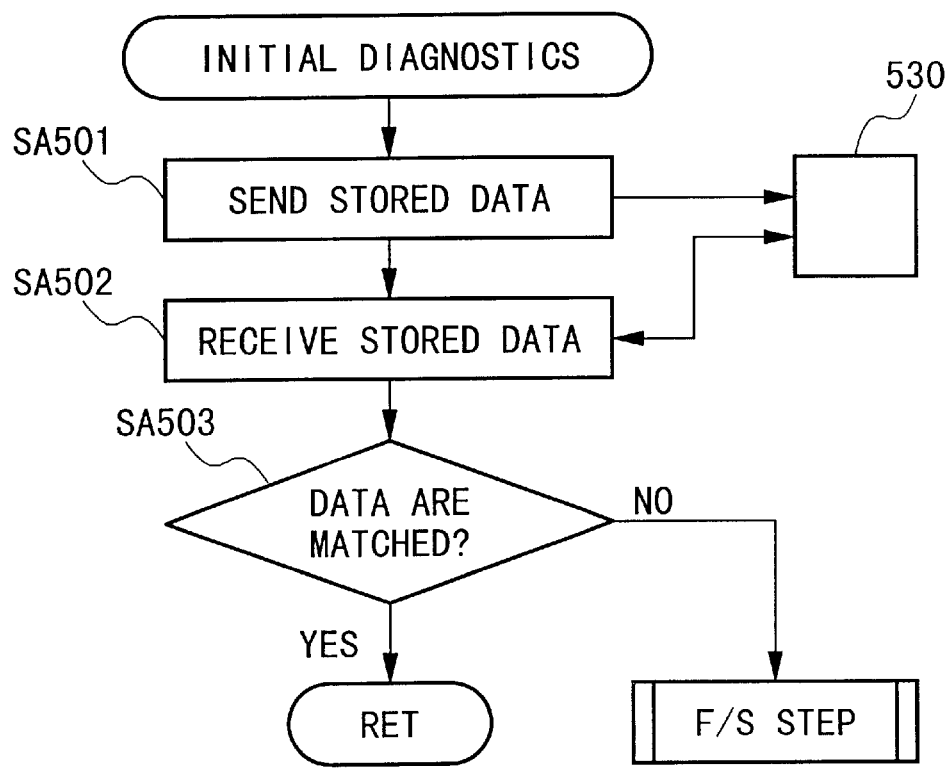
FIG. 50 is a flowchart for the initial process of passenger detection shown in FIG. 49.

Initial diagnostics are carried out as outlined in FIG. 50. First, in step SA501, stored data are sent from the control circuit 522 to the control circuit CC in the airbag circuit 30. In step SA502, passenger data are received from the airbag apparatus 530. In step SA503, it is examined whether the received data from the airbag apparatus 530 match the stored data. If it is judged that the data are matched. the process is continued. If the data do not match, it is judged that problems exist in the corn circuit and fail-safe process is carried out and alert lamp is turned on, for example. The initial diagnostics may be carried out by sending the stored data from the airbag apparatus 530 to the control circuit 522 so that matching process can be carried out in the control circuit CC in the airbag apparatus 530.

Figure 51:
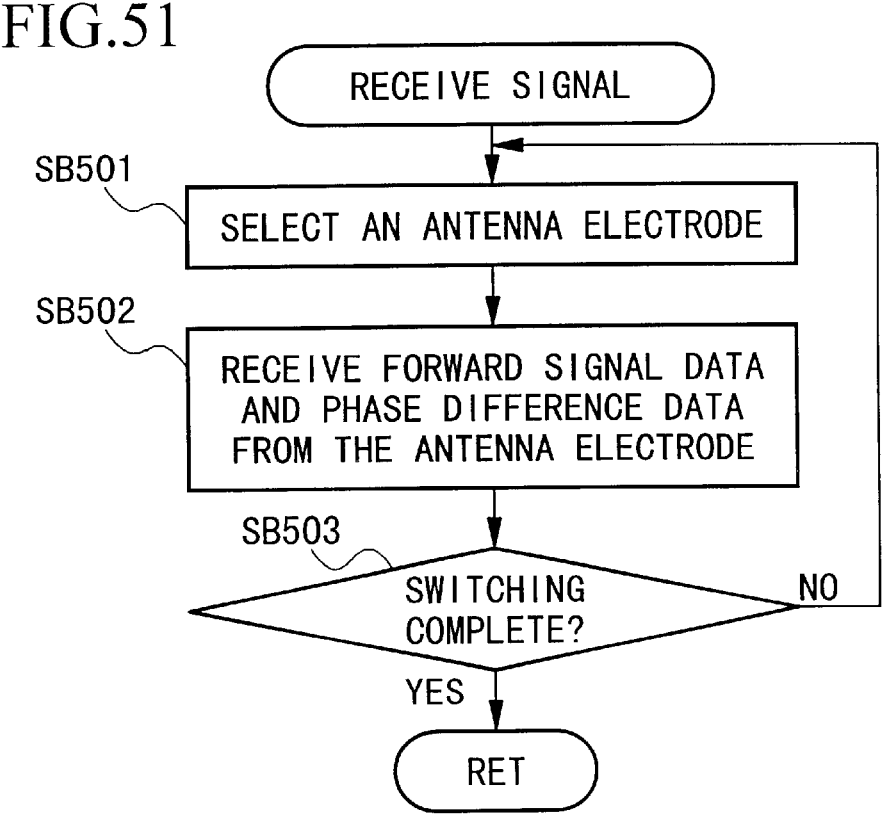
FIG. 51 is a flowchart for the signal receiving process shown in FIG. 49.

Signal reception process is carried out as outlined in FIG. 51. First in step SB501, the control circuit 522 successively selects one switching device at a time from the switching devices 518a~518d so that only the switching circuit 18a and so on is closed, for example, to select an antenna electrode 504a. In step SB502, the current data from the respective antenna electrode and phase difference are received in the control circuit 522. In step SB503, it is examined whether successive selection of antenna electrodes 504a~504d by the successive actions of the switching devices 518a~518d has been completed. If it is judged that the switching process has been completed, it proceeds to passenger evaluation process. If it is judged that the switching process is incomplete, it returns to step SB501.

Figure 52:
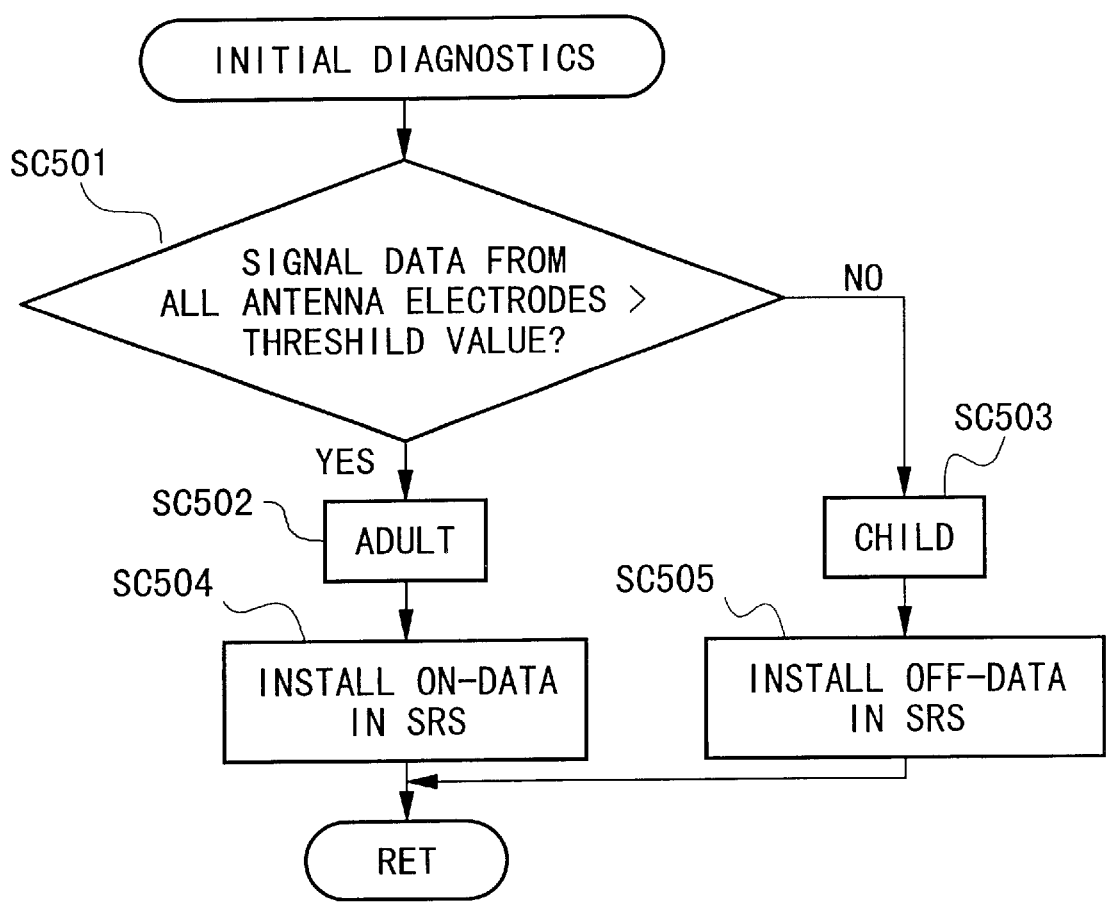
FIG. 52 is a flowchart for the passenger evaluation process shown in FIG. 49.

The passenger evaluation process is carried out as outlined in FIG. 52. First, in step SC501, signal data related to the current levels flowing in all the antenna electrodes 504a~504d and threshold values related to the passenger seating conditions are compared to decide whether the measured signal data are higher than the threshold values. If the measured signal data are higher than the threshold values, it proceeds to step SC502, and if it is judged that the signal data are not higher, it proceeds to step SC503. In step SC502, if it is judged that the passenger sitting on the seat is an adult, it proceeds to step SC504, so that ON-data for placing the airbag apparatus 530 in the deployable state are entered in the SRS process, and the program connects to SRS process. Also, in step SC3, if the passenger sitting on the seat is a child, it proceeds to step SC505, and OFF-data for not deploying the airbag apparatus 530 are entered in the SRS process, and the program is continued.

Figure 53:
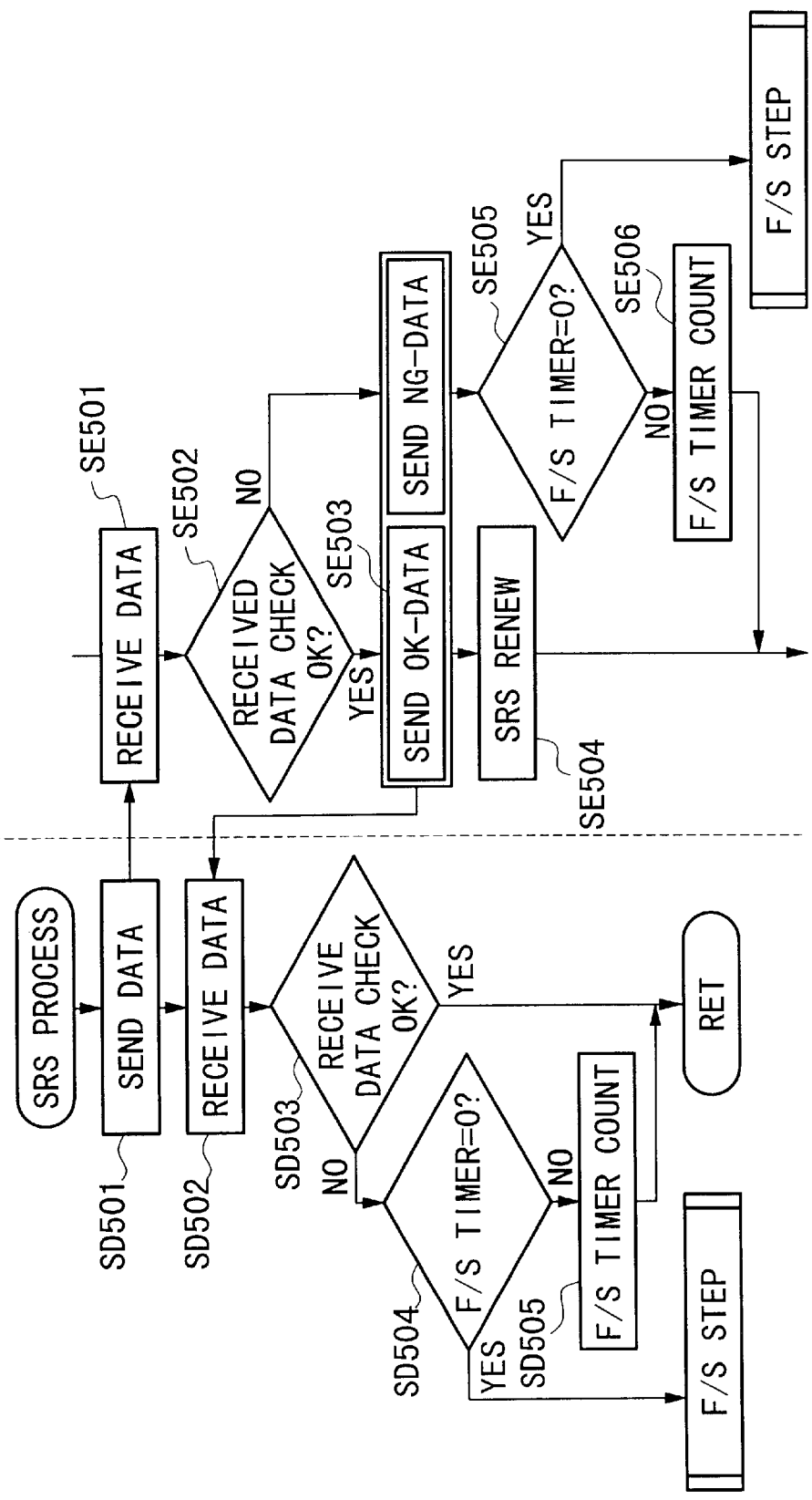
FIG. 53 is a flowchart for SRS process shown in FIG. 49.

The SRS process is carried out as outlined in FIG. 53. First, in step SD501, ON-data for placing the airbag apparatus in the deployable state or OFF-data for placing the airbag apparatus in the not-deployable state and system check-data are sent from the passenger detection unit circuitry (control circuit 22) to the airbag apparatus circuitry (control circuit CC). In step SD502, OK-data or NG-data in response to the ON-data and OFF-data and system check-data from the airbag apparatus circuitry are received by the control circuit 522, and it proceeds to step SD503. In step SD503, it is judged whether the ON-/OFF-data and system check-data, sent from the passenger detection side to the airbag apparatus circuitry, are again returned from the airbag apparatus circuitry to the passenger detection side in the normal condition. If it is judged to be normal (no problem in signal circuit), the process is continued. If there is a problem in the corn circuit, it proceeds to step SD504, and it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SD505, and fail-safe timer count is performed, and the process is continued.

On the other hand, in step SE501, the airbag apparatus circuitry (control circuit CC) receives ON-data for placing the airbag apparatus in the deployable state or OFF-data for placing the airbag apparatus in the not-deployable state and system check-data from the passenger detection unit circuitry (control circuit 22). In step SE502, the received data are checked to examine whether or not they are normal. In either case, it proceeds to step SE503 for sending OK-data or NG-data and system check-data to the passenger detection unit circuitry. If it is judged, in step SE502, that the signal circuit is normal, OK-data are sent in step SE503, and it proceeds to step SE504. In step SE504, the data on the airbag side is renewed in response to the OK-data, thereby enabling to place the airbag in the deployable state or not-deployable state. If, in step SE502, it is judged that there is a problem in the corn circuit, NG-data are sent to the control circuit 522 in step SE503, and it proceeds to step SE505. In step SE505, it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SE506, and fail-safe timer count is performed, and the process is continued.

According to this embodiment, HFLV signals impressed on a plurality of antenna electrodes 504 (504*a*~504*d*) disposed on the seat 501 are generated by the oscillation circuit 511, but its output is obtained by the trigger signals generated by triggering of a dc source (+Vcc) of a positive voltage (+5 volts for example) to switch the switching device 511*b* successively at a desired frequency (120 KHz for example), therefore, compared with a process of converting dc to high frequency ac and waveforming the resulting signals, the circuit configuration of the oscillation circuit 511 as well as control circuit 510 can be simplified, enabling the system cost to be lowered.

Especially, by utilizing a single power source in the control unit 510, produced by the power circuit 524 for example +5 volts, and using this power for the system power, the power circuit 524 as well as other circuit configuration can be simplified even more, and system cost can be significantly lowered.

Also, because the forward signal to the antenna electrodes 504 (504*a*~504*d*) is rectangular waveform of a substantially constant voltage, comparison/judging of stored data such as threshold values with the detected data is simplified, and further, the output amplitude is controlled by the amplitude control circuit 512 so that reliability and accuracy of judgment on passenger seating conditions by the control circuit 522 are even more improved.

Also, the control unit 510 is woven into the seat 501 having the antenna electrodes 504, when connecting the antenna electrodes 504 to control unit 510 using lead wires 506 (506*a*~506*d*), the length of the connecting wire can be shortened considerably compared with the case of disposing the control unit 510 on the dashboard or engine compartment. Therefore, system cost can be lowered and the effects of external noise can be prevented, thereby improving the detection capability and reliability of the passenger detection system even more.

Because the control unit 510 is housed within the same housing as other components such as the oscillation circuit 511, electric current detection circuit 515, switching circuit 518, control circuit 522, power circuit 524, so that assembly into the seat 501 is facilitated. Especially, an installation space is readily available near the seat frame 503 or its vicinity, therefore, even if the size of the control unit 510 becomes slightly larger, it can be simply and readily accommodated near the seat frame 503.

A plurality of antenna electrodes 504 (504*a*~504*d*) are disposed separately on the sitting section of seat 501, therefore, each antenna electrode is successively connected to the oscillation circuit 511 by successively switching the switching devices 518*a*~518*d* in the switching section 518, and by impressing HFLV to generate a weak electric field, a particular value of current, determined by the opposing area of contact with the passenger and other factors, flows in each antenna electrode 504. Therefore, by detecting the values of such perturbation current, it is possible to detect readily whether the passenger is an adult or a child.

Furthermore, the phase differential between the forward signals, from the oscillation circuits of the electric current detection circuit 515 and the antenna electrode side, and the output signals to antenna electrode 504 is dependent on the nature of the object sitting on the seat 501. Particularly, the levels of phase differential are recognizably different when the object is a human body. Therefore, the use of the phase shift detection circuit 520 to detect the phase difference together with the result of passenger identity judgment based on detected current levels, enables to reliably detect passenger loading on the seat 501.

In particular, the airbag in the airbag apparatus 530 is able to be made either deployable or not deployable, depending on the judgment of the system on whether the passenger is an adult or a child. For example, if it is judged that the passenger is a child based on a low-level of detected current, the airbag in the airbag apparatus 530 is placed in a non-deployable state. Therefore, even if the car collides, the airbag is not opened and the child is prevented from suffering secondary injuries.

FIG. 54 shows another embodiment of the passenger detection system. This system is basically the same as the system presented above, but the difference is that the antenna electrodes 504 (504*a*~504*b*) are provided on the backrest section 501*b*, and they are not provided on the sitting section 501*a*.

Figure 54A:
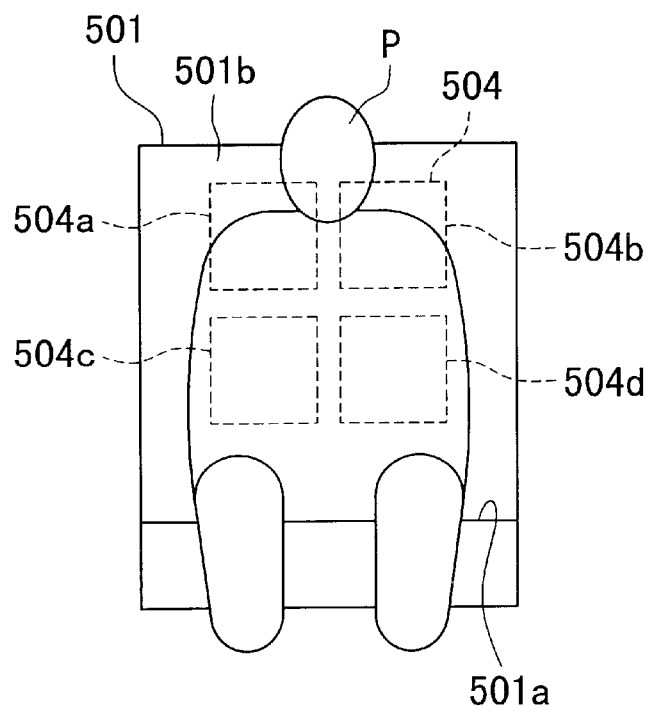
FIGS. 54A, 54B are diagrams for another arrangement of the antenna electrode, respectively showing, a front view of an adult passenger, and a front view of a child passenger.
Figure 54B:
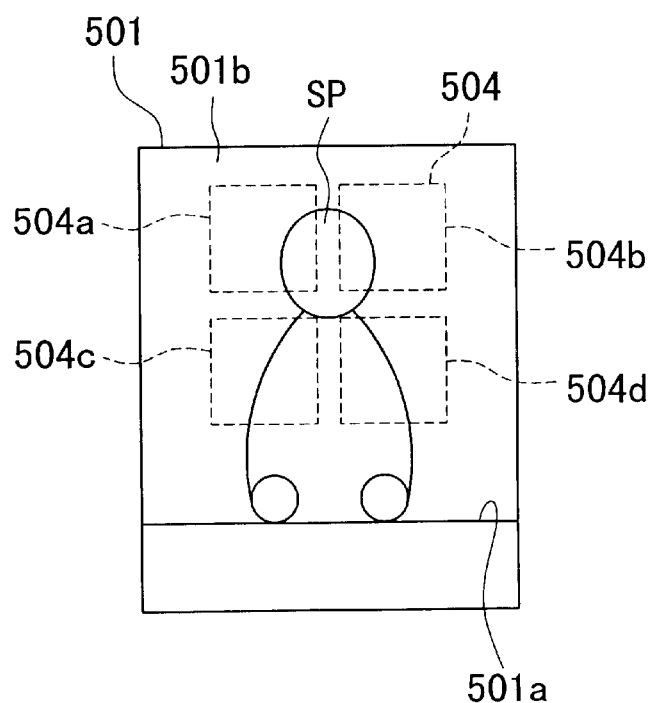

As shown in FIG. 54A, when the opposing areas to all the antenna electrodes 4*a*~4*d* are wide, and the detected current levels are high, it is judged that the passenger sitting on the seat 501 is an adult. Also, as shown in FIG. 54B, when the opposing areas to all the antenna electrodes 504*a*~504*d* are small, and the detected current levels are low, it is judged that the passenger sitting on the seat 1 is a child.

It should be noted that the present invention is not limited to the above embodiment and other arrangements are possible. For example, the number of antenna electrodes (antenna electrode section) may be adjusted suitably, and their shape can be rectangular or strip shape which are possible examples. Electric field generation device may include an HFLV source to produce substantially rectangle waveform by switching of positive electrical power source based on clock signals in the control circuit, or by dividing the clock signal in the control circuit. The output frequency other than 120 KHz may be chosen depending on the conditions inside the car, and the voltage may be selected outside the range of 5 volts (3~20 volts for example). Also, the amplitude control circuit and the phase shift detection circuit may be omitted depending on the precision of the system power source and expected performance level of the system. Also, information detection circuit includes not only the embodied example of direct detection of the antennae current, but includes such indirect detection circuits based on information on voltages related to the perturbation current and waveform data. Further, passenger evaluation methods include comparison of stored data related to the seating pattern and sitting posture of the passenger with detected data, thereby judging the passenger identity criteria such as passenger loading, and whether the passenger is an adult or a child.

Embodiment 6

Figure 55A:
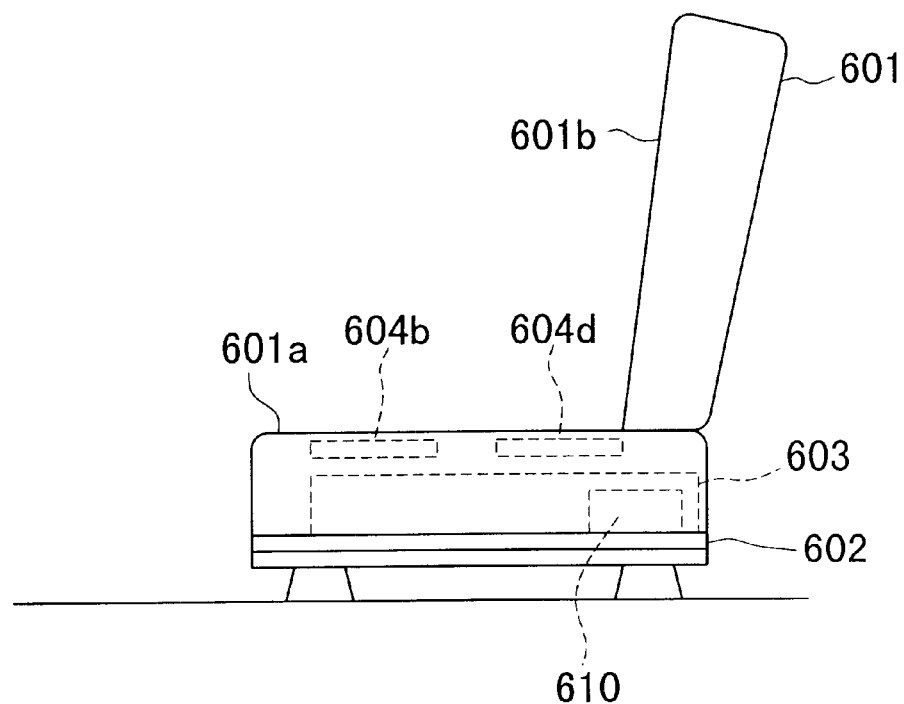
FIGS. 55A, 55B are diagrams of the interior section of the passenger detection system showing, respectively, a side view of the antenna electrodes installed on the seat, and a front view of the seat.
Figure 55B:
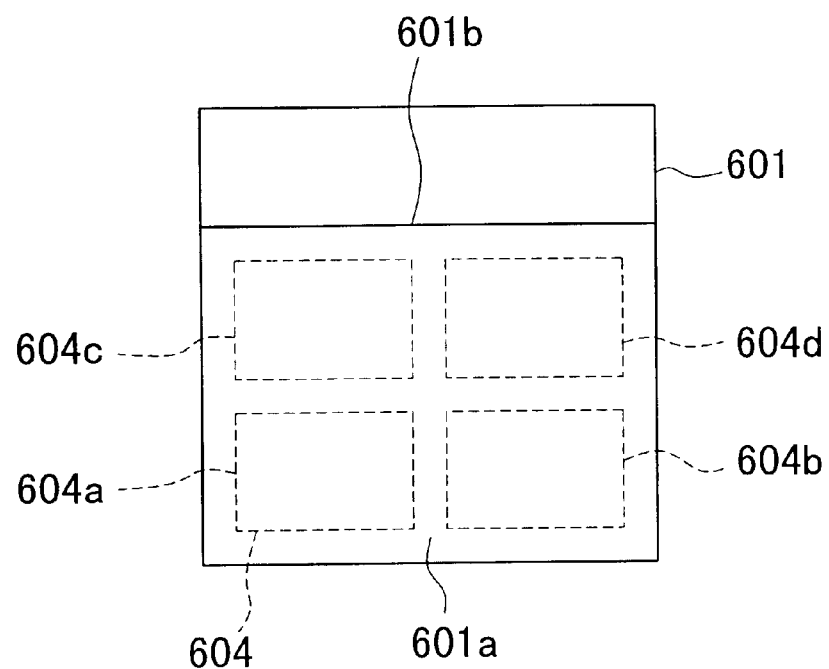
Figure 56A:
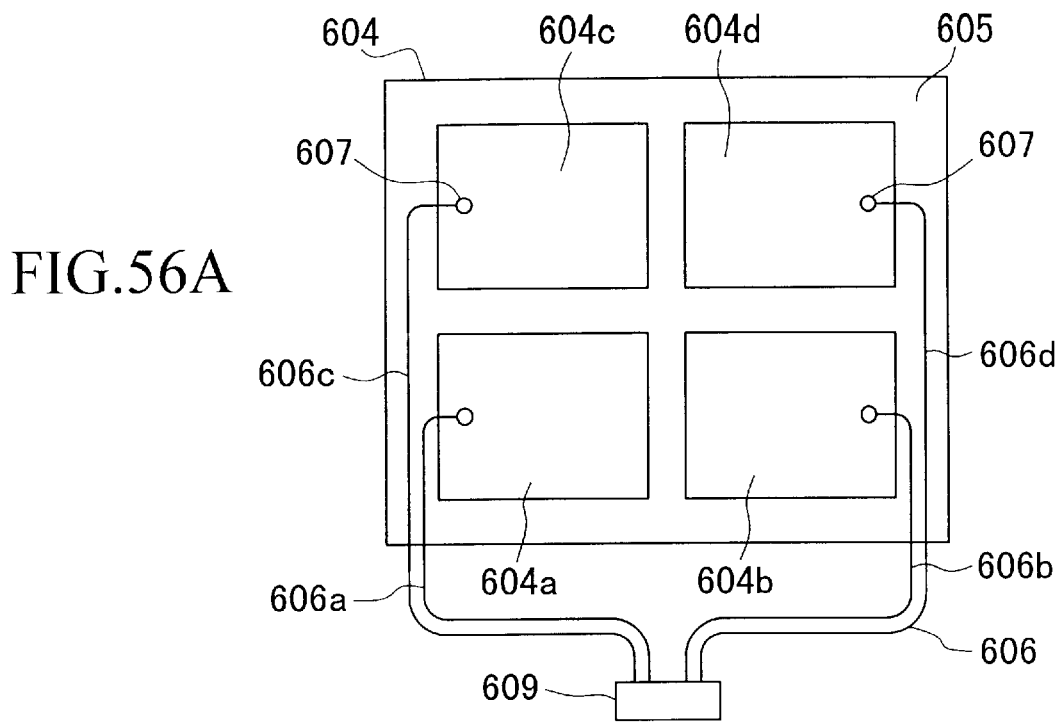
FIGS. 56A–56C are diagrams of specific structures of the antenna electrodes showing, respectively, a plan view, a cross sectional view of key parts, and a plan view of another embodiment.
Figure 56B:
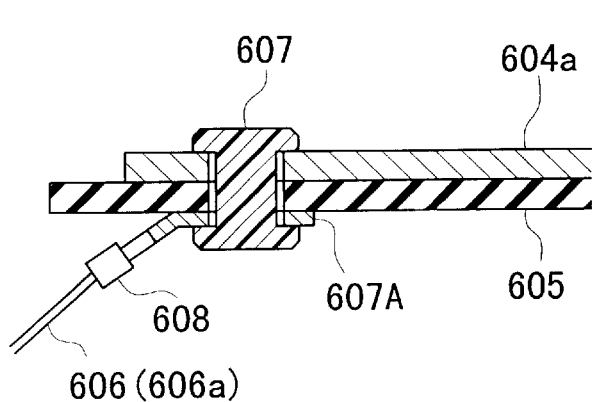
Figure 56C:
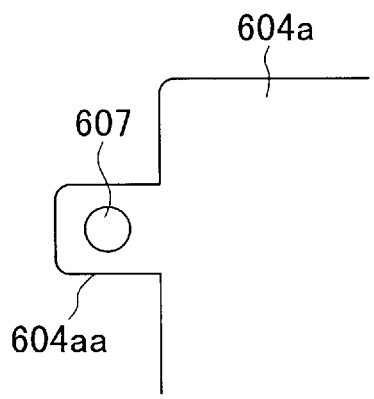
Figure 57:
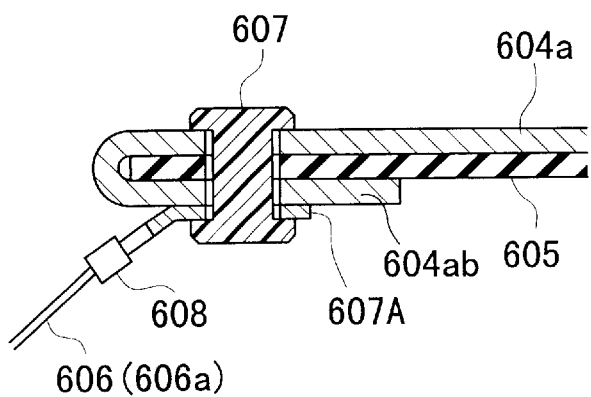
FIG. 57 is a cross sectional view of the essential parts to show the coupling condition between the connection terminal and the antenna electrode shown in FIG. 56B.

Next, the passenger detection system in Embodiment 6 will be presented with reference to FIGS. 55~59. The passenger detection system in this embodiment is based on detecting the perturbation current related to the passenger seating conditions by processing the detected signals from antenna electrodes using a common signal processing section. Those parts which are the same as the parts shown in FIGS. 96~97 will be given the same reference numerals and their detailed explanations will be omitted. FIGS. 55~57 show the arrangement of the passenger seat (driver seat) 601 and the antenna electrodes, and seat 601 is comprised primarily of a sitting section 601a and a backrest section 601b. The sitting section 601a is comprised by a seat frame 603 fixed to the base 602 which can be moved forward and backward, and an outer covering for the cushion. Particularly, a plurality of antenna electrodes 604 (604a~604d) of substantially the same shape (for example, rectangle) are disposed symmetrically on the sitting section 601a. The antenna electrode section 604 may be disposed on the outside the covering or on the outer covering or cushion material itself. A control unit 610 is assembled into the seat 601, and is disposed on the seat frame 603 or its vicinity.

The antenna electrode section 604 shown in FIG. 56 is basically comprised of a base member 605 made of an insulator such as non-woven fabric, and antenna electrodes 604a~604d placed separately and symmetrically on one surface of the base member 605, and are placed on the inside of the covering for the sitting section 601a. The antenna electrodes 604a~604d are made of an electrically conductive fabric, but they made be made by: weaving fine metallic wire, or a conductive fiber into the base member 605 or into the seat cloth for the sitting section 601a, which may be regarded as the base member; or applying a coating using a conductive paint; or using a thin flexible metallic strip. The antenna electrodes 604a~604d to the base member 605 may be adhesively bonded or bonded using a thermoplastic or thermosetting material, sewing, hooking, button, hooks, or adhesive tape, but adhesive bonding is preferred. The antenna electrodes 604a~604d shown in the drawing are formed into rectangles of substantially the same size. The antenna electrode section 604 contain many antenna electrodes 604a~604d but they are essentially synonymous functionally and are used interchangeably in the following presentation.

The antenna electrode section 604 is constructed as shown in FIGS. 56A, 56B. A lead wire 606 (606a~606d) including shielding wire makes an electrical/mechanical connection independently on one end of the antenna electrodes 604a~604d, using a connection terminal 607, and a terminal lug 607A, and the lead wire 606 (606a~606d) is attached to a connector 609 at the output end, and is connected to the connectors (or terminals) 613a~613d of the control unit 610. Particularly, the connection terminal 607 clamps antenna electrode with a metallic terminal to provide electrical conduction, and brass rivets, hooks can be used.

In the above antenna electrode section 604, the connection structure between the antenna electrodes 604a~604d and the lead wire 606 (606a~606d) are all essentially the same, therefore, explanation will be based on connecting an antenna electrode 604a to a lead wire 606a. The connection terminal 607 is riveted through the antenna electrode 604a and the base member 605. A connection terminal 607 is placed in the a hole provided through the antenna electrode 604a and the base member 605, and a riveting terminal lug 607A is inserted in the connection terminal 607 prior to riveting, and when the assembly is riveted, it makes an electrical connection between the terminal lug 607A and the antenna electrode 604a through the connection terminal 607. The terminal lug 607A is connected so as to make a mechanical/electrical contact with the lead wire 606a using a fastening means such as pressure lug 608.

The connection between the antenna electrode 604a and the lead wire 606a may be made as shown in FIG. 56C and FIG. 57. In the former case, an extension member 604aa is formed at a portion of the antenna electrode 604a, and the extension member 604aa is connected to the connection terminal 607. The latter case, one edge of the antenna electrode 604a is folded to the back side of the base member 605, and the foldback section 604ab, back side antenna electrode 604a, base member 605 are joined through a common hole by riveting a connection terminal 607. Also, terminal lug 607A is inserted in the connection terminal 607 prior to riveting.

Figure 58:
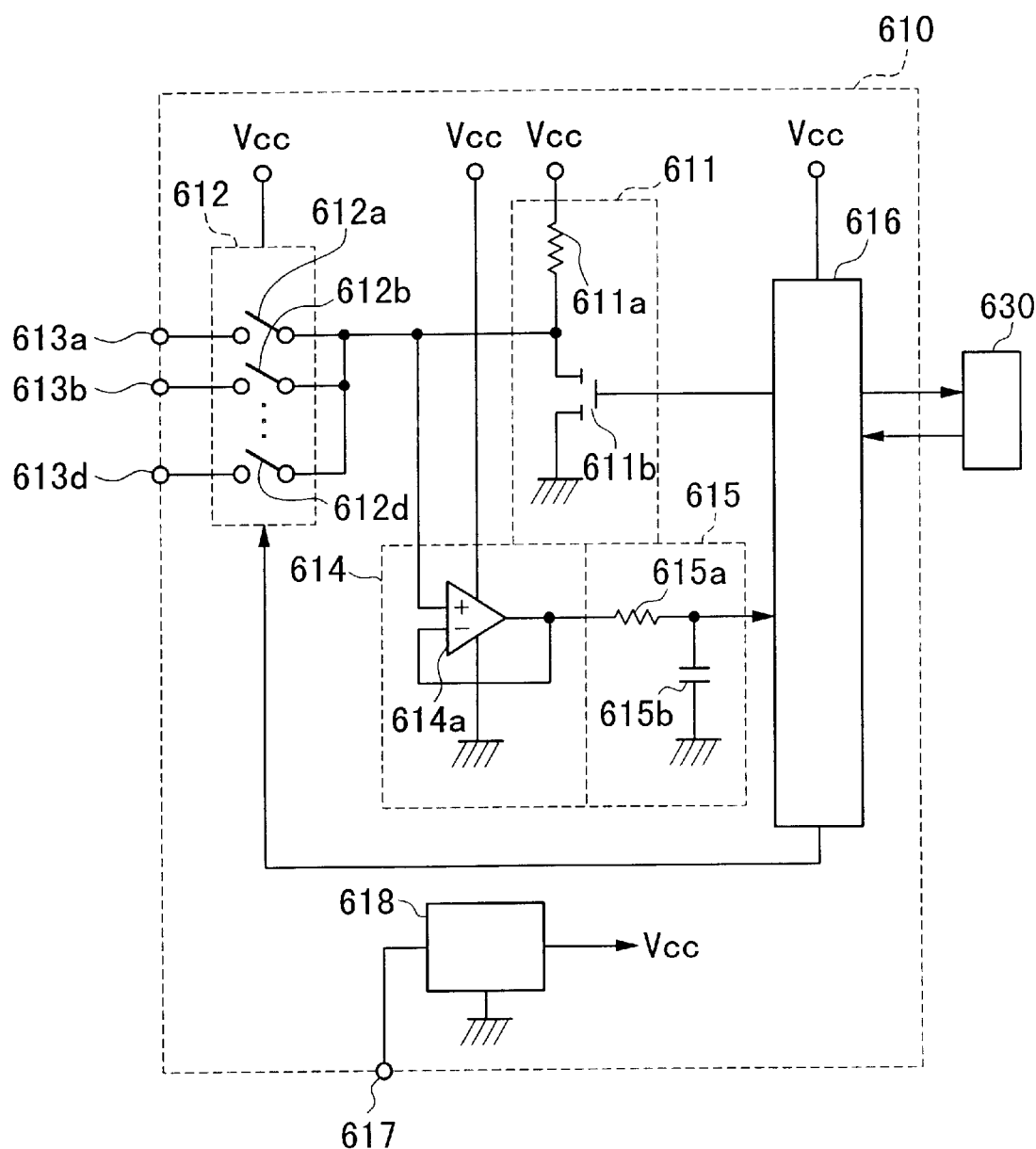
FIG. 58 is a block circuit diagram of the passenger detection system.
Figure 59:
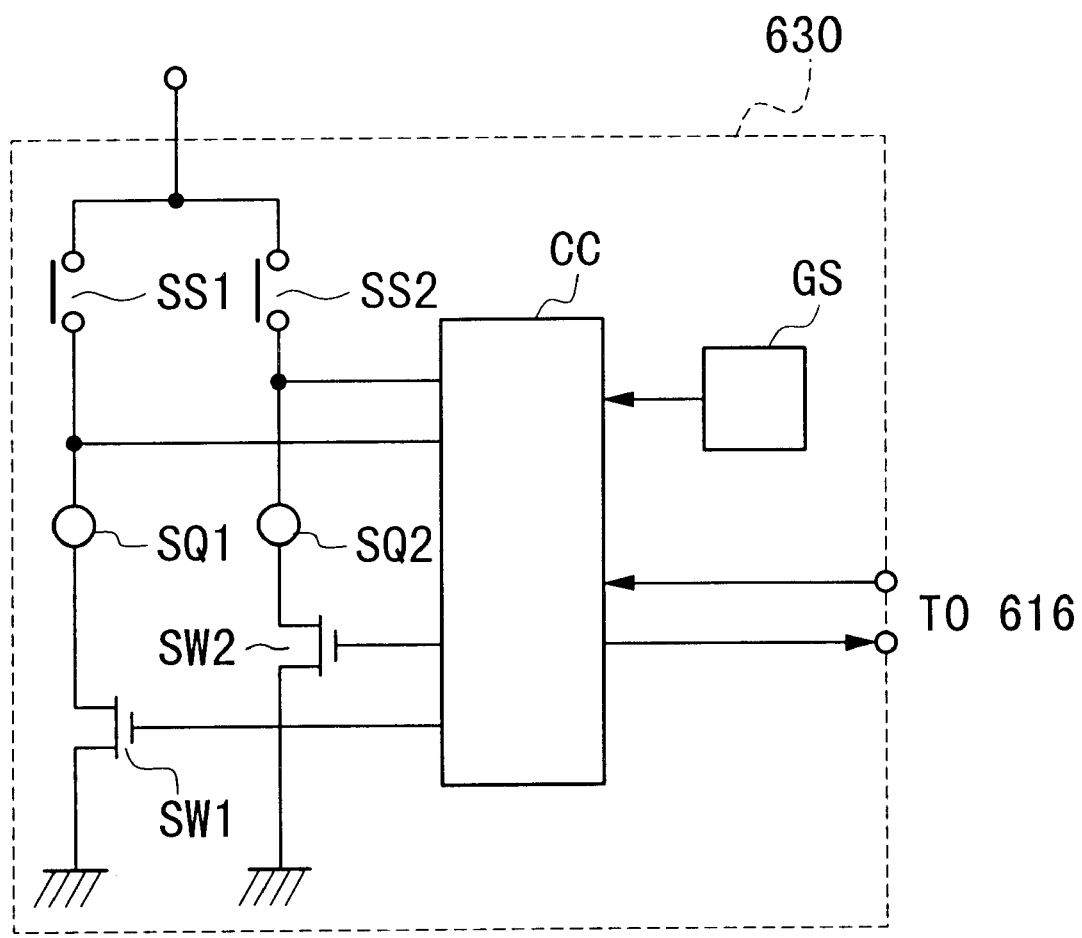
FIG. 59 is a block circuit diagram of the airbag apparatus shown in FIG. 58.

The control unit 610 is assembled into the seat 601, and the control unit 601 is comprised by, as shown in FIG. 58: an electric field generation device (forward current generation section) 611 for generating a weak electric field in the vicinity of the antenna electrodes 604a~604d; a switching circuit 612 connected to the forwarding line of the electric field generation device 611 and having a plurality of switching devices 612a~612d for switching the antenna electrodes 604a~604d; connectors 613a~613d disposed in the housing of the control unit, and connecting to the switching devices 612a~612d of the switching circuit 518 during the switching action; an impedance conversion circuit 614 connected to the forward line of the electric field generation device 611 for receiving an ac voltage for applying to the antenna electrode 604; an ac-dc conversion circuit 615 connected to the impedance conversion circuit 614 for converting the output ac signals to direct current (smoothing circuit) 615; a control circuit 616 including CPU, a/d conversion section, external memory (EEPROM, RAM for example) and the like; a connector 617 connected to the battery source (not shown) disposed in the housing; and an electric power circuit 618 connected to the connector 617. These components are contained in the same housing for the control unit 610, which is fixed to the seat frame 603 so as not to be exposed. An the airbag apparatus 630, shown in FIG. 59 for example, is connected to the control circuit 616 in the control unit 610. Selective switching of the switching devices 518a~518d is carried out according to the output signals from the control circuit 616.

In this control unit 610, the electric field generation device 611 is comprised by a series connected resistor 611a and switching device 611b in a dc line of a positive constant dc voltage source Vcc, in the power circuit 618, operated by the switching device (field-effect type transistors) 611b which is turned on/off by a gate signal from the control circuit 616, so that HFLV signals of a rectangular waveform are output from the drain to the antenna electrodes through the signal line and the switching circuit 612. The characteristics of HFLV signal are determined by the pulse-width-modulated (PWM) gate signal generated by the control circuit 616, and is designed to output at substantially 120 KHz. The duty ratio (ON-duty) of the gate signal is chosen at about 10%, but it may be changed depending on the circuit constant and operating frequency. The high frequency signal from the electric field generation device 611 to the switching circuit 612 is output when the switching device (field effect transistor) 611b is off, and its duty ratio is around 90%.

In the control unit 610, the impedance conversion circuit 614 is comprised by an op-amp having an amplification factor of 1, for example. Therefore, the output-side of the impedance conversion circuit 614 has a low impedance, and therefore, necessary current drain for operating CPU in the control circuit can be tolerated without affecting the performance on the input-side. The ac-dc conversion circuit 615 is connected to the output-side of the impedance conversion circuit 614, and is comprised by a smoothing circuit having a resistor 615a and a condenser 615b. The output-side of the ac-dc conversion circuit 615 is connected to the control circuit 616.

In the control unit 610, the electric power circuit 618 is designed to produces a singular power Vcc by adjusting the voltage form the battery power (12 volts) to singular dc voltage at 5 volts using a three-terminal regulator to simplify the circuit. The constant voltage Vcc produced by the power source circuit 618 is supplied to all the elements in the control unit 610 requiring the electrical power. It is preferable that the Vcc source be the single voltage source but it is possible to select other voltage values.

The passenger detection system having the above structure operates in the following manner. First, the control circuit 616 periodically operates the switching device 611b by sending a gate signal shown in FIG. 60A. Whenever the gate signal becomes High, the switching device 611b is turned ON, and its drain is at the ground potential so that there is no output to the signal line. In this case, the current stored in stray capacitance around a particular selected antenna electrode is discharged through the switching device 611b. The method of selection will be described later. On the other hand, whenever the gate signal becomes Low, the switching device 611b is turned OFF, and an output signal of rectangular waveform HFLV signals (120 KHz,+5 volts) shown in FIG. B are output to the signal line. The output signal is supplied to the antenna electrode 604 (604a~694d) through the signal line, switching circuit 612 (612a~612d), connectors 613a~613d, and as a result, a weak electric field is generated in the vicinity of the antenna electrode 604 (604a~694d). In this process, switching circuits 612 are operated by signals from the control circuit 616 so that, first, only the switching device 612a is closed, next only the switching device 612b is closed, and such a stepwise successive switching is carried out so that when a particular switch is being closed, other switches are all opened. Therefore, when a particular switching device (612a~612d) is closed, constant-amplitude forward signal passes through a particular a particular resistor 611a, signal line, a particular switching device (612a~612d), a particular connector (613a~613d) and reaches a particular antenna electrode 604 (604a~604d), thereby generating an electric field in the vicinity of a particular antenna electrode 604 (604a~604d), so that different values of perturbation current, governed by the seating condition of the passenger, flow in the antennae circuits.

When the passenger seat 601 is vacant, perturbation current flows at a low level governed by the stray capacitance existing around the particular antenna electrode. In this case, the rise time of the HFLV signal is rounded, as shown in FIG. 60B, depending on the RC time constant governed by stray capacitance component and the resistor 611a. On the other hand, when the passenger seat 601 is occupied, a larger stray capacitance is created in the vicinity of the particular antenna electrode, compared with the vacant seat, and a high level current flow in the electrode. Because the capacitance component produced by an adult is larger than that produced by a child, the level of perturbation current is higher. In this case, the rise time of the HFLV signal is exponential and is highly rounded by the influence of the RC time constant, as illustrated in FIG. 60C. The extent of rounding is affected by the size of the capacitance component, and is higher for an adult and lesser for a child.

HFLV signals (voltage waveform) are processed in the impedance conversion circuit (buffer circuit) 614 by the op-amp 614a at an amplification factor of 1, such that it may exhibit various waveforms depending on the RC time constant in the signal circuit including the electric field generation device 611 and the antenna electrode circuit line. Thus, it is possible to obtain sufficient current for operating the control circuit 616 as necessary by making the input-side to be high impedance and the output-side (ac-dc conversion circuitry) low impedance. Output HFLV signals from the impedance conversion circuit 614 are input in the ac-dc conversion circuit 615. Here, ac signal is leveled by the resistor 615a and the condenser 615b in the smoothing circuit, and is converted to a dc signal, as shown in FIG. 60D. In the drawing, dotted line represents dc current level in a vacant condition, and the solid line represents the same in an occupied condition, and the two levels are clearly distinguishable. The dc conversion level is dependent on the value of the capacitance component existing around the antenna electrode for a given value of resistor 611a in the RC time constant, so that it is high when an adult, which is a high capacitance object, is present while it is low when a child is present, and highest when the seat is vacant. The dc output current from the ac-dc conversion circuit 615 is successively input in the control circuit 616, and processed by A/D conversion and stored in memory.

Figure 61A:
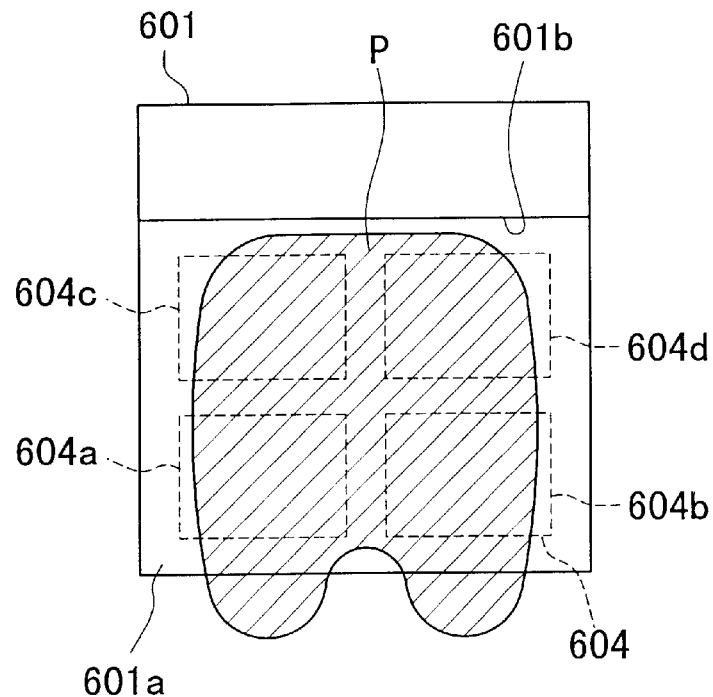
FIGS. 61A, 61B are diagrams to show, respectively, an adult seating condition and a child seating condition.
Figure 61B:
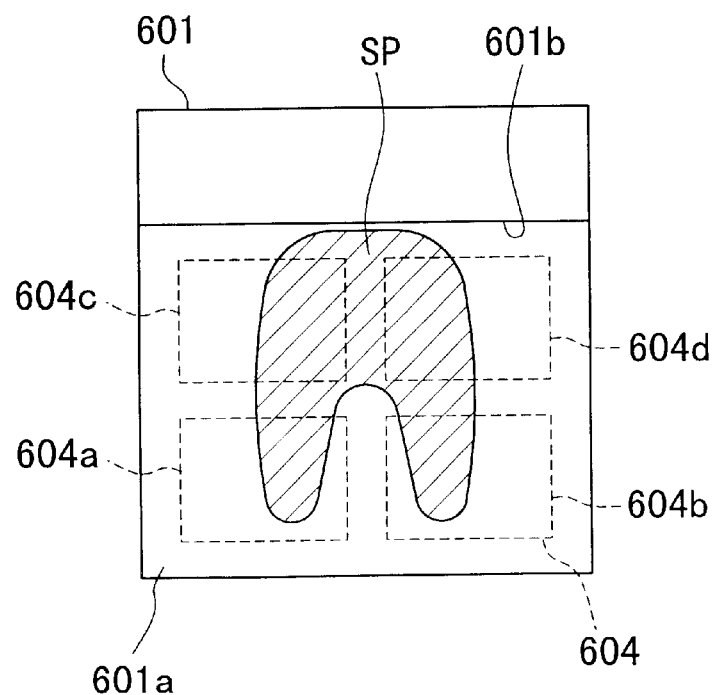

In the control circuit 616, reference data are already stored such as threshold values (threshold data) regarding the seating conditions (detect passenger loading, and identify adult/child). Specifically, passenger loading data are selected as follows. For example, as shown in FIGS. 61A, 61B, when an adult passenger P or a child passenger SP is seated on the seat 601, the areas opposing the individual antenna electrodes are different, and as a result, the capacitance components existing in the vicinity of the antenna electrodes are different, such that when an adult passenger P is seated, not only the capacitance level is higher than that when a child passenger SP is seated but the RC time constant is also affected such that the waveforms of the HFLV signals are different, and the dc current levels output from the ac-dc conversion circuit 615 are different. Therefore, a threshold value for detecting passenger loading is chosen to be a level midway between a dc level caused by a child passenger and the vacant dc level shown by dotted line in FIG. 60D. Thus, when dc output data is lower than the threshold value, it is assumed that a passenger is seated, and when it is higher than the threshold value, it is assumed that no one is seated. It is preferable that the threshold value be selected according to a sum of dc output from the ac-dc conversion circuit 615 representing all the current flowing in each antenna electrode, but it is possible to select a threshold value for each antenna electrode. The passenger identity process is omitted from this system.

Also, the threshold value regarding passenger identity is selected as follows. For example, as shown in FIGS. 61A, 61B, when an adult passenger P or a child passenger SP is seated on the seat 601, the areas opposing the individual antenna electrodes are different, and as a result, the capacitance components existing in the vicinity of the antenna electrodes are different, such that when an adult passenger P is seated, not only the capacitance level is higher than that when a child passenger SP is seated but the RC time constant is also affected such that the waveforms of the HFLV signals are different, and the dc current levels output from the ac-dc conversion circuit 615 are different. Therefore, a threshold value for detecting passenger loading is chosen to be a level midway between a dc level caused by a child passenger and the vacant dc level shown by dotted line in FIG. 60D. Thus, when the dc conversion data is lower than the threshold value, it is assumed that an adult P is seated, and when it is higher than the threshold value, it is assumed that a child SP is seated. It is preferable that the threshold value be selected according to a sum of dc output from the ac-dc conversion circuit 615 representing all the current flowing in each antenna electrode, but it is possible to select a threshold value for each antenna electrode.

Thus, signal data received by the control circuit 616 are compared against the threshold data stored in the control circuit 616, so that when the dc output from the ac-dc conversion circuit 615 is low due to the high current levels in all the antenna electrodes 604*a*~604*d* and is lower than the threshold value for passenger identity, it is assumed that the passenger sitting on seat 601 is an adult P, as illustrated in FIG. 61A. In such a case, the control circuit 616 places the airbag apparatus 630 shown in FIG. 59 in the deployable state by the signal from the control circuit 616. Conversely, when the dc output from the ac-dc conversion circuit 615 is high due to the low current levels in all the antenna electrodes 604*a*~604*d* and is higher than the threshold value for passenger identity, it is assumed that the passenger sitting on seat 601 is a child SP, as illustrated in FIG. 61B. In such a case, the control circuit 616 places the airbag apparatus 630 shown in FIG. 59 in the not-deployable state by the signal from the control circuit 616. This results in the airbag in the airbag apparatus 630 becomes not deployable by the signal from the control circuit 616. That is, when the airbag is to be deployed, the control circuit 616 sends a collision signal to the control circuit CC, and when the airbag is not to be deployed, the gate current is not supplied to the element SW2 of the passenger side when a collision takes place. The driver-side switching element SW1 is supplied with a gate signal. When the driver and an adult passenger are seated, the switching elements SW1, SW2 are both placed in the deployable state.

Figure 62:
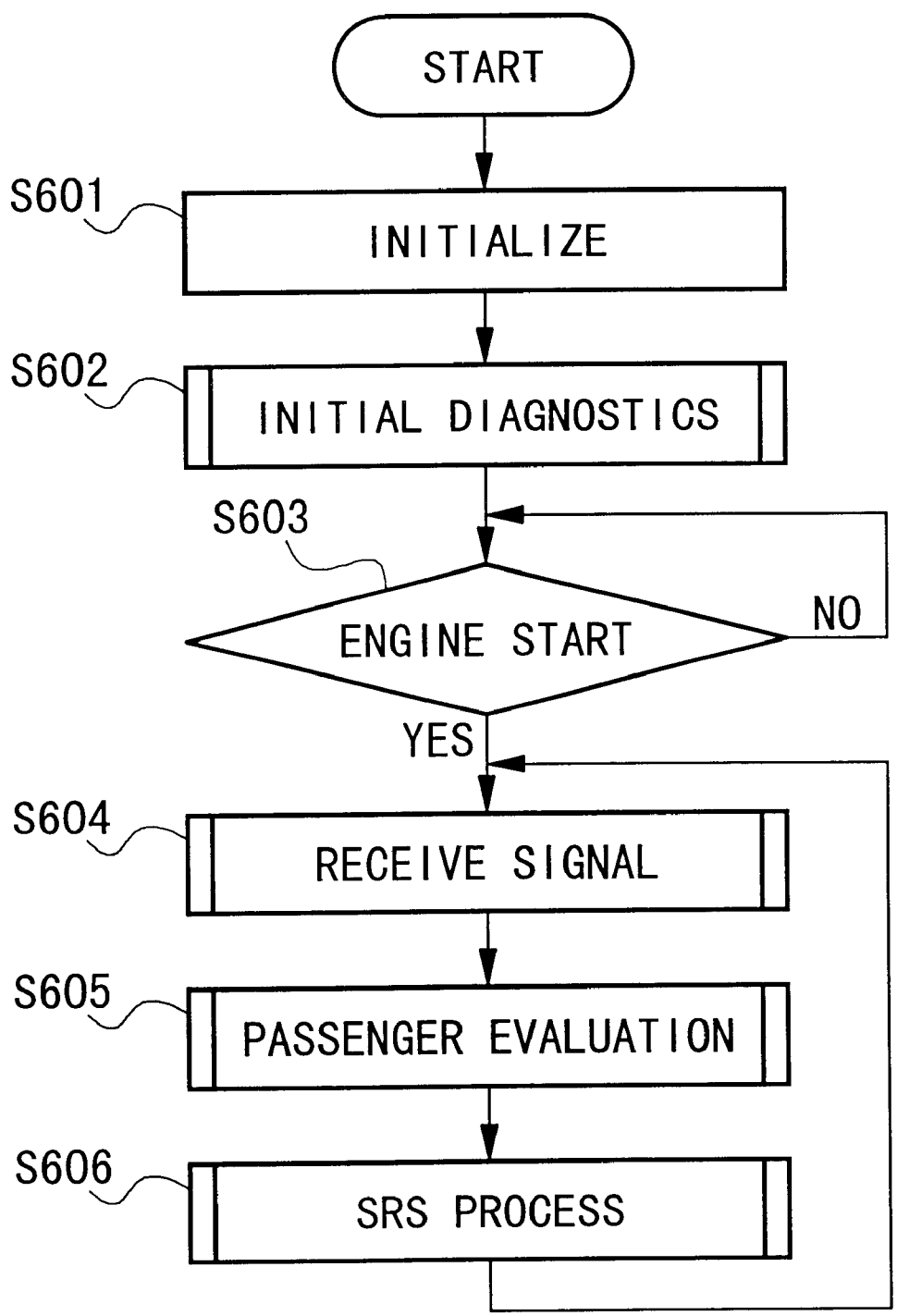
FIG. 62 is a flowchart for the process of detecting a passenger using the passenger detection system.

Next, the process of operation of the passenger detection system will be explained with reference to the overall flowchart shown in FIG. 62. FIGS. 63~66 show steps in sub-processes. First, as shown in FIG. 62, the ignition circuit is turned ON so that the process is in START. In step S601, the program is initialized, and proceeds to step S602. In step S602, initial diagnostics are performed for communication between the control circuit 616 and the airbag apparatus 630. In step S603, it examines whether the engine is operating, and if it is judged that the engine is operating, it proceeds to step S604. If it is judged that the engine is not operating, the program is shutoff. In step S604, signal data related to the perturbation current flowing in a particular antenna electrode related to passenger seating conditions (ac-dc conversion), resulting from impressing a weak electric field on the particular antenna electrode of the antenna electrodes 604*a*~604*d*, are received in the control circuit 616. In step S605, based on the received data, passenger loading data, passenger identity data are examined and conclusions reached. In step S606, SRS process is carried out between the control circuit 616 and the airbag apparatus (SRS) 630. When step S606 is completed, it returns to step S604 and repeats the steps S604 to S606. Step S603 may be omitted.

Figure 63:
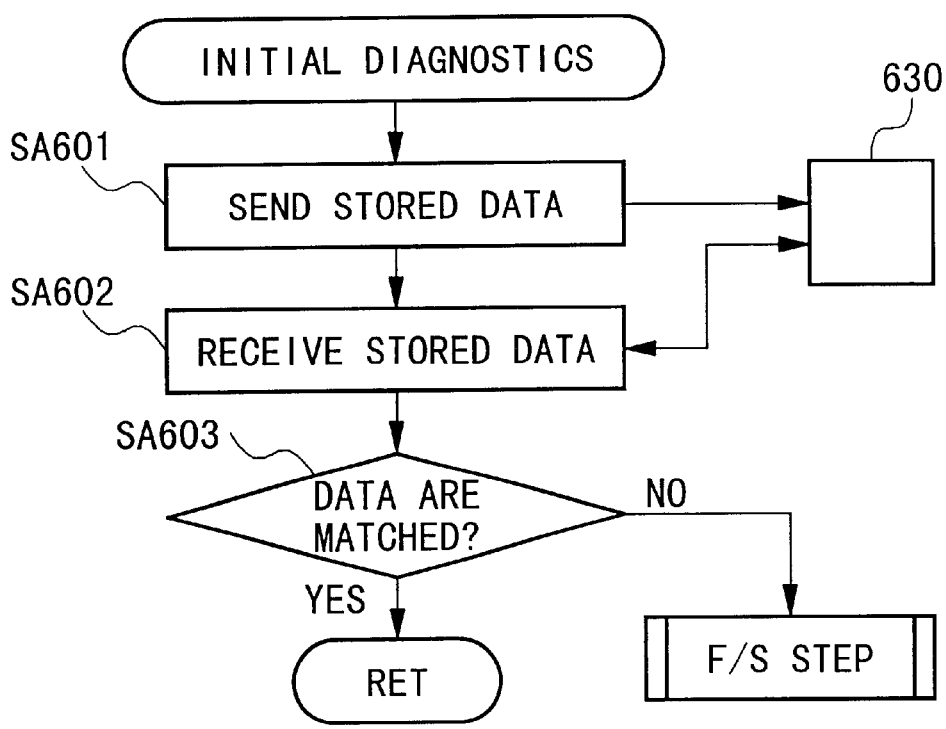
FIG. 63 is a flowchart for the initial process of passenger detection shown in FIG. 62.

Initial diagnostics are carried out as outlined in FIG. 63. First, in step SA601, stored data are sent from the control circuit 616 to the control circuit CC in the airbag circuit 630. In step SA602, passenger data are received from the airbag apparatus 630. In step SA603, it is examined whether the received data from the airbag apparatus 630 match the stored data. If it is judged that the data are matched. the process is continued. If the data do not match, it is judged that problems exist in the corn circuit and fail-safe process is carried out and alert lamp is turned on, for example. The initial diagnostics may be carried out by sending the stored data from the airbag apparatus 630 to the control circuit 616 so that matching process can be carried out in the control circuit CC in the airbag apparatus 630.

Figure 64:
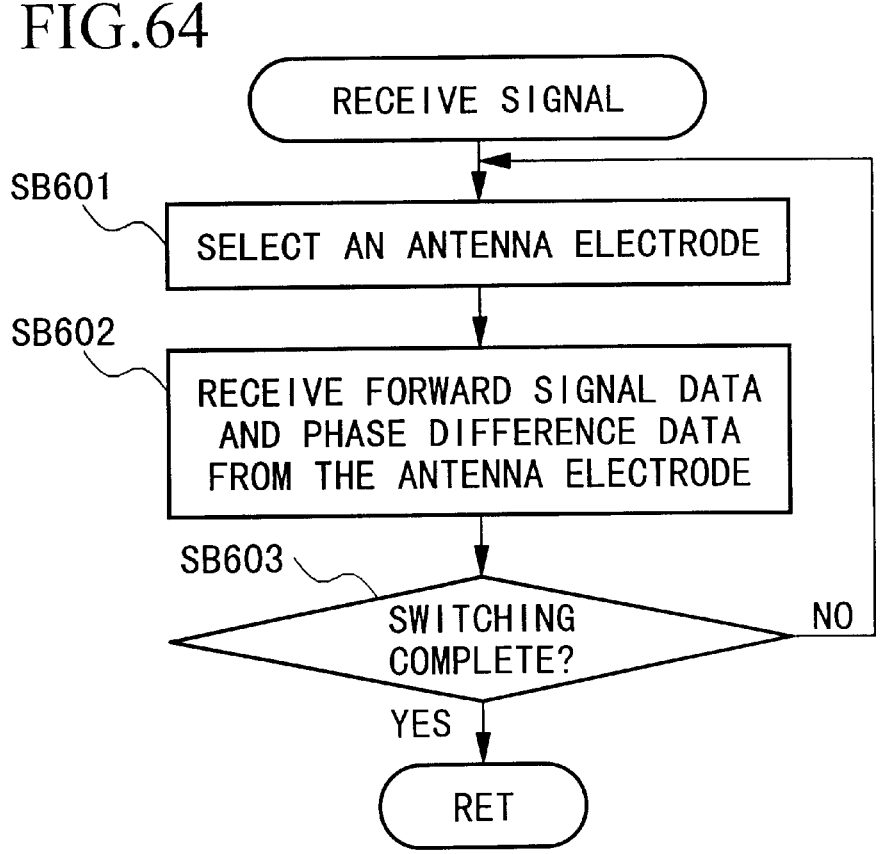
FIG. 64 is a flowchart for the signal receiving process shown in FIG. 62.

Signal reception process is carried out as outlined in FIG. 64. First in step SB601, the control circuit 616 successively selects one switching device at a time from the switching devices 612*a*~612*d* so that only the switching circuit 612*a* and so on is closed, for example, to select an antenna electrode 604*a*. In step SB602, the voltage data from the respective antenna electrode and ac-dc conversion data are received in the control circuit 616 and stored. In step SB603, it is examined whether successive selection of antenna electrodes 604*a*~604*d* by the successive actions of the switching devices 612*a*~612*d* has been completed. If it is judged that the switching process has been completed, it proceeds to passenger evaluation process. If it is judged that the switching process is incomplete, it returns to step SB601.

Figure 65:
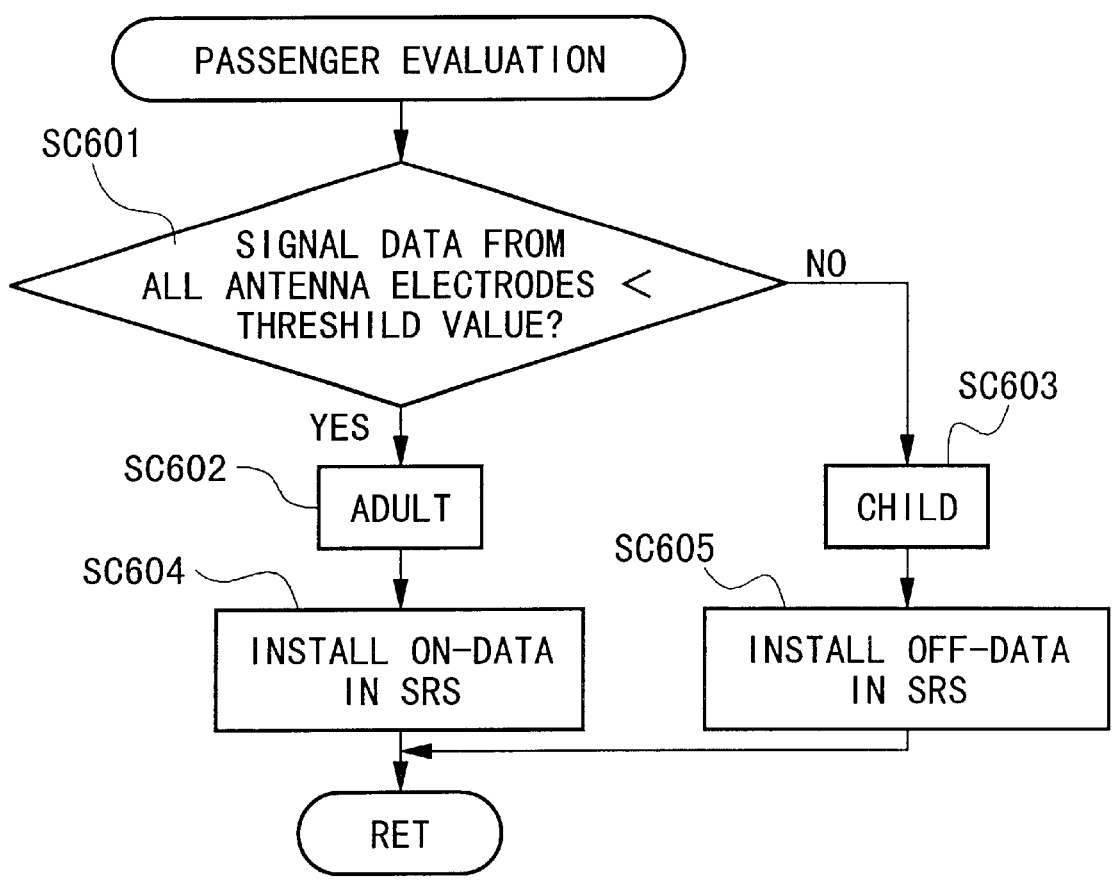
FIG. 65 is a flowchart for the passenger evaluation process shown in FIG. 62.

The passenger evaluation process is carried out as outlined in FIG. 65. First, in step SC601, the signal data on the perturbation current flowing in the in all the antenna electrodes 604*a*~604*d* related to the dc output current from the ac-dc conversion circuit 615 and threshold values related to the passenger seating conditions are compared to decide whether the detected data are higher than the threshold values. If the detected data are smaller than the threshold values, it proceeds to step SC602, and if it is judged that the detected data are not smaller, it proceeds to step SC603. In step SC602, if it is judged that the passenger sitting on the seat is an adult P, it proceeds to step SC604, so that ON-data for placing the airbag apparatus 630 in the deployable state are entered in the SRS process, and the program connects to SRS process. Also, in step SC3, if the passenger sitting on the seat is a child SP, it proceeds to step SC605, and OFF-data for not deploying the airbag apparatus 630 are entered in the SRS process, and the program is continued.

Figure 66:
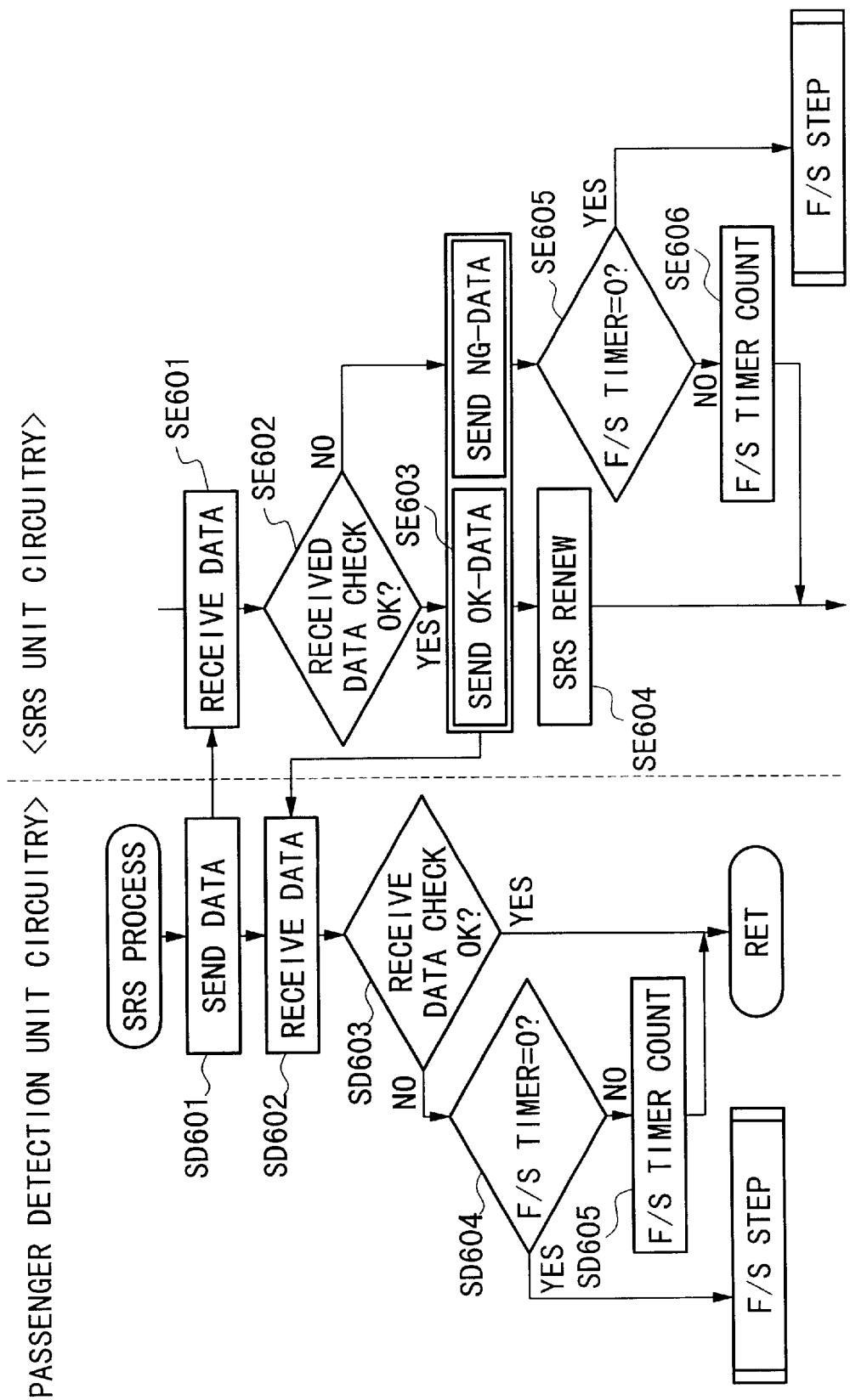
FIG. 66 is a flowchart for SRS process shown in FIG. 62.

The SRS process is carried out as outlined in FIG. 66. First, in step SD601, ON-data for placing the airbag apparatus in the deployable state or OFF-data for placing the airbag apparatus in the not-deployable state and system check-data are sent from the passenger detection unit circuitry (control circuit 616) to the airbag apparatus circuitry (control circuit CC). In step SD602, OK-data or NG-data in response to the ON-data and OFF-data and system check-data from the airbag apparatus circuitry are received by the control circuit 616, and it proceeds to step SD603. In step SD603, it is judged whether the ON-/OFF-data and system check-data, sent from the passenger detection side to the airbag apparatus circuitry, are again returned from the airbag apparatus circuitry to the passenger detection side in the normal condition. If it is judged to be normal (no problem in signal circuit), the process is continued. If there is a problem in the corn circuit, it proceeds to step SD604, and it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SD605, and fail-safe timer count is performed, and the process is continued.

On the other hand, in step SE601, the airbag apparatus circuitry (control circuit CC) receives ON-data for placing the airbag apparatus in the deployable state or OFF-data for placing the airbag apparatus in the not-deployable state and system check-data from the passenger detection unit circuitry (control circuit 616). In step SE602, the received data are checked to examine whether or not they are normal. In either case, it proceeds to step SE603 for sending OK-data or NG-data and system check-data to the passenger detection unit circuitry. If it is judged, in step SE602, that the signal circuit is normal, OK-data are sent in step SE603, and it proceeds to step SE604. In step SE604, the data on the airbag side is renewed in response to the OK-data, thereby enabling to place the airbag in the deployable state or not-deployable state. If, in step SE602, it is judged that there is a problem in the corn circuit, NG-data are sent to the control circuit 616 in step SE603, and it proceeds to step SE605. In step SE605, it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SE606, and fail-safe timer count is performed, and the process is continued.

According to this embodiment, the ac-dc conversion circuit 615 is connected, through the impedance conversion circuit 614, to the signal for outputting HFLV signals generated by the electric field generation device 611. Therefore, passenger seating conditions are analyzed in terms of the dc voltage signals (voltage waveforms) obtained by ac-dc conversion of the detected results related to the perturbation current flowing on a plurality of antenna electrodes 604 (604a~604d) disposed on the seat 601, thereby enabling to judge the passenger seating conditions precisely.

Also, because of the presence of the impedance conversion circuit 614 between the signal line and the ac-dc conversion circuit 615, the input-side has a high impedance and the output-side has a low impedance. Therefore, when the control circuit 616 receives dc output from the ac-dc conversion circuit 615, current drain by the control circuit 616 does not affect the performance of the signal line. Therefore, passenger seating conditions can be detected with high precision.

Also, because the capacitance components in the vicinity of the antenna electrodes are dependent on the passenger seating conditions on the seat 601, RC time constant determined by resistor 611a and capacitance component may be chosen appropriately, the waveforms of HFLV signals in the forwarding line are affected by the feedback effect of the passenger seating conditions. Therefore, the differences in the waveforms caused by differences in the rise time can be represented by ac-dc conversion using the ac-dc conversion circuit 615, the detected data can be distinguished, thereby providing information on passenger seating conditions with precision.

Also, the passenger seating condition is judged from the output signals from the ac-dc conversion circuit 615 and analyzed by the control circuit 616 in association with a plurality of antenna electrodes 604 (604a~604d), which are selected by the switching circuit 612. Therefore, the control circuit 616 bases its decision on a large amount of perturbation data, thereby improving the detection capability and reliability of the passenger detection system even more.

Also, the electric power circuit 618 as an element in the control unit 610 produces a singular power source Vcc by reducing the voltage form the battery power BA to singular dc voltage so that all the elements in the control unit 610 requiring the electrical power will be served by the same constant voltage Vcc, therefore, the electric circuit can be constructed using a three-terminal regulator to simplify the circuit, and together with simplifying the structure of the antenna electrode section, the system is simplified and the system cost is lowered.

Because the control unit 610 is housed within the same housing as other components such as the electric field generation device 611, switching circuit 612, impedance conversion circuit 614, ac-dc conversion circuit 615; control circuit 616; power circuit 524, so that assembly into the seat 601 is facilitated. Especially, an installation space is readily available near the seat frame 603 or its vicinity, therefore, even if the size of the control unit 610 becomes slightly larger, it can be simply and readily accommodated near the frame 603.

A plurality of antenna electrodes 604 (604a~604d) are successively impressed with HFLV signals from the electric field generation device 611, but the output is obtained by successively applying the gate signal to the switching device 611b at a suitable frequency (such as 120 KHz) from a singular voltage source Vcc in the power circuit 618. Therefore, compared with oscillation circuit operated by dc-ac conversion and wave shaping, it is possible to produce a control circuit including the electric field generation device 611 that is simple and cost effective.

Also, the control unit 610 is woven into the seat 601 having the antenna electrodes 604, when connecting the antenna electrodes 604 to control unit 610 using lead wires 606 (606a~606d), the length of the connecting wire can be shortened considerably compared with the case of disposing the control unit 610 on the dashboard or engine compartment. Therefore, system cost can be lowered and the effects of external noise can be prevented, thereby improving the detection capability and reliability of the passenger detection system even more.

In particular, the airbag in the airbag apparatus 630 is able to be made either deployable or not deployable, depending on the judgment of the system on whether the passenger is an adult or a child. For example, if it is judged that the passenger is a child based on a low-level of detected current, the airbag in the airbag apparatus 630 is placed in a non-deployable state. Therefore, even if the car collides, the airbag is not opened and the child is prevented from suffering secondary injuries.

Figure 67:
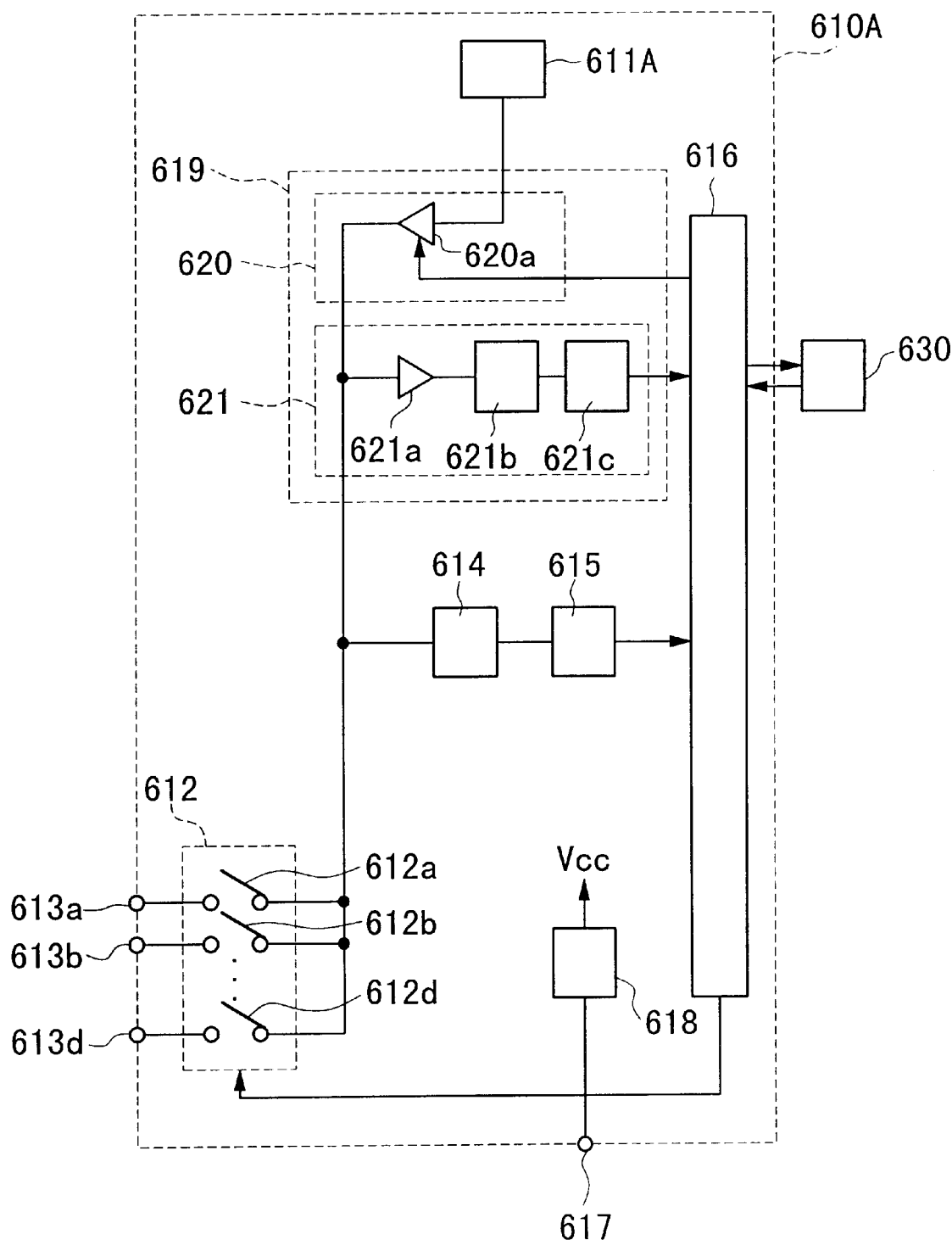
FIG. 67 is a block circuit diagram 610A of the passenger detection system.

FIG. 67 shows another embodiment of the passenger detection system. The control unit 610A is basically the same as the control unit shown in FIG. 58, but the difference is that the electric field generation device 611A is served by an oscillation circuit, and amplitude control circuit 619 for maintaining the voltage amplitude substantially constant is connected between the electric field generation device 611A and the switching circuit 612. It is preferable that a resistor that forms an active RC time constant be connected between the amplitude control circuit 619 and the junction of the impedance conversion circuit 614 to the forwarding line.

The amplitude control circuit 619 is comprised by an amplitude varying circuit 620 for enabling to vary the voltage amplitude of the forward signal and amplitude detection circuit 621 for detecting the voltage amplitude of the forward signal. The amplitude varying circuit 620 includes a variable amplitude section 620a with programmable gain amplifier (PGA) and the amplitude detection circuit 621 includes: a detection section 621a with an op-amp for detection of voltage amplitude; an ac-dc conversion circuit 621b for converting the output signal from the detection section 621a to dc; and an amplifier 621c for amplifying the output signal from the ac-dc conversion circuit 621b. Output signals from the amplifier 621c are supplied to the control circuit 616, and variable amplitude signals for the variable amplitude section 620a are output from the contra circuit 616.

The amplitude control circuit 619 operates as follows. First, the oscillation circuit 611A generates HFLV signals, which are detected by the detection section 621 a of the amplitude detection circuit 621, and the detected signal is converted to a dc signal in the ac-dc conversion circuit 621b, amplified in the amplifier 621c, and is input in the control circuit 616. In the control circuit 616, detected amplitude is checked whether it is at the required amplitude value, and variable amplitude signal is output to the variable amplitude section 620a to correct to the required amplitude. Signal is corrected, and henceforth, the amplitude is retained at a constant level by the linked action of the amplitude varying circuit 620 and the amplitude detection circuit 621. Forward signal having a constant amplitude is supplied to the antenna electrodes 604 (604a~604d) through signal lines, switching circuit 612 (612a~612d) and connectors 613a~613d.

In this embodiment, voltage amplitude in the line voltage in the signal lines (HFLV) is maintained constant so that stable dc can be output from the ac-dc conversion circuit 615, thereby improving the precision of passenger detection even more.

Figure 68:
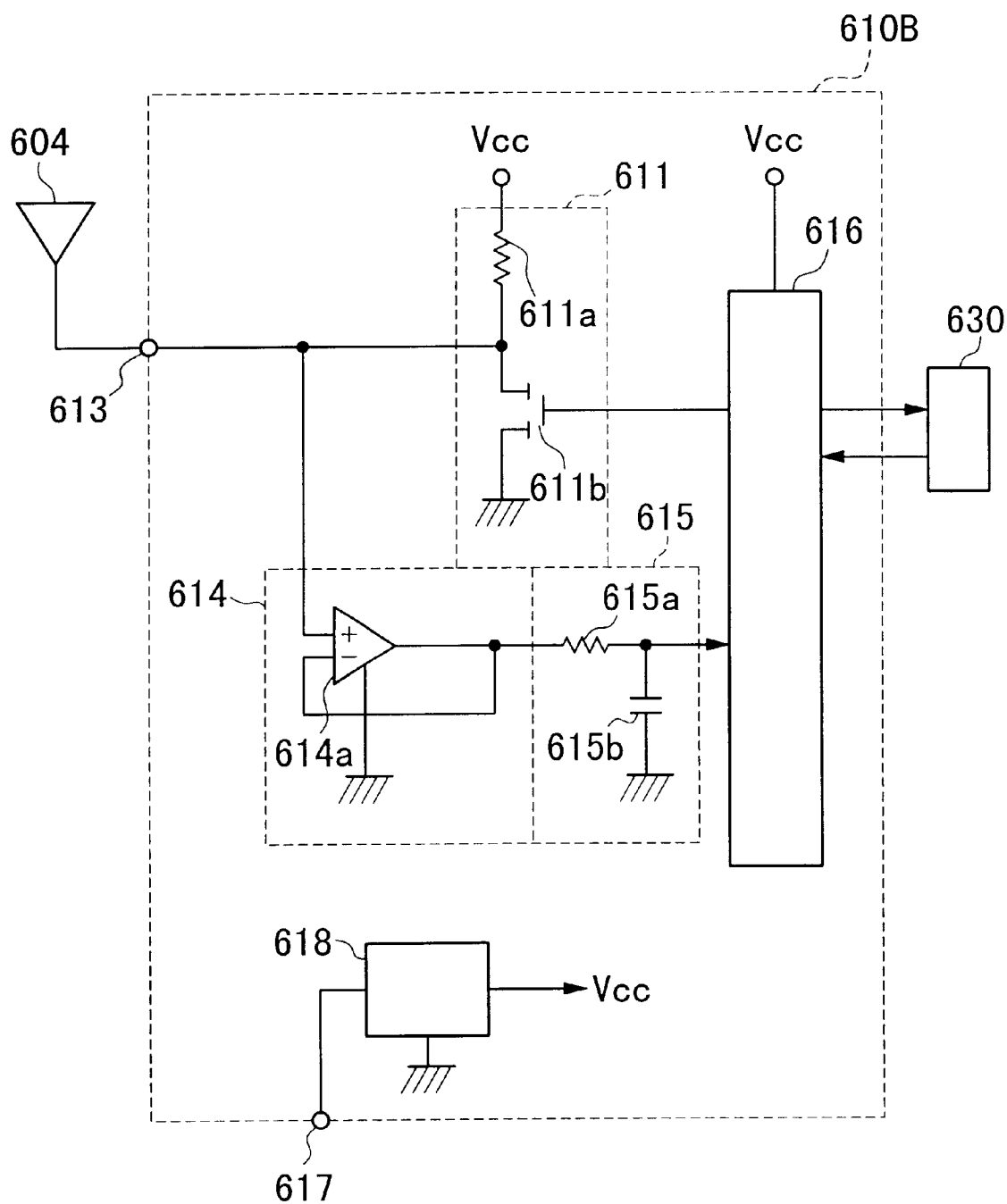
FIG. 68 is a block circuit diagram 610B of the passenger detection system.

FIG. 68 shows another embodiment of the passenger detection system. The control unit 610B is basically the same as that shown in FIG. 58. The differences are that one antenna electrode 604 is mounted on a sheet 601 (sitting section 601a or backrest section 601b) is placed on the dashboard or in its vicinity, and the switching circuit 612 which selectively switches or contact the electric field generation device 611 and the antenna electrode 604 are omitted.

In this embodiment, because there is only one antenna electrode 604, data obtained from the ac-dc conversion circuit 615 are less, so that the passenger detection performance is slightly inferior, however, the circuit configuration is simple and the system cost is lower.

Specially, if the antenna electrode 604 is placed on the dashboard or door or sideport of the seat, when it detects that a space between the passenger and the dashboard or door becomes smaller than normal, because of the position of the passenger or other factors, the airbag apparatus or side airbag apparatus can be made not to deploy. This system can be applied (use with) with the passenger detection system having a plurality of antenna electrodes shown in FIG. 58 or FIG. 67, it enables passenger detection including passenger loading, identification as well as sitting posture of the passenger.

Figure 69:
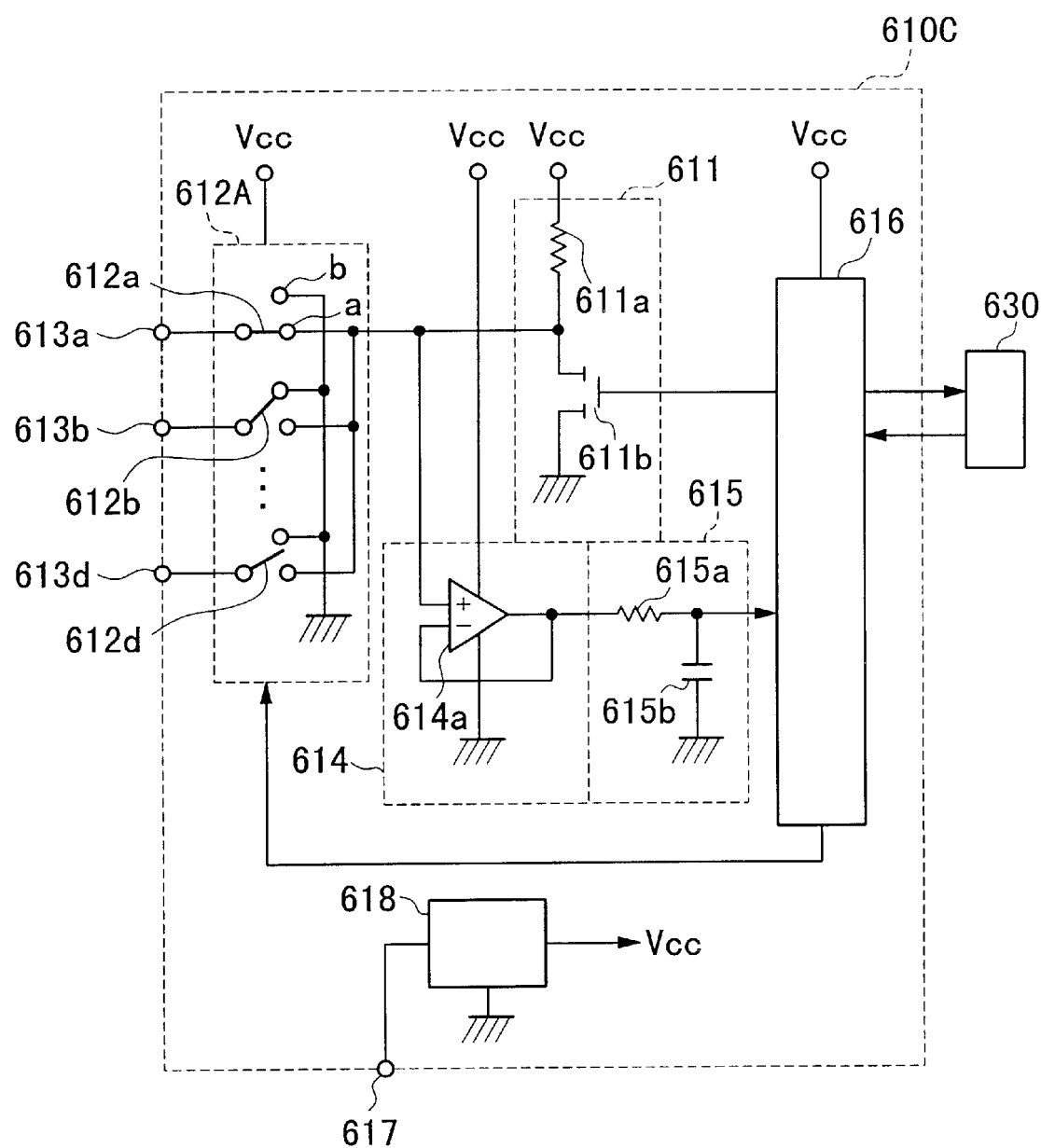
FIG. 69 is a block circuit diagram 610C of the passenger detection system.

FIG. 69 shows another embodiment of the passenger detection system. The control unit 610C is basically the same as that shown in FIG. 58. The differences are that one particular antenna electrode among a plurality of antenna electrodes 604 (604a~604d) serves as signal forwarding antenna electrode by connecting to the electric field generation device 611, and all other antenna electrodes can serve selectively as a signal receiving antenna electrode by adding a switching circuit 612A.

In this embodiment, one particular antenna electrode among a plurality of antenna electrodes 604 (604a~604d) can be suitably combined with other antenna electrodes to serve as signal forwarding/receiving electrode, and many such combinations are possible to increase the data volume so that precision and reliability for passenger detection are increased. Further, it is possible to carry out the function of the switching circuit 612 shown in FIG. 58 by suitably controlling the switching circuit 612A, and in such a system, data volume can be increased even further.

Figure 70:
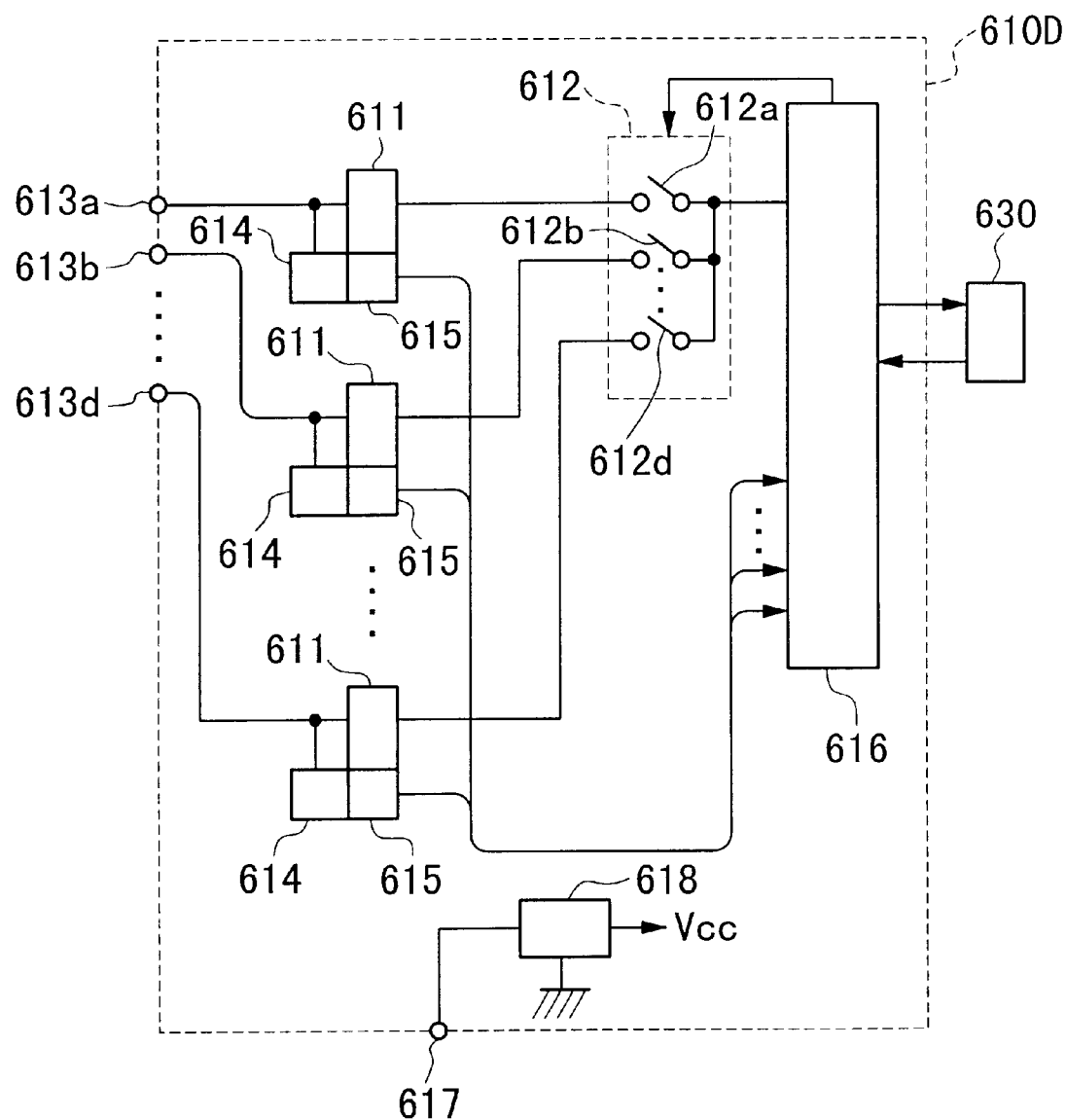
FIG. 70 is a block circuit diagram 610D of the passenger detection system.

FIG. 70 shows another embodiment of the passenger detection system. The control unit 610D is basically the same as that shown in FIG. 58. The differences are: switching circuit 612 is disposed between the control circuit 616 and the electric field generation device 611; as many electric field generation device 611, impedance conversion circuits 614, and ac-dc conversion circuits 615 are provided as are antenna electrodes 604 (604a~604d); the signal line (output line) for the electric field generation device 611 is connected directly to the antenna electrodes 604a~604d through the connectors (terminals) 613a~613d. In the diagram, connections of the power source Vcc to various components of the circuit are omitted. Also, although the control circuit 616 and switching devices 612a~612d in the switching circuit 612 are connected by one signal line, but individual lines may be provided.

In this embodiment, in addition to obtaining the same benefits as those provided by the system shown in FIG. 58, data from all the antenna electrodes can be obtained concurrently in the control circuit 616 so that the data volume is increased, and enables to detect grounding fault of any electrodes, for example, to improve precision and reliability of passenger sitting condition even more. For example, when an antenna electrode that is being impressed with HFLV signals is touching another antenna electrode that is not being impressed with HFLV signals, dc signals output from individual ac-dc conversion circuits 615 received in the control circuit 616 would show different levels than normal, thus alerting possible touching of electrodes. Also, when a particular antenna electrode is grounded, dc signal output from the ac-dc conversion device 615 would be at an abnormal level.

Especially, this embodiment can be applied to the systems shown in FIGS. 67, 69. For example, when applying to the system in FIG. 67, a switching circuit is provided between the electric field generation device 611A and the amplitude control circuit 612, and as many amplitude control circuits 619, impedance conversion circuit 614 and ac-dc conversion circuit 615 are provided as there are antenna electrodes 604 (604a~604d).

FIG. 71 shows another embodiment of the passenger detection system, which is basically the same as those shown in FIGS. 55~58. Difference is that the backrest section of 601b of the seat 601 is provided with a plurality of separate antenna electrodes 604 (604a~604d) but the sitting section 601b is not provided with any antenna electrode 604.

Figure 71A:
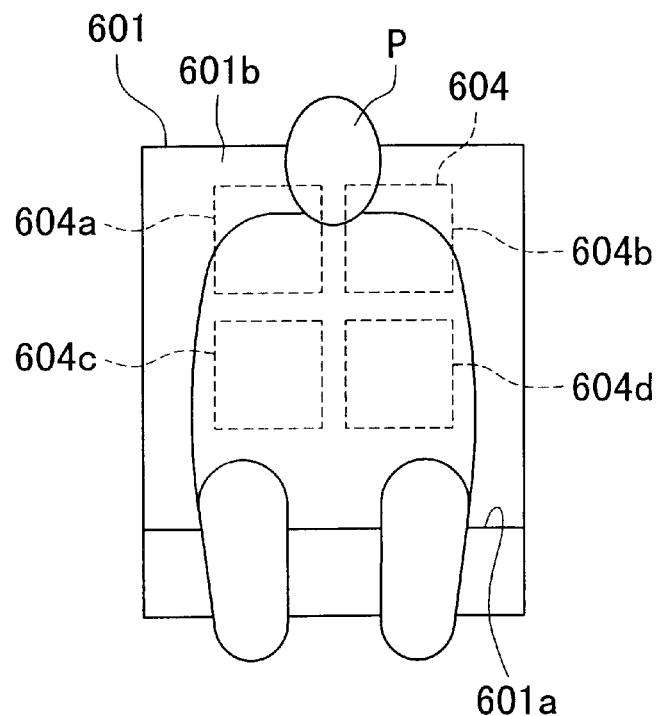
FIGS. 71A, 71B are diagrams of another arrangement of the antenna electrodes showing, respectively, a front view of an adult sitting; and a front view of a child sitting.
Figure 71B:
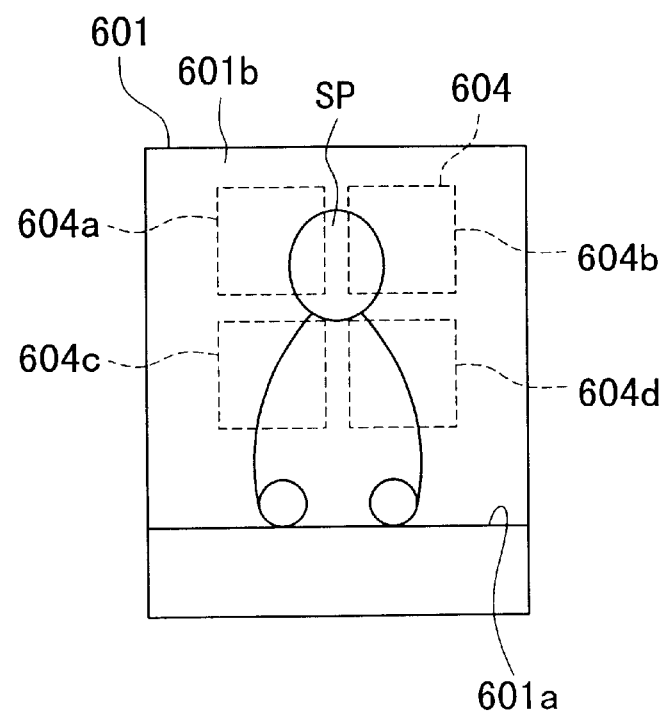

In this embodiment, as shown in FIG. 71A, when all the areas opposing the antenna electrodes 604a~604d are large, the capacitance components around the antenna electrode become high, resulting in rounding of the line voltage waveform and decrease in the dc output level from the ac-dc conversion circuit 615, and, according to the threshold values, it is judged that the passenger is an adult P. Also, as shown in FIG. 71B, when the opposing areas to individual antenna electrodes 604a~604d are small, the capacitance components around the antenna electrode become low, resulting in less rounding of the line voltage waveform and increase in the dc output level from the ac-dc conversion circuit 615, and, according to the threshold values, it is readily judged that the passenger is a child SP.

It should be noted that the present invention is not limited to the above embodiment and other arrangements are possible. For example, the number of antenna electrodes (antenna electrode section) may be adjusted suitably, and their shape can be rectangular or strip shape which are possible examples, and the antenna electrodes placed on the base member may be covered with an insulating cover member. Electric field generation device may produce HFLV signals by appropriate switching of clock signals in the control circuit, or by dividing the clock signal in the control circuit. The output frequency other than 120 KHz may be chosen depending on the conditions inside the car, and the voltage may be selected outside the range of 5 volts (3~20 volts for example). Also, the impedance conversion circuit may be omitted depending on the expected performance level of the system. Also, instead of the airbag apparatus, the control circuit may produce a warning light to indicate the seat belt wearing condition. Further, passenger evaluation methods include comparison of stored data related to the seating pattern and sitting posture of the passenger with the detected data, thereby judging the passenger seating condition including passenger loading, and whether the passenger is an adult or a child.

Embodiment 7

Figure 72A:
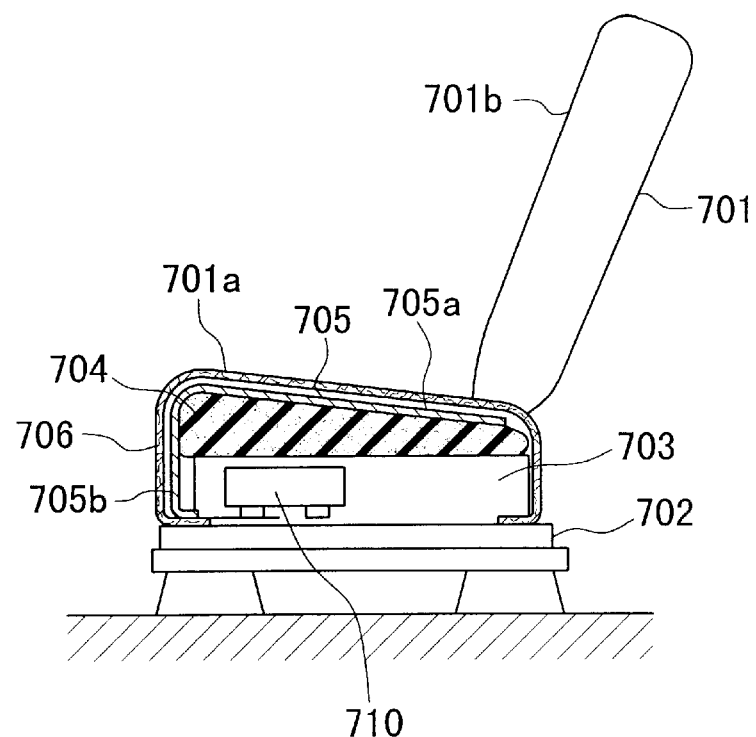
FIGS. 72A–72C are diagrams of an arrangement of the antenna electrodes on the seat, showing respectively: a cross sectional side view of key parts; a partial broken plan view of a section; and a plan view of an open antennae.
Figure 72B:
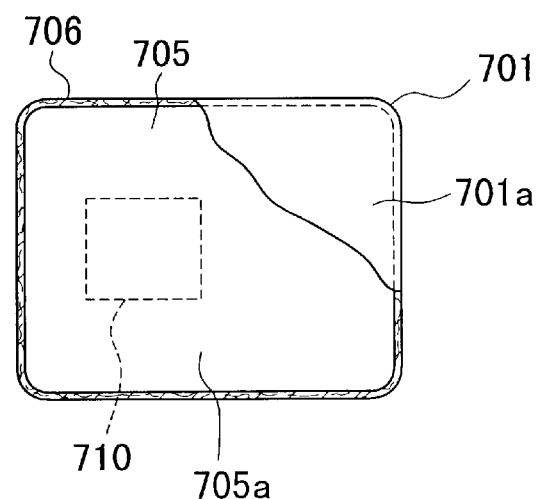
Figure 72C:
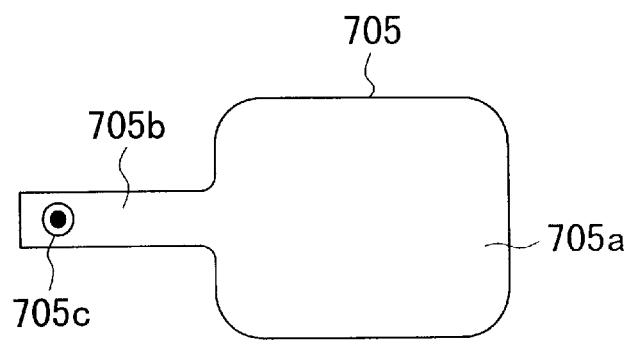
Figure 73:
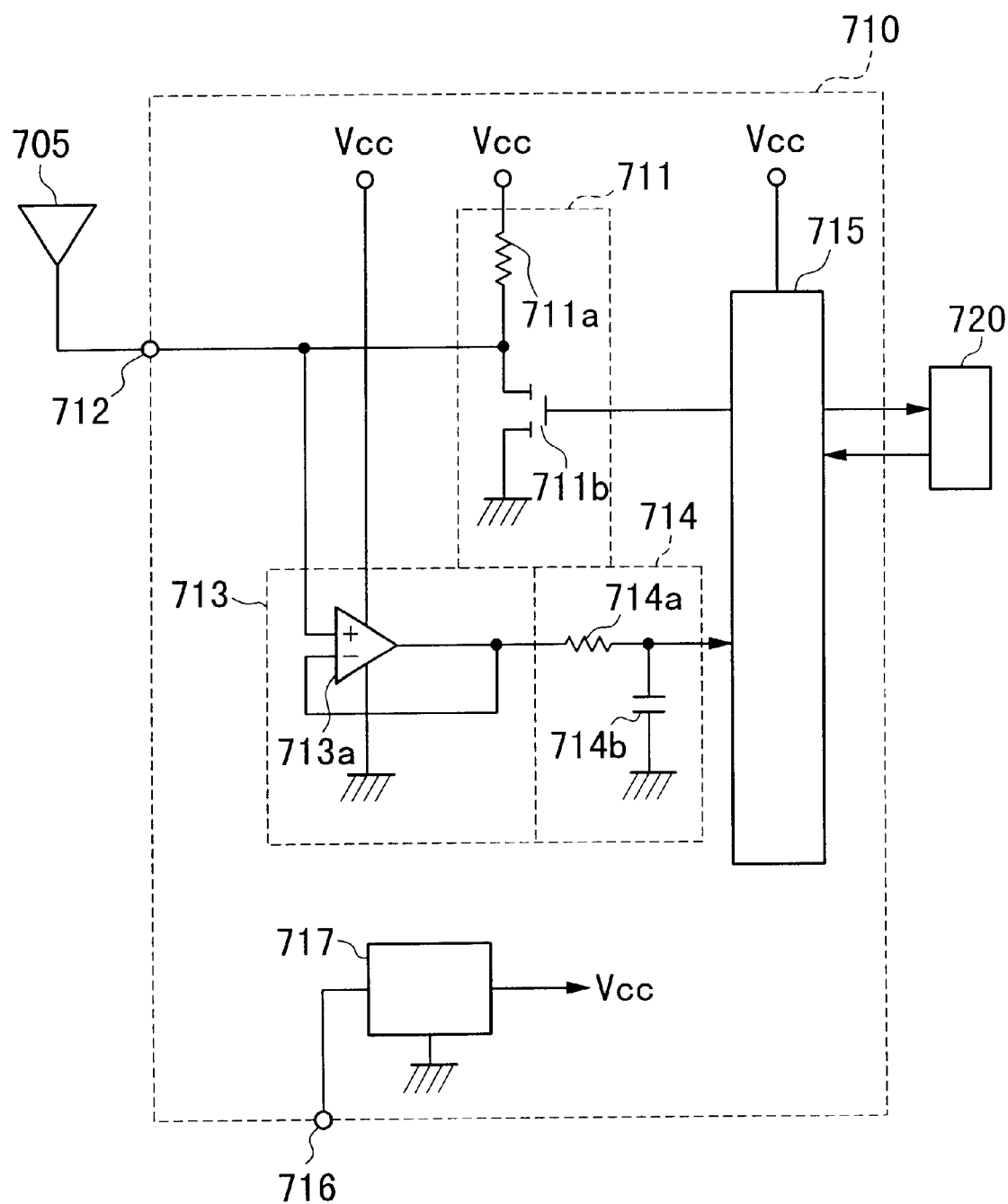
FIG. 73 is an electrical circuit diagram of the passenger detection system.
Figure 74:
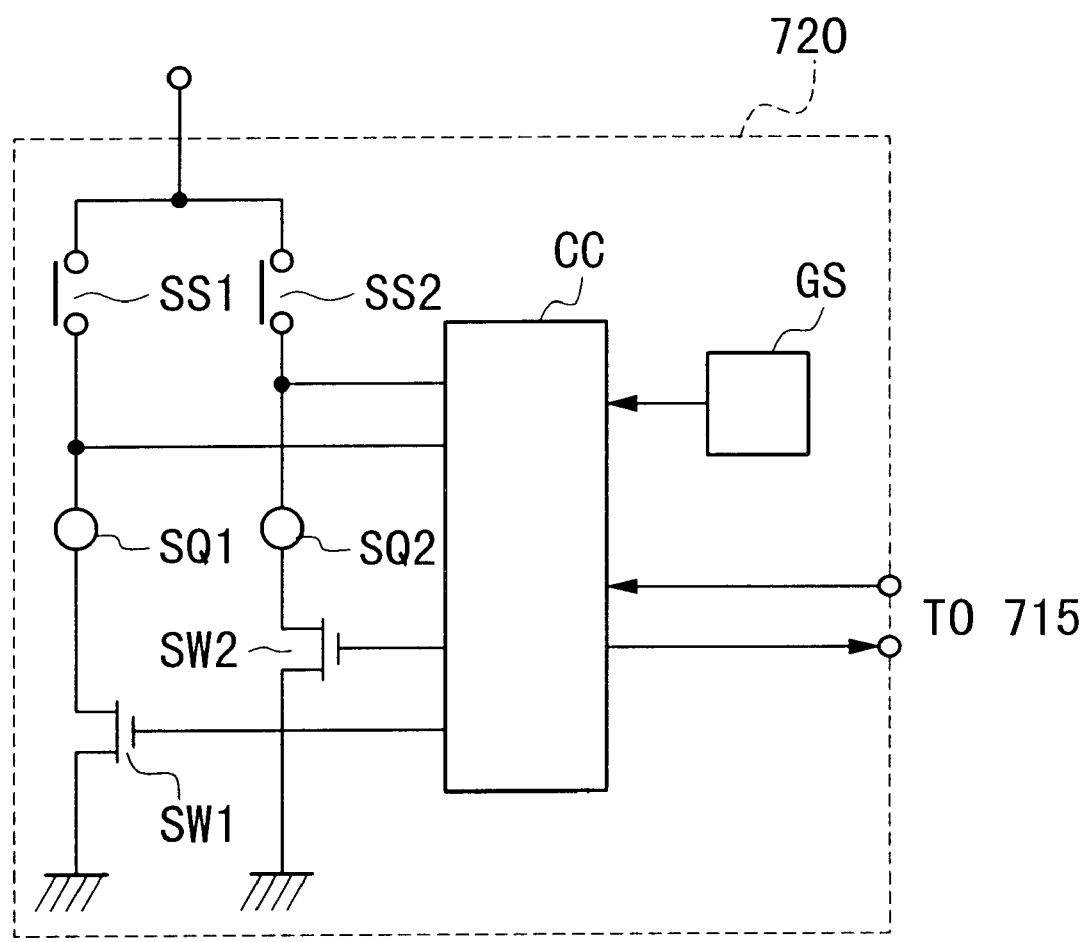
FIG. 74 is a circuit diagram of the airbag apparatus in the system shown in FIG. 73.

Next, some examples of the passenger detection system in Embodiment 7 will be presented with reference to FIGS. 72~74. This passenger detection system is based on detecting the true perturbation current related to passenger seating conditions by means of drift compensation. Accordingly, FIG. 72 shows a passenger (driver) seat, comprised primarily of a sitting section 701a and a backrest section 701b. The sitting section 701a includes a seat frame 703 fixed on a slidable base 702 slidable forward or backward, a cushion member 704 disposed above the seat frame 703, an antenna electrode 705 disposed over the entire surface of the sitting section 701a, and the outer covering 706 covering the antenna electrode 705. A control unit 710 is disposed on or in the vicinity of the seat frame 703.

The antenna electrode 705 is made of a conductive fabric in view of passenger comfort, but it may be made by weaving a metallic thread or a conductive fabric in the seat fabric or applying a conductive paint or disposing flexible metal strips. The antenna electrode 705 is comprised (refer to FIG. 72C) by an antennae section 705a covering almost the entire surface of the sitting section 701a, a conduction section 705b having a narrower width than the antennae section 705a and extending from a part of the antennae section 705a, and connector 705c providing the electrical connection to the output end of the conductor section 705b. The conduction section 705b is disposed so as to extend from the front of the cushion member 704 to the seat frame 703, and the connector at the output end is connected to the connector 712 of the control unit 710.

As shown in FIG. 73, the control unit 710 is comprised by, an electric field generation device (forward current generation section) 711 for generating weak electric field in the vicinity of the antenna electrode; a connector 712 connected to the signal line for forward signals output from the electric field generation device 711; an impedance conversion circuit 713 connected to the signal line for processing ac line voltages to be applied to the antenna electrode 705; an ac-dc conversion circuit (smoothing circuit) 714 for receiving and converting ac output signals (line voltage) from the impedance conversion circuit 713 to a dc voltage; a control circuit 715 including CPU, ac-dc conversion section, an external memory (for example, EEPROM, RAM); a connector 716 connected to the battery source (not shown) disposed in the housing; and an electric power circuit 717 connected to the connector 716. These components are contained in the same housing for the control unit 710, which is fixed to the seat frame 703 so as not to be exposed. An the airbag apparatus 720, shown in FIG. 74 for example, is connected to the control circuit 715 in the control unit 710.

Such an airbag apparatus 720 is comprised by: a driver-side squib circuit comprised by a series circuit including safety sensor SS1, squib SQ1, and a solid-state switching device SW1 such as field effect transistors; a passenger-side squib circuit comprised by a series circuit including safety sensor SS2, squib SQ2, and solid-state switching device SW2 such as field effect transistors; an electronic accelerometer (impact sensor) GS; and a control circuit CC having a function to judge an impact event on the basis of output signals from the sensor GS, and to supply signals to the gate circuits of switching devices SW1, SW2.

In the control unit 710, the electric field generation device 711 is comprised by a series resistor 711a and a switching device 711b, in a dc line of a positive constant dc voltage source Vcc in the power circuit 717, operated by the switching device (field-effect type transistors) 711b which is turned ON/OFF by a gate signal from the control circuit 715, so that HFLV signals of a rectangular waveform, are output from the drain to the antenna electrode 705 through the signal line and the connector 712. The characteristics of HFLV signal are determined by the pulse-width-modulated (PWM) gate signal output from the control circuit 715, and is designed to output at substantially 120 KHz. The duty ratio (ON-duty) of the gate signal is chosen at about 10%, but it may be changed depending on the circuit constant and operating frequency. The HFLV signals are output from the electric field generation device 711 to the signal line when the switching device 711b is off, and its duty ratio is about 90%.

In the control unit 710, the impedance conversion circuit 713 is comprised by op-amp having an amplification factor of 1, for example. Therefore, the output-side of the impedance conversion circuit 713 has a low impedance, and therefore, necessary current drain for operating CPU in the control circuit may be tolerated without affecting the performance on the input-side. The ac-dc conversion circuit 714 is connected to the output-side of the impedance conversion circuit 713, and is comprised by a smoothing circuit having a resistor 714a and a condenser 714b. The output-side of the ac-dc conversion circuit 714 is connected to the control circuit 715.

In the control unit 710, the electric power circuit 717 is designed to produces a singular power Vcc by adjusting the voltage form the battery power (12 volts) to singular dc voltage at 5 volts using a three-terminal regulator to simplify the circuit. The constant voltage Vcc produced by the power circuit 717 is supplied to all the elements in the control unit 710 requiring the electrical power. It is preferable that the Vcc source be the single voltage source but it is possible to select other voltage values.

The passenger detection system having the above structure operates in the following manner. First, the control circuit 715 periodically operates the switching device 711b by sending a gate signal shown in FIG. 75A. Whenever the gate signal becomes High, the switching device 711b is turned ON, and its drain is at the ground potential so that there is no output to the signal line. In this case, the current stored in capacitance around the antenna electrode 705 is discharged through the switching device 711b. On the other hand, whenever the gate signal becomes Low, the switching device 611b is turned OFF, and an output signal of rectangular waveform HFLV signals (120 KHz, +5 volts) shown in FIG. B is output to the signal line. The output signal is impressed on the antenna electrode 705 through the connector 712, and as a result, a weak electric field is generated in the vicinity of the antenna electrode 705. The result is a flow of perturbation current of different levels dependent on seating conditions of the passenger.

When the passenger seat 701 is vacant, a perturbation current flows at a low level governed by the stray capacitance existing around the antenna electrode 705. In this case, the rise time of the HFLV signal is rounded somewhat, as shown in FIG. 75B, depending on the RC time constant governed by stray capacitance component and the resistor 711*a*. On the other hand, when the passenger seat 701 is occupied, a larger stray capacitance is present in the vicinity of the antenna electrode 705, compared with the vacant seat, and a high level perturbation current flow in the electrode 705. Because the capacitance component produced by an adult is larger than that produced by a child, the level of perturbation current is higher. In this case, the rise time of the HFLV signal is exponential and is highly rounded by the influence of the RC time constant, as illustrated in FIG. 60C. The extent of rounding is affected by the size of the capacitance component, and is higher for an adult and lesser for a child.

HFLV signals (voltage waveform) are processed in the impedance conversion circuit (buffer circuit) 713 by the op-amp 714*a* at an amplification factor of 1, such that it may exhibit various waveforms depending on the RC time constant in the signal circuit including the electric field generation device 711 and the antenna electrode circuit line. Thus it is possible to obtain sufficient current for operating the control circuit 715 as necessary by making the input-side a high impedance and the output-side (ac-dc conversion circuitry) a low impedance. HFLV signals output from the impedance conversion circuit 713 are input in the ac-dc conversion circuit 714. Here, ac signal is leveled by the resistor 714*a* and the condenser 714*b* in the smoothing circuit, and is converted to a dc signal, as shown in FIG. 75D. In the drawing, dotted line represents dc current level in a vacant condition, and the solid line represents the same in an occupied condition, and the two levels are clearly distinguishable. The dc conversion level is dependent on the value of the capacitance component existing around the antenna electrode for a given value of resistor 711*a* in the RC time constant, so that it is high when an adult, which is a high capacitance object, is present while it is low when a child is present. The dc output current from the ac-dc conversion circuit 714 is successively input in the control circuit 715, and processed by A/D conversion and stored in memory.

Figure 76A:
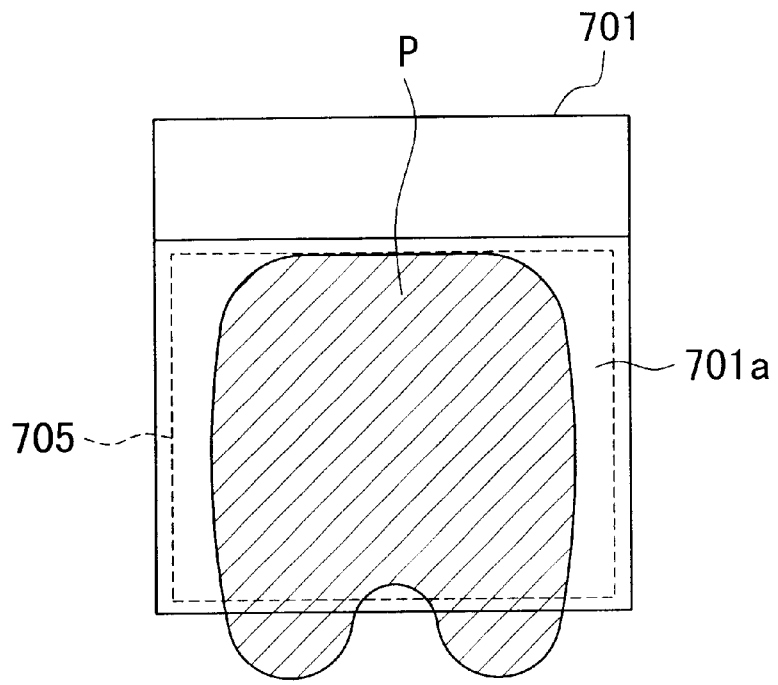
FIGS. 76A, 76B are diagrams to show, respectively, an adult seating condition and a child seating condition.
Figure 76B:
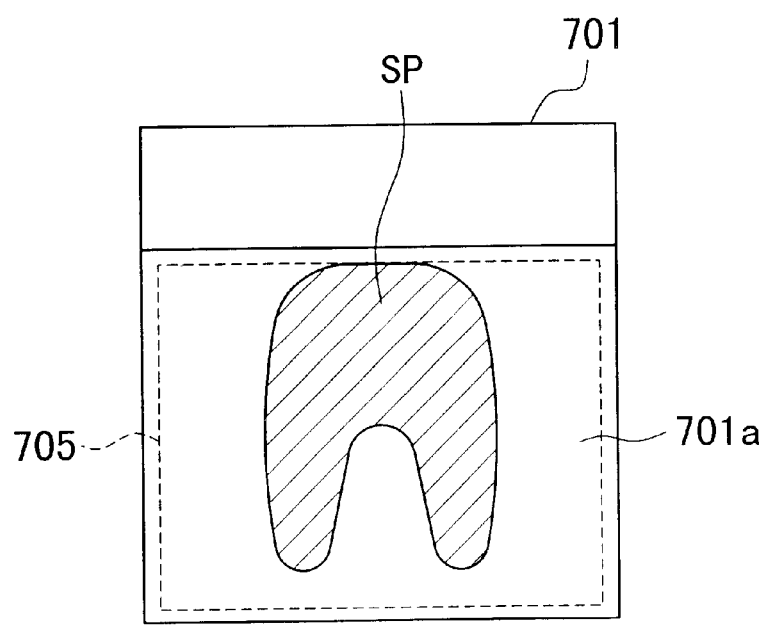

In the control circuit 715, reference data are already stored such as threshold values (threshold data) regarding the seating conditions (detect passenger loading, and identify adult/child). Specifically, passenger loading data are selected as follows. For example, as shown in FIGS. 76A, 76B, when an adult passenger P or a child passenger SP is seated on the seat 701, the areas opposing the individual antenna electrodes are different, and as a result, the capacitance components existing in the vicinity of the antenna electrodes are different, such that when an adult passenger P is seated, not only the capacitance level is higher than that when a child passenger SP is seated but the RC time constant is also affected such that the waveforms of the HFLV signals are different, and the dc current levels output from the ac-dc conversion circuit 714 are different. Therefore, a threshold value for detecting passenger loading is chosen to be a level midway between a dc level caused by a child passenger and the vacant dc level shown by dotted line in FIG. 75D. Thus, when dc output data is lower than this threshold value, it is assumed that a passenger is seated, and when it is higher than the threshold value, it is assumed that no one is seated.

Also, the threshold value regarding the passenger identity is selected as follows. For example, as shown in FIGS. 76A, 76B, when an adult passenger P or a child passenger SP is seated on the seat 701, the areas opposing the antenna electrode are different, and as a result, the capacitance components existing in the vicinity of the antenna electrode are different, such that when an adult passenger P is seated, not only the capacitance level is higher than that when a child passenger SP is seated but the RC time constant is also affected such that the waveforms of the HFLV signals are different, and the dc current levels output from the ac-dc conversion circuit 714 are different. Therefore, a threshold value for detecting the passenger loading is chosen to be a level midway between the adult and child dc levels. Thus, when the dc conversion data is lower than the threshold value, it is assumed that an adult is seated, and when it is higher than the threshold value, it is assumed that a child is seated.

Thus, signal data received by the control circuit 715 are compared against the threshold data stored in the control circuit 715, so that when the dc output from the ac-dc conversion circuit 615 is low due to the high current level in the antenna electrode 705 and is lower than the threshold value for passenger identity, it is assumed that the passenger sitting on seat 601 is an adult P, as illustrated in FIG. 76A. In such a case, the control circuit 616 places the airbag apparatus 720 shown in FIG. 74 in the deployable state by the signal from the control circuit 715. Conversely, when the dc output from the ac-dc conversion circuit 714 is high due to the low current level in the antenna electrode 705 and is higher than the threshold value for passenger identity, it is assumed that the passenger sitting on seat 701 is a child SP, as illustrated in FIG. 76B. In such a case, the control circuit 715 places the airbag apparatus 720 shown in FIG. 74 in the not-deployable state by the signal from the control circuit 715. This results in the airbag in the airbag apparatus 720 becomes not deployable by the signal from the control circuit 616.

When a collision occurs in this system, safety sensor SS1, SS2 are closed responding to a relatively minor acceleration, and the squib circuits on the driver-side and the passenger-side are placed in an operable state. And, when the control circuit CC judges that a collision has definitely taken place according to the signals from the accelerometer GS, signals corresponding to the judging results by the control circuit 715 are sent to the gates of switches SW1, SW2. That is, when the result of judging by the control circuit 715 is an adult P, the switches SW1, SW2 are turned ON, and when the result is a child, only the switch SW2 is turned OFF. These actions cause a current to flow in the squib circuit, and owing to the heat generated by the respective squib SQ1 and SQ2 or SQ1, the airbags on the driver side and passenger side or only the passenger side airbag is turned ON, and the occupants are protected from the impact.

The passenger detection system presented above is able to detect passenger seating conditions precisely so as to enable appropriate control of the airbag apparatus 720. Here, however, the properties of the components comprising the control unit 710, such as the electric field generation device 711, impedance conversion circuit 713, ac-dc conversion circuit 714, may show a drift due to self-heating or changes in environmental temperature.

For example, resistors and condensers may change their resistance value or charge capacity with rise in temperature, and switching elements such as semiconductors also behave similarly. Therefore, the signal level arising from the perturbation current in the antenna electrode 705 may also show a drift.

However, threshold data regarding the passenger seating conditions stored in the control circuit 715 remain constant regardless of temperature changes so that if the detected output level for the ac-dc conversion circuit 714 changes in the increasing direction, for example, and if it exceeds the threshold value, airbag may not be deployed upon collision even when an adult passenger P is seated in the passenger seat 701. Also, depending on the nature of the component material, if the detected output signal level from the ac-dc conversion circuit 714 changes in a decreasing direction and falls below the threshold value, the airbag may be deployed even when a child is seated in the passenger seat.

Therefore, it is necessary to ensure that regardless of temperature changes in the environment and changes in properties of components in the control unit, the system must be able to assess the passenger seating conditions must be correctly.

Figure 77A:
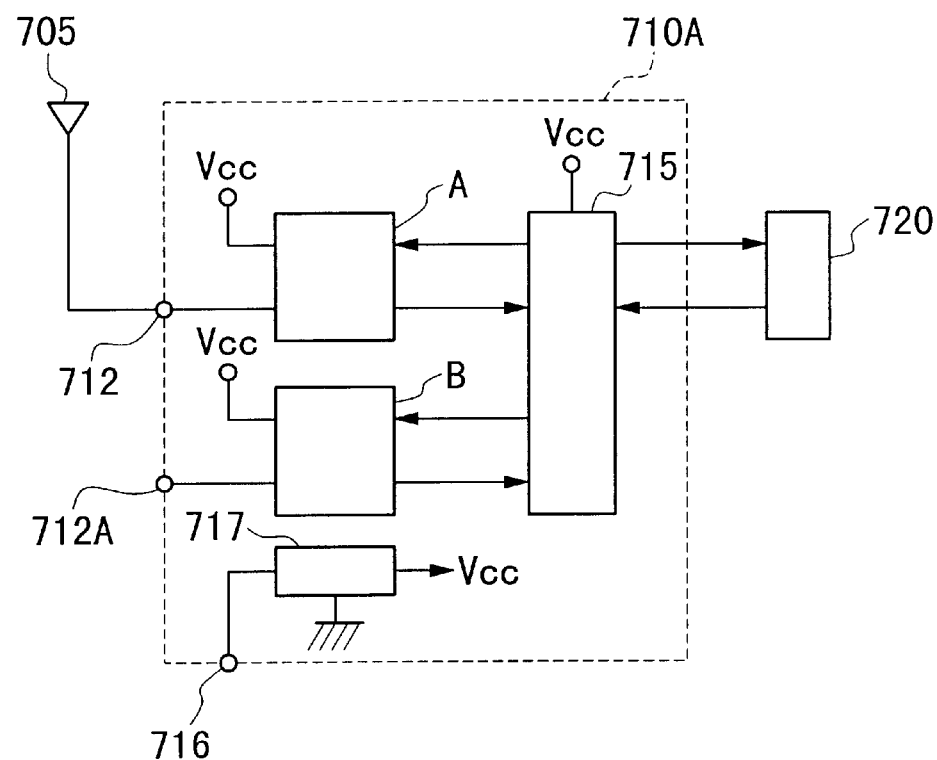
FIGS. 77A, 77B are circuit diagrams of the passenger detection system showing respectively: block circuit diagram; and a specific circuit diagram of an interface circuit.

The features of the system shown in FIG. 77 are as follows. Drift in signal output is corrected by the control circuit by correcting input data from an antennae interface circuit A that is associated with the antenna electrode 705 using data from a correction interface circuit B that is not associated with the antenna electrode 705. Interface circuit A and interface circuit B are configured in the same way, and while the antenna electrode 705 is connected to the electric field generation device 711 in interface circuit A, the antenna electrode 705 is not connected to the electric field generation device 711 in interface B, and it is left as open circuit.

In this passenger detection system, control unit 710A is comprised by: antennae interface circuit A; correction interface circuit B; control circuit 715; and power circuit 717, and antennae interface circuit A is connected to the antenna electrode 705 through the connector 712, and the correction interface circuit B is not connected to the antenna electrode 705, but is open circuited. The control unit 710A is connected to the airbag apparatus 720.

Figure 77B:
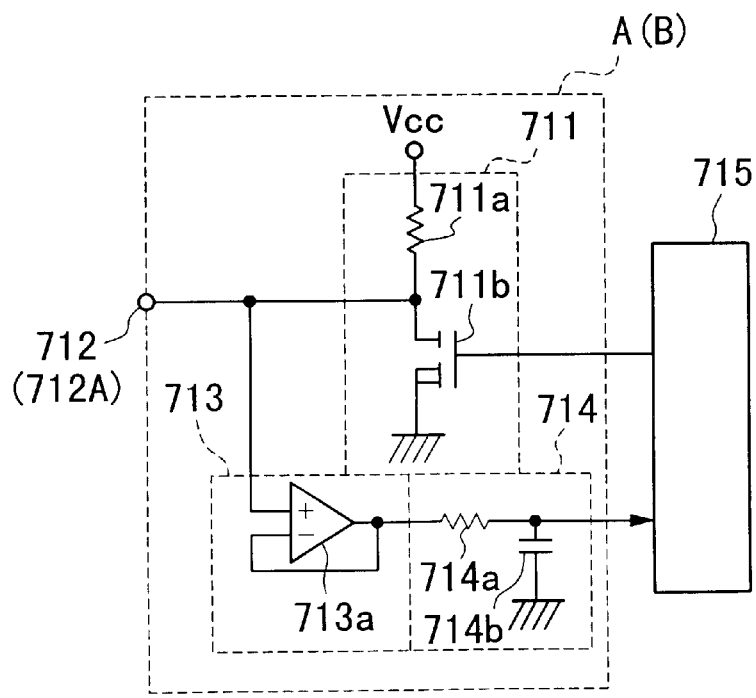

In the control circuit 710A, as shown in FIG. 77B, interface circuit A and interface circuit B are constructed in substantially the same way. These interface circuits include switching devices comprised by a resistor 711a and a switching device such as FET device, and is comprised by: an electric field generation device 711 operated by gate signal from the control circuit 715; an impedance conversion circuit (buffer circuit) 713 connected to high frequency signal output line of the electric field generation device 711; and an ac-dc conversion circuit 714 for converting output from the impedance conversion circuit 713 to dc signal and leveling the signal using the smoothing circuit comprised by resistor 714a and a capacitor 714b. The impedance conversion circuit 713 includes an op-amp 713a with an amplification factor of 1.

Figure 78:
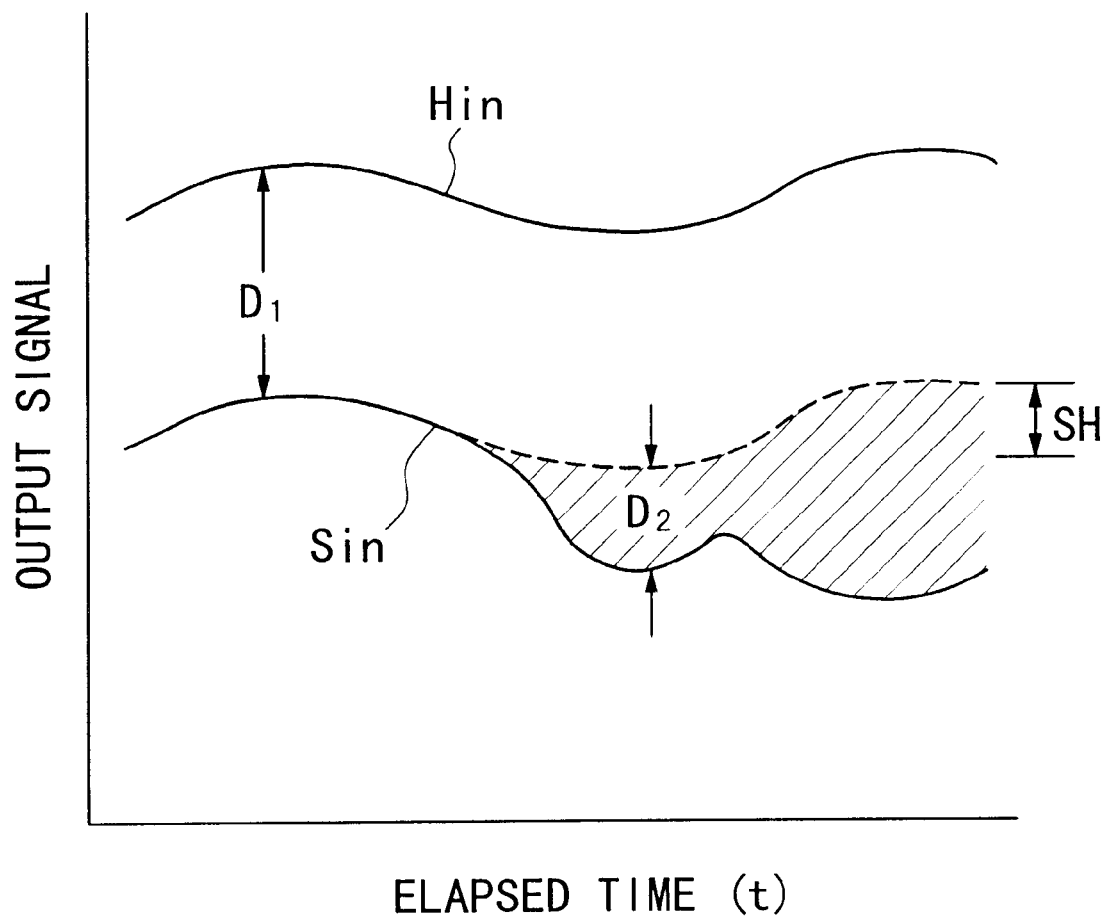
FIG. 78 is a graph of output signals from the interface circuit for antenna electrodes and correction shown in FIG. 77.

The operation of this system will be explained with reference to FIGS. 77~78. First, after turning the ignition switch, seat 701 is vacated. In this condition, gate signals such as the ones shown in FIG. 75A, are applied to the switching devices 711b of the electric field generation device 711 in the interface circuits A, B by the control circuit 715 so that the electric field generation devices 711 output substantially rectangular shape HFLV signals (120 KHz, +5 volts). Output signal in the antennae interface circuit A is impressed on the antenna electrode 705 through the signal line and connector 712, and a weak electric field is generated around the antenna electrode 705. As a result, a low level current flows caused by stray capacitance existing around the antenna electrode 705, and the line voltage in the forward line of the electric field generation device 711 exhibits a waveform showing FIG. 75B with slight rounding. On the other hand, because the forward line in the correction interface circuit B is open, line voltage in the electric field generation device 711 exhibits a waveform with even less rounding.

Each line voltage is input in the ac-dc conversion circuits through respective impedance conversion circuits 713, and is converted to respective dc current. A low level signal Sin is output from the ac-dc conversion circuit 714 in the antennae interface circuit A as shown by the dotted line in FIG. 78 and is received in the control circuit 715 and stored in memory. On the other hand, a low level signal Hin that is higher than Sin is output from the ac-dc conversion circuit 714 in the correction interface circuit B as shown by the solid line in FIG. 78 and is stored in memory. It is considered that, although Sin, Hin both change with time as a result of drifting, because both circuit configurations are the same, the same levels of drift are being experienced in both interface circuits A, B. Therefore, the differential $D_1$ remains always constant. The difference $D_1$ is calculated as Hin-Sin.

Next, when a passenger is seated in seat 701, a larger capacitance component is generated compared to the stray capacitance in the vacant state, and a high level loaded current flows in the electrode 705. Therefore, there is large rounding effects on the waveform of the electric field generation device 711 as shown in FIG. 75C. Therefore, a low level output signal Sin such as the one shown by the dotted envelope in FIG. 78 is output from the antennae interface circuit A. This output signal Sin is dependent on the passenger seating conditions. The differential signal $D_2$ between the loaded state current signal and vacant state current signal Sin represents the amount of correction to be applied to the vacant state output current signal Sin. The differential $D_2$ is calculated according to a relation Hin−(Sin+$D_1$).

In the control circuit 715, threshold values of the differential $D_2$ is stored for the passenger seating conditions. For example, the threshold value SH for passenger identity is related to the differential $D_2$ so that when the differential $D_2$ is higher than the threshold value SH, the passenger is judged to be an adult, and when the differential $D_2$ is less than the threshold value SH, the passenger is judged to be a child.

Therefore, the differential $D_2$ calculated according to the passenger seating conditions received in the control circuit 715 is compared with the threshold values SH on the passenger seating conditions stored in the control circuit 715. For example, as shown in FIG. 76A, when the opposing area to the antenna electrode 705 are large, and the perturbation current level is high, the dc output current from the ac-dc conversion circuit 714 is low, and the differential $D_2$ is large. Therefore, when the differential $D_2$ is higher than the threshold value SH, the passenger seated in seat 701 is judged to be an adult. The result is that the airbag apparatus shown in FIG. 74 is placed, by the forward signal from the control circuit 715, in the deployable state. Conversely, as shown in FIG. 76B, when the opposing area to the antenna electrode 705 are small, and the perturbation current level is low, the dc output current from the ac-dc conversion circuit 714 is high, and the differential $D_2$ is small. Therefore, when the differential $D_2$ is lower than the threshold value SH, the passenger seated in seat 701 is judged to be a child SP. The result is that the airbag apparatus shown in FIG. 74 is placed, by the forward signal from the control circuit 715, in the not-deployable state.

When a collision occurs in this system, safety sensor SS1, SS2 are closed responding to a relatively minor acceleration, and the squib circuits on the driver-side and the passenger-side are placed in an operable state. And, when the control circuit CC judges that a collision has definitely taken place according to the signals from the accelerometer GS, signals corresponding to the judging results by the control circuit 715 are sent to the gates of switches SW1, SW2. That is, when the result of judging by the control circuit 715 is an adult P, the switches SW1, SW2 are turned ON, and when the result is a child, only the switch SW2 is turned OFF. These actions cause a current to flow in the squib circuit, and owing to the heat generated by the respective squib SQ1 and SQ2 or SQ1, the airbags on the driver side and the passenger side or only the driver side airbag is turned ON, and the occupants are protected from the impact.

Figure 79:
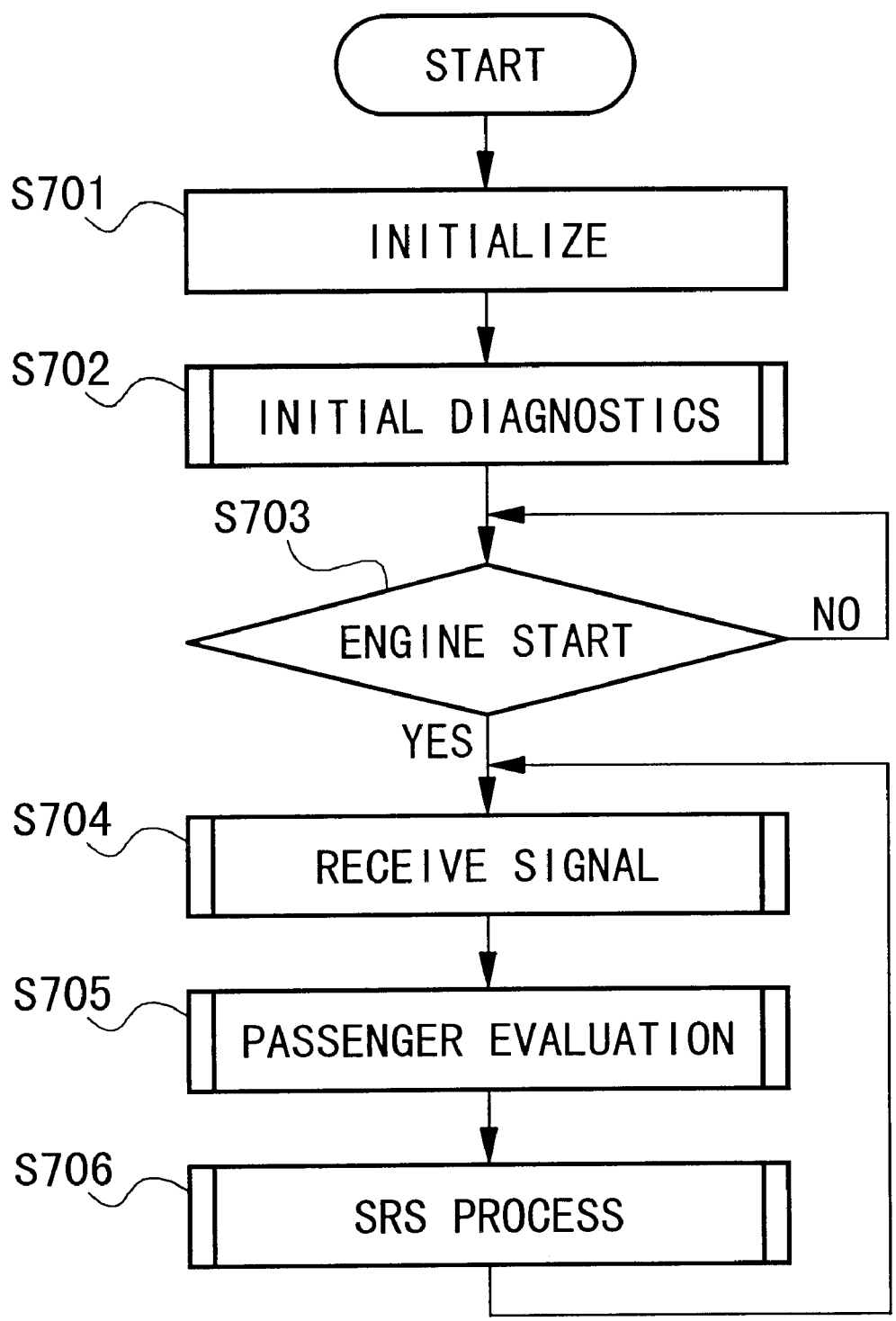
FIG. 79 is a flowchart for the process of detecting a passenger using the passenger detection system.

The process of operation of the passenger detection system will be explained with reference to the overall flowchart shown in FIG. 79. FIGS. 80–83 show steps in sub-processes. First, as shown in FIG. 79, the ignition circuit is turned on so that the process is in START. In step S701, the program is initialized, and proceeds to step S702. In step S702, initial diagnostics are performed for communication between the control circuit 715 and the airbag apparatus 720. In step S703, it examines whether the engine is operating, and if it is judged that the engine is operating, it proceeds to step S704. If it is judged that the engine is not operating, the program is shutoff. In step S704, signal data on ac-dc conversion for the antennae interface circuit A and correction interface circuit B are received in the control circuit 715. In step S705, based on the received data, data correction are performed, and passenger seating conditions are judged according to the corrected data. In step S706, SRS process is carried out between the control circuit 715 and the airbag apparatus (SRS) 720. When step S706 is completed, it returns to step S704 and repeats the steps S704 to S706. Step S703 may be omitted.

Figure 80:
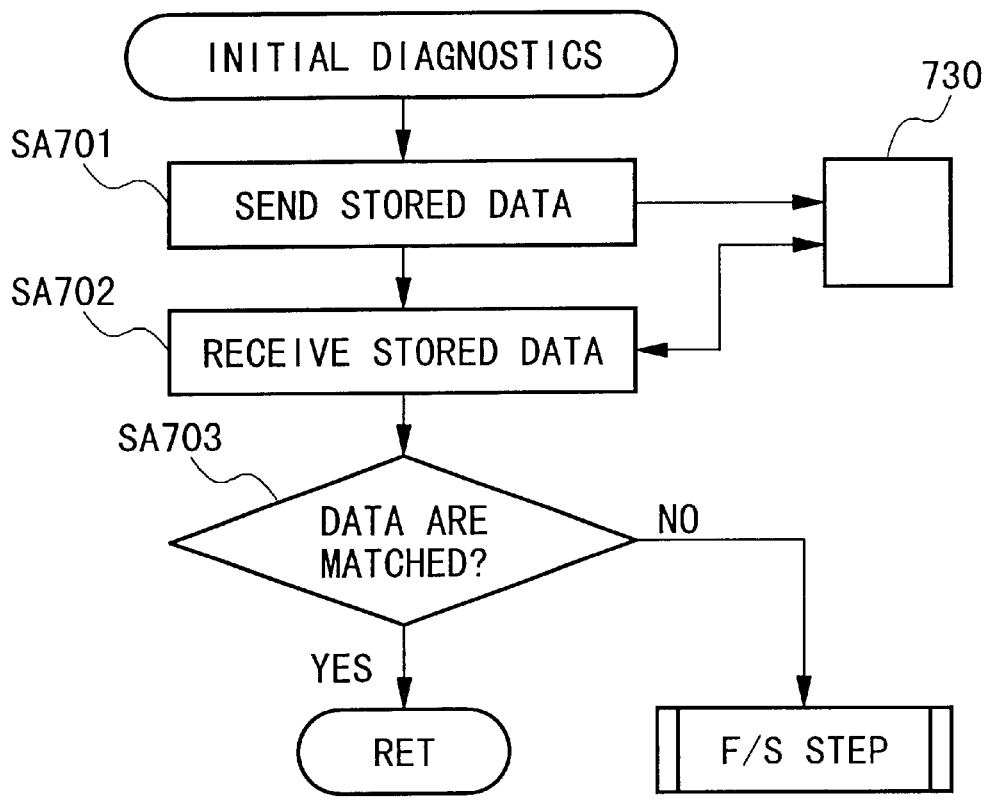
FIG. 80 is a flowchart for the initial process of passenger detection shown in FIG. 79.

Initial diagnostics in FIG. 79 are carried out as outlined in FIG. 80. First, in step SA701, stored data are sent from the control circuit 715 to the control circuit CC in the airbag apparatus 720. In step SA702, passenger data are received from the airbag apparatus 720. In step SA703, it is examined whether the received data from the airbag apparatus 720 match the stored data. If it is judged that the data are matched. the process is continued. If the data do not match, it is judged that problems exist in the corn circuit and fail-safe process is carried out and alert lamp is turned on, for example. The initial diagnostics may be carried out by sending the stored data from the airbag apparatus 720 to the control circuit 715 so that matching process can be carried out in the control circuit CC in the airbag apparatus 720.

Figure 81:
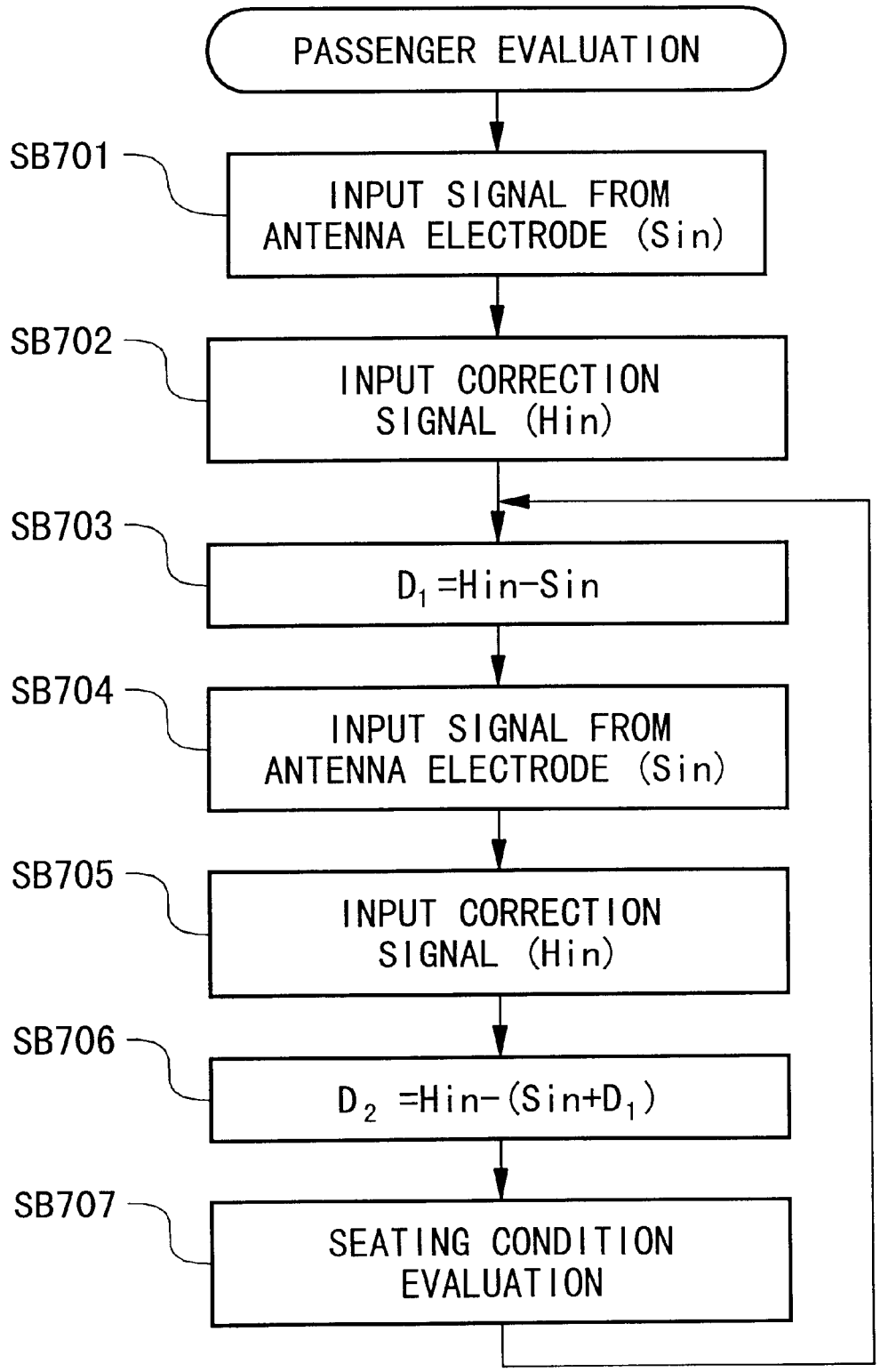
FIG. 81 is a flowchart for the signal receiving process shown in FIG. 79.

The passenger evaluation process is carried out as outlined in FIG. 81. First, in step SB701, in the vacant state, dc current signal Sin output from the antennae interface circuit A (ac-dc conversion circuit 714 for impressing current on the antenna electrode 705) is stored in memory in the control circuit 715, and it proceeds to step SB702. In step SB702, in the vacant state, dc current signal Hin output from the antennae interface circuit B is stored in memory in the control circuit 715, and it proceeds to step SB703. In step SB703, differential $D_1$ (=Hin−Sin) is calculated using signals Sin, Hin from interfaces A, B, respectively, retrieved from memory, and the result is stored in memory, and it proceeds to SB704. In step SB704, in measuring state, output signal Sin from the interface A is stored in memory.

In step SB705, in measuring state, output signal Hin from the interface B is stored in memory, and it proceeds to step SB706. In step SB706, differential $D_2$ (=Hin−(Sin+$D_1$)) is calculated using signals Sin, Hin from interfaces A, B, respectively, retrieved from memory, and the result is stored in memory, and it proceeds to SB707. In step SB707, passenger seating conditions are judged based on differential $D_2$, and it returns to step SB703.

Figure 82:
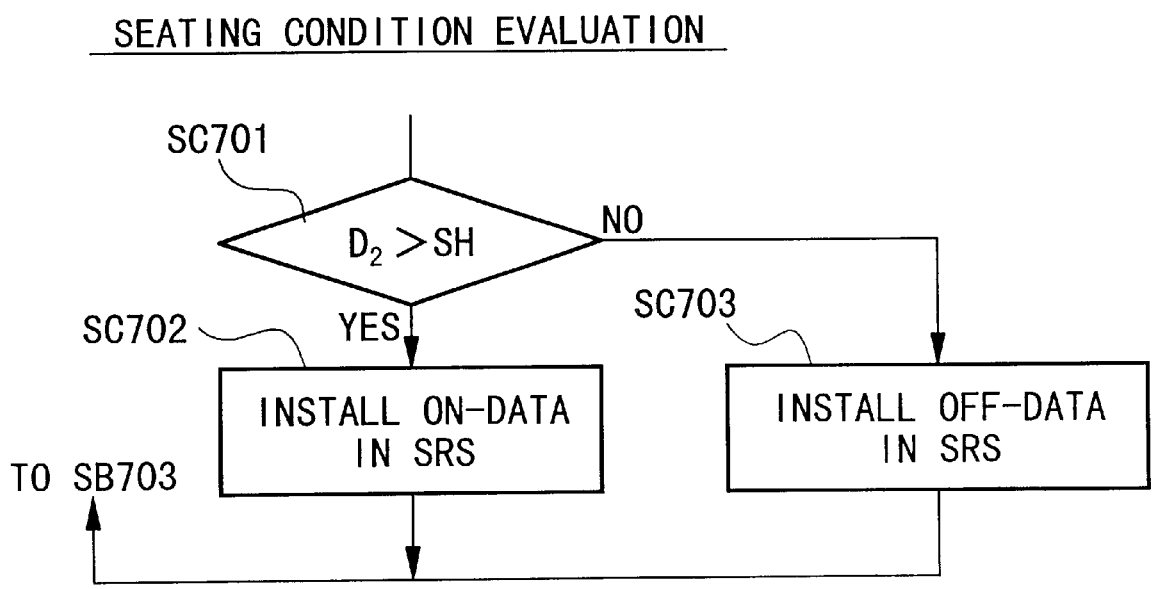
FIG. 82 is a flowchart for the passenger evaluation process shown in FIG. 79.

The passenger evaluation process is carried out as outlined in FIG. 82. First, in step SC701, threshold values SH are compared with $D_2$ to decide whether the measured $D_2$ is higher than the threshold values. If the measured signal data are higher than the threshold values SH, it proceeds to step SC702, and if it is judged that the signal data are not higher, it proceeds to step SC703. In step SC702, the passenger sitting on the seat is judged to be an adult, so that ON-data for placing the airbag apparatus 720 in the deployable state are entered in the SRS process. In step SC703, the passenger sitting on the seat is judged to be a child, so that OFF-data for not deploying the airbag apparatus 720 are entered in the SRS process.

The SRS process in FIG. 79 is carried out as outlined in FIG. 83. First, in step SD701, ON-data for placing the airbag apparatus in the deployable state or OFF-data for placing the airbag apparatus in the not-deployable state and system check-data are sent from the passenger detection unit circuitry (control circuit 715) to the airbag apparatus circuitry (control circuit CC). In step SD702, OK-data or NG-data in response to the ON-data and OFF-data and system check-data from the airbag apparatus are received by the control circuit 715, and it proceeds to step SD703. In step SD703, it is judged whether the ON-/OFF-data and system check-data, sent from the passenger detection side to the airbag apparatus circuitry, are again returned from the airbag apparatus circuitry to the passenger detection side in the normal condition. If it is judged to be normal (no problems in corn circuit), the process is continued. If there is a problem in the corn circuit, it proceeds to step SD704, and it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SD5, and fail-safe timer count is performed, and the process is continued.

On the other hand, in step SE701, the airbag apparatus circuitry (control circuit CC) receives ON-data for placing the airbag apparatus in the deployable state or OFF-data for placing the airbag apparatus in the not-deployable state and system check-data from the passenger detection unit circuitry (control circuit 715). In step SE702, the received data are checked to examine whether or not they are normal. In either case, it proceeds to step SE703 for sending OK-data or NG-data and system check-data to the passenger detection unit circuitry. If it is judged, in step SE702, that the signal circuit is normal, OK-data are sent in step SE703, and it proceeds to step SE704. In step SE704, the data on the airbag side is renewed in response to the OK-data, thereby enabling to place the airbag in the deployable state or not-deployable state. If, in step SE702, it is judged that there is a problem in the corn circuit, NG-data are sent to the control circuit 22 in step SE703, and it proceeds to step SE705. In step SE705, it is examined whether the fail-safe timer is at zero. This detection process of circuit problems is programmed to repeat three times. Therefore, if it is judged that the fail-safe timer is zero, fail-safe process is carried out, and a warning lamp is activated, for example. If it is judged that the fail-safe timer is not at zero, it proceeds to step SE706, and fail-safe timer count is performed, and the process is continued.

In this system, an antennae interface circuit A and a correction interface circuit B of substantially the same circuit configuration are provided in the control circuit 710, and the antenna electrode 705 is connected to the electric field generation device 711 in the interface circuit A while the electric field generation device 711 in the interface circuit B is not connected to the antenna electrode 705 and remain open circuited, therefore, the output signals Sin, Hin output from the respective interface circuits A, B contain the same levels of drift contribution. Therefore, by computing the differential $D_1$ between the output signals Sin, Hin, it is possible to eliminate the respective drift in each circuit.

In addition, it is possible to derive essentially true signal data $D_2$ (=Hin−(Sin+$D_1$)) from the output signals Sin, Hin. Therefore, even is the output signals from the antennae interface circuit A are affected over time by thermal effects, passenger seating conditions can always be determined according to correct information data. In other words, the system enables to avoid misdiagnose passenger seating conditions such that even though an adult is seated on seat 701, erroneous judgment is made such that a child is seated on seat 701.

Also, in the interface circuit A, because the an ac-dc conversion circuit 714 is connected to the signal line for outputting HFLV signals from the electric field generation device 711 through the impedance conversion circuit 713, the line voltage related to perturbation current flowing in the antenna electrode 705 can be received through the signal line and converted to dc data, which is used to judge the passenger seating conditions.

Also, because the impedance conversion circuit 713 is connected between the signal line and the ac-dc conversion circuit 714, the output-side has low impedance and the control circuit 714 can drain current from the dc output from the ac-dc conversion circuit 714 without affecting the measurements in the signal line. Therefore, precision evaluation of the passenger seating conditions can be performed.

Also, because the capacitance component existing around the antenna electrode 705 is affected by the passenger seating conditions, therefore, by adjusting the RC time constant of the signal line circuit, it is possible to generate differences in rounding of the rise time of the HFLV signal to be impressed on the antenna electrode 705. Therefore, the difference in the output waveform from the antenna electrode 705 can be converted to dc data in the ac-dc conversion circuit 714 to obtain data to indicate the passenger seating conditions.

Also, HFLV signals to be impressed on the antenna electrode 705 are produced by the electric field generation device 711 which is controlled by a singular power source Vcc, generated by switching the gate signal of the switching circuit 711b, therefore, compared to the oscillation circuit which performs waveform shaping after the conversion process, the circuit configuration is much simpler and more cost effective.

Further, the airbag in the airbag apparatus 720 is able to be made either deployable or not deployable, depending on the judgment of the system on whether the passenger is an adult or a child. For example, if it is judged that the passenger is a child based on the level of dc output from the ac-dc conversion circuit 714, the airbag in the airbag apparatus 30 is placed in a non-deployable state. Therefore, even if the car collides, the airbag is not opened and the child is prevented from suffering secondary injuries.

Figure 84:
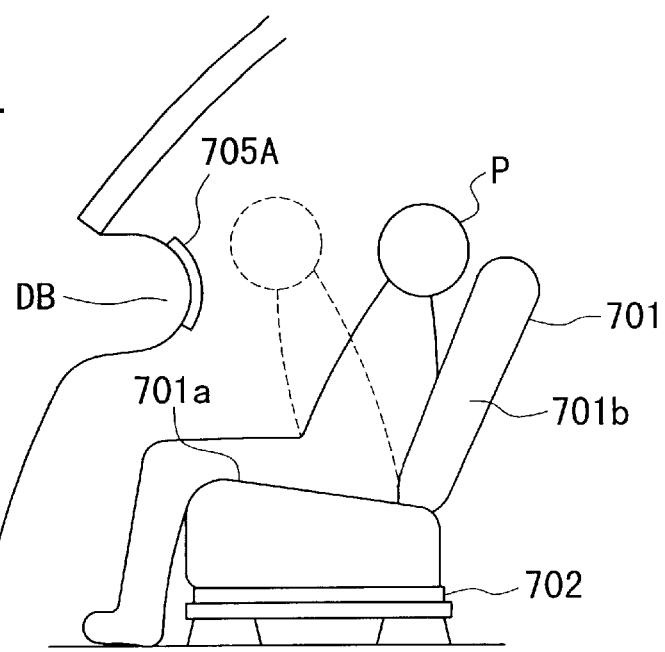
FIG. 84 is a schematic side view of another embodiment of the passenger detection system.

FIG. 84 shows another embodiment of the passenger detection system, which is basically the same as that shown in FIG. 77. Difference is that the antenna electrode 705A is disposed on the dashboard section DB. Here, the control unit is not shown but is disposed in the dashboard section DB.

In this system, when the passenger P is too close to the dashboard section DB (antenna electrode 705A), as illustrated by the dotted line in FIG. 84, perturbation current in the antenna electrode 705A increases, and the system detects that the passenger is too close and places the airbag in the not-deployable state. Drift in the detected results caused by thermal effects is negated by adopting a correction interface circuit so that the position of the passenger can be detected precisely at all times.

Figure 85:
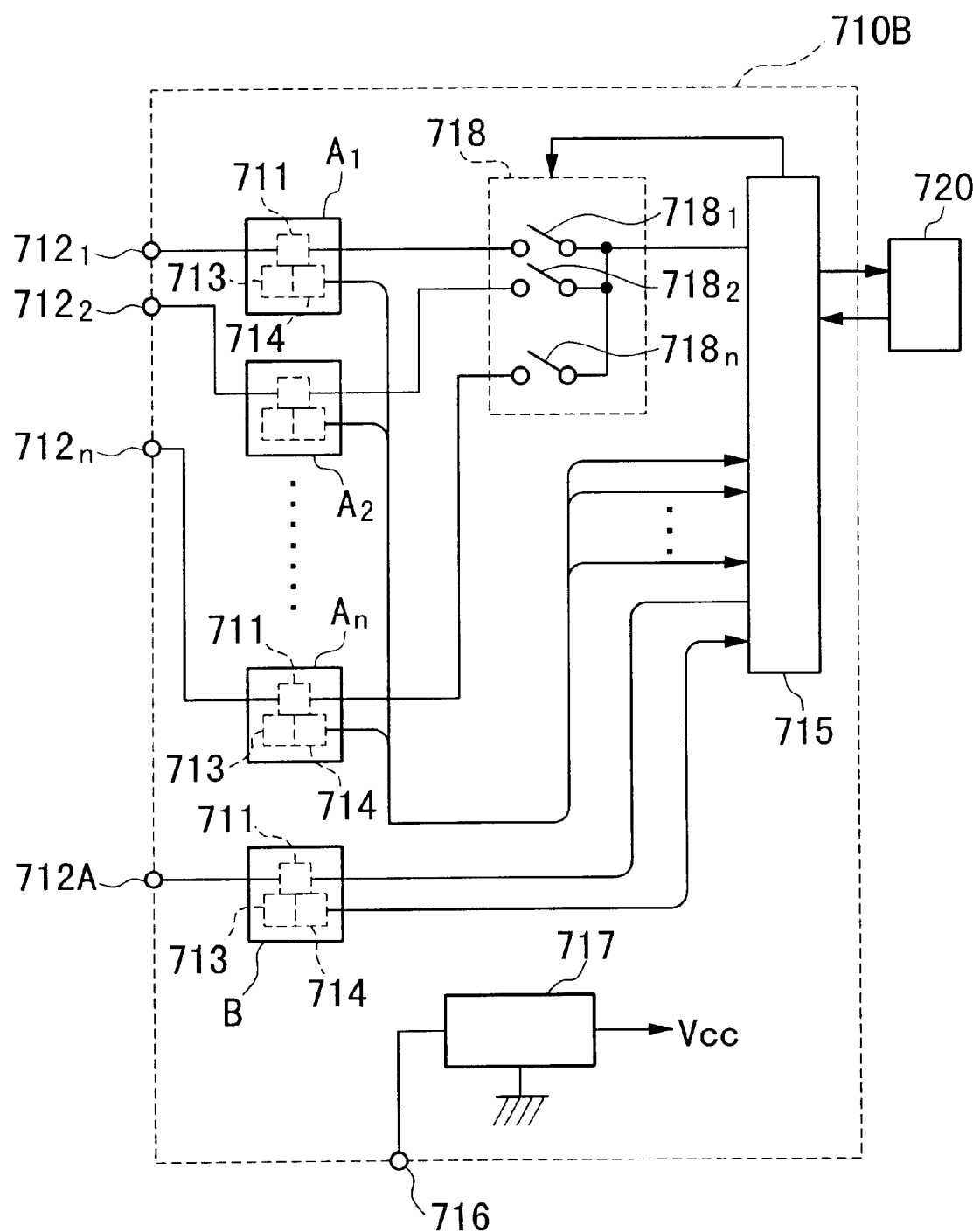
FIG. 85 is an electrical circuit diagram for the system shown in FIG. 84.

FIG. 85 shows another embodiment of the passenger detection system, and the control unit 710 is basically the same as that in the system shown in FIG. 77. Differences are that a plurality of antenna electrodes are disposed on the seat 701, a plurality of antennae interface circuits $A_1$~$A_n$ and a switching circuit 715 having a plurality of switching devices $718_1$~$718_n$ are disposed between these interface circuits and the control circuit 715. The switching actions of the switching devices $718_1$~$718_n$ in the switching circuit 718 are controlled by the signals from the control circuit 715.

These interface circuits $A_1$~$A_n$ are constructed substantially in the same way as the correction interface circuit B, and is comprised by the electric field generation device 711, the impedance conversion circuit 713 and the ac-dc conversion circuit 714. Individual antenna electrodes are connected to the interface circuits $A_1$~$A_n$ through the connectors $712_1$~$712_n$, and the interface circuit B is not connected to the antenna electrode 705A but is open circuited.

In this system, because a plurality of antenna electrodes are disposed on the seat 701 and individual interface circuits $A_1$~$A_n$ are provided for individual antenna electrodes in the control circuit B, the volume of data output from the interface circuits $A_1$~$A_n$ is much increased so that the passenger seating conditions can be assessed much more precisely. Here, regardless of the number of interface circuits A1~An, only one correction interface circuit B is needed, thereby avoiding congestion of circuits.

Figure 86:
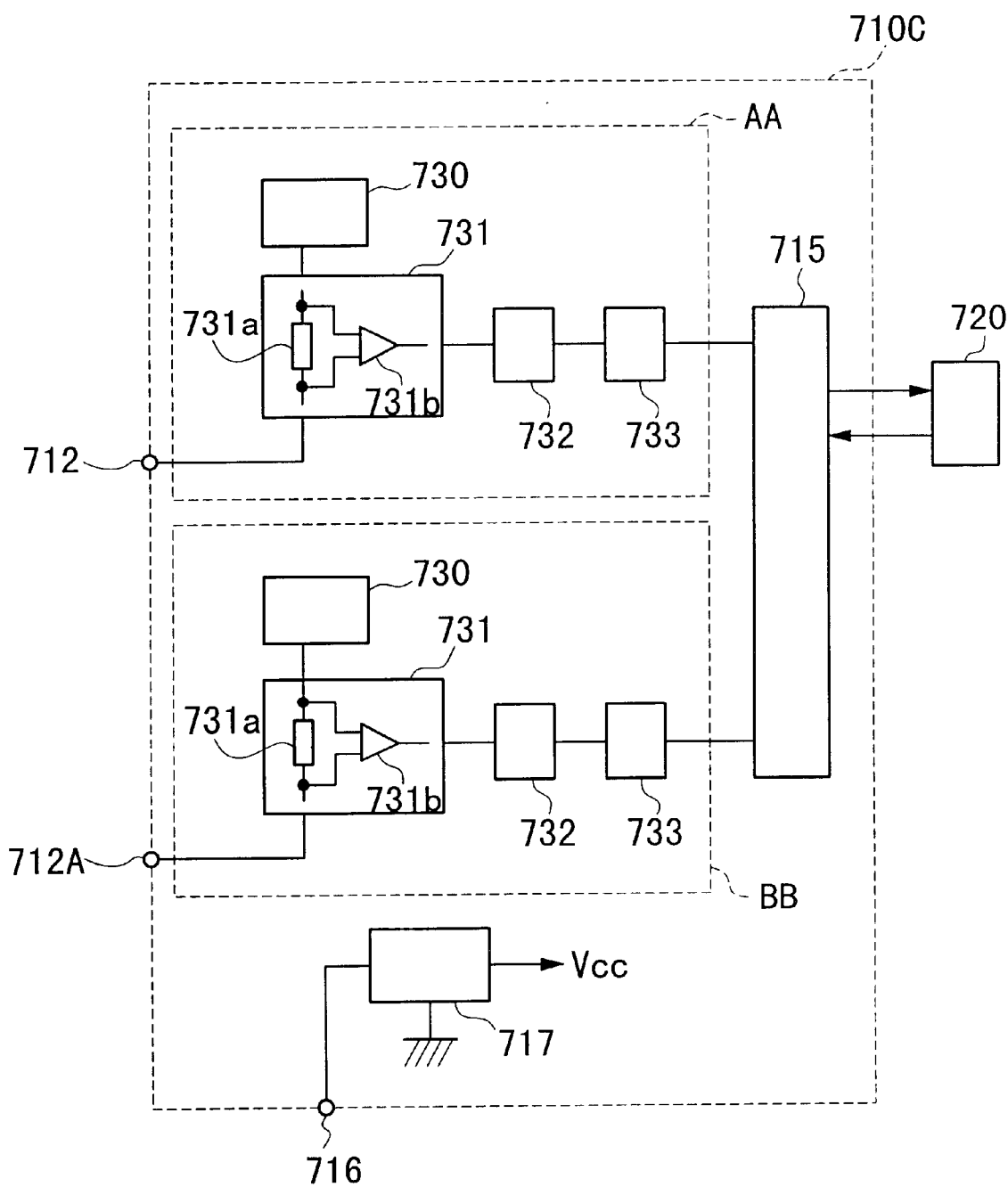
FIG. 86 is a block circuit diagram for the system shown in FIG. 84.

FIG. 86 shows another embodiment of the passenger detection system. In this system, the antennae interface circuit in the control unit 710C is comprised by an antennae interface circuit AA and a correction interface circuit BB. The antenna electrode is connected is connected to the antennae interface circuit AA through the connector 712, and the correction interface BB is not connected to the antenna electrode, and is open circuited.

These interface circuits AA (BB) are comprised by: an electric field generation device 730; current detection circuit 731 for detecting the current flowing in the signal line of the electric field generation device 730; an ac-dc conversion circuit 732 for converting the output signal from the current detection circuit 731 to dc; and an amplifier for amplifying the output signal from the ac-dc conversion circuit 732. The electric field generation device 730 is the same as the device 711 in FIG. 77, but it may be served by an oscillation circuit. Also, the current detection circuit 731 includes a resistor 731a for converting current to voltage and an amplifier 731b for amplifying the voltage generated by the resistor 713a. Here, output signals from the amplifiers 733 in interface circuits AA, BB are entered in the control circuit 715.

In this system, when the electric field generation device 730 impresses a current flow in the antenna electrode through the current detection circuit 731, a voltage is generated at the ends of the resistor 731a corresponding to the current. This voltage is converted to a dc signal in the ac-dc conversion circuit 732, amplified in the amplifier 733 and is entered in the control circuit 715. In the meantime, output signals from the interfaces AA, BB are also entered in the control circuit 715. In this case, however, the respective signals Sin, Hin are different than those shown in FIGS. 77, 85, and the signal level of the output signal Sin from the interface AA is higher than the output signal Hin from the interface BB. Therefore, drift component $D_1$ is calculated as $D_1$=Sin−Hin and the true detected value $D_2$ of the perturbation current is calculated as $D_2$=Sin−(Hin+$D_1$). Thus, the passenger seating conditions are performed based on compensated measured signal data $D_2$ to provide an accurate assessment.

It should be noted that the present invention is not limited by the embodiments presented above, and for example, the location of the antenna electrode may be on the door or near the seat, or on both ends of the dashboard. The antenna electrodes may be divided suitably and their shapes can be adjusted to other shapes such as strip shape. When many antenna electrodes are to be used, it is preferable that they be firmly supported on an insulating base member. The electric field generation device can be produced by suitably dividing the clock signals in the control circuit, and output frequency can be selected other than 120 KHz to suit the condition inside the car, and the voltage can be selected to be other than 5 volt (3~20 volt range). The impedance conversion section 315Aa may be omitted depending on the detection content and detection precision required by the system. Also, the judging result of the control circuit can be applied to control of the seat belt use and warning light, for example. Further, passenger evaluation can be based on pre-stored reference data on seating pattern of the passenger on the seat and sitting posture, and comparing the detected data with the reference data to obtain information on passenger loading and passenger identity.

Embodiment 8

Embodiment 8 of the passenger detection system is based on detecting the perturbation current related to passenger seating condition using many antenna electrodes processed by a single buffer circuit to prevent signal attenuation.

Figure 87A:
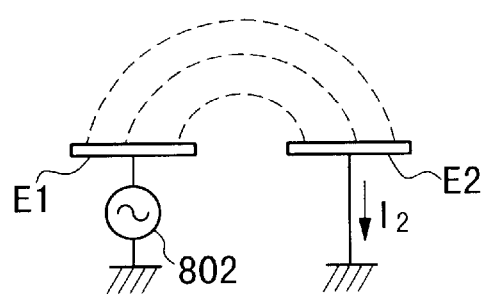
FIGS. 87A, 87B are diagrams to explain the basic operation of the passenger detection system in terms of electric field distribution patterns between the antenna electrodes, respectively, when an object does not or does intervene between the electrodes.
Figure 87B:
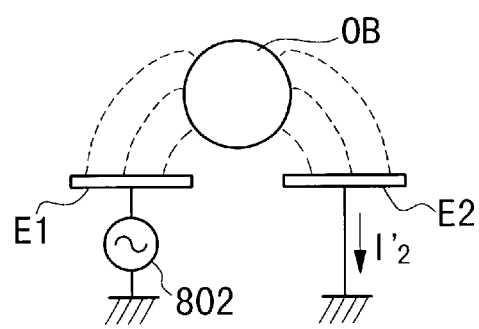

As shown in FIG. 87A, when two antenna electrodes E1, E2 are placed separately, and an oscillation circuit 802 generating HFLV signals is connected to one electrode E1, and the other electrode E2 is grounded, an electric field of characteristics governed by the difference in the potential between the two electrodes E1, E2 is generated, and a current $I_2$ flows in the antenna electrode E2. When an object OB is introduced in the electric field, as shown in FIG. 87B, a perturbation current $I_2'$ of a different characteristics than $I_1$ flows in the electrode E2. Therefore, the current flowing in the antenna electrode changes depending on whether or not an object OB is seated on the seat. The foregoing embodiments presented so far are all based on this principle. By increasing the number of antenna electrodes, it becomes possible to obtain a high volume of data on the object OB, including a passenger sitting on the seat, to enable to detect passenger seating conditions.

Figure 88A:
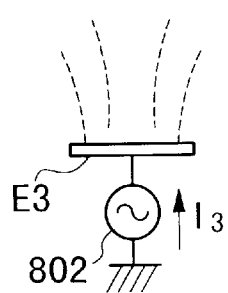
FIGS. 88A, 88B are diagrams to explain the basic operation of other passenger detection system in terms of the electric field distribution patterns of an antenna electrode, respectively, when an object does not or does intervene between the electrodes.

Also, as shown in FIG. 88A, when HFLV signals are impressed on one antenna electrode E3 from the oscillation circuit 802, a weak electric field is generated around the antenna electrode E3, and a forward current $I_3$ flows in the circuit connected to the antenna electrode E3. When an object OB is introduced in the vicinity of the antenna electrode E3, the existing weak electric field is disturbed, and, a perturbation current $I_3'$ of different characteristics flows in the circuit of the antenna electrode E3. Therefore, detection of such forward current enables to detect passenger seating conditions, and by increasing the number of antenna electrodes, much more information on the passenger may be obtained. However, increasing the number of antenna electrodes introduces complications including mutual signal interference effects.

Figure 88B:
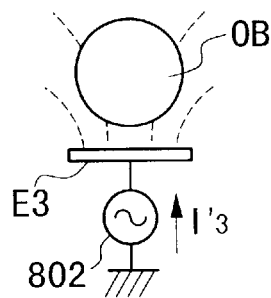
Figure 89:
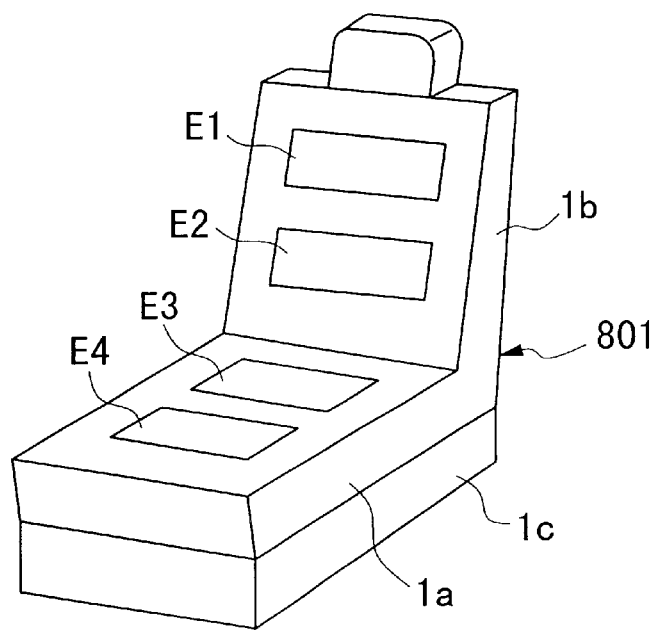
FIG. 89 is a perspective view of a seat equipped with the passenger detection system.
Figure 90:
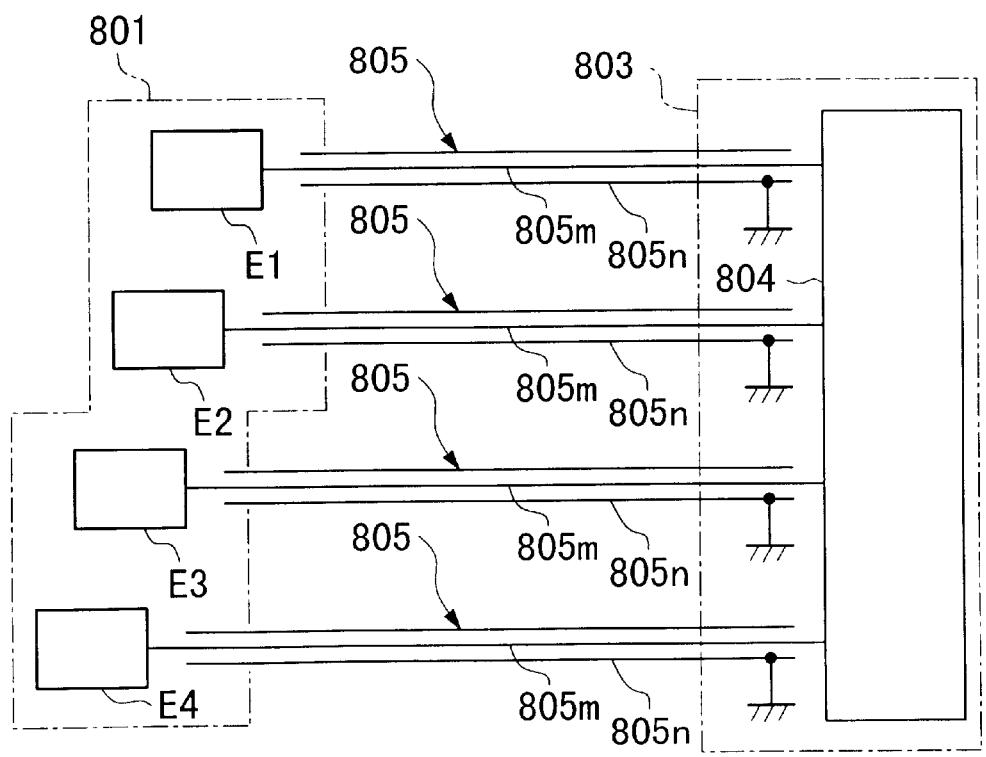
FIG. 90 is a block circuit diagram of the passenger detection circuit installed in the seat shown in FIG. 89.
Figure 91:
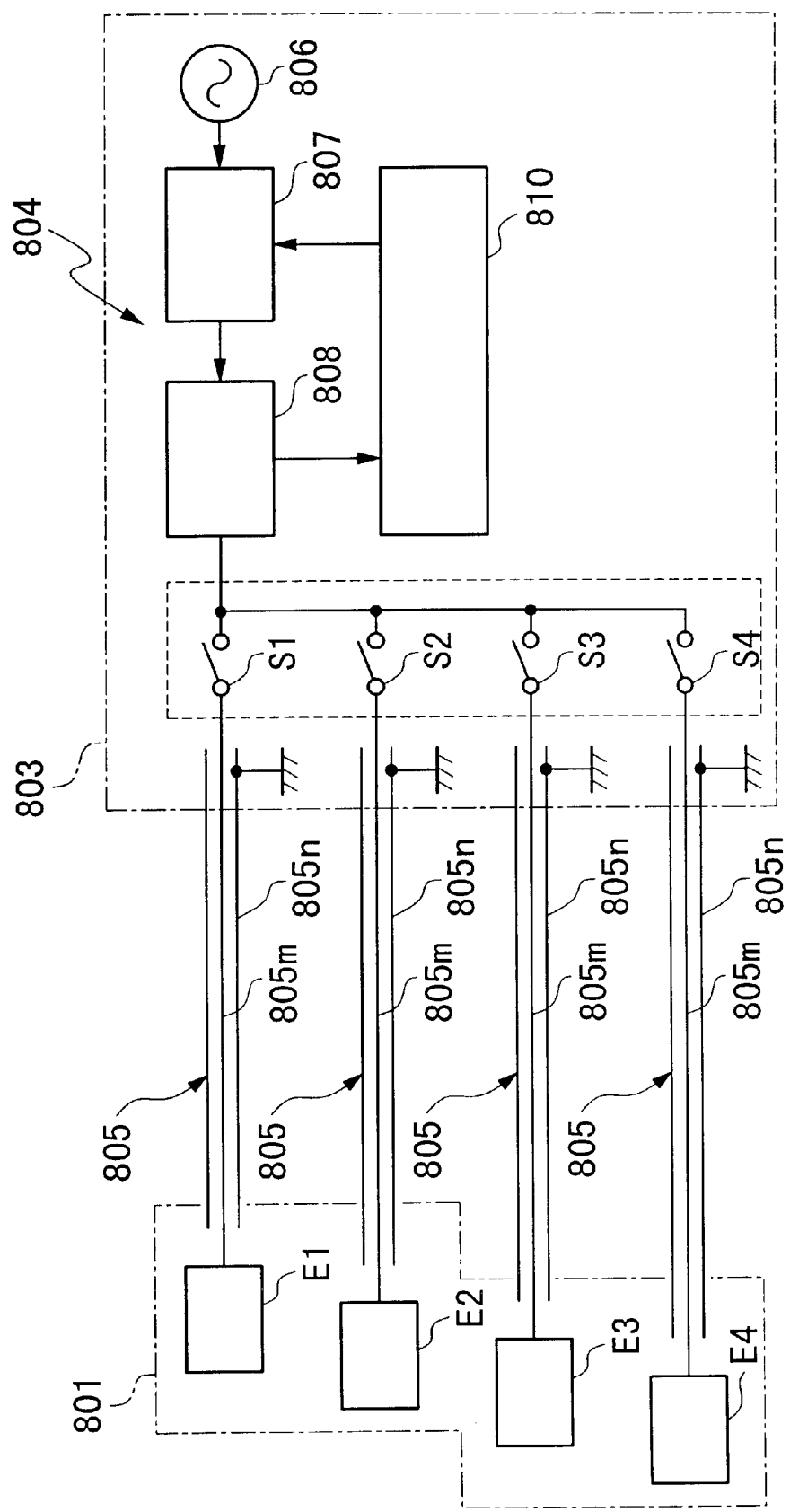
FIG. 91 is a block circuit diagram of a specific example of the circuit shown in FIG. 90.

Embodiment 8 is based on the principle illustrated in FIG. 88, the embodiments will be presented with reference to FIGS. 89~91. The passenger seat 801 shown in FIG. 89 is comprised by a sitting section 801a and a backrest section 801b, and a plurality of antenna electrodes E1~E4, a pair each electrode for example, provided on the surfaces of the sitting section 801a and the passenger seat 801b. The antenna electrodes E1, E2 are made of a conductive fabric in view of passenger comfort, but they may be made by weaving a metallic thread or a conductive fabric in the seat fabric or applying a conductive paint or disposing flexible metal strips. These antenna electrodes E1~E4 are connected in the signal processing circuit 804 in the control unit 803 shown in FIG. 90 by means of shield cables 805.

As shown in FIG. 91, the signal processing circuit 804 and its power source (not shown) are housed in one housing of the control unit 803 which may be fixed to a base 801 supporting the seat 801. The signal processing circuit 804 is comprised by: an oscillation circuit 806 for generating HFLV signals of 5~12 volts at about 100 KHz; an amplitude control circuit 807 for controlling the amplitude of the forward signal generated by the oscillation circuit 806 at a constant value; a current detection circuit 808 for detecting the forward current from the oscillation circuit 806; a switching circuit 809 for successively operating the switching elements S1~S4 between the current detection circuit 808 and each antenna electrode E1~E4; and a control circuit 810 including MPU for controlling the overall passenger detection system. Each antenna electrode E1~E4 is connected to the current detection circuit 808 through respective switching element S1~S4 by means of the shield cables 805. A shield cable 805 is comprised by a signal line 805m and a shield line 805n for the signal line 805m, and the ends of the signal line 805m connects antenna electrodes E1~E4 to respective switching elements S1~S4, and shield line 805n is grounded. Shield cables 805 protects the forward/perturbation signals from the external noise to increase the precision of signal processing by the signal processing circuit 804.

The passenger detection system shown in FIG. 91 operates as follows. First, HFLV signals generated from the oscillation circuit 806 are sent to the amplitude control circuit 807 which controls the voltage amplitude constant, and the signal is sent to the current detection circuit 808. In the meantime, the control circuit 810 controls the on/off action of the switching circuit 809 so that, but only one switching element of the switching elements S1~S4 is successively turned on at any one time. For example, switching element S1 is turned on and all other switching elements are turned off. In so doing, HFLV signals generated from the switching element S1 by the oscillation circuit 806, is impressed on only one antenna electrode E1, and a weak electric field is generated around the antenna electrode E1. Then, according to the principle illustrated in FIG. 88, forward current flows in the antenna electrode E1, of characteristics governed by the conditions around the antenna electrode E1, and a perturbation current related to this current flows in the current detection circuit 808, and is received (output) in the control circuit 810 as the detected data (signal data) of the passenger seating conditions. Next, only the switching element S2 is turned on, and a weak electric field is generated around the antenna electrode E2, and forward current determined by the passenger seating conditions is detected by the current detection circuit 808, and is received in the control circuit 810 as the detected data related to the present passenger seating conditions. Similarly, switching elements E3, E4 are successively turned on, and weak electric field generated around the respective antenna electrode E3, E4 is generated, and forward current related to the passenger seating conditions is successively received in the control circuit 810 as the detected data.

In the control circuit 810, various signal data related to the sitting conditions in various sections of the seat 801 are computed to obtain passenger seating pattern and other data regarding the detected sitting state of the passenger. In the control circuit 810, various data including reference sitting patterns are stored, and the detected sitting pattern is computed from the detected data, which are compared so as to extract a matching sitting pattern from the stored sitting pattern. The sitting patterns stored in the control circuit 810 include a vacant seat pattern (no passenger on the seat), adult normal pattern, back-facing child seat pattern (a child seat is facing backward), front-facing child seat pattern among others. When a detected sitting pattern is obtained in the control circuit 810, a corresponding signal is sent to the airbag apparatus (not shown), and instruction-data are entered in the CC circuit to instruct the airbag circuit to be either in the deployable state or not-deployable state.

The passenger seating condition detection system presented above is based on impressing HFLV signals on one antenna electrode to generate forward/perturbation current to be processed to obtain passenger seating conditions, but a passenger detection system may also be based on two-electrode system illustrated in FIG. 87. In such a system, the antenna electrode circuit and the signal processing circuit are connected using the shield cables which are used as both forward and return signal line for each antenna electrode.

Shield cables used to connect the antenna electrodes to the signal processing circuit reduces the external noise effects and improves processing accuracy for detecting the passenger seating conditions. However, interference effects caused by the resistive and capacitive components between the signal line and the shield line of the shield cable sometimes affect the signal level adversely at both ends of the shield line (antenna electrode end and signal processing end). Such signal level errors occur more frequently when the cable length increases. Non-uniform lengths of cables cause difficulty in correcting such errors. In actual application to automobiles, these difficulties places serious limitations on distribution of antenna electrodes. Therefore, it is desirable to develop a passenger detection system that is not affected by the lengths of the shield cables.

The following embodiments are designed to overcome such difficulties and will be explained with reference to FIGS. 92~95. These embodiments are applications of the system shown in FIGS. 90 and 91, and those parts which are the same as those in FIGS. 92~95, 90, 91 are given the same reference numbers and their explanations are omitted.

Figure 92:
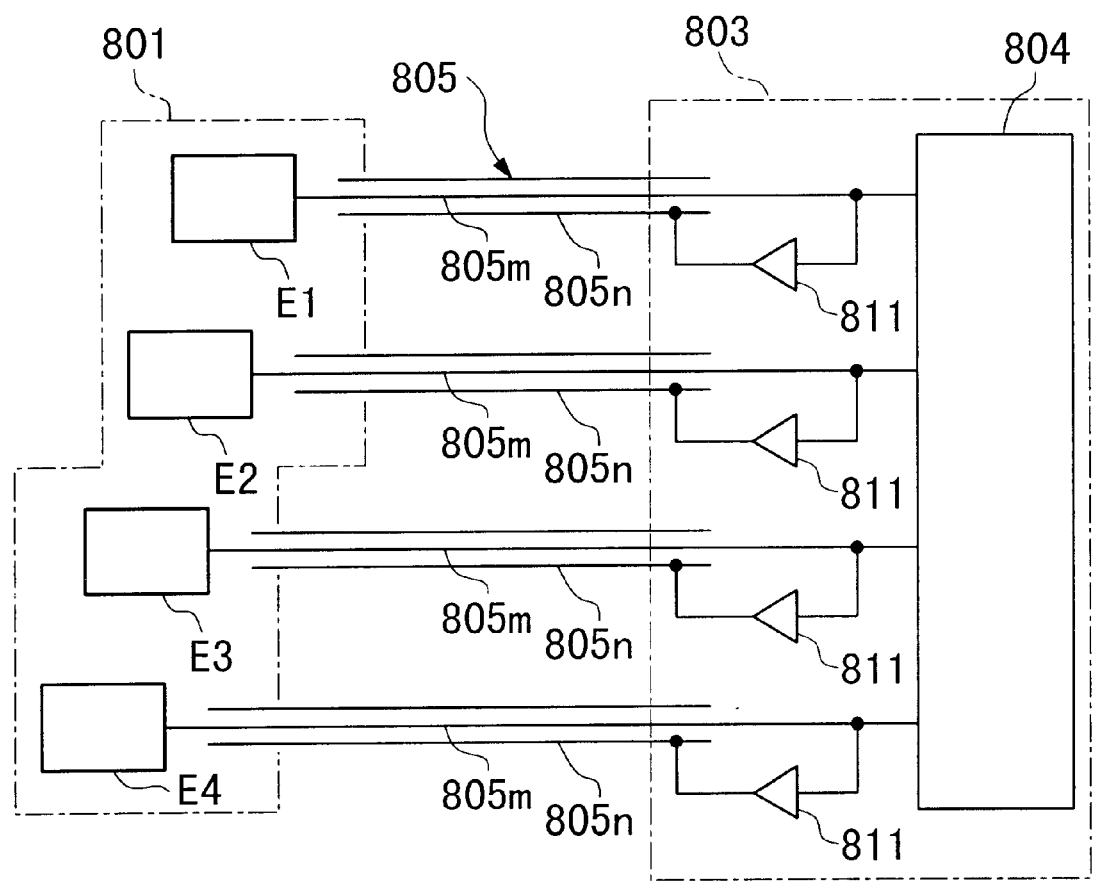
FIG. 92 is a block circuit diagram of an embodiment of the passenger detection system.
Figure 93:
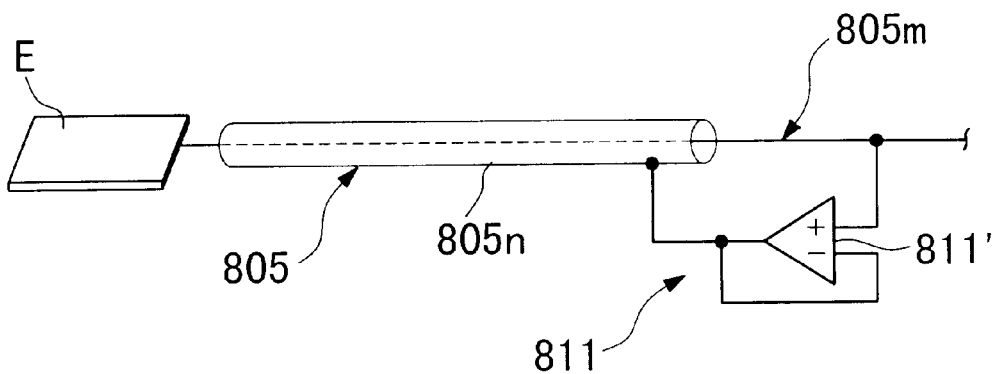
FIG. 93 is a schematic drawing of the shield cable of the system shown in FIG. 92.

As shown in FIG. 92, a buffer circuit 811 is inserted between a shield line 805n, connecting each of the antenna electrodes E1~E4, and the signal processing circuit 804, and the buffer circuits 811 are used to equalize the signal levels at the output ends of the signal line 805m and the shield line 805n. Buffer circuit 811 is comprised by an op-amp 811' such as in FIG. 93, and the positive terminal of the op-amp 811' (non-inverting input terminal) is connected to the signal line 805m, and the negative terminal (inverting input terminal) is connected to the output terminal of the op-amp, and the output terminal of op-amp is connected to the shield line 805n.

When a buffer circuit 811 is connected between the signal line 805m and the shield line 805n of one shield cable 805, the signal levels of the forward current flowing in the signal line 805m or the return (perturbation) current are kept at the same level as the shield line 805n in the buffer circuit 811, therefore, there is no attenuation of the current flowing in the signal line 805m due to RC constant distributed circuit formed between the signal line 805m and the shield line 805. Therefore, errors in the signal levels at both ends of the signal line 805m are decreased. Therefore, when obtaining the passenger sitting data according to the system designs shown in FIG. 87 or 88, regardless of the length of the shield cable 805, precision data on passenger seating conditions can be obtained and processed in the signal processing circuit 804.

Figure 94:
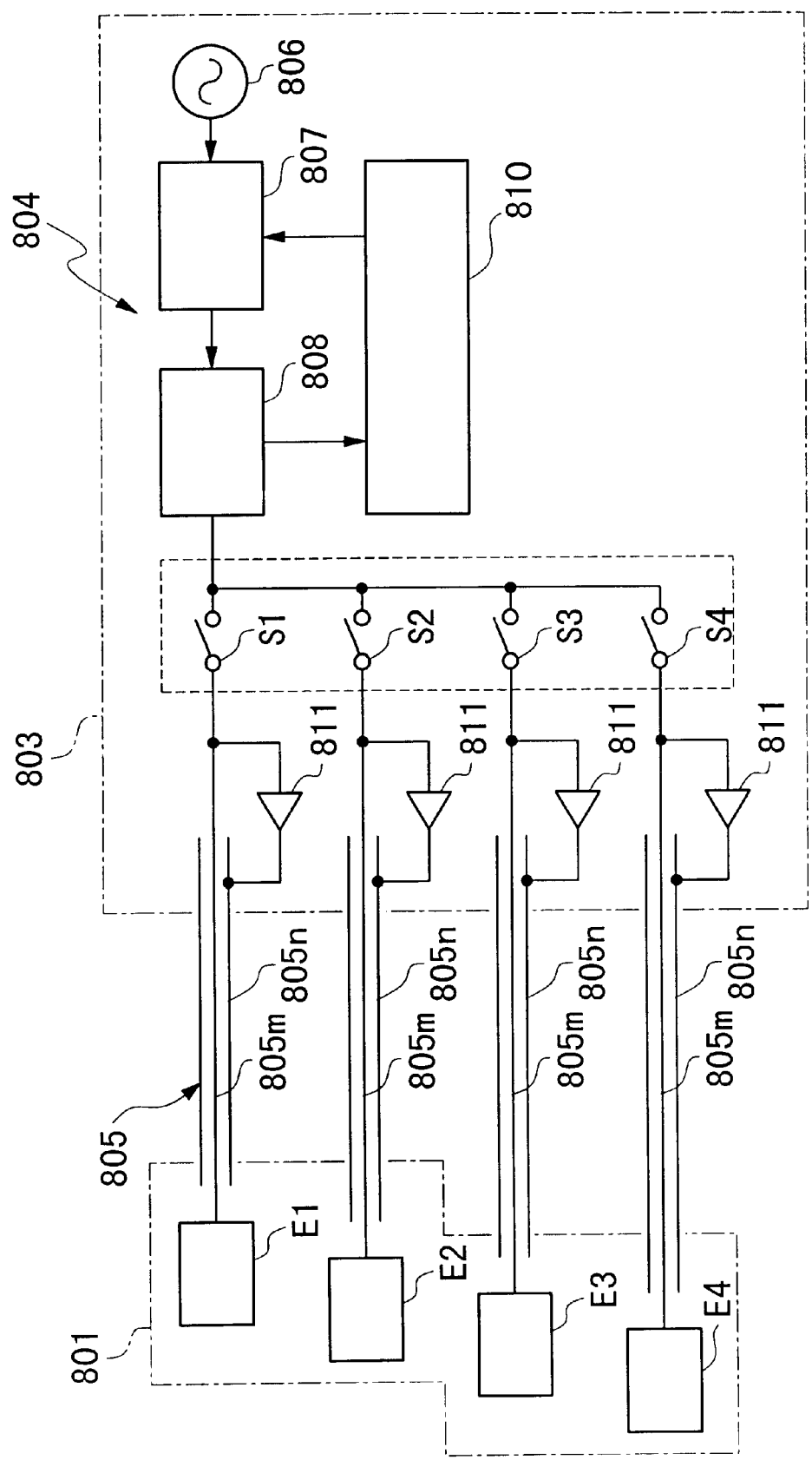
FIG. 94 is a block circuit diagram of a specific example of the circuit shown in FIG. 92.

FIG. 94 shows a system based on the application of the present invention on the passenger detection system shown in FIG. 91. A buffer circuit 811 is inserted between the shield cables 805 and each of the switching elements S1~S4. The operation of the signal processing circuit 804 is the same as that in FIG. 91. That is, HFLV signals are generated from the oscillation circuit 806 and are switched in the switching circuit 809 by the successive on/off actions of the switching elements S1~S4.

For example, only the switching element S1 is turned on and others are turned off, then, HFLV signals from the oscillation circuit 806 are impressed only on the antenna electrode E1 through the signal line 805m of one shield cable 805, which generates a weak electric field around the antenna electrode E1, and a perturbation current related to the forward current flows in the antenna electrode E1, and the perturbation current is detected by the current detection circuit 808 and is input in the control circuit 810, as the present passenger sitting data. Attenuation in the signal line 805m is reduced in the buffer circuit 811, and the accuracy of the data detected by the current detection circuit 808 is improved, and high precision data are received in the control circuit 810. Similarly, switches S2~S4 are successively turned on to obtain perturbation current related to the passenger seating conditions on the antenna electrodes E2~E4 are detected in the current detection circuit 808, and are received successively in the control circuit 810.

Next, the system shown in FIG. 95 will be explained. The system is comprised by: a plurality of antenna electrodes E1~En; shield cables 805; a common buffer circuit 811. In this case, linking switching elements S1'~Sn' which turns on/off as a unit with the switching elements S1~Sn in the switching circuits 809 are added to the switching circuit 809, and one buffer circuit 811 is connect to each shield line 805n of the shield cable 805 through the switching elements S1'~Sn'. In this case, switching element S1 and its linking switching element S1' are turned on concurrently, and HFLV signals from the oscillation circuit 806 are impressed only on antenna electrode E1 through the signal line 805m of one shield cable 805, and the perturbation current related to the sitting conditions around antenna electrode E1 is detected by the current detection circuit 808 and is output to the control circuit 810. In this case, common buffer circuit 811 reduces the attenuation of the forward current flowing in the signal line 805m, so that the control circuit 810 receives high precision data as in the system shown in FIG. 94. Next, switching element S2 and the linking switching element S2' are turned on concurrently, and the common buffer circuit 811 common to the shield cable 805 is connected to the switching element S2, and the forward current related to the passenger sitting condition around the antenna electrode E2 is detected by the current detection circuit 808, and high precision data are received in the control circuit 810. Similarly, switches S3~Sn and the linking switches S3'~Sn' are successively turned on to obtain perturbation signals from the antenna electrodes E3~En, and are received successively in the control circuit 810.

Figure 95:
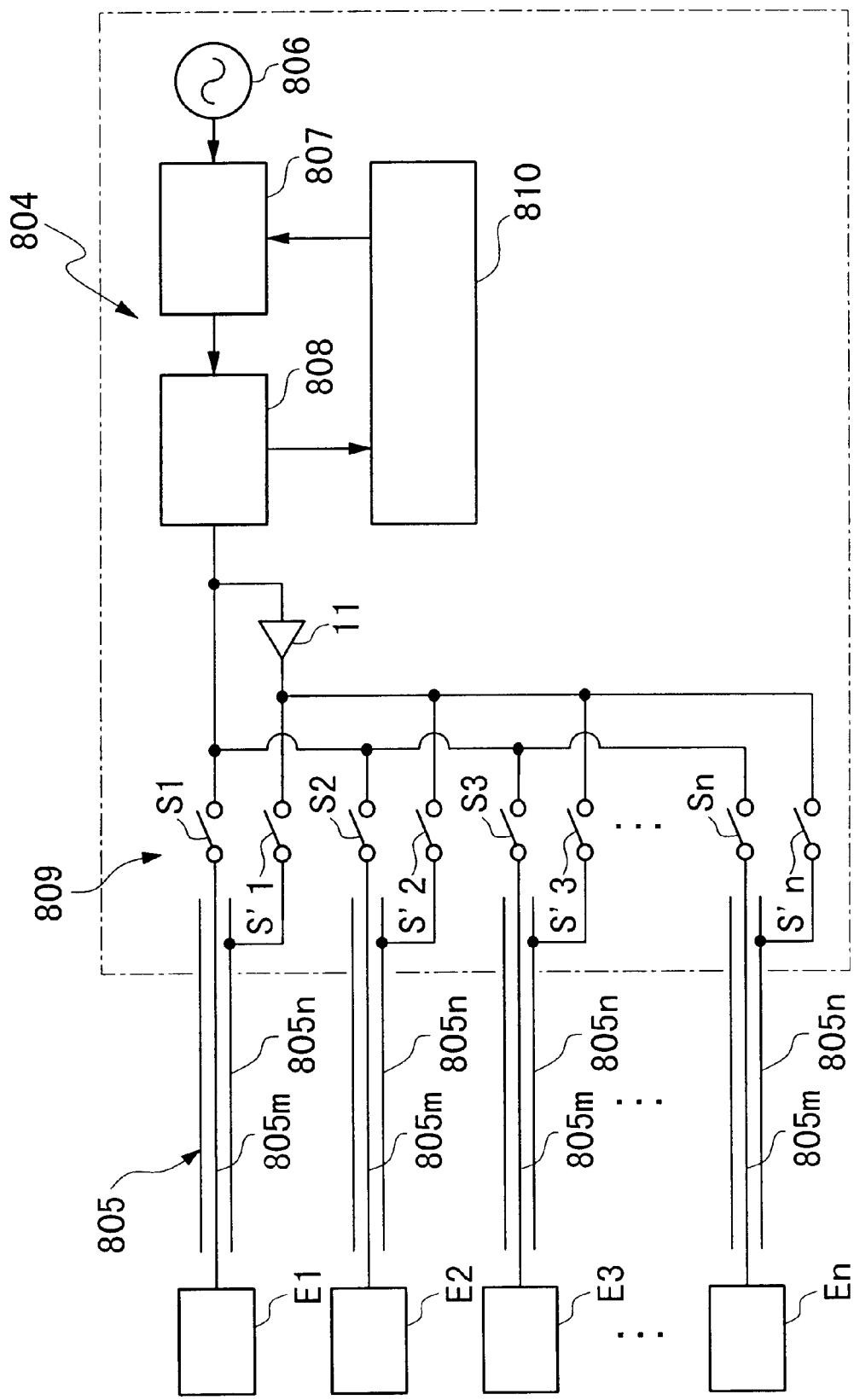
FIG. 95 is a block circuit diagram of another specific example of the circuit shown in FIG. 92.

As shown in FIG. 95, by using a common buffer circuit for a plurality of shield cables, cost is reduced, and in particular, circuit configuration can be simplified significantly for a passenger detection system.

It should be noted that the present invention is not limited by the embodiments presented above. For example, the buffer circuit connected between the signal processing section and the shield cables can be connected to the electrode-end of the shield cable. Also, the buffer circuits are applicable to a passenger detection system based on the principle illustrated in FIG. 87.

What is claimed is:

1. A passenger detection system comprising:
   an array of at least three spaced-apart antenna electrodes disposed on a seat, at least two of said antenna electrodes arranged in a linear row and one antenna electrode offset from said linear row;
   an electric field generation device connectable to said at least three spaced-apart antenna electrodes for generating an electric field around at least one antenna electrode of said at least three spaced-apart antenna electrodes;
   a switching circuit for selecting a particular antenna electrode from said at least three spaced-apart antenna electrodes and connecting said selected antenna electrode to said electric field generation device to produce said electric field around said selected antenna electrode;
   an information detection circuit for detecting said electric field around said selected antenna electrode, and obtaining information related to a current flowing in said selected antenna electrode resulting from said electric field around said selected antenna electrode; and
   a control circuit for receiving signal data from said information detection circuit and determining passenger seating conditions on said seat according to said signal data.

2. The passenger detection system according to claim 1, wherein said at least three spaced-apart antenna electrodes are disposed on a sitting section of said seat.

3. The passenger detection system defined in claim 1, wherein the at least three antenna electrodes have substantially the same size and shape and are spaced equidistantly from a center point on the seat.

4. The passenger detection system defined in claim 1, wherein the at least three antenna electrodes are made from material selected from the group consisting of a conductive fabric, metallic thread, metal strip and a combination thereof.

5. The passenger detection system defined in claim 1, further comprising at least one other antenna electrode spaced apart from the at least three antenna electrodes, so that each of the four spaced-apart antenna electrodes is located at a respective quadrant of a rectangular field.

6. The passenger detection system defined in claim 1, wherein the switching circuit connects sequentially one of the at least three antenna electrodes after another to the electric field generation device, so that the information detecting circuit generates a respective output signal which corresponds to the current flowing in the selected antenna electrode connected to the electric field generation device.

7. The passenger detection system defined in claim 6, wherein the output signals of the at least three antenna electrodes are added together in the control circuit to represent the signal data.

8. The passenger detection system defined in claim 1, wherein the control circuit is operative to store a passenger identity reference value and to compare the stored passenger identity reference value to the signal data, the passenger detection system further comprising an air bag device coupled to the control circuit which outputs a bag deployment enabling signal to deploy the air bag device only if the signal data is at least equal to the passenger identity reference value.

9. The passenger detection system defined in claim 8, wherein the passenger identity reference value corresponds to a current signal selected to be midway between a relatively high current level which flows through the at least three antenna electrodes when an adult is seated on the seat and a relatively low current level which flows through the at least three antenna electrodes when a child is on the seat.

10. The passenger detection system defined in claim 9, wherein the passenger identity reference value is further selected as a function of the characteristics of the seat.

11. The passenger detection system defined in claim 8, wherein the control circuit outputs an air bag deployment prohibiting signal, when it determines that the signal data is smaller than the passenger identity reference value.

12. The passenger detection system defined in claim 9, wherein the control circuit is operative to store a passenger loading reference value which is represented by the current level flowing through the at least three electrodes and selected to be lower than the relatively low current level flowing through the at least three antenna electrodes when the child is seated on the seat.

13. The passenger detection system defined in claim 1, further comprising an amplitude varying circuit coupled to the electric field generation device and operative to control the amplitude of a source forward signal such that the source forward signal has a uniform amplitude when applied to each of the at least three spaced-apart antenna electrodes.

14. The passenger detection system defined in claim 13, wherein the information detection circuit includes an impedance element coupled in series with the amplitude varying circuit to receive the source forward signal from the electric field generation device and with each of the at least three spaced-apart antenna electrodes, the information detection circuit further having an operational amplifier operative to amplify an output signal resulting from a voltage differential across the impedance element if a passenger is seated on the seat.

15. The passenger detection system defined in claim 3, further comprising a problem diagnostic circuit operative to verify communication between the control circuit and an air bag device.

16. The passenger detection system as defined in claim 1, further comprising a phase detector circuit connected between the electric field generation device and the at least three spaced apart antenna electrodes for measuring respective phase shifts resulting from a passenger seated on the seat.

17. The passenger detection system according to claim 1, wherein the array of at least three spaced-apart antenna electrodes are disposed on a backrest section of the seat.

18. A passenger detection system comprising:
- an array of at least three spaced-apart antenna electrodes disposed on a seat, at least two of said antenna electrodes arranged in a linear row and at least one antenna electrode offset from said linear row;
- an electric field generation device connectable to said at least three spaced-apart antenna electrodes for generating an electric field around at least one antenna electrode of said at least three spaced-apart antenna electrodes;
- a switching circuit for selecting a particular antenna electrode from said at least three spaced-apart antenna electrodes and connecting said selected antenna electrode to said electric field generation device to produce said electric field around said selected antenna electrode;
- an information detection circuit for detecting said electric field around said selected antenna electrode, and obtaining information related to a current flowing in said selected antenna electrode resulting from said electric field around said selected antenna electrode;
- a control circuit for receiving signal data from said information detection circuit and determining passenger seating conditions on said seat according to said signal data; and
- an airbag apparatus for enabling to deploy, upon collision, an air bag designated for said seat, wherein
- said airbag apparatus is instructed by said control circuit to be either in the deployable state or not-deployable state according to data generated by said control circuit after the passenger seating conditions have been determined.

19. A passenger detection system comprising:
- a seating surface;
- an array of at least three spaced-apart antenna electrodes arranged on said seating surface, at least two of said antenna electrodes arranged in a linear row and at least one antenna electrode offset from said linear row;
- an electric field generator capable of exciting said at least three-spaced apart antenna electrodes so as to produce respective electric fields as a function of the size of a passenger seated on said seating surface;
- a switch sequentially connecting said electric field generator to said at least three spaced-apart antenna electrodes; and
- a controller responsive to currents flowing in said at least three spaced-apart antenna electrodes resulting from said respective electric fields so as to determine passenger seating conditions.

* * * * *

UNITED STATES PATENT AND TRADEMARK OFFICE
CERTIFICATE OF CORRECTION

PATENT NO. : 6,559,555 B1  
DATED : May 6, 2003  
INVENTOR(S) : Takashi Saitou et al.

It is certified that error appears in the above-identified patent and that said Letters Patent is hereby corrected as shown below:

<u>Title page,</u>  
Item [73], should read as follows:  
-- Assignee: Honda Elesys Co., Ltd. --

Signed and Sealed this

Sixteenth Day of September, 2003

JAMES E. ROGAN  
*Director of the United States Patent and Trademark Office*